United States Patent
Lennon et al.

(10) Patent No.: US 7,574,652 B2
(45) Date of Patent: Aug. 11, 2009

(54) METHODS FOR INTERACTIVELY DEFINING TRANSFORMS AND FOR GENERATING QUERIES BY MANIPULATING EXISTING QUERY DATA

(75) Inventors: Alison Joan Lennon, Balmain (AU); Timothy Charles Edgoose, Chippendale (AU); Sue-Ken Yap, Lane Cove (AU); Sammy Chan, West Pennant Hills (AU); Jing Wu, Carlingford (AU); Lena Qian, Eastwood (AU); Khanh Phi Van Doan, Noranda (AU); Joshua Brendon Worrill, Alexandria (AU)

(73) Assignee: Canon Kabushiki Kaisha, Tokyo (JP)

( * ) Notice: Subject to any disclaimer, the term of this patent is extended or adjusted under 35 U.S.C. 154(b) by 284 days.

(21) Appl. No.: 10/465,222

(22) Filed: Jun. 20, 2003

(65) Prior Publication Data

US 2004/0015783 A1  Jan. 22, 2004

(30) Foreign Application Priority Data

Jun. 20, 2002  (AU) .................................... PS3062
Jun. 20, 2002  (AU) .................................... PS3063
Dec. 23, 2002  (AU) .............................. 2002953553

(51) Int. Cl.
    *G06F 17/00* (2006.01)
(52) U.S. Cl. ..................................... 715/248; 715/249
(58) Field of Classification Search ................ 715/523, 715/805, 500, 248, 249; 709/246
    See application file for complete search history.

(56) References Cited

U.S. PATENT DOCUMENTS

| | | | |
|---|---|---|---|
| 5,581,678 A | 12/1996 | Kahn | ......................... 395/140 |
| 5,611,034 A | 3/1997 | Makita | ....................... 395/140 |
| 5,970,490 A | 10/1999 | Morgenstern | ................. 707/10 |
| 6,009,428 A | 12/1999 | Kleewein et al. | .............. 707/10 |
| 6,178,416 B1 | 1/2001 | Thompson et al. | ............. 707/3 |
| 6,195,662 B1 | 2/2001 | Ellis et al. | .................... 707/103 |
| 6,222,540 B1 | 4/2001 | Sacerdoti | ..................... 345/339 |
| 6,820,135 B1 * | 11/2004 | Dingman et al. | ............ 709/246 |
| 6,823,495 B1 * | 11/2004 | Vedula et al. | ............... 715/805 |

(Continued)

OTHER PUBLICATIONS

Vitali et al. "Two Implementation of XPointer" ACM Jun. 11-15, 2002 pp. 145-146.*

(Continued)

*Primary Examiner*—Rachna S Desai
(74) *Attorney, Agent, or Firm*—Fitzpatrick, Cella, Harper & Scinto

(57) ABSTRACT

Access to heterogeneous data sources may be obtained by interactively determining transformations for use in mapping at least one source data component from at least one data source to a target data component. Selection of at least one the source data component is detected. A corresponding list of representative data examples is generated for each selected source data component. A resulting list of representative data examples is compiled for the target data component from the lists of representative data examples of the selected source data components, the resulting list of data examples being representative of the target data component. A modification of an example is identified from the resulting list of examples representative of the target data component, the example being modified as a single textual entity. At least one transformation is determined, by inferring from the modified example, to be applied to at least one source data component.

25 Claims, 64 Drawing Sheets

U.S. PATENT DOCUMENTS

| | | | |
|---|---|---|---|
| 2002/0107973 A1 | 8/2002 | Lennon et al. | 709/231 |
| 2002/0184213 A1* | 12/2002 | Lau et al. | 707/6 |
| 2003/0058277 A1* | 3/2003 | Bowman-Amuah | 345/765 |
| 2003/0204487 A1* | 10/2003 | Sssv et al. | 707/1 |
| 2004/0205615 A1* | 10/2004 | Birder | 715/523 |
| 2004/0216030 A1* | 10/2004 | Hellman et al. | 715/500 |
| 2005/0160408 A1* | 7/2005 | Fleegal | 717/136 |
| 2006/0235732 A1* | 10/2006 | Miller et al. | 705/7 |

OTHER PUBLICATIONS

Lieberman, Henry, "Your Wish Is My Command Programming by Example", Media Lab MIT, 2001 (supplied in IDS).*

Blackwell, A.F., "SWYN: A Visual Representation for Regular Expressions", in *Your Wish Is My Command—Programming by Example*, edited by H. Lieberman, Academic Press, 2001, ch. 13.

Chang, C.K., et al., "Mind Your Vocabulary: Query Mapping Across Heterogeneous Information Sources", Proce. 1999 ACM SIGMOD Conf., Philadelphia, PA, Jun. 1999, pp. 335-346.

Papakonstantinou, Y., et al., "Object Exchange Across Heterogeneous Information Sources", IEEE International Conference on Data Engineering, ICDE1995, Taipei, Taiwan, Mar. 1995, pp. 251-260.

Quass, D., et al., "Querying Semistructured Heterogeneous Information", International Conference on Deductive and Object-Oriented Databases, 1995, pp. 319-344.

Levy, A.Y., et al., "Querying Heterogeneous Information Sources Using Source Descriptions", VLDB 1996, pp. 251-262.

Carey, M.J., et al., "Towards Heterogeneous Multimedia Information Systems: The Garlic Approach", Proceedings of the 5th International Workshop on Research Issues in Data Engineering, 1994, IBM Almaden Research Center, San Jose, CA.

XML Spy (www.xmlspy.com), 1992.

Papakonstantinou, Y., et al., "The Enosys Markets Data Integration Platform: Lessons from the Trenches", ACM Conference on International and Knowledge Management (CIKM) 2001 (s http://www.db.ucsd.edu/publications/CIKM.htm).

Petropoulos, M., et al., "Building XML Query Forms and Reports with XQForms", Proceedings of WWW10, Hong Kong, 2001.

Mukhopadhyay, P., et al., "Mixing Querying and Navigation in MIX", Data Engineering (ICDE), 2002 (see http://db.ucsd.edu/people/yannis.htm.

Suzuki, G., et al., "Mediation System For Hetrogeneous Information Sources Based on XML: MediPresto/XM", Data base systems 125-60, Jul. 18, 2001.

R. Sedgewick, "Algorithms", Addison-Wesley Publishing Company, pp. 479-483, 1988.

* cited by examiner

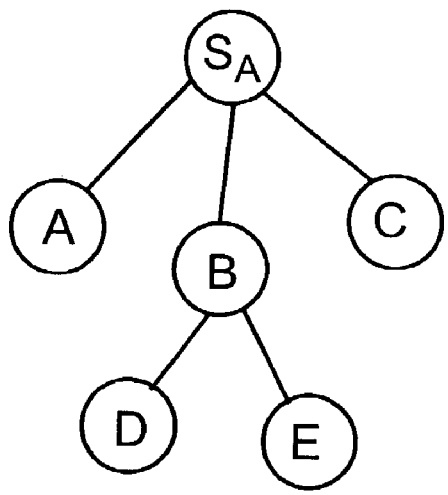
Fig. 10A
Initial view
(before mapping is applied)
Fig. 10B
Visual representation without removal of source components from the schema view
z = f (D, E)
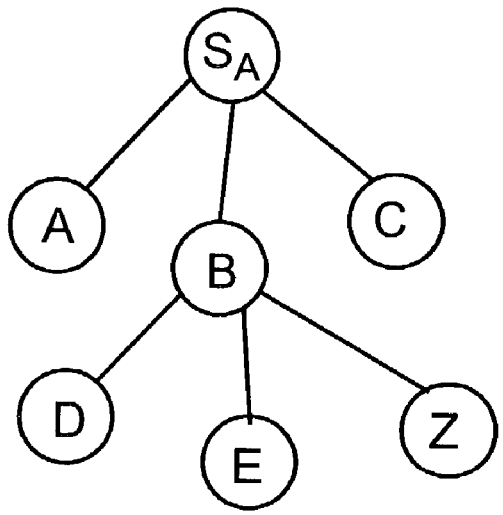
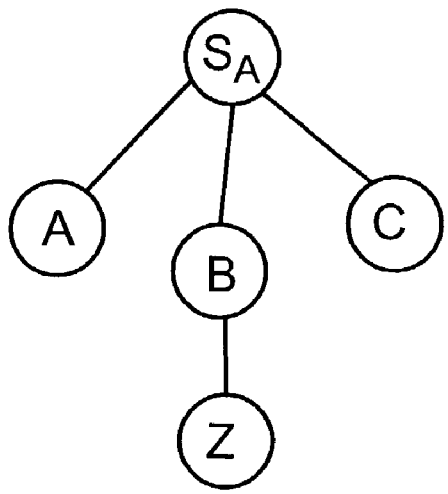
Fig. 10C
Visual representaion with removal of source components from the schema view

```
<osListByLocation>
{
   for $loc in distinct-values(document("HumanResourcesDB")/department/location)
      let $dept := document("HumanResourcesDB")/department[location=$loc]/code)
      let $mc := document("MachineSpreadsheet")/machine[department=$dept])
      return
         <location name="{$loc/text()}">
         {
            for $os in distinct-values($mc/os)
               return
                  <os name="{$os/text()}">count($mc[os=$os])</os>
         }
         </location>
}
</osListByLocation>
```

Fig. 25

```
<mcListByProject>
{
   for $prj in distinct-values(document("HumanResourcesDB")/project/code)
      let $dept :=
document("HumanResourcesDB")/employee[project=$prj])/department
      let $mc := document("MachineSpreadsheet")/machine[department=$dept])
      return
         <project code="{$prj/text()}">
         {
            for $x in $mc
               return
                  <machine>$x/name/text()</machine>
         }
         </project>
}
</mcListByProject>
```

Fig. 26

```
<Company name = "XYZ-Mart">
   <Dept name="Apparel">
      <Sales month ="Jan">123000</Sales>
      <Sales month ="Feb">23000</Sales>
      <Sales month ="Mar">343000</Sales>
      <Sales month ="Apr">56000</Sales>
   </Dept>
   <Dept name = "Toys">
      <Sales month ="Jan">1111000</Sales>
      <Sales month ="Feb">222000</Sales>
      <Sales month ="Mar">333000</Sales>
      <Sales month ="Apr">1234444</Sales>
   </Dept>
</Company>
```

Fig. 32

| Company | Dept | Month | Sales |
|---------|---------|-------|---------|
| XYZ-Mart | Apparel | Jan | 123000 |
|  |  | Feb | 23000 |
|  |  | Mar | 343000 |
|  |  | Apr | 56000 |
|  | Toys | Jan | 1111000 |
|  |  | Feb | 222000 |
|  |  | Mar | 333000 |
|  |  | Apr | 1234444 |

Fig. 33

| Company | Dept |
|---------|------|
| XYZ-Mart | «Apparel» |
|  | «Toys» |

Fig. 34

XYZ-Mart

| Month \ Dept | Jan | Feb | Mar | Apr |
|---|---|---|---|---|
| Apparel | 123000 | 23000 | 343000 | 56000 |
| Toys | 1111000 | 222000 | 333000 | 1234444 |

| Month \ Dept | Apparel | Toys |
|---|---|---|
| Jan | 123000 | 1111000 |
| Feb | 23000 | 222000 |
| Mar | 343000 | 333000 |
| Apr | 56000 | 1234444 |

| Company | Dept | Month | Advertisement | Sales |
|---|---|---|---|---|
| XYZ-Mart | Apparel | Jan | 532 | 23000 |
| | | Feb | 1000 | 56000 |
| | | Mar | 1500 | 123000 |
| | | Apr | 3000 | 343000 |
| | Toys | Jan | 1500 | 222000 |
| | | Feb | 1800 | 333000 |
| | | Mar | 2750 | 1111000 |
| | | Apr | 3000 | 1234444 |

(columns labeled 4001, 4002, 4003, 4004)

| Name | Ext | Photo |
|---|---|---|
| A. Jones | 2801 | ajones.jpg |
| B. Smith | 2802 | bsmith.jpg |
| C. Brown | 2803 | cbrown.jpg |
| D. Black | 2501 | dblack.jpg |
| E. White | 2502 | ewhite.jpg |
| F. Williams | 2503 | fwilliams.jpg |
| G. Little | 2701 | glittle.jpg |
| H. Richards | 2702 | hrichards.jpg |

Fig. 43

```
<Company name = "XYZ-Mart">
    <Dept name = "Apparel">                    ← 4401
        <Sales month = "Jan">123000</Sales>    ← 4402
        <Sales month = "Feb">23000</Sales>
        <Sales month = "Mar">343000</Sales>
        <Sales month = "Apr">56000</Sales>
        <Staff gender = "male">20</Staff>
        <Staff gender = "female">20</Staff>    ← 4403
    </Dept>
    <Dept name = "Toys">
        <Sales month = "Jan">1111000</Sales>
        <Sales month = "Feb">222000</Sales>
        <Sales month = "Mar">333000</Sales>
        <Sales month = "Apr">1234444</Sales>
        <Staff gender = "male">10</Staff>
        <Staff gender = "female">10</Staff>
    </Dept>
</Company>
```

Fig. 44

|  |  |  | 4503 | 4504 | 4501 |  |
|---|---|---|---|---|---|---|
| Company | Dept | Month | Sales | Gender | Staff | 4502 |
| XYZ-Mart | Apparel | Jan | 123000 | male | 20 | |
| | | Feb | 23000 | female | 20 | |
| | | Mar | 343000 | | | |
| | | Apr | 56000 | | | |
| | Toys | Jan | 1111000 | male | 10 | |
| | | Feb | 222000 | female | 10 | |
| | | Mar | 333000 | | | |
| | | Apr | 1234444 | | | |

Fig. 45

| Company | Dept | Sales | Staff |
|---|---|---|---|
| XYZ-Mart | Apparel | «link» | «link» |
| | Toys | «link» | «link» |

Fig. 46

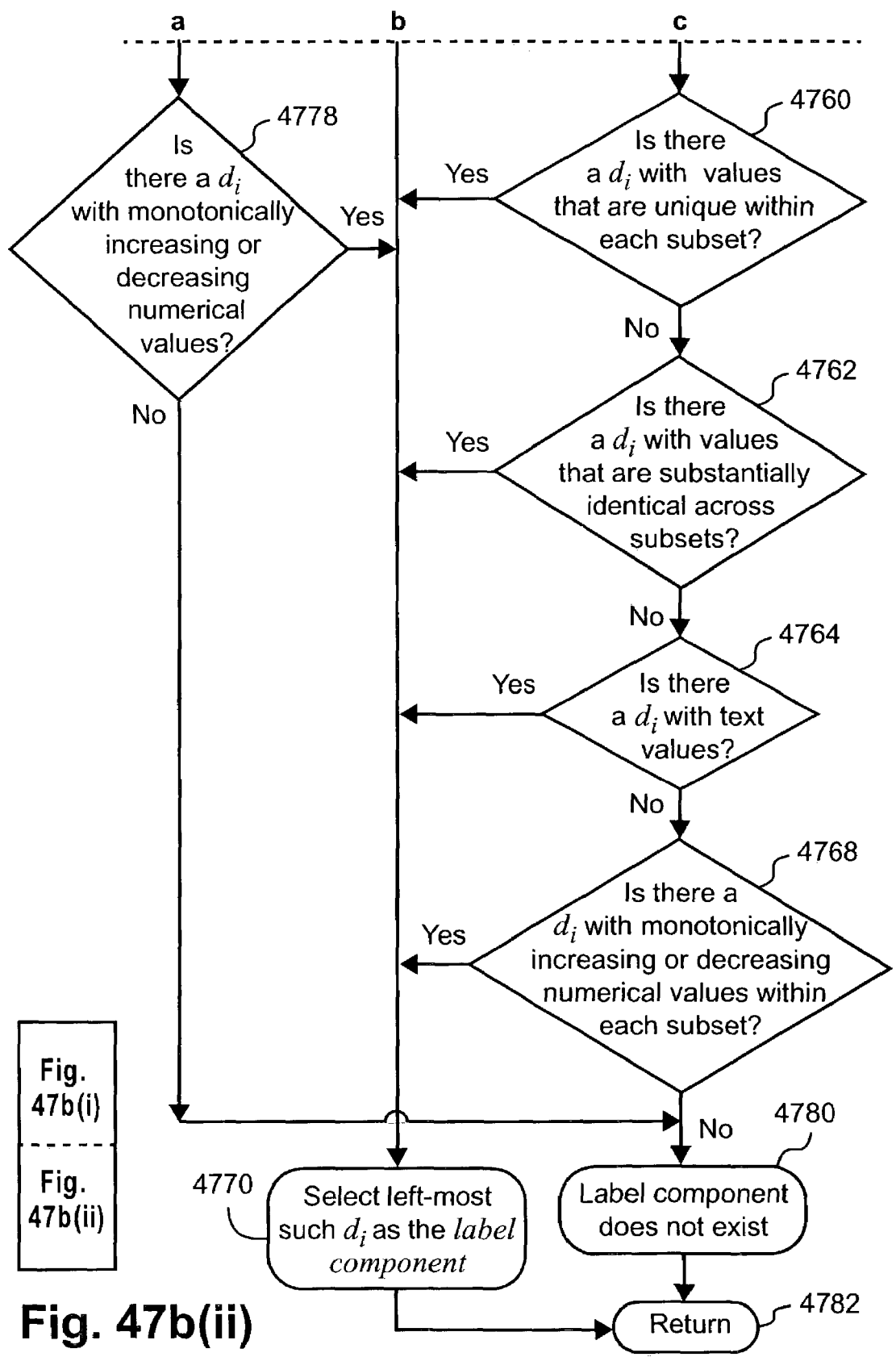
Fig. 47b(ii)

METHODS FOR INTERACTIVELY DEFINING TRANSFORMS AND FOR GENERATING QUERIES BY MANIPULATING EXISTING QUERY DATA

COPYRIGHT NOTICE

This patent specification contains material that is subject to copyright protection. The copyright owner has no objection to the reproduction of this patent specification or related materials from associated patent office files for the purposes of review, but otherwise reserves all copyright whatsoever.

TECHNICAL FIELD OF THE INVENTION

The present invention relates to enabling users to access data from heterogeneous data sources and, in particular, to the specification of data transforms for the purposes of reducing or eliminating heterogeneity over such data sources.

BACKGROUND

The World Wide Web (or simply, the "Web") provides users with networked access to large amounts of information from a large number of information sites. However, much of that information remains technically and/or practically inaccessible due to being stored in database systems of varying forms. Also, it is difficult for users to collate information from many different data sources, where the desired data may be stored on the Web in some combination of database systems or structured documents.

Although interfaces to the Web can provide users with access to information stored within specific databases, each database typically uses its own vocabulary to describe the stored information. In addition, similar information is often stored in many disparate ways (eg. monetary information can be stored as $US in one database, and Japanese Yen or $AU in other databases). These problems make it difficult for users to collate related information from different data sources. There exist systems that attempt to provide interoperation and varying degrees of integration among multiple databases. These systems have been called multi-database systems, federated databases, and more generally, heterogeneous distributed database systems.

One form of multi-database system is where there is a global schema for the integrated system. A schema is a specification of the structure and interrelationships of a class of data. In such a case, individual schema of the constituent data sources are tightly integrated into the global schema. In this regard, the schema must either use the same vocabulary and semantics as the global schema or there must be a clear mapping to components of the global schema. This case is relatively easy to implement if the databases have a similar nature or purpose, and most easy to implement if the databases all select to use a single vocabulary. However, this is difficult to achieve when the information to be integrated is varied in nature or purpose, or the information sources have been compiled without a view to being integrated. For example, a database system designed to hold metadata for media objects would most likely use very different terminology to a database containing schematics for motor vehicle assembly. Multi-database systems, which are based on a global schema generally result in a loss of autonomy by the information owners and lack extensibility, two features which are undesirable and unnecessarily restrictive in a networked environment such as the Web.

Consequently, less tightly coupled database federations have become more popular in more recent times. In these systems, the extent of schema integration depends on the needs of users. Typically in these systems, each data source has its own local schema, also known as the "export schema". An export schema can be integrated to different extents with a common data model for the federation, and such integration may involve mapping the local schemas of the constituent data sources into a common component schema, in order to alleviate data model heterogeneity. An example of this is found in the Object Exchange Model of the TSIMMIS project at Stanford University. In some cases, the mappings are provided by the local schema administrator, while in other cases the mappings are provided and stored centrally (for the federation) with the facility for further mappings to be added when new data sources need to be accessed. The mappings are typically represented using procedural code and are only understood by the particular federated system. Examples of the use of procedural code to effect mappings include the repository wrappers in the Garlic project of IBM Corp., and TSIMMIS mentioned above. Users of the federated system typically interact with the global schema, which is a result of the applied mappings. Therefore the existence of the mappings is effectively hidden from the user.

The next stage in the transition to even more loosely-coupled systems, is where users can effectively create their own personalised federations. In these cases the responsibility of maintaining a consistent view of the information falls upon users of the information and may involve users creating a view of the information against the export schemas of information sources that they want to access. Such user-defined federations can be more extensible and therefore are more suited to the web environment. Web standards, such as the XML Query (XQuery) language and XML Schema, provide an opportunity for data sources to become accessible using the HTTP protocol. For example, Tamino (XML) database systems can be queried using XQuery over HTTP. These web standards can unify access to databases and structured data (eg. XML). User-defined federations over the Web can therefore be more extensible. However, they rely on users being more knowledgeable about the contained data and tools used to manipulate the data, for example to transform the data to a common form for the purposes of collation or comparison.

User-defined federations also suffer greatly from the problems implicit in the use of multiple vocabularies by the creators or owners of the individual data sources. For example, one data source may store names in the form Surname, GivenName whereas another data source may store names as two separate fields, Surname and GivenName, or SecondName and FirstName. This heterogeneity of vocabulary makes it difficult for users to pose queries across the multiple data sources. In other words, if a user was searching for references to a person with a surname of "SMITH", the user would typically need to enter a constraint for each data source using the terminology of that source. For example, where Name starts with "SMITH", OR Surname="SMITH" OR Second Name="SMITH". The user may also need to consider whether the data in the data source is stored in upper or lower case. These problems were also experienced by the previous generation of loosely-coupled federations but were solved by having expert-defined mappings that resolved the problem for a particular federation. For example, U.S. Pat. No. 6,009,428 describes a method of mapping between data types that utilises functions that are local to particular databases and that implement conversions. However, like much of the art in this area, these mappings are pre-defined and performed by a data-translation procedure that is hidden from the user.

In order for users to gain seamless access to heterogeneous data sources it is necessary to be able to create and apply mappings to the export schemas of the data sources that are of interest to the users. Such mappings preferably define how data from the individual sources are to be combined, transformed or renamed into terms that the user understands. This collection of mappings results in a user-generated view of the selected information sources and represents a re-mapping of the live data rather than the creation of a new layer of data, which describes in some form the original (live) data. Such views therefore differ from techniques such as the ISO standard Topic Maps, which define a further layer upon the data where the subjects and relationships of the data are modeled as exchangeable collections of topics and associations.

In the past, the creation of mappings has been the task of a system administrator, or someone who understands the principles of mathematical and functional transformations. In most cases, as described above, the mappings are implemented using scripts or procedural code and therefore hidden from the user of the information. Typically, an administrator may set up a set of mappings for a collection of databases that may be required by an organization and everyone in that organization would use the created mappings to access the data.

Another related area in which mapping transformations are currently used is the area of data warehousing. In such instances, the Extract/Transform/Load (ETL) methodology is typically used to select information from data sources, transform the information in some way and then load the transformed information into a data warehouse. Typically, these tools are also used by database administrators or data warehouse managers and involve defining transformation expressions which include functions, statements, operators and data fields. For example, Data Junction data warehousing software contains a map designer module, which allows users to define mapping transformations using an expression builder tool. This tool requires users to enter expressions using functional notation. For example, the expression "DateConvert("mmddyy", "mm/dd/yyyy", field1)" converts a date of the form 070801, that is stored in variable "field1" to form 07/08/2001. Clearly, although the building of expressions of this form may be acceptable to a person knowledgeable with respect to functional notation, the average user of the Web may not be inclined to use such tools.

Further, information that is desired to be collated from a number of different sources can be referred to as a "view" of the data. Commonly-used relational database management systems (RDBMS), such as provided by Oracle™ or Microsoft™, often provide users with a graphical user interface (GUI) to design views across tables in the database system. These GUIs are designed to remove the need for the user to create views by directly writing queries to the database system, such as SQL queries of SQL databases. However these views are typically limited to tables stored in the RDBMS.

More general reporting systems, such as Brio Intelligence (Brio Software™, Inc.), Business Objects (Business Objects™) and Crystal Reports (Crystal Decisions™) allow users to design views or reports across known sets of data sources, where the data sources are generally accessed via proprietary wrappers. Users can design reports by selecting data sources and viewing all the data components (or fields) that can be used in the reports. Data components of interest can then be selected for inclusion in the report. However, this method requires that the user be a report designer, and understand the relationships between data components of different data sources. Such a method is typically suited to smaller corporate environments, where the people who generate the reports are usually very familiar with the different corporate data sets.

A common desire of users of information is to be able to easily create views of data across heterogeneous data sources (ie. data sources of different form and structure) without having to "personally" know or understand the relationships between data components of the different data sources. These data sources may be distributed over an Intranet or, as is so often the case recently, over the Internet. In most prior art arrangements the procedures that must be followed for users to create new reports or views are typically designed for users having a good understanding of database terminology and procedures frequently used for report generation. This class of user is often satisfied with an approach where the data is first collected from a list of tables and their contained fields because they understand what the field names mean and can recall the conventions (eg. style, units, etc.) used in compiling the data. The average collator of information (eg. a business/information analyst) may not be so familiar with the data and the specifications of the data in terms of the tables and fields (ie. schema). This class of user typically accesses a large number of different data sources on an irregular basis, and is often dependent on a database administrator or experienced report writer to obtain the data required.

This problem is exacerbated in situations where the data must be collated from multiple heterogeneous data sources. In these cases, the way the schema of each data source is presented to the user could vary. For example, one data source might be hierarchical and so the schema may be represented in an hierarchical form. Another data source could be relational and its schema could be represented using a list of tables and relationships between tables, such as used by products such as Microsoft Access™. Neither of these schema formats inform the user about the "form" of the data. For example, is an "Amount" column in a relational table a value in US dollars, Japanese Yen or Euro? Similarly, the only way the user can find out whether a "Name" column includes both given and surnames is to actually select that column for inclusion in the report and then inspect the data. Some prior art arrangements do provide a data preview functionality, which alleviates this situation to some extent.

Another limitation of the prior art is that the creators of new reports and views cannot easily use information deduced by others in the formation of their reports.

A further limitation of the prior art is that new reports or views are typically created by first collecting the required data and then deciding on a graphical form of the report (eg. table, line graph, scatter plot). However, users increasingly expect to move more directly to their desired end result. For example, if a user already knows that he/she wants the report presented as a line graph, he/she should not need to first collect the data in a table then create a graph from the table.

SUMMARY OF THE INVENTION

It is an object of the present invention to substantially overcome, or at least ameliorate, one or more disadvantages of existing arrangements.

In accordance with one aspect of the present disclosure there is provided a method of interactively defining transformations for use in mapping at least one source data component from at least one data source to a target data component, the method comprising the steps of:
  (a) selecting at least one source data component;
  (b) for each selected source data component, generating a corresponding list of representative data examples;

(c) compiling an resulting list of representative data examples for the target data component from the lists of representative data examples of the selected source data components, the resulting list of data examples being representative of the target data component;

(d) modifying an example from the resulting list of examples representative of the target data component, the example being modified as a single textual entity; and (e) inferring from the modified example, at least one transformation to be applied to at least one source data component.

Implementation of this aspect makes it easier for consumers of information to be able to define their own mappings with their associated data transforms, and therefore create personal views over collections of heterogeneous data sources without the assistance of skilled system or database administrators. These personal views can enable users to more easily formulate queries over heterogeneous data sources. This means that more fluid data federations may be achieved, a situation which is clearly desirable in the environment of the Web where many heterogeneous data sources exist. Such user-defined mappings can also be used to interactively create style sheets using style sheet languages such as XSLT, and can allow more graphical-oriented users to interactively define transformations that are stored and utilised as part of a style sheet that operates on XML data.

In accordance with another aspect of the present disclosure, there is provided a method for forming a query from manipulations of existing query data in a graphical user interface, the existing query data comprising one or more views of data, each data view being a visualisation of a data structure and associated with a visualisation type and a query, the query defining how to obtain data for the data structure of the data view, the method comprising the steps of:

(i) selecting a data component from a first existing data view;

(ii) indicating the selected data component to be added to a second data view, a target location of the selected data component in the second data view indicating a role of the selected data component in the second data view, the role being dependent on the visualisation type associated with the second data view;

(iii) creating a query for the second data view, the query specifying how to obtain data for the data structure for the second data view and being formed using the indicated data component and an interpretation of its corresponding role in the second data view; and (iv) adding the selected data component to the second data view.

Arrangements incorporating this aspect enable users of information to be able to create new views of data by manipulating data from existing views of data. This represents an advantage over prior art arrangements in that the user creating the view does not need to interact with a schema for the data sources involved. This means that differences in the types of data sources and hence their schemas are effectively hidden from the user. It also means that the user does not need to "guess" what data is associated with brief data component names, the form of the associated data and what relationships exist between data components.

A further advantage of this aspect is that the user works directly with the data. This means the user can immediately understand what a data component represents and the naming conventions used by the data. If the data includes unit information, this information may be inferred by the user when the data is viewed.

Further, the user can use information inherent in existing reports or views to create new views. For example, another user may have known that two data components from different data sources are semantically congruent (ie. contain the same data) and has created a view that represents a join across the two data sources. Another user can build upon this view, for example by adding further data to the view, without having to explicitly inform the system of the existence of the implied semantic congruence relationship or indeed understand that the relationship exists.

Finally, the user can create a new view of data by first selecting the display type of the new view (eg. table, graph, chart, etc.) and then move data components from existing views of data into the new view in a graphical user interface. A preferred arrangement for this aspect can ensure that a user's manipulations are appropriate for the selected display type. For example, a 2-dimensional graph requires that a data component used for the y-axis has a point-wise correspondence with that selected for the x-axis. The aspect can use these user-indicated manipulations to automatically generate a query that is used to obtain the data required by the new view of data.

According to other aspects of the present disclosure, there are provided apparatus and computer program product including a computer readable medium having recorded thereon a computer program for implementing any one of the methods described above.

Other aspects are also disclosed.

BRIEF DESCRIPTION OF THE DRAWINGS

At least one embodiment of the present invention will now be described with reference to the drawings and appendix, in which:

FIGS. 10A, 10B and 10C schematically illustrate how a mapping can affect a schema view;

FIG. 25 is an example XQuery associated with a data view that is used for demonstrating the learning process;

FIG. 26 is an example XQuery associated with a data view that the data recommendation process may help to create;

FIG. 32 depicts example XML data to be presented;

FIG. 33 is an example of a base table data structure;

FIG. 34 is an example of a base table data structure with hyperlinks;

FIG. 43 is a table display corresponding to the 2D grid shown in FIG. 42;

FIG. 44 is another example XML data;

FIG. 45 is a fully expanded base table data structure of the XML tree in FIG. 44;

FIG. 46 is a base table data structure of the XML tree in FIG. 44 with hyperlinks;

Figure 1:
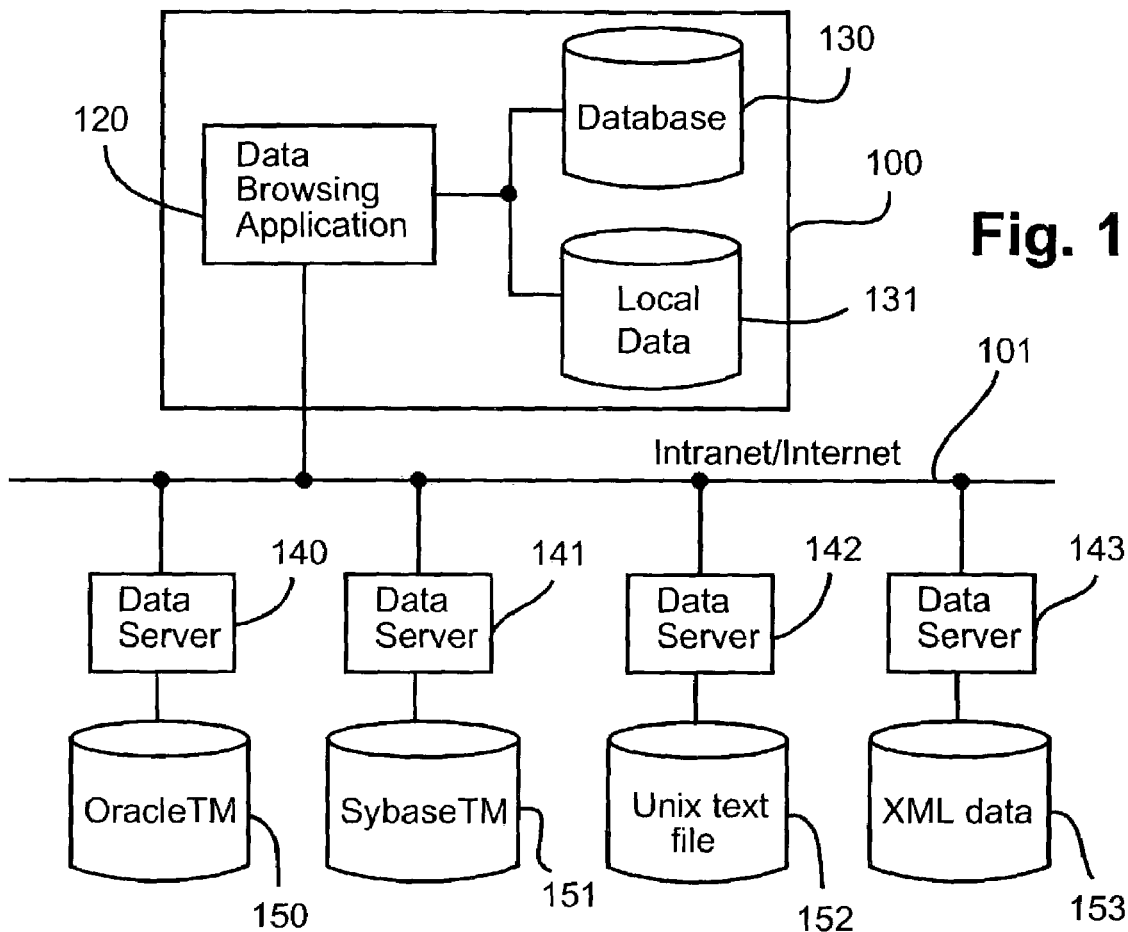
FIG. 1 is a block diagram showing the operating environment of the arrangements described herein.

Appendix A is an XML Schema example of a preferred serialisation syntax for data view definition documents.

DETAILED DESCRIPTION INCLUDING BEST MODE 1.0 Overview

Where reference is made in any one or more of the accompanying drawings to steps and/or features, which have the same reference numerals, those steps and/or features have for the purposes of this description the same function(s) or operation(s), unless the contrary intention appears.

The arrangements described herein are done so with respect to the Internet which represents a distributed system of heterogenous data sources. In this information space, valuable data is stored in database systems (proprietary, legacy and open source) and in structured documents (eg. HTML/XML documents). The arrangements described operate to unify this information space by normalising all information in uniform resource identifier (URI) space. This means that each atom of data is ultimately addressable by a URI. In addition, data from the data sources is communicated using Extensible Markup Language (XML) and the schemas of the data sources are represented using XML Schema. The adoption of these Web standards serves to notationally normalise the data, however the problem of semantic heterogeneity remains.

The arrangements described may also be realised using other systems having heterogeneous data sources. For example, an Intranet system having data stored in various sources such as UNIX™ text files, Oracle or Microsoft Access™ database systems, and other proprietary or legacy database systems, may also be used to implement embodiments of the present invention.

Referring to FIG. 1, the described arrangements may be practised as part of a data browsing application 120, that is executed as a software application on a local computer 100 connected to an intranet or the Internet 101. The data browsing application 120 communicates with any number of distributed heterogeneous data sources via the Internet 101. The data sources may be Oracle databases (eg. 150), Sybase databases (eg. 151), simple textual data (eg. 152) such as a Unix file or collections of XML documents (eg. 153). Each data source 150-153 has associated therewith a corresponding data server 140, 141, 142, and 143 that communicates with the data browsing application 120.

The data servers 140-143 represent processes that are identified by a URI, which accept requests using the HTTP protocol from the data browsing application 120, and return data in the form of XML. The requests can be formulated using an XPath expression, which is appended to the URI of the data server as a query string. XPath is a W3C Recommendation (see http://www.w3.org/TR/Path). Preferably, the requests are expressed using a richer query language such as the emerging W3C standard, XQuery. XQuery is a query language (see http://www.w3.org/XML/Query) that uses the structure of XML to express queries across all these kinds of heterogeneous data, whether the data is physically stored in XML or viewed as XML via some middleware such as a data server. In an alternative implementation, the requests can be passed in the body of the HTTP request (eg. using XML messaging protocols such as SOAP).

In an alternative arrangement the data browsing application 120 can directly access web-accessible XML document data sources without the need for a data server. These data sources may be local or accessed via the Internet. Queries directed at these XML document data sources are processed by the data browsing application 120.

The data browsing application 120 preferably has access to a database 130 within the local computer 100 that stores URIs of interest to the user (eg. data source URIs), as well as mapping information required to transform data from the data sources into the view desired by the user. The database 130 can also act as a cache for data obtained from heterogeneous data sources and relevant schemas. The local database can include heterogeneous forms of storage including the registry in Windows™ (Microsoft Corp.) implementations and various text file formats. The data browsing application 120 may also access local data sources 131, such as local XML documents and/or other local databases.

The data browsing application 120 receives XML data (an XML document) in response to data source requests. This XML document is an hierarchical tree structure comprising of a root element with possibly sub-elements, each of which may in turn comprise of sub-elements of its own. Each element in an XML tree is identified by a name. Optionally associated with each element of an XML tree is a general text string referred to as the text value of the element. This is typically true for leaf elements of the tree, that is, elements containing no sub-elements, but may also be true for non-leaf elements. Also optionally associated with each element is one or more attributes, each identified by an attribute name and associated with an attribute value in the form of a general text string.

Special hyperlink attributes may also be present in the XML data, the targets of which can be entities such as external files, an XML element residing in the same or another XML document structure, or further data source requests. The latter type of hyperlink can enable a user to use the data browsing application 120 to browse through a data source, with XML data being presented to the user with each browsing step. Data servers can include return hyperlinks in their generated XML data.

The data browsing application 120 automatically selects the most appropriate display types for the XML data at each browsing step. These display types include tree, table, bar and line graph, xy scatter plots, and 2D grids. The method of selecting the most appropriate display types is described in Section 5.0. The result of this presentation step represents a view of the data. The user can effect presentation changes to this view of data and save the resulting view of data for future use. Saved views of data can act like data sources. They are associated with a query and when a user selects to present a view of data, the query is executed. This results in an XML document which is presented as described in Section 5.0.

The data browsing application 120 also enables users to create new views of data from existing views by manipulating displayed data in a graphical user interface (GUI). This process is described further in Sections 6.0 and 7.0. The method of creating new views of data can use recommending services to introduce previously unknown sources of data to the user (see Sections 8.0, 9.0 and 10.0).

Finally the data browsing application 120 enables users to personalise their view of data by creating mappings which serve to map data from data sources of interest to a form more understandable by the user. These mappings can be stored for re-use and exchanged with other users. The method of creating new mappings is described in Sections 3.0 and 4.0. The process of exchanging sets of mappings is described in Section 11.0

The data browsing application 120 in FIG. 1 can alternatively be implemented as a client server application. In this case, a single instance of the server application may run on a corporate Intranet and users may use a client to access this server. This alternative implementation has the advantages that XML document and schema caches can serve the organization and data is not duplicated over many different installations on the Intranet. The client of such a client-server implementation can be implemented within a commonly-used Web browser such as Netscape Navigator™ (Netscape Corp.) or Internet Explorer™ (Microsoft Corp.).

Figure 11:
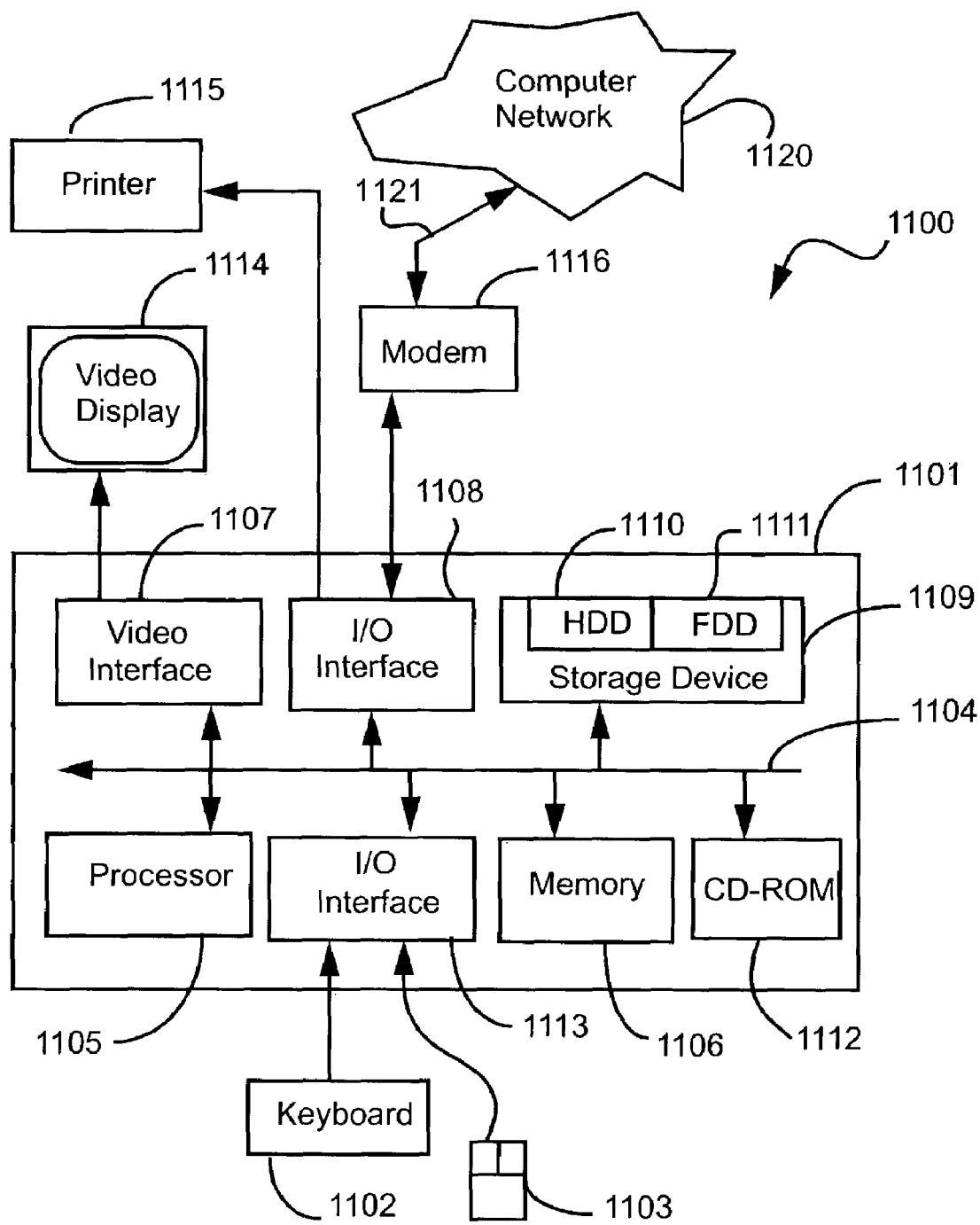
FIG. 11 is schematic block diagram representation of a computer system which may be used in the described arrangements.
Figure 64:
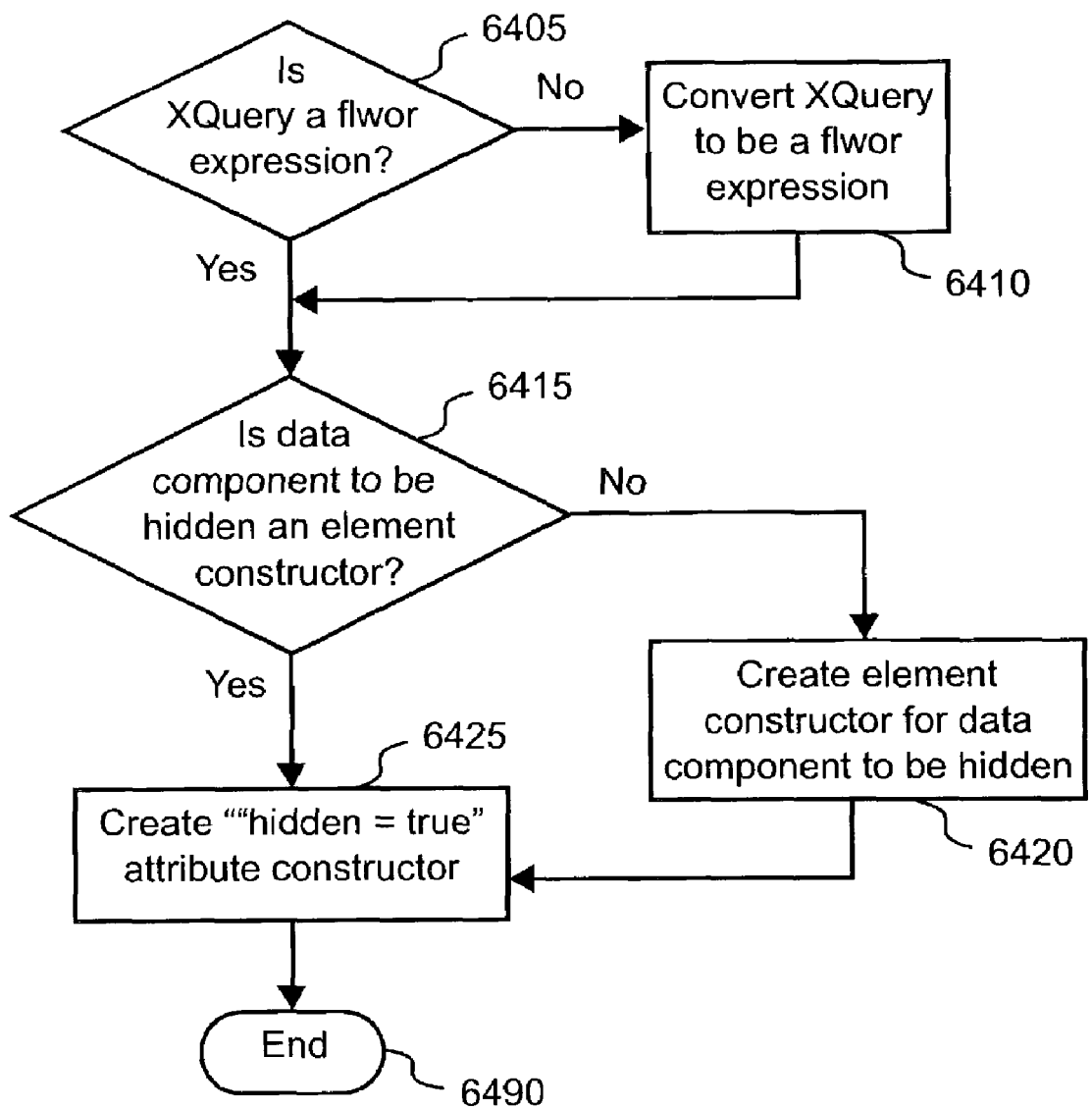
FIG. 64 is a flowchart of the process of hiding a data component.

The methods described herein are preferably practiced using a general-purpose computer system 1100, such as that shown in FIG. 11 wherein the processes of FIGS. 1 to 64 may be implemented as software, such as an application program executing within the computer system 1100. In this regard, the computer 1100 may be configured to operate as the local computer 100, or as required, as one of the servers 150-153. The software may be stored in a computer readable medium, including the storage devices described below, for example. The software is loaded into the computer from the computer readable medium, and then executed by the computer. A computer readable medium having such software or computer program recorded on it is a computer program product. The use of the computer program product in the computer preferably effects an advantageous apparatus for the methods described herein.

The computer system 1100 comprises a computer module 1101, input devices such as a keyboard 1102 and mouse 1103, output devices including a printer 1115 and a display device 1114. A Modulator-Demodulator (Modem) transceiver device 1116 is used by the computer module 1101 for communicating to and from a communications network 1120, for example connectable via a telephone line 1121 or other functional medium. The modem 1116 can be used to obtain access to the Internet 101, and other network systems, such as a Local Area Network (LAN) or a Wide Area Network (WAN).

The computer module 1101 typically includes at least one processor unit 1105, a memory unit 1106, for example formed from semiconductor random access memory (RAM) and read only memory (ROM), input/output (I/O) interfaces including a video interface 1107, and an I/O interface 1113 for the keyboard 1102 and mouse 1103 and optionally a joystick (not illustrated), and an interface 1108 for the modem 1116. A storage device 1109 is provided and typically includes a hard disk drive 1110 and a floppy disk drive 1111. A magnetic tape drive (not illustrated) may also be used. A CD-ROM drive 1112 is typically provided as a non-volatile source of data.

The components 1105 to 1113 of the computer module 1101, typically communicate via an interconnected bus 1104 and in a manner which results in a conventional mode of operation of the computer system 1100 known to those in the relevant art. Examples of computers on which the described arrangements can be practised include IBM-PCs and compatibles, Sun SPARCstation's or alike computer systems evolved therefrom.

Typically, the application program is resident on the hard disk drive 1110 and read and controlled in its execution by the processor 1105. Intermediate storage of the program and any data fetched from the network 1120 may be accomplished using the semiconductor memory 1106, possibly in concert with the hard disk drive 1110. In some instances, the application program may be supplied to the user encoded on a CD-ROM or floppy disk and read via the corresponding drive 1112 or 1111, or alternatively may be read by the user from the network 1120 via the modem device 1116. Still further, the software can also be loaded into the computer system 1100 from other computer readable medium including magnetic tape, a ROM or integrated circuit, a magneto-optical disk, a radio or infra-red transmission channel between the computer module 1101 and another device, a computer readable card such as a PCMCIA card, and the Internet and Intranets including e-mail transmissions and information recorded on Web sites and the like. The foregoing is merely exemplary of relevant computer readable media. Other computer readable media may alternately be used.

Some of the herein described methods may alternatively be implemented in dedicated hardware such as one or more integrated circuits. Such dedicated hardware may include graphic processors, digital signal processors, or one or more microprocessors and associated memories.

2.0 Data Components and Views

In the following sections, the term data component will be used in a general sense to refer to an identifiable unit of data. In the preferred arrangement, this unit of data corresponds to an identified XML element or attribute. If an XML Schema exists for the data, then a data component should be able to be associated with either an element or attribute declaration (and definition). The name of the data component is taken to be the name of the XML element or attribute.

A data node is a data component, which corresponds to a uniquely-identified XML node. A data node can be identified by a single XPath expression which evaluates to a single node in an XML tree. Alternatively, a particular element can exist as part of a repeated structure in an XML document. For example, in the XML document fragment indicated below having elements A, B and C, <A><B>... </B><C>... </C></A>

<A><B>... </B><C>... </C></A> etc., the element B occurs within the repeated structure of A. If all the B elements were to be extracted from the XML document fragment and presented, for example, as a column of a table, the collection of data is referred to as a data set. A data set can be identified by an iterator and a path (XPath expression) relative to the iterator. In the case of the above example, B is a data set having an iterator "/A", and a path relative to the iterator, "B".

Furthermore if B represented a numeric value (ie. was quantifiable), then the element B could also act as a data series (with respect to element C). In other words B could be graphed with respect to C. A data series is a specialisation of a data set. Identification of a data series requires an iterator (as for data set), a path (as for data set) and also a label or independent axis (ie. x-axis) path relative data set's iterator. So, in the case of the above example, if B was numeric it could also act as a data series having a label path, "C".

Alternative implementations could allow the label of a data series to be a further data set without departing from the scope of this disclosure. However, when the iterator for the data series and its independent data set differ, extra knowledge is required to infer the correspondence between the independent and dependent data sets.

Data nodes, data sets and data series can be considered specialisations of a data component because each entity is still associated with a particular element declaration. So, in the following description the term data component will be used in the description when a process is described in general terms. However, the appropriate term will be used when specific examples are described. For example, if the process of copying columns of a table display type is being described then the table column will be referred to as a data set.

Figure 2:
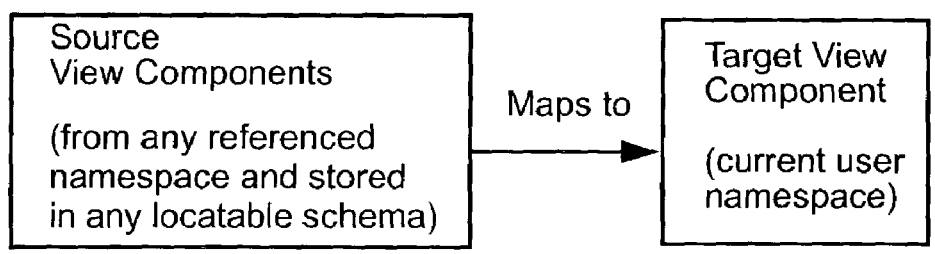
FIG. 2 is a schematic that shows how source components of a schema view are mapped into a target view component.

The data browsing application 120 allows users to create personalised views of data over data sources that are of interest to them. A personalised view of data will subsequently be referred to as a "data view". The personalisation refers to the possible use of one or more mappings. A mapping serves to map data from the data sources of interest into a form desired by the user in a data view. In other words, a mapping defines how one or more data components from one or more data sources are renamed, transformed or combined into a new target data component that is part of a data view. Preferably, the new target data component is more meaningful to the user than the unmapped (source) data component(s). The target data components preferably exist in a unique namespace that is created to hold the mappings created by the user. The source data components of a mapping may exist in any referenced namespace and their definitions may be stored in any schema, which can be located over the Internet. This mapping process is depicted in FIG. 2.

For example, a user may create a target data component called MyName. This target component may have a mapping that takes the source data components SecondName and FirstName from a namespace such as http://www.example-.com/abc, represent them in the form SecondName, FirstName, and then convert the resulting data component to upper case. In other words, the user would see data of the form, "SMITH, JOHN" as being an instance of their target data component, MyName. The user can specify more than one mapping for any one target data component. The user can also specify whether the source data components used by the mapping should be removed from the user's view of the data. In the above example, such may be desirable because the user may not want to see MyName, SecondName and FirstName in his/her data view.

The objective of creating new target data components, which may combine, replace or modify existing source data components, is to provide a more understandable and consistent view of data to a user. In other words, the defined mappings can be used to provide a view of data to the user without the user being aware of the data transformations occurring. The data view, with which the user ultimately interacts, is similar to a view constructed by a database administrator which may perform a join across two or more tables in a relational database. The data view however differs in three main ways:

(1) the data view can effectively provide a join across two or more heterogeneous data sources;

(2) the data view may contain new (mapped) data components which are derived from data components defined to exist for the data sources; and (3) the data view may contain presentation specifications for data components.

A data view can be understood as a "rich" query, being essentially a query that can join data from different data sources, and effect naming and data transformations on the source data and enforce data-specific presentation characteristics. In the data browsing application 120 a data view is defined by a data view definition. This definition contains an XQuery expression which specifies how data is obtained for the data view. The definition can also contain other information for the data view (eg. exported mappings, presentation rules, properties of the data view, etc.). Data view definitions are described in more detail in Section 11.0. In its simplest form a data view definition is simply an XQuery expression which can be appended to the URI of a data source as a query string.

Data views are dynamically generated from live data. In other words, the data browsing application 120 does not store or warehouse data views which may derive their data from more than one data source or may require transformations of the data. When a user selects to view a data view in the data browsing application 120, the data view's query is executed. This results in data being dynamically collected from one or more data sources, appropriately mapped and presented.

As mentioned above, database administrators have traditionally been responsible for creating views of data, using tools which enable them to work with definitions of tables and their contained data fields and relationships. One way for a user to create a personalised data view is to interact with the schemas (or data dictionaries) of the data sources of interest. These schemas shows the classes of data contained within data sources of interest and relationships between the data.

In the data browsing application 120, a "schema view" is used to represent the schemas of one or more data sources. A schema view shows the classes of data contained within the data sources and relationships between the data. Unlike a data view, a schema view does not contain instance data. The schema view is conceptually similar to the graphical representation of tables and their associated columns of a relational database management system (eg. Microsoft Access™).

The schema view displays the classes of data in an hierarchical fashion consistent with the XML form of the data which is received by the data browsing application 120. Preferably, the classes of data and their inter-relationships, are defined using the W3C Recommendation, XML Schema (see http://www.w3.org/XML/Schema). This means that if data in a data source is stored in a set of relational tables, the schema view of that data source would be derived from the XML schema definitions of the data source and therefore would be essentially hierarchical in nature. The function of a schema view is to show the user classes of data from which a new data view can be constructed.

Figure 3:
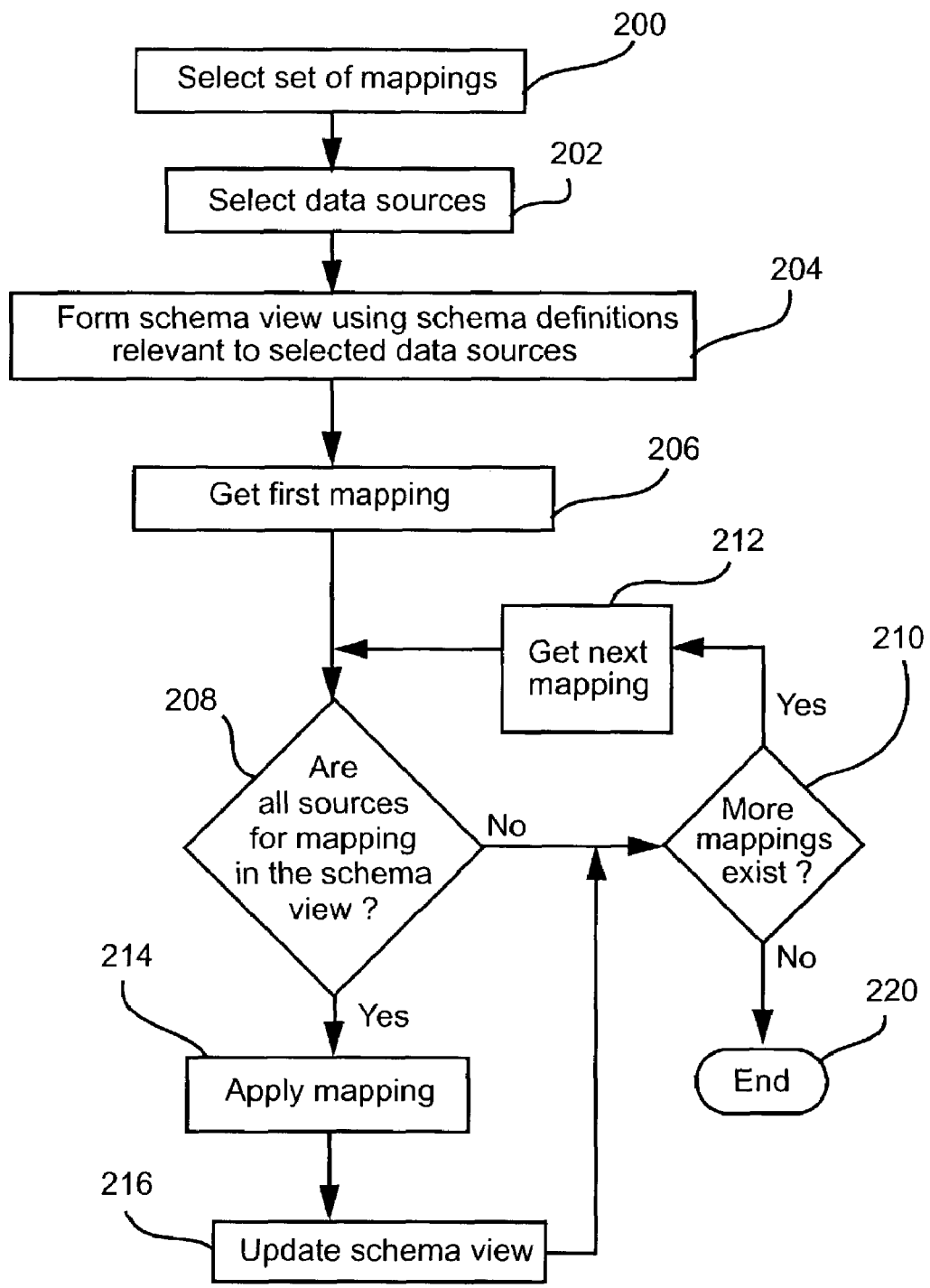
FIG. 3 is a flow chart that describes the process of creating a schema view for a user.

Referring now to FIG. 3, the method of displaying a schema view over selected data sources is now described. The creation of the mappings used by this process will be described in Sections 3.0 and 4.0. A schema view is preferably displayed when a user wishes to construct a new data view. Schema views displayed by the data browsing application 120 are dynamic and usually partial, in that they depend on those data sources the user has selected. On commencing a session in the data browsing application 120, a user can be automatically associated by the data browsing application 120 with a set of mappings. These can be considered part of a user's working environment or application settings. Alternatively, execution of the data browsing application 120 enables the user to select a set of mappings to use, as depicted in step 200 of FIG. 3. The data browsing application 120 then enables the user in step 202 to select a number of data sources in which the user is interested. The data browsing application 120 then identifies, in step 204, the schema definitions for the data components contained in selected data sources and forms an initial schema view over the sources from those schema definitions.

Figure 4:
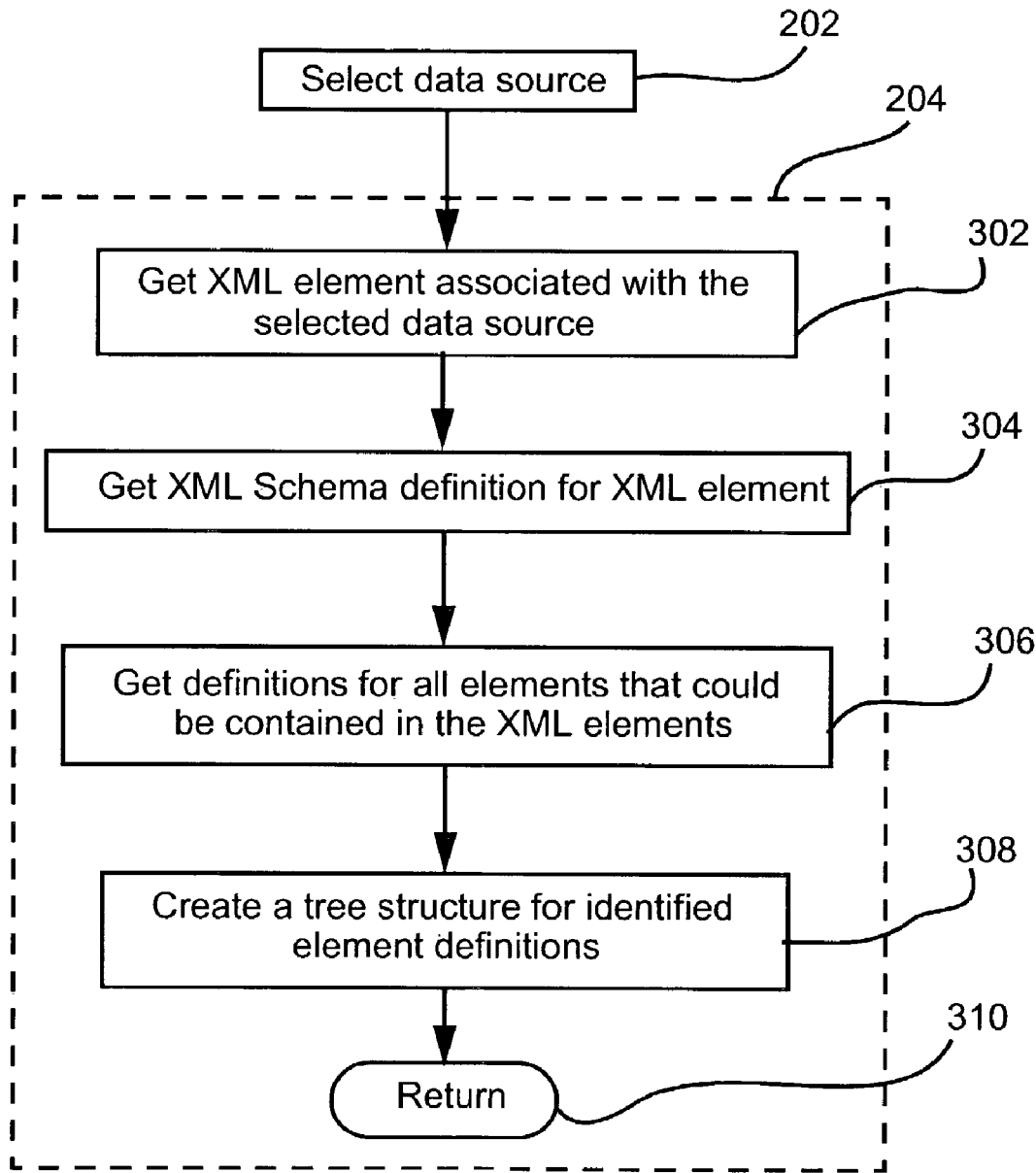
FIG. 4 is a flow chart that described how a schema view is formed using data represented using XML Schema.

Referring now to FIG. 4, step 204 is described in further detail. After the user has selected a data source in step 202, the data browsing application 120 identifies the XML element associated with that data source in step 302. In step 304, the system attempts to locate an XML schema definition for that element. This requires searching for a definition in the namespace defined for the element. In the preferred arrangement, this search is performed by first identifying all the schema documents that have been encountered for that namespace. These schema documents may have been encountered by way of XML schema schemaLocation hints provided in XML documents or other schemas. The encountered schemas are preferably stored in the local cache of the data browsing application 120, for example, within the memory 1106 of the local computer system 100. Alternatively, the encountered schemas can be fetched across the Internet 101 and re-parsed when required. If a definition for the element is located, then the data browsing application 120 attempts in step 306 to recursively locate, for that definition, all the possible child element definitions and attribute definitions. Preferably attribute definitions are differentiated from child element definitions by colour in the displayed schema view. Alternatively, the names of attributes can be prefaced by a meaningful symbol, such as @. The located definitions are then represented as a tree structure in step 308. This tree structure forms the initial schema view of step 204 in FIG. 3. The sub-routine of step 204 then concludes at step 310.

Returning now to FIG. 3, the mappings associated with the identified mapping set are then processed. The first mapping of the set is selected in step 206. The data browsing application 120 in step 208 checks that all source data components required by the mapping exist in the current schema view. If they do, then control passes to step 214, where the mapping is applied. This involves creating a definition for the target data component in the current schema view and, if required, removing some or all of the associated source data components definitions from the schema view. In the preferred arrangement, created target data component definitions are highlighted from the native schema component definitions in the schema view using display colour. This is not essential, and need only be implemented in order to make it clear to the user which component definitions are derived from the mappings.

It should be noted that a mapping can be applied to both a schema view and a data view. When a mapping is applied to a schema view, the result is a definition created in the schema view for the target data component, and definitions for the one or more source data components of the mapping optionally removed from the schema view. When a mapping is applied to the data view, the data components corresponding to the one or more source data components of the mapping are transformed, according to the mapping, to a data component corresponding to the target data component of the mapping.

Once a mapping is processed, the schema view is updated in step 216. Preferably, the updated schema view is displayed to the user by way of the display 1114, however it is also possible to only display the updated schema view when all mappings associated with the selected mapping set have been processed. On completion of step 216, the data browsing application 120 checks whether there are any more mappings to process in step 210, and if so the next mapping is retrieved in step 212 and control returns to step 208. If in step 208, definitions for all the source data components required by the mapping were not in the current schema view, then the mapping is not processed and control passes to step 210. When there are no more mappings, the procedure concludes at step 220.

Figure 6:
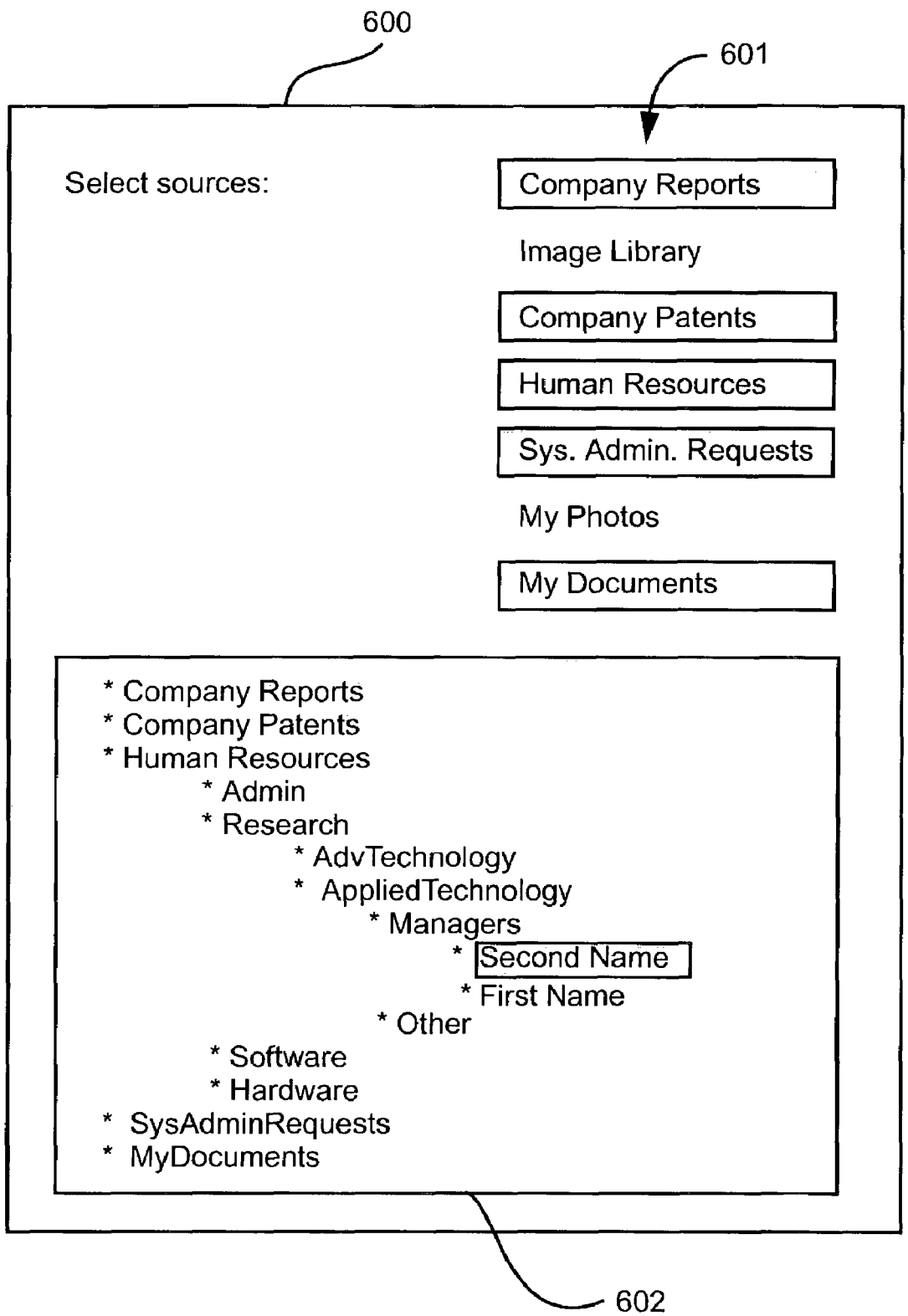
FIG. 6 is a schematic showing a typical screen layout used for creating a schema view over selected data sources.

The procedure described above with reference to FIG. 3, can be achieved using a user interface, an example of which is shown in FIG. 6. FIG. 6 shows a graphical user interface (GUI) image 600, which may be reproduced by the display device 1114, and at the top of which, the user is presented with a list 601 of his/her commonly-used data sources. The user can select one or more of these data sources, for example by manipulating the mouse pointer 1103, with the selected data sources being highlighted. In this example, selection is highlighted by the data source being enclosed by a box. With each selection, a panel 602 arranged below the list 601 is immediately updated with a constructed schema view formed using the process described above with respect to FIG. 3. Preferably, the user can navigate through the schema view panel 602 expanding and collapsing the indicia for data component definitions as desired. The indicia used to represent data component definitions are preferably derived from the names of elements. However some other element information, for example the documentation nodes associated with the element in the schema, could also be used to represent. the data component in the schema view.

The schema view constructed using the process shown in FIG. 3 can be used to collect constraints for a new data view across the selected data sources. The constraints may be collected for combination in the schema view in either a conjunctive or disjunctive manner. The dynamically-constructed schema view enables a data view to be specified in terms of the user's mappings. When a data view is to be presented to the user, in order to obtain the- source data the mappings must be decomposed into source data components by inverting mappings where possible. In some cases, it is necessary to pass the responsibility for some of the mapping inversion to the data server(s). For example, if a target data component, X, is defined to be the concatenation of the string source data components, A, B and C, and the user enters the constraint X="Hello, Mr. Jones", then it is difficult to efficiently invert the constraint remote from the data. In the preferred arrangement, if the source data components are from a single data source, then a "LET" clause of an XQuery request is used where possible to define a variable for X so that the constraint on X can be used directly.

Clearly, this solution is only possible where all the source data components arise from one data server. In cases where inversion at the XQuery formulation is not possible, the data browsing application 120 must process the constraint after receipt of the source data. However, where possible constraints on mapped components are inverted before queries are passed to the data servers.

In the preferred arrangement, as data is returned from the data servers 140-143 in response to a query, the data is transformed by the data browsing application 120 according to the transformations defined by relevant mappings. This means that the data is presented to the user in terms of the user's mappings.

A constructed data view can be exchanged with other users. In this event, any of the mappings used by the data view at creation time must be serialised and packaged with the definition of the data view. When a new user receives a data view from another user, the serialised mappings are used to ensure that the data view appears as it was created. It is also possible for the new user to import mappings contained in the data view into the new user's own set of mappings. This process of sharing data views and importing mappings is discussed in more detail in Section 11.0

3.0 Interactively Defining Mappings

Figure 5:
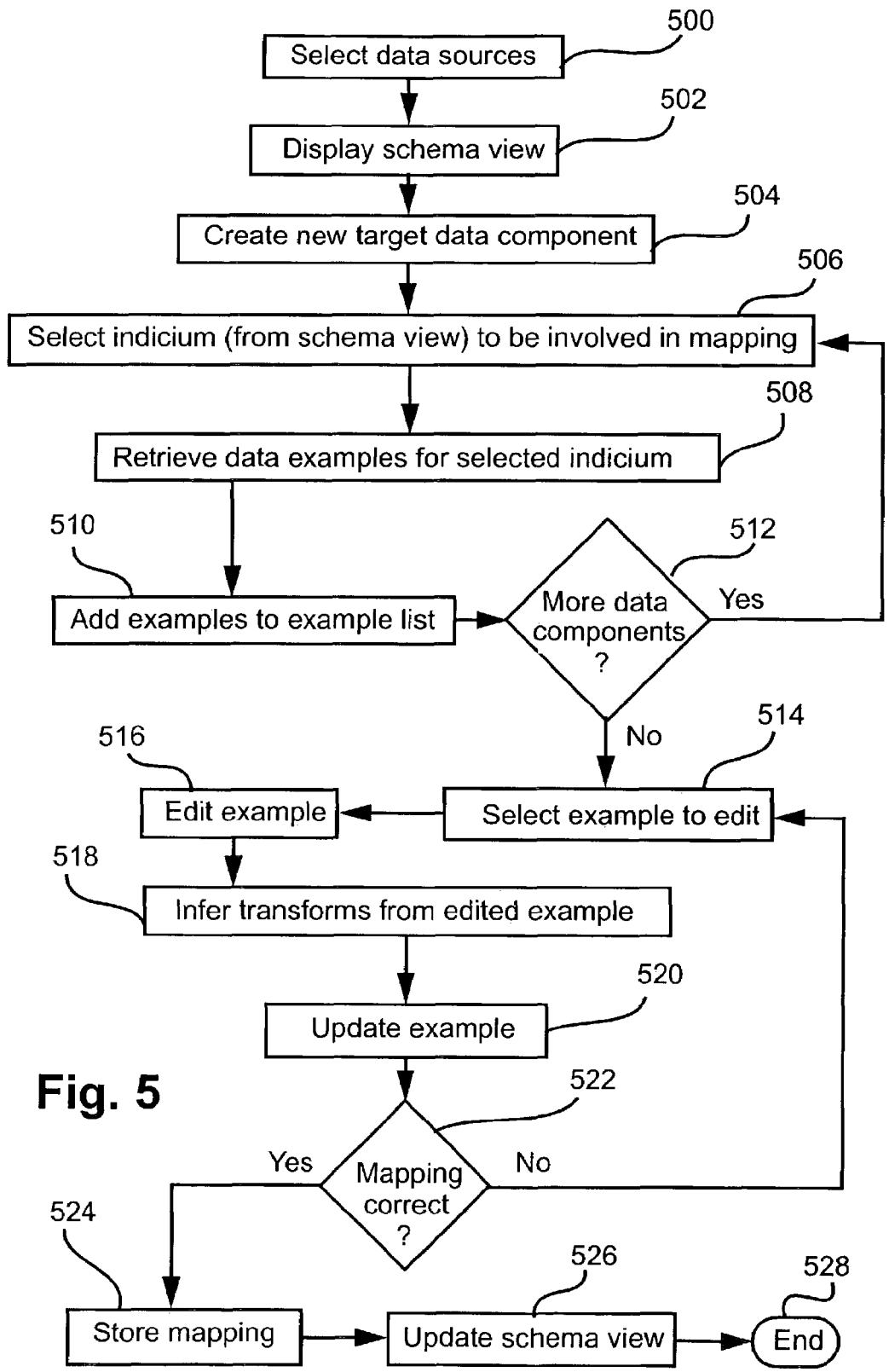
FIG. 5 is a flow chart that describes the mapping creation process.

The mapping creation process can now described with reference to the flowchart of FIG. 5. The process may be implemented as a separate application program executed by the processor 105 within the local computer system 100. In the preferred arrangement, the process is incorporated in the data browsing application 120. At step 500, the user selects the data sources from which data component definitions are to be selected as source data components for new mappings. A schema view for the selected data sources is constructed, as described using FIG. 3, and displayed to the user in step 502. The schema view is preferably displayed as a tree, in which the user can expand and collapse nodes in a similar way to that of FIG. 6. Each data component definition of this initial schema view is represented by an indicium that can be selected by the user. In its simplest form, this indicium is just the element name of the data component definition as described above. The user then indicates that a new target data component is to be created in step 504. In step 506, the user is enabled to select an indicium from the schema view to indicate that the associated data component definition is to be involved in the mapping. Thus, for example, if a target data component is to be created to be the concatenation of two or more source data components, the user may double-click on the is indicium representing the first source data component definition for the concatenation. The type definition for the target data component defaults to that of the initialising source data component. Preferably, the type information is represented by an XML Schema type definition. In the arrangement of FIG. 5, steps 504 and 506 are performed as a single action for the initialising source data component.

Figure 7A:
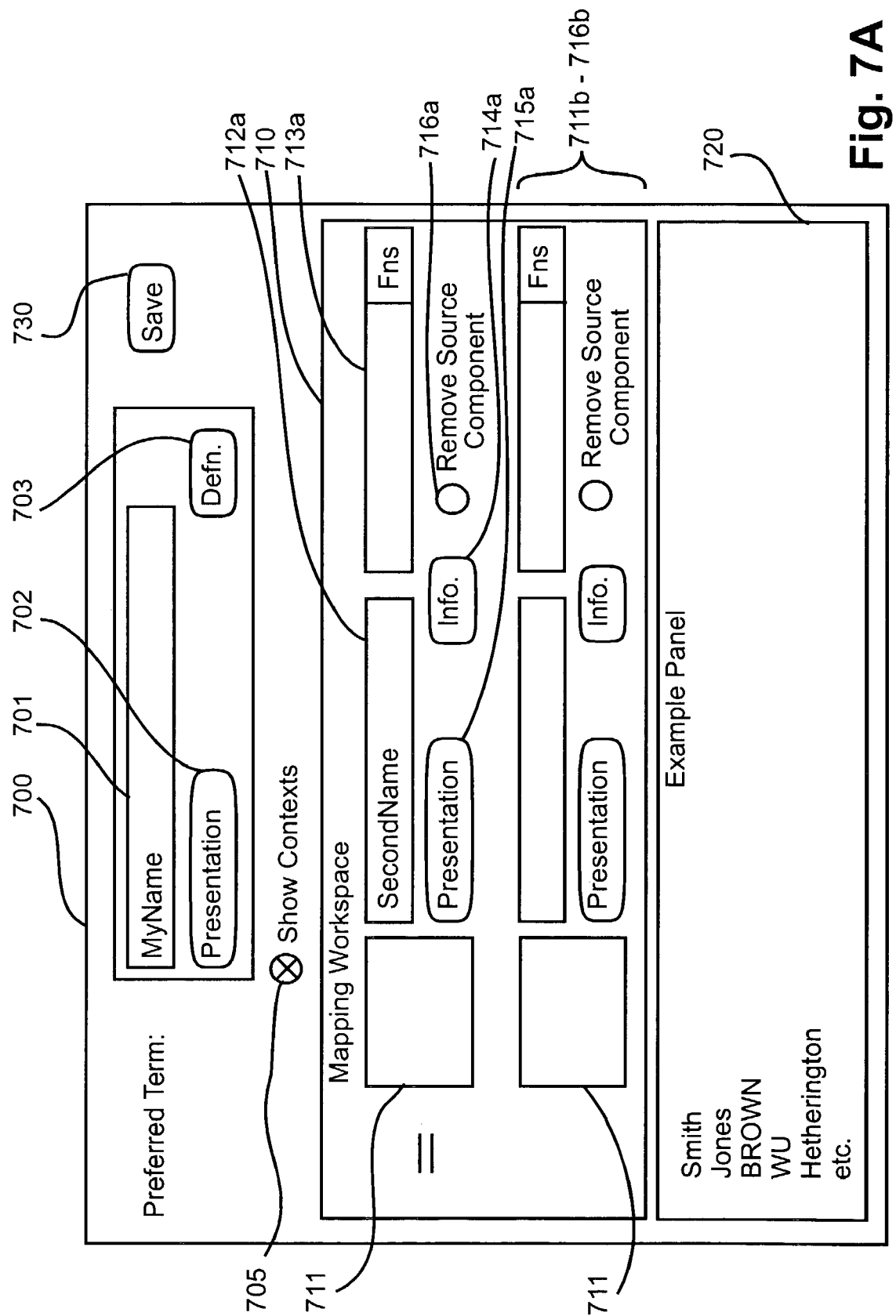
FIGS. 7A to 7C schematically depict screen layouts used for creating a new mapping.

When the initialising source data component definition is selected, a GUI window 700 such as shown in FIG. 7A is displayed on the display 1114. On initial display, the GUI window 700 shows a target data component having the same name as the initialising source data component. If a component with this name already exists in the user's namespace, then the user is asked if he/she wishes to add a further mapping to this (target) name. If the user confirms this, then no action is required. If the user responds to the prompt with "no", then the focus is set to the target name and the user is required to alter the name appropriately.

In the case of the example GUI window depicted in FIG. 7A the user has selected to change the target name from SecondName to MyName.

In a simple implementation, all target names have no context (ie. the names all can be represented by element declarations, which are direct children of the schema element in an XML Schema document) and are assigned to the user's namespace. In alternative implementations, users may specify some structure in their namespace and target data components could also have an hierarchical context. For example, in the GUI 700 of FIG. 7A, "Preferred Term" has no context. (ie. it is not contained within another specified element) If a context within the user's namespace was to be specified, the user could simply enter the context as part of the preferred name. Alternatively, the GUI may display a window with existing contexts able to be selected, or allowing a new context to be created.

A set of data examples for the source data component is then retrieved in step 508 from the data source for which the selected data component was defined. The number of examples retrieved can be predetermined or depend on the type of computing environment in which the mapping is being created. For example, if the data sources were being accessed over the Internet 101 and Internet access was being provided by a slow modem (eg. 1116), then fewer examples might be retrieved. The retrieved examples are then added in step 510 to an example list, which is displayed as the list 720 in the GUI 700 of FIG. 7A. In the case of the initialising source data component, the retrieved examples represent the initial example list. As further source data components are selected to be involved in the mapping, example data are added to the end of each example in the list.

For example, if the source data component SecondName is selected, then the example list may look like:
 Smith
 Jones
 BROWN
 Wu
 Hetherington
 etc.

Note that some names are completely capitalised whereas others are not.

If a further source data component, FirstName, were then selected, then the example list would appear as (see FIG. 7B):
 SmithAlan
 JonesJenny
 BROWNLouise
 WUJulie
 HetheringtonRupert
 etc.

The example list 720 serves two purposes. First, the list 720 shows the user how the data is actually stored in the data source. Very few (database) schemas highlight notational standards that may have been adhered to when data was collected and assimilated into a database. Also, if this information exists, then it is typically very verbose. Examples often explain the standards much easier to users of the data. For instance, in the above example, a user may deduce that the data defined by the source data component SecondName has been compiled with little attention to case consistency (ie. upper or lower case may have been used). On the basis of this information, the user may choose to apply a function to ensure that this data was either all upper or lower case in the user's view.

The second purpose of the example list 720 is to provide an intuitive way for users to define mappings. Typically the task of defining mapping transformations is left to a system administrator or other such experienced person. This usually occurs because the creation of mappings typically requires an understanding of functional and mathematical processes. As such, whereas a software engineer may understand that the sequence of unary functions of toUpperCase( ), insert(6, "/test") applied to a source data component means take the data, convert it to upper case, and then insert the string "Itest" at position 6 in the resulting string, an average user may not be happy to apply such means to create transforms. This notation has the additional difficulty of the user not understanding whether position index is zero-based or one-based.

The preferred arrangement provides the user with a means of implying these transforms by allowing the user to select an example from the example list 720, and then edit the selected example to demonstrate the form of the desired target data component. For instance, in the above-mentioned example, the user could select the example "JonesJenny" and edit this example to read "JONES, Jenny". The data browsing application 120 then analyses the edited example and attempts to infer the applied function(s). In this case, the unary function, toUpperCase( ) has been applied to the SecondName source data component, and then a connector of "," has been added between the two source data components. The result of this inference is shown in FIG. 7C. The method used to infer the transforms required by the mapping is described in more detail later.

It is also possible for the user to apply some presentation characteristics to the data of the target data component. For example, such presentation characteristics may stipulate that the SecondName portion of the target data component to always be displayed in bold or in a particular colour. These characteristics can be also applied by demonstration and then stored for use when transforming incoming data.

The above method of allowing users to define transforms by demonstrating the required transformation using an (edited) example, is an example of the technique known as "programming by example" or PBE. PBE is a technique that has previously been used for programming tasks such as inferring regular expressions from a set of examples provided by the user, collecting and collating regularly-accessed information on the web, detecting and automating repetitive tasks in a user interface, and defining grammars (eg. for e-mail addresses). These tasks, like that of defining transforms, typically require identifying abstractions or generalisations (eg. formulas, grammar rules) for a class of actions or data. In general, people appear to be more comfortable thinking about concrete examples than they are about abstractions such as functional transforms and grammatical rules. For this reason, the above briefly described method of interactively defining transforms uses edited examples, and thus intuitive to many people than methods based on selecting a set of functions to apply to the data as used in the prior art.

Figure 7B:
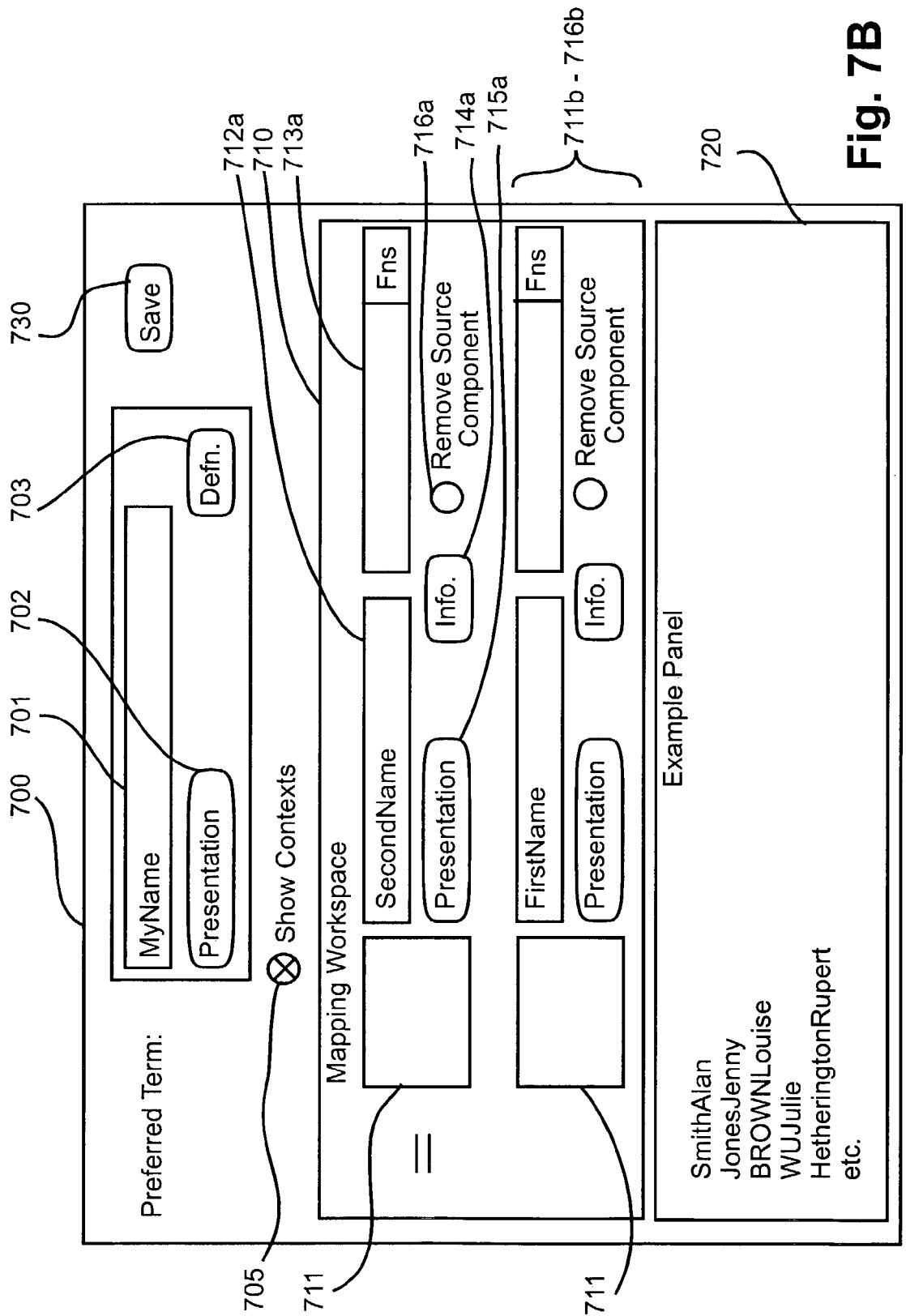
Figure 7C:
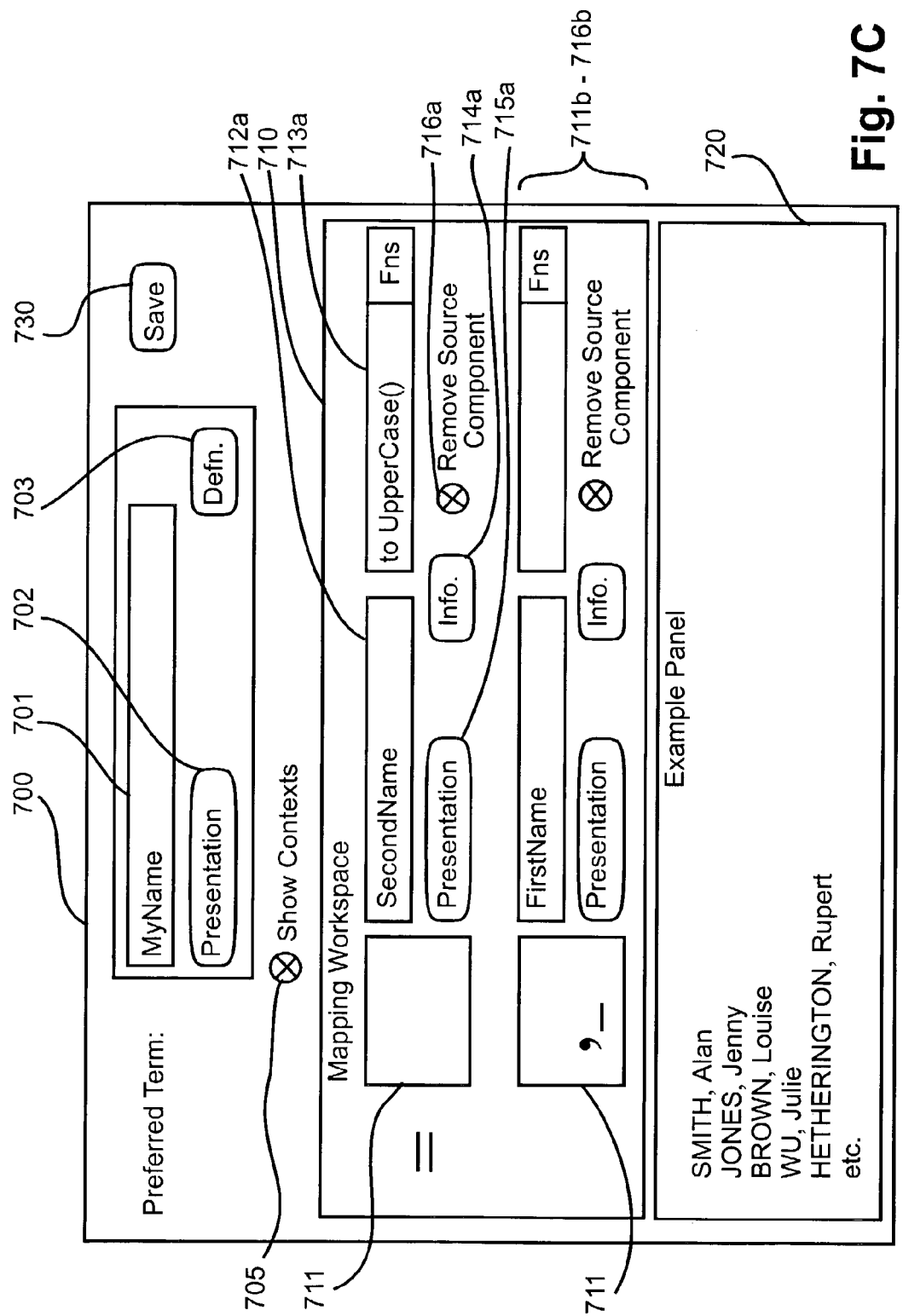

The GUI used by the preferred arrangement to perform a mapping, is described now with reference to FIGS. 7A, 7B and 7C. It will be appreciated that, in the field of GUI's, the term "button" is colloquial name for an icon that is user selectable, for example using the mouse 1103. The name of the target data component is shown in a text field 701. Associated with the target data component field 701 is a "Presentation" button 702 and a "Defn" button 703. The "Presentation" button 702 can be used to view or edit presentation details for data conforming to the target data component. This functionality is discussed later in more detail. The "Defn" button 703 enables the user to edit the type definition information for the target. In a simple implementation, the user may directly edit the XML Schema text for the definition of the target element. Alternative implementations may provide an interface that controls the editing actions of the user more tightly. Editing the type information is largely unnecessary for most transforms. This feature has been included in the preferred arrangement mostly for the purposes of completeness for advanced users.

The initialising source data component is shown as the first source data component in the mapping workspace 710, and the name of the source data component is shown in a text field dialog box 712. A function selector 713 is shown adjacent to the text field 712 to enable manual function selection to be used to thereby supplement the automatic process if desired. Preferably, a drop down menu of available unary functions may be selected from the selector 713. The manual selection and editing of functions are not essential and are only provided to supplement the automatic method for more advanced users. Each source data component in the mapping workspace 710 is also associated with an "Info" button 714 and a "Presentation" button 715. The "Info" button 714 is used to display any information that may help the user in defining a mapping. In the preferred arrangement, the "Info" button 714 is used to show any content that has been associated with a <documentation> tag in the XML Schema definition for the source data component. The "Presentation" button 715 can be used to assign, edit and view presentation characteristics that are to be applied to data defined by the source data component.

Each source data component in the workspace 710 is preceded by a connector 711. The connectors 711 may contain any connector text, binary operators (such as the mathematical functions +, −, / or *) or n-ary operators (such as min, max, sum). Below the mapping workspace 710 is the example panel 720. In FIG. 7C, this panel shows the results of the edited example described above. The results of the inferred solution are also reflected in the function selector 713, where the unary function, toUpperCase( ), is shown in FIG. 7C as being applied to the source data component with the name SecondName, to provide that the second name of a person identified is presented in upper case format. As seen, more than one text field 712 and corresponding ancillary components may be included in the mapping workspace 710. In this example, and shown in FIG. 7C, a connector 711b including a comma "," and a single character space is defined by the user to precede the FirstName term.

A checkbox 705 can be checked to control whether the context of the names used by the source data components is displayed. The context defines a hierarchical position of a source data component in the schema view. For example, from FIG. 6, the context of the SecondName source data component is HumanResources/Research /AppliedTechnology/Managers. Including contexts in the data component names, which can be long as shown by the above example, can make the interface appear complicated. Even if not displayed in the GUI 700, the context of each source data component is stored as part of a mapping. In an alternative implementation, the context for a source data component can be included as information presented to the user when the "Info" button 714 is selected.

Returning now to FIG. 5, once a user has selected the initiating source data component into the mapping workspace 710, the user can then decide in step 512 if the mapping is to involve further source data components. If so, then control returns to step 506 and the user can select the indicium of the desired source data component from the displayed schema view and drag the indicium, using the mouse pointer 1103, and drop it in the mapping workspace 710. If the drop position is located over an existing source data component of the mapping, the data browsing application 120 assumes that the source data component is to be replaced by the dragged component. Otherwise the dragged component is added to the end of the list of source data components. This results in the example list 720 being updated again as described above in step 510. This process continues until the user decides that all the required source data components exist in the mapping workspace.

The order in which the source data components are moved into the mapping workspace can be important. For example, if a user wishes to create a new numeric target that was based on a transform where $X=(A+B)/C$, then the source data components A, B, and C would need to be moved into the mapping window in the order A, B, and C, or B, A and C.

In step 514, the user selects an example from the example list 720 to edit. This action results in the selected example being highlighted and the user is able to edit the example as a string and thereby demonstrate to the system the required transformations that should be applied to the data. In such instance, no functions need be selected using the function selector 713. When the user presses "return" on the keyboard 1102 to indicate that the user has finished editing the example, the data browsing application 120 attempts to infer the transformation indicated by the user's example.

When the inference step 518 is complete, the example list 720 in FIG. 7C is updated according to the resulting inferred transform in step 520. This serves to clearly show the user the transform that has been inferred. If the inferred mapping is found to be correct in step 522, as may be determined by user observation, the mapping is then stored in step 524, the current schema view updated with the target data component in step 526, and the mapping creation process concludes in step 528.

If the inference step did not accurately infer the transform(s) that the user desired, then the user can select another example and repeat the process until a correct result is achieved. The inference step as described later in reference to FIG. 8 only attempts to find solutions for the part of the example that was edited. So, in the example depicted in FIG. 7, because FirstName was not edited it would not have been included in the analysis.

The process of FIG. 5 described above can be supplemented with functional editing of transformations required for mappings. For example, in the preferred arrangement, the user can also select functions from a list to apply to the data as part of the mapping. These functions can be added and removed from the function list for a particular source data component, and the parameters of functions can be simply edited. The function selector 713 of FIG. 7A enables this functionality.

A target data component for a mapping is added to the current schema view such that its hierarchical context is the maximum common context of source data components involved in the mapping. For example, if a target data component was defined having three source data components having contexts A/B/C, A and A/B/C/D, the context of the target in the view would be A. As mentioned previously, the user can specify for each mapping whether source data components associated with the mapping are removed from the schema view (ie. data associated with the source data components would not appear in any data views derived from this schema view). A user indicates that a particular source data component is to be removed by checking the Remove Source Component checkbox 716 in FIG. 7C.

FIG. 10A shows an initial schema view before a mapping is applied. In this schema view, schema component SA contains data components A, B and C, and data component B further contains data components D and E. FIG. 10B shows the result of adding a target data component, Z, which is derived from data components D and E, to a schema view without removal of the source data components associated with the mapping. FIG. 10C shows a similar schema view, but with removal of source data components. Preferably, the user can define this property for each source data component involved in a mapping. In other words, some source data components of a mapping can be removed while others are retained.

If a target data component is associated with more than one mapping then, in the preferred arrangement, the target data component is also inserted into the schema view having a hierarchical context, which is the maximum common context of the context of the various mappings. This is useful because this operation allows the user to manipulate the target data component to select data from multiple data sources using a single constraint.

When a mapping has been defined, selecting a "Save" button 730 causes the mapping to be stored. Such an action also, is preferably used to update the current schema view with the new target data component.

4.0 Inferring Mapping Transforms from an Edited Example

Figure 8:
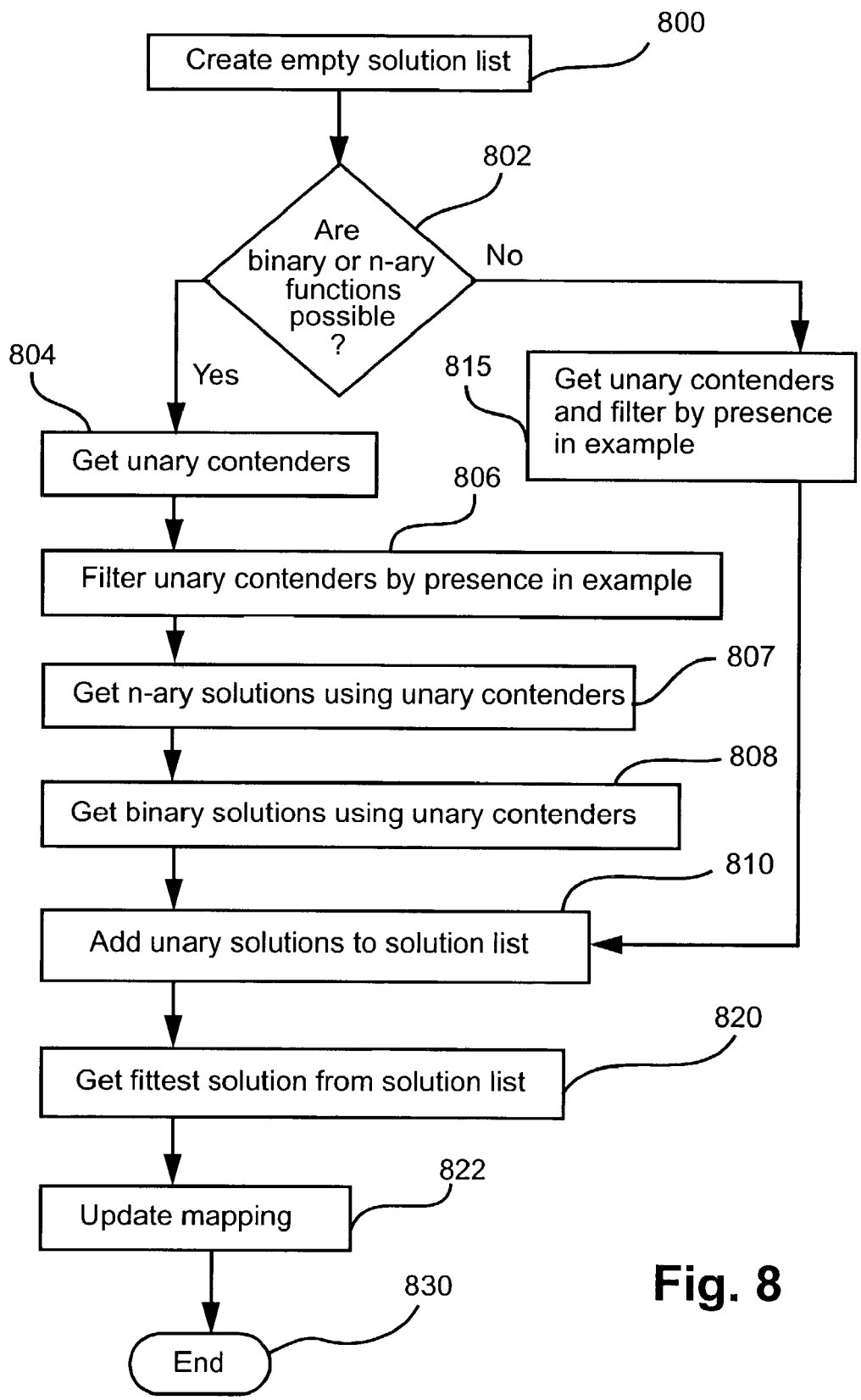
FIG. 8 is a flow chart describing the process used one arrangement to infer transforms using an example that a user has edited.

A method of inferring the transforms associated with a mapping from a user-edited example is described now with reference to FIG. 8, which is a flowchart representative of a computer application program that may be stored in the memory 1109 of the local computer 100 and executed as part of the data browsing application 120 by the corresponding processor 1105. The method begins with the user submitting an edited example for analysis. Such submission may be by way of the GUI 700. The data browsing application 120 in an initial step 800 creates an empty solution list. A determination is then performed in step 802 to establish whether binary or n-ary functions are possible. Preferably, binary or n-ary functions are only considered possible if (i) there is more than one source data component involved in the transformation, and (ii) at least one pair of consecutive source data components can participate in a binary or n-ary operation. (eg. have a numeric data type). Note that, concatenation is strictly a binary operation but in the analysis, concatenation is treated as the default binary operator.

If binary or n-ary functions are possible, control passes to step 804 where the data browsing application 120 creates a list of unary contenders for each of the source data components for the selected example. A unary contender is the possible result of applying one or more of the predetermined unary functions to unedited example data for a source data component. Unary functions are defined to be those functions that act on a single source data component. In a preferred arrangement, unary functions can be applied in sequence, with the maximum number of functions that can be applied in any sequence being three. Clearly, other limits to the number of functions that can be applied in sequence can also be used. In other words, each unary function in a sequence is applied to the result of the previous function application step. The unary functions preferably implemented are shown in Table 1. Other functions may also be implemented without departing from the scope of the present disclosure.

TABLE 1

Preferred Unary Functions

| Function Name | Operand Type | Description of result |
|---|---|---|
| initWord(n) | String | String containing the first n words of the operand |
| words(start, n) | String | String containing n words starting from start word. |
| init(n) | String | String containing first n characters of the operand |
| toUpperCase( ) | String | String representing operand converted to upper case |
| toLowerCase( ) | String | String representing operand converted to lower case |
| capitalise( ) | String | String in which the first characters of all non-conjunction words in the operand are capitalised |
| capitaliseAll( ) | String | String in which the first characters of all words in the operand are capitalised |
| toLanguage (xml:lang) | String | String in which the operand is translated to the language specified by the xml:lang |
| noPunctuation( ) | String | String in which all punctuation in the operand is removed |
| insertText(text, n) | String | String in which the string 'text' is inserted at position n in the operand. |
| noConjunctions( ) | String | String in which all the conjunctions in the operand have been removed |
| toNumber( ) | String | Number if the operand can be parsed as a number |
| toString( ) | Number | String representing the operand |
| negate( ) | Number | Numeric value which is the negation of the operand |
| toInteger( ) | Number | Numeric value of the operand as an integer (rounded if necessary) |
| toDouble( ) | Number | Numeric value of the operand as double precision number |

Each implemented function has a specified operand type, and a description of the result is shown in the third column of Table 1. If the operand type criterion is not satisfied then a unary contender does not result from the application of the function. The initial operand types are obtained from the base primitive types of the XML schema definitions of the source data components. In a preferred arrangement, these primitive types are mapped to the base types of Integer, Double and String as shown in Table 2. Alternatively, it may be preferable to use the XML Schema base types as those of the mapping application. In such a case the type mapping shown in Table 2 would not be necessary and the operand type of Table I may contain XML Schema primitive types.

TABLE 2

Mapping of base XML Schema primitive types to based types

| Base Type | Base XML Schema Primitive Types |
|---|---|
| Integer | decimal, gYear, gMonth, gDay |
| Double | Float, double |
| String | All other primitive types |

Returning now to FIG. 8, in step 804 a list of unary contenders for each source data component of the example is generated. The preferred order that contenders are added to this list is as follows:
 (i) the unchanged source data component;
 (ii) contenders that result from the application of a single unary function;
 (iii) contenders that result from a sequence of two unary contenders; and
 (iv) contenders that result from a sequence of three unary contenders.

The order in which unary contenders are created is significant in that functionally simpler contenders are preferably located at the top of the list and therefore are more likely to be involved in a solution.

In step 806 each of the unary contenders is tested for presence in the edited example. Such operates to filter the unary contender list for each source data component, with each member of the filtered list having a valid start and end position in the edited example. Step 806 results in a filtered unary contender list. this list is required for step 810 (described below). Control then passes to step 807 where n-ary solutions based on the unary contenders are detected. The process of detecting n-ary solutions involves testing all combinations of unary contenders. Detected n-ary solutions are added to the solution list. Control then passes to step 808 where binary solutions based on the unary contenders are detected. Binary functions (or operations) are assumed in the preferred arrangement to operate from left to right. In other words, the operands of an operation can be the result of the previous operation plus a new contender. The process of detecting possible binary solutions involves testing all combinations of unary contenders, with each combination having an ordered contribution from each of the source data components. The binary solutions found are added to the solution list.

If it was determined in step 802 that binary or n-ary functions were not possible, then the equivalent of steps of 804 and 806 are merged in a single step 815. This is advantageous because the merger removes the need to store the large unary contender lists for each of the source data components.

In step 810, which follows each of steps 808 and 815 a search is performed for solutions based on the filtered unary contender lists. Each solution must be composed of a filtered unary contender for each source data component. A further requirement of a solution is that the unary contenders do not overlap in the edited example. For example, if a unary contender for the first source data component was located between character positions 3 and 15 in an edited example and a unary contender for the second source data component was located between character positions 10 and 20, then these contenders would not be considered part of solution because of the overlap between the sets of character positions. Any solutions found in step 810 are then added to the solution list.

The "fittest" solution in the solution list is then determined in step 820. In the preferred arrangement, the cost of any solution is based on two components:
 (i) the total length of the connectors between contenders in the edited example; and,
 (ii) the weights assigned to individual functions to bias the inference method to find simpler solutions.

Solutions are examined in the order they are added to the solution list so that if a solution is found with a zero cost then step 820 ends immediately. Solutions later in the list must have a lower cost than a solution earlier in the list. Although connectors are really a form of binary operation (ie. concatenation), they are treated as an important contributor to the cost of solutions in the preferred arrangement.

For example, consider the following solution where the parts of the edited example that correspond to contenders are enclosed in boxes:
 SMITH, John [Address: 100 Main St, Newcastle, NSW ]
 This represents a solution if each source data component is represented in the correct order (ie. SecondName, FirstName, Address). The connector cost of the above example would be proportional to the total length of connectors (2+11+1=14), and is determined using a sum of characters not attributed to unary contenders. Unary functions may have been used for some of the contenders (eg. toUpperCase( )) and so the final cost of the solution would depend on whether costing weights were assigned to the used unary functions.

When the fittest solution is detected, the mapping is updated in step 822. In the preferred arrangement, this results in the function list for the source data component in the mapping workspace 710 being updated with the names of any unary functions (and their identified arguments). The connector fields are also updated with either the connector strings or any identified binary or n-ary functions that were required for the fittest solution (see FIG. 7C). The example list is also updated using the new mapping. The mapping process concludes in step 830.

The process for inferring the mapping transforms may vary depending on the type of transforms that a user may wish to perform. Other functions, unary or binary, or indeed n-ary, may be introduced into the process without departing from the scope of this disclosure. In the preferred arrangement the addition of new unary, binary and n-ary functions is relatively simple because such merely requires a class to be added to the system which extends either the UnaryFunction or BinaryFunction or NaryFunction classes and the new function to be added to the corresponding function list. Contenders based on the new function would immediately begin to be generated.

The process described using FIG. 8 is that followed when the transforms of a mapping are to be inferred from scratch (ie. making no assumptions about previous inference sessions or any manually entered transforms that the user may have recorded). Sometimes it is not possible to unambiguously define a mapping by the editing of a single example, and so the inferring process operates only on the changed part of the edited example. The objective is to refine a part of the mapping.

In the preferred arrangement, the data browsing application 120 detects only those parts of the example that the user edited in the current editing session. This means that an existing mapping can be refined and removes the need for unnecessary processing in the analysis. So, for example, if an initial mapping has three source data components and the user selects an example and only changes the text associated with two of those components, then the inference method described is performed on a subset of the data. The inference method achieves this by detecting which source data components are affected by the change, and then attempts to find a solution for just the changed part of the example.

This results in a quicker implementation, and also means that the process can be more responsive to the user's changes. For example, rather than waiting until the user has finished editing the example and submitting the changed example to the data browsing application 120 for analysis, the analysis can optionally be performed interactively in parts. If the user moves the cursor by more than some threshold distance in the user interface, then the analysis method can be initiated to generate a solution for the changed part of the example only. The resulting solution is then integrated into a total mapping solution in readiness for any other changes. One issue arising from a progressive approach to finding a mapping solution is that the system must be able to respond quickly to the user's changes. In many cases, a sufficiently quick response may require a smaller set of possible functions to be implemented.

As well as editing the text of the example, the user can also apply various presentation characteristics to the example being edited. For instance, in the preferred implementation, the user can select font type, font size, style (eg. bold, italic, underline, superscript, subscript, etc.) and colour characteristics to parts of the edited example. Once the data browsing application 120 has identified a solution using the process described above, the data browsing application 120. can then attribute presentation characteristics to the source data components if they have been applied. Presentation characteristics are assumed to always be applied after any structural transforms have been applied (ie. it is the last transform to be applied to the source data component before that data is included as part of the target data component).

If the user applies a presentation characteristic to the entire example, then the applied characteristic is associated with the target of the mapping and not the source data components. Accordingly, if the user adds a further source data component to a mapping, the data of the further source data component will acquire the presentation characteristics stored with the target data component. However, if a presentation characteristic is only applied to part of the example, then the system will infer which source data component(s) are affected and store the presentation characteristics with only those source data components. For example, in the name example used previously, the user may wish to always display the Second-Name part of MyName in bold (eg. SMITH, John).

The user can view the presentation characteristics associated with any source data component by selecting the corresponding Presentation button 715 in the screen layout GUI shown in FIG. 7A. Presentation characteristics attributed to the target data component can be viewed by selecting the corresponding Presentation button 702. The preferred arrangement also allows the user to manually add and change presentation characteristics using the presentation function of both target and source data components. This may be achieved by selecting the buttons 702 and 715*a* respectively. If presentation characteristics are defined for both source and target data components, then the characteristics associated with the source data component(s) will be applied before those of the target data component.

One class of mapping transformations, which is critical for data aggregation purposes, is transformations of values having dimensions (and units of measurements) or currencies. Currently many data source schemas do not convey the semantics of measurement or currency mostly due to the fact that the data sources were created without the expectation of being used outside the domain of creation. This means when a user from outside of this domain was to view the data, simple field names such as YTD Sales or DistanceTravelled do not convey sufficient information. For example, are the sales values quoted using US$ or AU$, and is the distance in miles or kilometres. While insufficient schema information is provided for data sources, it is up to the user creating the mapping to define the required transformations in the mappings by, for example, specifying a conversion factor.

However, if the definitions of a data source are represented using XML Schema it is possible that the semantics of measurement can be adequately represented. The defined data types of XML Schema already provide for the semantics of time (and date). Although there are currently no standardised semantics for measurement, the data browsing application 120 uses a library of dimension types with each dimension associated with a predefined set of possible units. Example 1 of XML schema below represents a definition of a length type. This type extends the XML Schema data type of float and each element using this type is associated with a units attribute.

XML Schema Example 1

```
<xsd:complexType name = 'length'
    <xsd:simpleContent>
        <xsd:extension base="xsd:float">
            <xsd:attribute name="units" type="lengthUnits" use=
                "required"/>
        </xsd:extension>
    </xsd:simpleContent>
</xsd:complexType>
<xsd:simpleType name="lengthUnits">
    <xsd:restriction base="xsd:string">
        <xsd:enumeration value="feet"/>
        <xsd:enumeration value="metres"/>
        etc.
    </xsd:restriction>
</xsd:simpleType>
```

Data source schema designers can therefore declare elements that use the predefined dimension types. For example, an element MyLength may be defined as:

<xsd:element name='MyLength' type='length'/> and then used in a document as follows:

<MyLength units='metres'>100</MyLength>

Alternatively if the units were to be fixed for all instances, the element declaration may be used to refine the base type by restricting the value of the units attribute to be "metres".

If data sources use this method of defining dimensions and units, the data browsing application 120 checks when mappings are being created that each of the source data components have similar dimensions. A mapping is not permitted if the sources of the mapping are not dimensionally consistent. The user can indicate a mathematical operation between sources that have the same dimension but different units by inserting the required operator (ie. +, −, /, *) between the operand sources. The data browsing application 120 then uses the dimension library to perform the necessary conversion, with the target of the mapping having the same units as those of the first operand of the operation.

For example, consider the case where a user selected first a source data component DistanceTravelled (which extended the length type and used units of kilometres) and then a second source data component DistanceFromSource (which also extended the length type but used units of miles). If the user then edited an example of the data by inserting a + operator between the representative values, the resulting representative data values would show the sum of the distances in kilometres. If the user wished that the resulting values were represented using the units of miles, then the user can alter the order in which the source data components are selected. Alternatively, the type information of the target data component of the mapping can be explicitly edited to use the units of miles.

The data browsing application 120 can only perform these unit conversions when the data sources are appropriately described. It should be clear that currency conversions can be performed using substantially the same method with currency being defined as a dimension and the units being the individual currencies. In the preferred arrangement, the data browsing application 120 requests a conversion rate from an on-line conversion process. In the situation where this conversion process is not available due to network problems, then the conversion is performed using a table of conversion rates.

5.0 Presenting Data Views

Data views can be created either using schema views as described in Section 2.0, or using visual methods as described in Section 6.0 of this disclosure. These data views are presented to the user by the data browsing application 120.

Figure 12A:
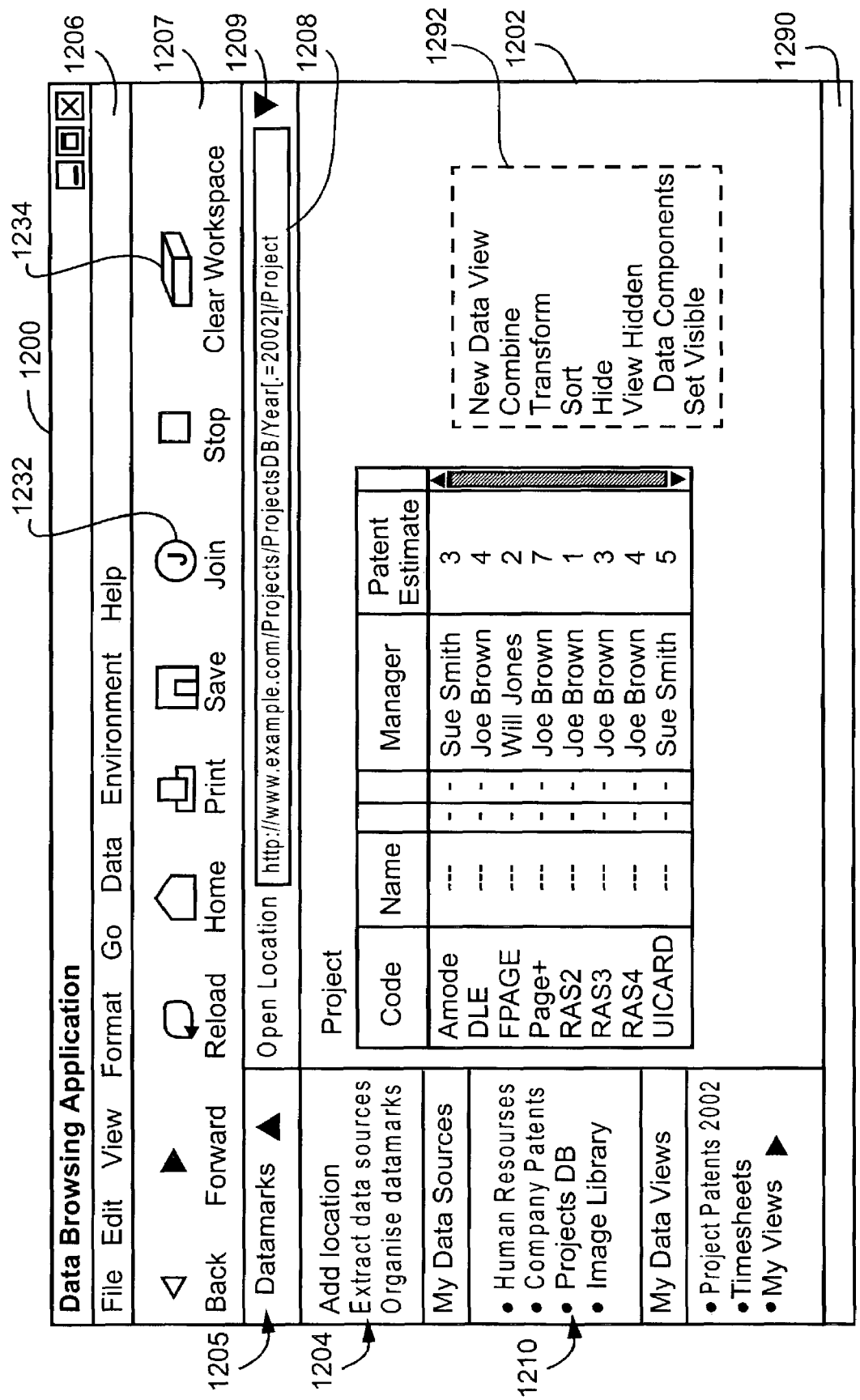
FIGS. 12A-12F shows an example implementation of creating a new data view using a graphical user interface (GUI)

The preferred method of presenting data views in the data browsing application 120 is now described. In this method, the user works in a GUI environment 1200 displayed by the data browsing application 120 upon the video display 1114 as depicted in FIG. 12A. On the left of the GUI 1200 is a datamarks panel 1205. Datamarks are similar to the web browser bookmark concept, in that a datamark represents a link to useful information. Preferably the datamarks panel 1205 is a tree containing items, with each terminal item being associated with a URI. In alternative arrangements, the datamarks panel 1205 may be implemented as a simple list. The URI may correspond to a data source or a previously created data view. In the preferred arrangement, data sources comprise XML documents and data servers. Data servers are described in more detail in Section 1.0. In alternative arrangements, other types of data sources may be permitted (eg. Microsoft Excel® spreadsheets). In these alternative arrangements the data browsing application 120 provides a method for generating XML from the data source.

In the datamarks panel 1205, shown in FIG. 12A, the data sources and data views are maintained in separate sections (eg. as two nodes of a tree). This is not essential and is done in the preferred arrangement to help the user differentiate between primary and derived data sources. Also at the top of the datamarks panel 1205 are selectable panel options 1204 for adding and organising datamarks in the panel. If the user selects to add a datamark, a new datamark is created and added to the datamarks panel 1205 for the currently selected data view. The name of the added datamark is assumed to be the title of the data view and the URI is assumed to be the URI of the data source or data view definition. In the preferred arrangement, the datamark is added to the appropriate section (data source or data view node) of the datamarks panel 1205.

Selecting an item from the datamarks panel 1205 results in the generation of XML data. In the case of the data source, preferably the URI contains an XQuery which is used by the data server to generate an XML data result. If the XQuery is not specified for a URI, then the default request of "/" is assumed. In the case of a data view, the data browsing application 120 reads in the data view definition (which is generated as described later in Section 11.0), generates the appropriate query request(s), collates and formats the XML data from the query request(s) according to the data view's definition.

In each case, before the XML data is presented to the user, a check is made to see whether any mappings are relevant to the incoming data. If relevant mappings are found the corresponding data transformations are performed. These transformations can involve combining one or more data components from one or more data sources. The preferred process of applying mappings when a user selects to see a data view is described in Section 11.0

To the right of the datamarks panel 1205 in GUI 1200 is a workspace 1202. When a user selects a datamark, the resulting data view is displayed in the workspace 1202. In FIG. 12A the data view is a table headed by the term "Project". Preferably, the workspace 1202 is organised as a grid with each data view that has been selected for viewing being displayed as a rectangular grid unit. The preferred size of displayed data views (and hence the number of grid units displayed in each row of the grid in the workspace) is specified as a user preference. The user can select to re-size and move data views in the workspace. If this occurs the grid layout is relaxed to a manual layout, however the preferred data view size is still used when displaying new data views in the workspace and the grid layout is used to determine an initial location of a new data view.

The GUI 1200 also allows the user to modify the data views displayed in the workspace 1202. For example, the user can modify presentation properties (eg. fonts, styles, colours, etc.), apply filters, change the sort order, specify and apply transformations that may apply to one or more data components, etc. At any time the user can save a selected data view. If the data view originated from a datamark corresponding to a data source and the user had made modifications, a new data view definition is created. The user can then specify where the created data view definition is to be stored. If the data view originated from an existing data view definition, then the user can select to either update the existing data view definition or create a new data view definition for the selected data view.

In an alternative arrangement, the collection of data views occupying the worksheet 1202, can also be saved. In this case when a user saves his/her work, the user can select to save the entire workspace 1202, including the new data view. This workspace 1202 can be exchanged with other users. In a further variation, data views are always saved as part of a workspace 1202. This workspace 1202 can contain any number of data views and other workspaces. It is also possible for contained components of a workspace to be laid out according to a layout type for the workspace other than the grid layout type previously described (eg. in columns or row). As described above, a workspace can also be laid out manually. A workspace can act like a package that can be exchanged with other users. On receipt of a workspace, for example via e-mail or by a URI link, a receiving user can choose to unpack the workspace by dragging contained workspaces to the datamarks panel 1205 as shown in FIG. 12A.

Alternative arrangements can also allow more than one workspace to be open at once. Open workspaces not currently being viewed may be accessed via a set of tabs located above the status bar 1290 of FIG. 12A.

When a user selects a datamark from the datamarks panel 1205, the data view associated with that datamark is presented in the workspace in the next available grid position. The presentation process is described in more detail later in this section. If the workspace is clear, then the data view will appear at the top left hand corner of the workspace. Alternatively the user can select the clear workspace control 1234 on a toolbar 1207 in FIG. 12A before selecting the datamark. If existing data views are displayed in the workspace 1202 and the clear workspace control 1234 is selected, then the user is prompted to save those data views if they have been modified from their original state.

The user can also present a data view by typing the URI of a data source or data view definition in the open location control 1208 below the toolbar 1207 in FIG. 12A, selecting the desired location from a history list, which is viewed by pressing an icon 1209, or by using the "Open Location" function on the File menu. In each case, the result is the same procedure as described for selecting a datamark.

The preferred method of displaying a data view associated with a datamark is now described with reference to the process flow in FIG. 31A. The user selects the appropriate datamark in the datamarks panel 1205 and a GUI object 3110 of the data browsing application 120 passes the URI associated with this datamark to the workspace controller object 3115. This object ascertains whether the received URI corresponds to a data source or a data view definition. In the latter case, the object 3115 locates and parses the data view definition, which, in the preferred arrangement is stored as an XML document, into a tree structure comprising the data view's definition. Preferably the data view's definition is represented using a Document Object Module (DOM) object. Data view definitions are described further in Section 11.0.

The workspace controller 3115 then creates a data view presenter object 3120 to present the data view. The workspace controller 3115 passes to the object 3120 either the URI of a data source or a node of data view's definition. In the preferred arrangement, the root node of the data view's definition is passed to the data view presenter object 3120. However, in other arrangements, the data view definition may be organised differently with descriptive nodes (eg. when and by whom the data view was created) not being passed to the data view presenter object 3120. Preferably, each displayed data view in the workspace 1202 is associated with its own data view presenter object 3120.

The data view presenter object 3120 then creates a new data view manager object 3125 to obtain the data for the data view to be presented. The URI (of a data source) or the data view definition node is passed to the created data view manager object 3125. If the data view manager is initialised with a URI, then the data view manager 3125 requests the XML store object 3140 to fetch the URI, parse the resulting stream corresponding to the XML document into a DOM-like structure, hereinafter called an XML Schema DOM, or simply XSDOM, and return a handle to the created structure.

The XSDOM structure differs from the DOM structure in that element and attribute nodes provide additional methods from those of the DOM Level 2 Application Programming Interface (API). The additional methods locate XML Schema definitions for the abovementioned nodes. These XML Schema definitions are used by a data view presenter object 3120 to appropriately present the data associated with the data view. The data view manager object 3125 uses the provided handle to the XSDOM object created by the XML Store object 3140 to create its own XSDOM structure which acts as the data for the data view being presented. This XSDOM structure is the structure 3130 in FIG. 31A.

Preferably the data browsing application 120 has a single XML Store object 3140. This object caches fetched XML documents in an object cache. Hence before the XML Store object 3140 initiates an HTTP fetch of XML data, it first checks whether the document is in cache and whether the cached copy is still up-to-date. The XML Store object 3140 also receives requests for XML Schema documents. These requests arise from XSDOM requests for definitions of elements and attributes. The XSDOM element and attribute nodes can identify their XML namespace and attempt to locate XML Schema documents that have definitions for that namespace and thus perhaps for the particular element or attribute. The XML Store object 3140 locates XML Schema documents using the schema location URIs included in XML documents. It parses these schemas into schema objects and caches them for future use in the XML Store cache 130, corresponding to the database 130 of FIG. 1. As with XML documents, before schema objects are used from the cache the XML Store object 3140 checks that they are still up-to-date.

If the data view manager object 3125 is initialised with a data view definition, it extracts the query associated with the definition and requests the XML Store object 3140 to fetch the data it requires in order to process the query. Each request results in a handle to an XSDOM object in the XML Store object 3140. The data view manager 3125 then uses these handles to obtain the necessary data to create its own XSDOM structure which corresponds to the data for the data view 3130. This data may represent mapped, filtered, sorted, grouped data from one or more data sources. If the data is obtained from more than one data source, then it represents a join across those data sources. Joins are described further in Sections 6.0 and 7.0 of this disclosure The presentation process performed by the data view presenter object 3120 requires an analysis of the data view's XSDOM data 3130, and the associated schema definitions, in order to select the most appropriate presentation or display type. Once the most appropriate display type (eg. table, graph, scatter plot, 2D grid, etc.) is selected, the data view presenter object 3120 renders the data using the selected display type and passes a handle to this rendered data view to the workspace controller 3115 for presentation to the user.

Preferably the rendered data view is a Scalable Vector Graphics (SVG) object. The data browsing application 120 has a set of SVG templates for each display type, with each display type being associated with a default or preferred SVG template. On selection of the preferred display type, the data view presenter object 3120 selects the default SVG template, for the preferred display type, and populates it with data from the data view's XSDOM structure 3130. The result of this population is a renderable SVG object, which can be displayed to the user and with which the user can interact.

The presentation analysis performed by the data view presenter object 3120 is described in more detail in the remainder of this section. It should be clear that the described method can be generally applied to hierarchical data and hence is not limited to use in the data browsing application 120.

Figure 31A:
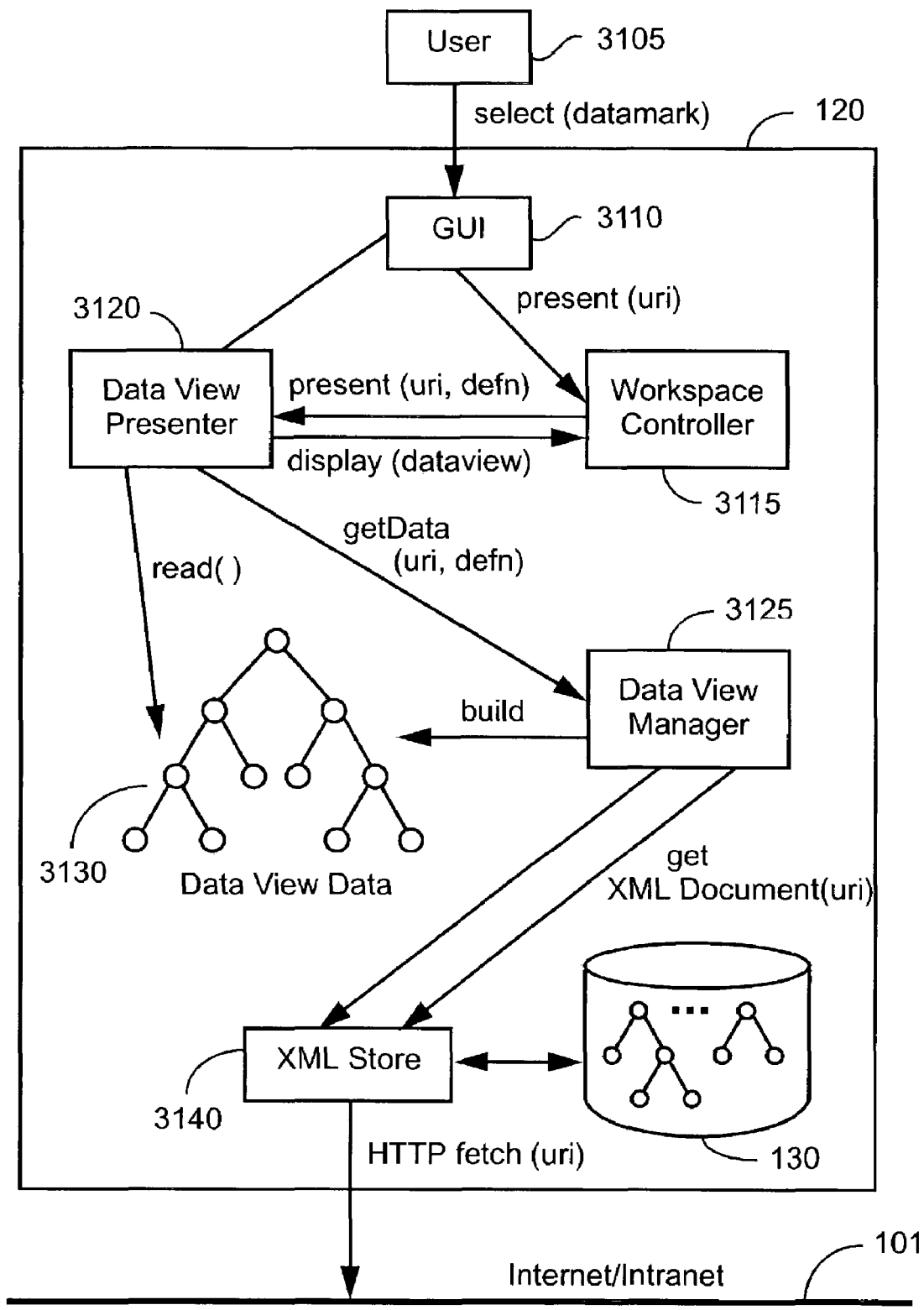
FIG. 31A depicts the process of presenting a data view.
Figure 31B:
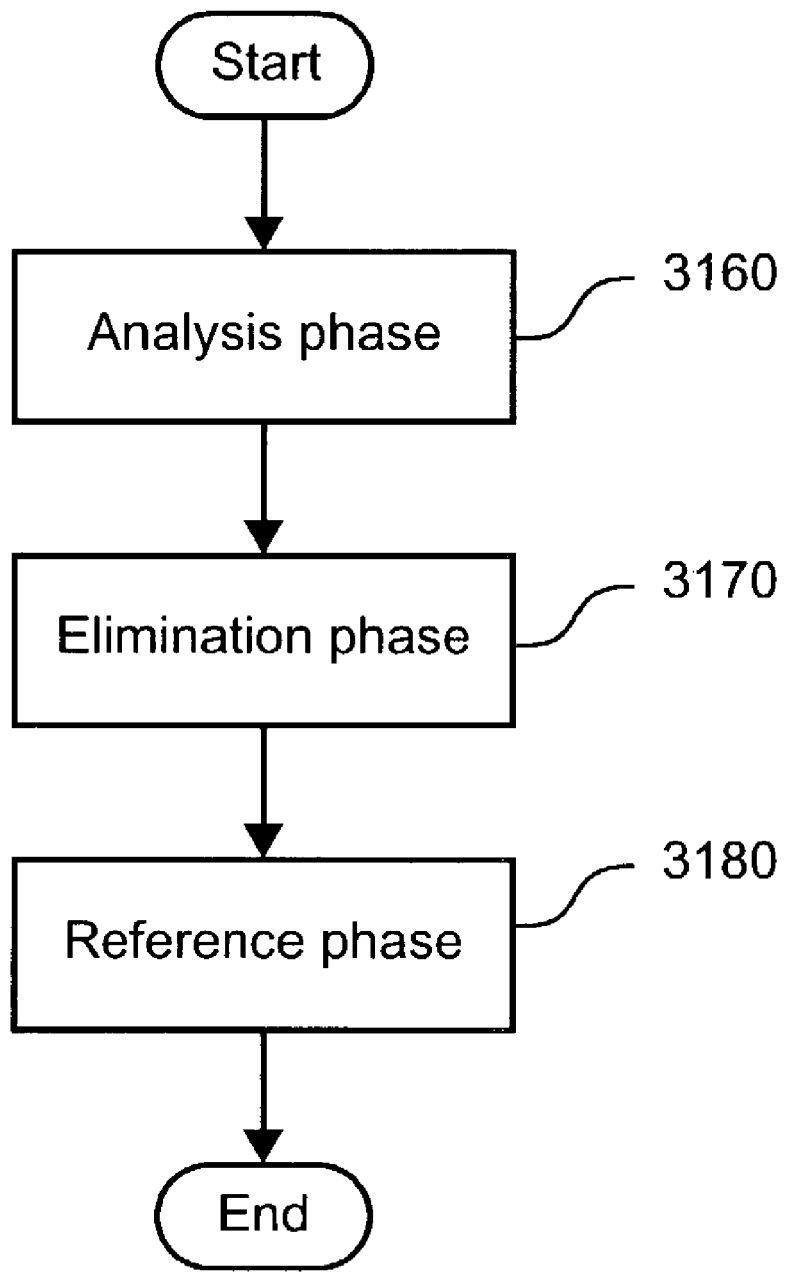
FIG. 31B is a flowchart of the display selection method.

The method for selecting the most appropriate presentations operates in three phases, as depicted in the flowchart of FIG. 31B. The first, analysis phase 3160, examines the structure of the hierarchical data, from the data itself or from schema definitions of the data if such are available, or from both, to identify the existence of regularly occurring data items and determine whether a representative base table data structure and flat data table can be constructed. The presence of the latter indicates that the data is 1 or 2-dimensional and hence a graph or xy plot presentation may be appropriate. The second, elimination phase 3170 is responsible for examining the data and/or its schema definitions to determine which display types are not appropriate. The elimination phase 3170 makes use of a set of elimination rules, each having an associated condition and a list of elimination candidates. When the condition of a rule is satisfied, its list of candidates are eliminated from the list of possible display types.

When all elimination rules are processed, it may be possible that more than one display type remains. If this is the case then a third, preference phase 3180, begins, in which a set of preference rules are processed to order the remaining candidates. These rules test for attributes such as the number of rows or columns in a table, or the number of segments in a pie chart. For example, if there are more rows than columns then it may be more appropriate to swap the rows and columns so that the height of the table is less than its width. This rule preferably takes into account the size of the data view and hence the number of table columns that are realistically viewable.

Once the list of possible display types has been ordered, the data is laid out according to the best display type and presented to the user. A menu listing all the display types in the list, in the order previously determined is also presented to the user to give the user the option of selecting another appropriate display type.

5.1 Display Types

The data browsing application 120 supports the following display types: tree, table, bar graph, line graph, pie graph or collection thereof, xy scatter plot (or simply xy plot), and 2D grid. Fewer or additional display types may be used. Display types comprising collections of one or more of the above display types may also be used. With the exception of 2D grid, and tree display types, there are sub-types for each type. For some tables, the user may have the option to view the transpose of the table (ie. rows and columns are transposed). For bar, line, pie graphs and xy plots, there are row-wise and column-wise sub-types. The tree display type is a generic display type that can be used to display data of any hierarchical structure. It simply shows the data in its natural hierarchical form.

The base table data structure underlying all non-tree display types is a tabular display format where instances of individual data components are laid out in columns. An example XML data and its base table representation are shown in FIGS. 32 and 33 respectively. In FIG. 33, the column headings 3301-3304 identify the data components present in the XML data, and are typically the names of elements and attributes in the data. Only those attributes, which are considered to hold primary data, are treated as data components. Therefore, attributes- belonging to the XML instance or XML Schema instance namespaces (eg. xml:lang, xsi:schemaLocation, etc) are not treated as data components because the role of these attributes is to provide information to the processing application. Similarly any attributes belonging to the namespace of the data browsing application 120 are also not treated as data components. Such attributes may have been used to store an alternative name for a data component or to temporarily list a data component. Such attributes are described in Section 7.0 of this disclosure.

Shown in each column are the values 3305-3311 associated with these elements and attributes. The contents of the columns are ordered such that the values of attributes and sub-elements of the same XML element are shown on the same row in the table. Thus, "Jan" (item 3307) and "123000" (item 3308) appear on the same row since they originated from the month attribute and the value of the same Sales element in the XML data. Both of these in turn are associated with Apparel (item 3306) since they are sub-elements and descendants of the same (first) Dept XML element. Note that this Dept element also comprises three other Sales sub-elements, and hence Apparel is repeated three more times in items 3309, 3310, 3311 in the Dept column. However, for reasons of clarity, when the same value appears consecutively in the same column, only the first incarnation is usually shown, and the remaining is usually left blank.

A base table data structure can be fully expanded as shown in FIG. 33, where the values all attributes and sub-elements are listed. Alternatively, the base table data structure may be displayed in non-fully expanded form, where the contents of certain XML sub-elements are not shown. Instead, the sub-elements are represented by hyperlinks in the table. An example of a non-fully expanded base table data structure is shown in FIG. 34, in which 3401 and 3402 are hyperlinks.

Hyperlinks are typically used to reduce the depth or dimension of the XML data (and hence the size of the displayed table) to a manageable level.

Hyperlinks can thus be used to enable browsing of a data source in the data browsing application 120. By selecting a hyperlink in the presented data, the user can select a further context node for presentation and thus browse to further content in the data source. Alternatively, the user can select to view the content of the hyperlinks within the current display type. For example, the user can select to view a graph within the cell of a table. Selective viewing of the contents of hyperlinks within an existing data view results in a composite display type.

The base table data structure can be used directly for a table display type. For example, data having a repeated pattern of the same sub-elements (or attributes) is best presented to the user as a table with each element or attribute constituting a column of the table. However, with some data patterns, such as that represented by the base table data structure in FIG. 33, the hierarchical data can be flattened by promoting some data to be column or row headings. Whilst the base table data structure is useful for conveying the underlying structure of the XML data, and allows for easy manipulation of the data as described in Section 6.0, a flatter table structure is usually a more effective presentation format.

A flatter table data structure can also be more suitable for identifying the bar, line and pie graphical display types, since these display types are essentially methods for presenting the relationship between two data components that have a one-to-one correspondence between one another. When such data components exist, the content of one data component is displayed as column headings in the table, and the contents of the remaining data components are shown under their corresponding columns. If the contents of the data components exist in more than one subset, then each subset is displayed as one row of data in the table. The presence of subsets is indicated by the existence of a third data component, which has a one-to-many correspondence with the first two data components. The contents of this third data component can then be used to identify the different data subsets, and are typically shown in a column of row-headings in the displayed table. If there also exists another data component with a single value, then it may be appropriate to use its content as a caption for the table.

Figures 35, 36, 37:
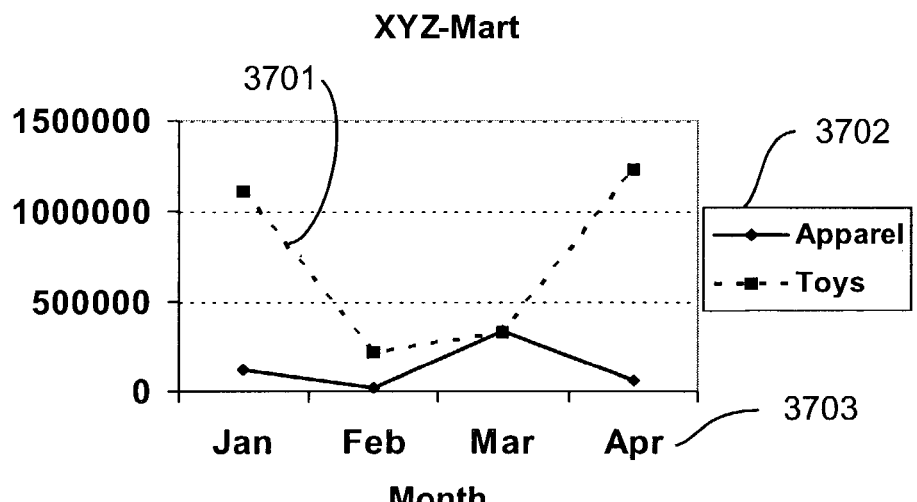
FIG. 35 is an example of a table display type.
FIG. 36 is an example of a transposed table display type.
FIG. 37 is an example of a row-wise line graph.

An example of a table display 3501 obtained by flattening the base table data structure of the XML data of FIG. 32 is shown in FIG. 35. In FIG. 35, the column headings 3502 are values of the data component 3303 Month, whilst the data cells are values of the data component 3304 Sales. The table also comprises a column of row headings 3503, which are the values of a third data component 3302 Dept. The names of the data components 3303 and 3302 that make up the column and row headings, Month and Dept respectively are shown in the top-left corner cell 3505 of the table. Finally, data component 3301 comprising a single data value is displayed as the table caption 3506.

The transposed form of the table display of FIG. 35 is simply a table with its rows and columns swapped. An example of such a table, based on the XML data of FIG. 32 is shown in FIG. 36. When a table, such as FIG. 35 or FIG. 36, is presented to the user in the workspace 1202, the user can also select to see the base table form for the data (ie. FIG. 33). In the preferred arrangement, the user can specify whether data components that have a single value, such as item 3301, are included in the base table data structure. If the user selects not to include these data components, then one of them, typically the first data component, is used to compose a caption for the displayed data.

Figure 38:
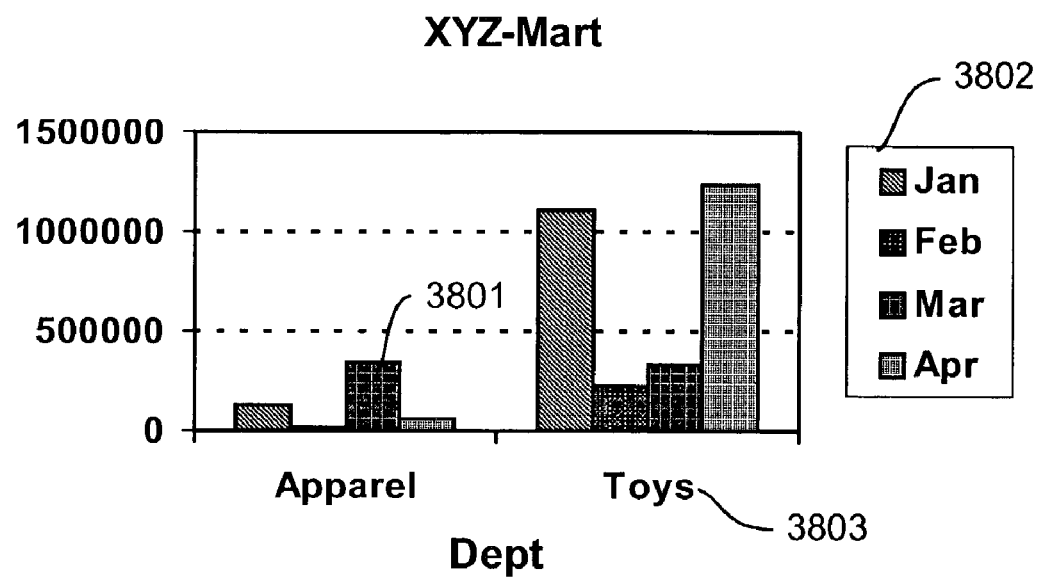
FIG. 38 is an example of a column-wise bar graph.

When the values of the second data component displayed in a flattened table display type are numerical, then it may be possible to present the XML data as a bar, line, or pie graph. If this is the case then there exists direct a mapping between the contents of a table display and those of the graph displays. For the cases of the row-wise bar and line display types, an example of the latter of which is shown in FIG. 37, each row of the table is shown as a data series 3701 in the graph. The row header associated with each row constitutes the name of the data series 3702, and the column headers become labels along the x-axis 3703. For the column-wise bar and line graphs on the other hand, an example of the former of which is shown in FIG. 38, each column of the data table 3501 is mapped onto a data series 3801, with the column header mapping onto the data series name 3802, and the row headers mapped onto the x-axis labels 3803. Both examples shown in FIG. 37 and FIG. 38 are based on the flat data table used by FIG. 35.

Bar and line graphs can preferably have up to two different y axes (not shown in FIG. 37 and FIG. 38), one located on the left edge of the graph area, and one on the right. Different y axes are typically used for plotting different sets of data, for example temperature and rainfall variations, where each set is represented by a distinct data component. The values of one data component are plotted against the left y-axis, and the values of the second are plotted against the right y-axis. The preferred arrangement maintains an axis index for each data series in the flat data table.

Although the preferred arrangement only permits graphs with a single x-axis, multiple x axes could be allowed in alternative arrangements where the base table data structure is used to find graph groups which are located in nested hierarchies. Alternatively, multiple x-axis arrangements could use multiple flat data tables, one for each x-axis.

Figure 39:
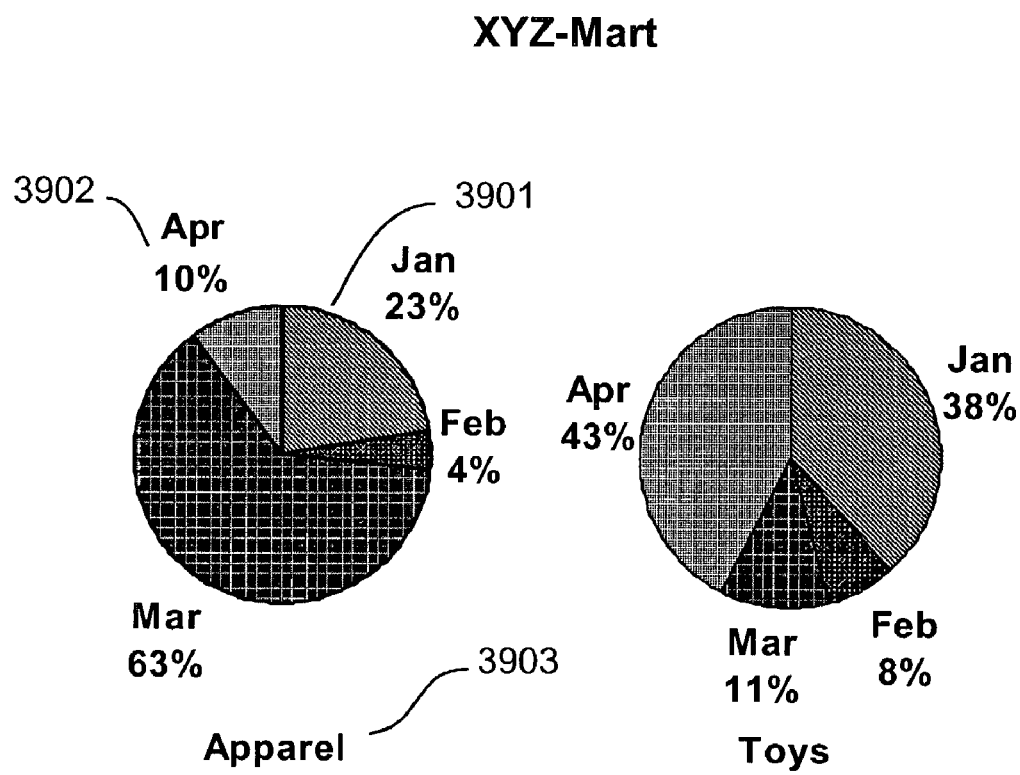
FIG. 39 is an example of a row-wise pie graph.

Similar mappings used for bar and line graphs are also used for the row-wise pie and column-wise pie graph display types. In the former, an example of which is shown in FIG. 39, a row in the table is shown as a pie chart 3901. If more than one row exists then multiple pie charts are displayed. The column headers of the table are mapped onto the labels 3902 associated with the pie segments in each chart. The row headers map onto the titles 3903 of the pie charts. In the latter column-wise display type, each column rather than each row is shown as a separate pie chart. If more than one column exists then multiple pie charts are displayed. Labels for the pie segments in each chart are obtained from the row headers of the table, whilst the charts' titles are obtained from the column headers. The example shown in FIG. 39 is based on the flat data table used for FIG. 35.

The xy plot display type is another display format used for presenting numerical data. As in the cases of bar, line and pie graphs, the use of xy plots require the presence of two data components that have a one-to-one correspondence between one another. One data component, referred to as the x-component, serves as coordinate values for the x-axis, whilst the other serves as coordinate values for the y-axis and is called the y-component. Again, as in the cases of the table, bar, line and pie graph display types, if there exists a third data component, called the series label component, which has a one-to-many correspondence to the x and y components, then the x and y components are said to be divisible into multiple subsets, in which case each subset is displayed as a separate data series in the plot. Unlike the preceding display types however, the xy plot display may incorporate an additional data component if it has a one-to-one or one-to-many correspondence with the x and y components. This additional data component, if it exists, serves as labels for each data points, in the plot and is called the point label component.

The presence of the point label component, if it has a one-to-many correspondence with the x and y components, enables the creation of a column-wise xy plot display type, as opposed to the above which is also referred to as a row-wise xy plot. The column-wise xy plot is produced in the same way as its row-wise counter-part, with the exception that the roles of the series label and the point label components are swapped.

Figures 40, 41:
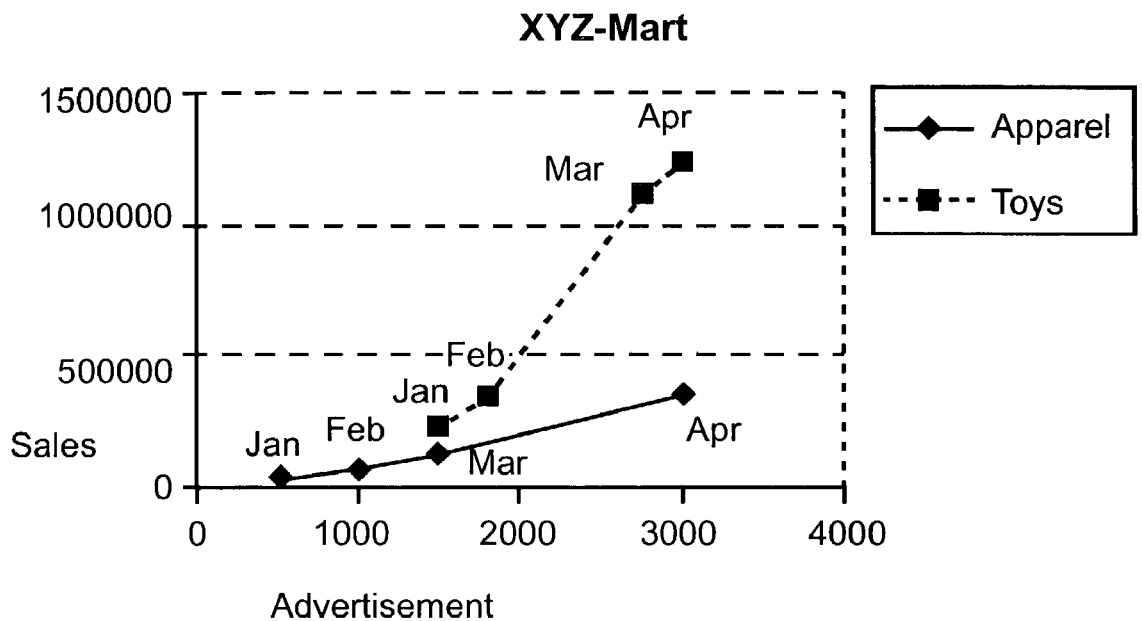
FIG. 40 is an example of a row-wise xy plot.
FIG. 41 is a base table display corresponding to the xy plot of FIG. 40.

An example of the row-wise xy plot and its corresponding base table data structure are shown in FIG. 40 and FIG. 41 respectively. In the figures, data components 4001-4004 serve as the series label, point label, x, and y components respectively.

The 2D grid display type is a display format primarily used for data with pictorial content, but may also be used to display text-only data. It is typically generated from the base table data structure, in which the contents of each entire row of the table are presented as a single data item. The set of items are then laid out in a regular 2D grid pattern whose numbers of rows and columns are dictated either by the user or by the dimensions of the workspace. Each item in the grid comprises a list of property and value pairs. The properties are the column headings of the basic table display, whilst the values are the data contents under the corresponding columns.

Figure 42:
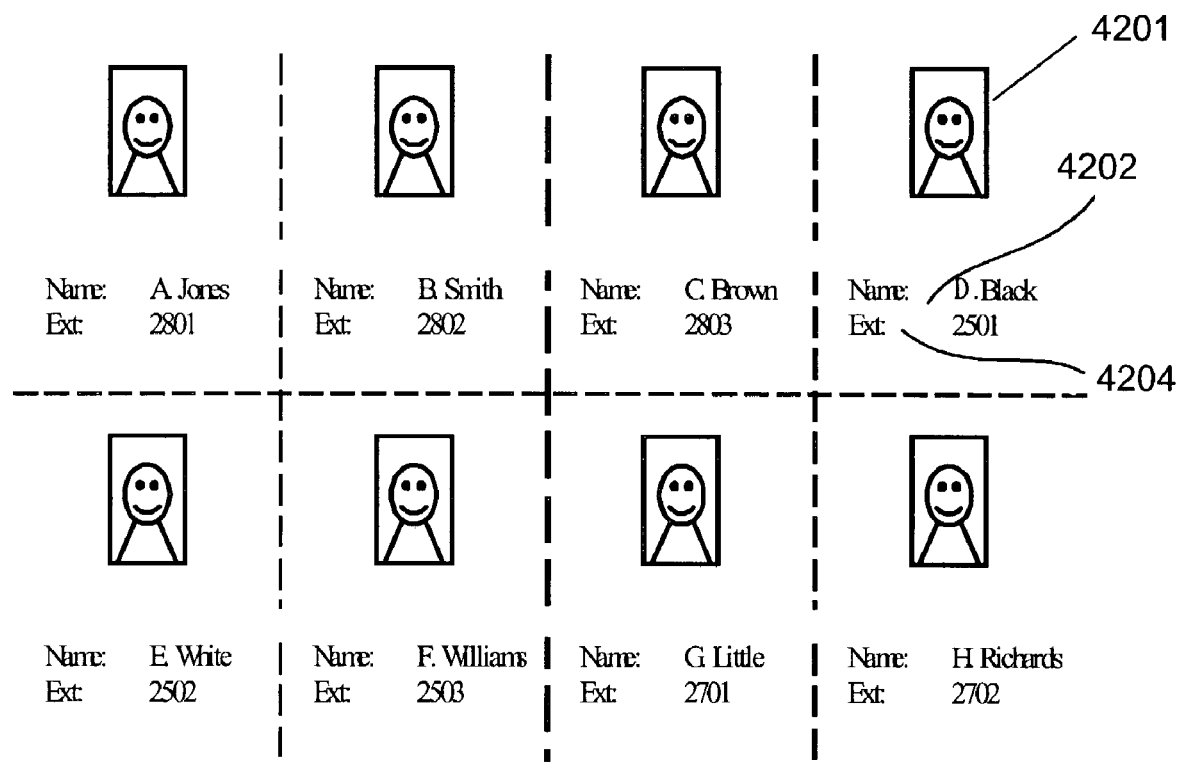
FIG. 42 is an example of a 2D grid display type.

An example of a 2D grid display type and its corresponding base table data structure are shown in FIG. 42 and FIG. 43 respectively. Each cell in the grid contains a property named Photo 4201, which refers to the storage location of a photograph of an employee. These photographs 4201 are shown in the 2D grid display, along side the remaining data components Name 4203 and Ext 4204.

The 2D grid display type is also used in the preferred arrangement to display a list of data items, where each data item represents a link to further information. Preferably, as mentioned earlier, the user can select to view the contents of these links in-line resulting in a composite 2D grid display type.

In the preferred arrangement, the user can manipulate (eg. copy to another data view, apply a filter, sort, transform or combine) data components. These data components may be data nodes, data sets or data series. A data node, such as a node of a tree, can be uniquely identified by an XPath expression which corresponds to the node's location in the document. A data set, on the other hand, such as a column of a table or a data series of a graph, can be identified by an XPath expression which corresponds to an iterator and an optional path relative to the iterator. So for example, in FIG. 36 the iterator for the data set corresponding to the Apparel column is:

Company/Dept[name="Apparel"]/Sales

This data set does not require a further path to be specified in addition to the iterator. The optional path is preferably used for tables where all columns have the same iterator (ie. all elements for a row have the same parent element).

In addition to the ordered list of display types produced by the preferred arrangement, iterators (and optional relative path) are provided for all data sets. These allow the data elements to be readily and specifically obtained from XSDOM documents 3130 created by the data view manager object 3125 in FIG. 31A for particular queries. The data view manager object 3125 also uses this information to modify queries of existing data views and construct new queries. This process is described further in Section 6.0.

The tree display type does not require the specification of data sets. The path for a data node of a tree display type can be taken directly from the data (ie. it is already provided by the XSDOM API).

5.2 Analysis Phase

The process of selecting and ranking display types begins with the analysis phase 3160 of FIG. 31B. In the preferred arrangement, data is expressed in standard XML format. Other data formats are also possible.

The analysis phase 3160 of the preferred arrangement is responsible for analyzing the contents of an XML tree, identifying and extracting the relevant items from the tree and appropriately constructing from these a base table data structure. A base table data structure provides a means for detecting regularly occurring data items in the XML tree and identifying relationships between data items. Each column of the base table data structure represents a distinct attribute or element in the XML tree. The values listed under each column are instances of these attributes and elements that exist in the XML tree. In other words, each column is a data component. Further, the data for each row pertains to a single entity.

The placement of data in the base table data structure takes advantage of the implied correspondence between items residing on the same rows to capture the structural relationships between data elements in the XML tree. Preferably, the XML tree is traversed in the depth-first fashion during which the base table structure is populated from left to right. That is, when a sub-element is encountered, its attributes and contents are placed in the table immediately to the right of the attributes and contents of its immediate parent. If a parent element contains multiple instances of the same child-element, then these instances are placed underneath one another in the same column, to depict that there is a one-to-many relationship between the parent element and the child element. Different types of child-elements sharing the same parent element occupy adjacent columns in the table.

A base table data structure can generally be constructed from an XML tree of any depth or dimension. However to ensure manageable sizes, the structure is typically limited to dimensions of 2 or 3 or less. The dimension of a base table data structure is determined by the number of cascading one-to-many relationships between data components. For example, the table of FIG. 33 has a dimension of 2 since there is a one-to-many relationship between data component 3301 (Company) and data component 3302 (Dept), the latter of which in turn has a one-to-many relationship to data component 3303 (Month). If an XML tree of a higher dimension is encountered then typically sub-elements residing on depth levels higher than 2 or 3 are not expanded during the tree traversal, and are instead represented by hyperlinks in the base table data structure. As mentioned previously, preferably the user can select to view hyperlinked data in a composite data view.

Hyperlinks may also be used when a parent element comprises different types of sub-elements, more than one of which contain multiple instances of data. In this case the sub-elements are preferably represented by hyperlinks to prevent correspondence relationships across instances of the different sub-elements from being misconstrued. Consider the XML tree in FIG. 44 and its fully expanded base table representation in FIG. 45. In the figures, the data elements 4401 Dept comprises of two different types of sub-elements, 4402 Sales and 4403 Staff, each of which occurs more than once. Due to the implied correspondence between data residing on the same rows in the table, the fully expanded table of FIG. 45 undesirably suggests that Gender and Staff, values 4501 and 4502 are somehow related to Sales and Month values 4503 and 4504. In order to avoid this implication, the sub-elements 4402 Sales and 4403 Staff are preferably represented by hyperlinks, resulting in the base table data structure of FIG. 46 where each row pertains to a single entity.

Once constructed, a base table data structure is analyzed to determine whether other display types are possible. Since all of the remaining display types are essentially different methods for displaying 1 or 2-dimensional data, the data contained in the base table data structure must be of the same number of dimensions, otherwise the remaining display types are not possible. To assist the generation of these display types, the data in the base table data structure needs to be reorganised into a more suitable format, called a flat data table. A flat data table is a data structure in which the hierarchies of a base table data structure have been collapsed and represented as one-to-one relationships. This is possible when the base table structure has few data components comprising primarily n data components that have one-to-one relationships with one another, and is achieved by promoting one of these data components to be:column headings, and populating the cells of the table with.the values of the remaining data components. The flat data table is the required data structure for graphical data. Typically, n=2 and hence each cell in the resulting table contains a single value. When n=3 or more, each cell contains multiple values and the table is said to be an extended flat data table. Extended flat data tables with n=3 are typically used for the xy plot display type, and for bar and line graphs with two distinct y axes.

The process of constructing a flat data table begins by identifying n multiply-occurring data components in the base table data structure that have a one-to-one correspondence with one another, where n=2 or 3. One, referred to as the label component, serves as the column headings of the data table, whilst the others, referred to as the value components, serve as the contents of the data cells in the table. Whilst there are no restrictions on the value components, the label component should preferably not contain duplicated data since it is used, for example, to label the x-axis in a bar or line graph, where duplicated labels are generally not allowed. A second condition on the label component is that it should preferably contain text data. The rationale for this is that, should not all n data components contain numerical data, using the text component as labels frees the other possibly numerical data components for the contents of the data table, thereby allowing graphical display types to be generated.

A different set of conditions is applied if there exists another multiply-occurring data component that has a one-to-many correspondence to the first n data components. The presence of this additional data component, referred to as the series label component, indicates that the first n data components comprise distinct subsets. The label component should then preferably comprise distinct data values within each subset, whilst the sets of data across individual subsets must preferably be identical or substantially identical. If the above conditions are satisfied, then each subset of the value components makes up a single row of cells in the flat data table, and the series label component makes up the row heading column of the flat data table.

If another singly-occurring data component is present in the base table data structure, then it may act as a caption for the flat data table. On the other hand, if another multiply-occurring data component exists, then it generally cannot be accommodated in the flat data table. This is because the flat data table is already fully populated with all the data needed to generate its associated display types, with no further slots remaining. Since the aim of the presentation process is to select displays that are most appropriate for showing all or substantially all of the data that is present, the preferred option is to revert to either a table display type (using the base table data structure) or a tree display type rather than showing only part of the data.

Figure 47A:
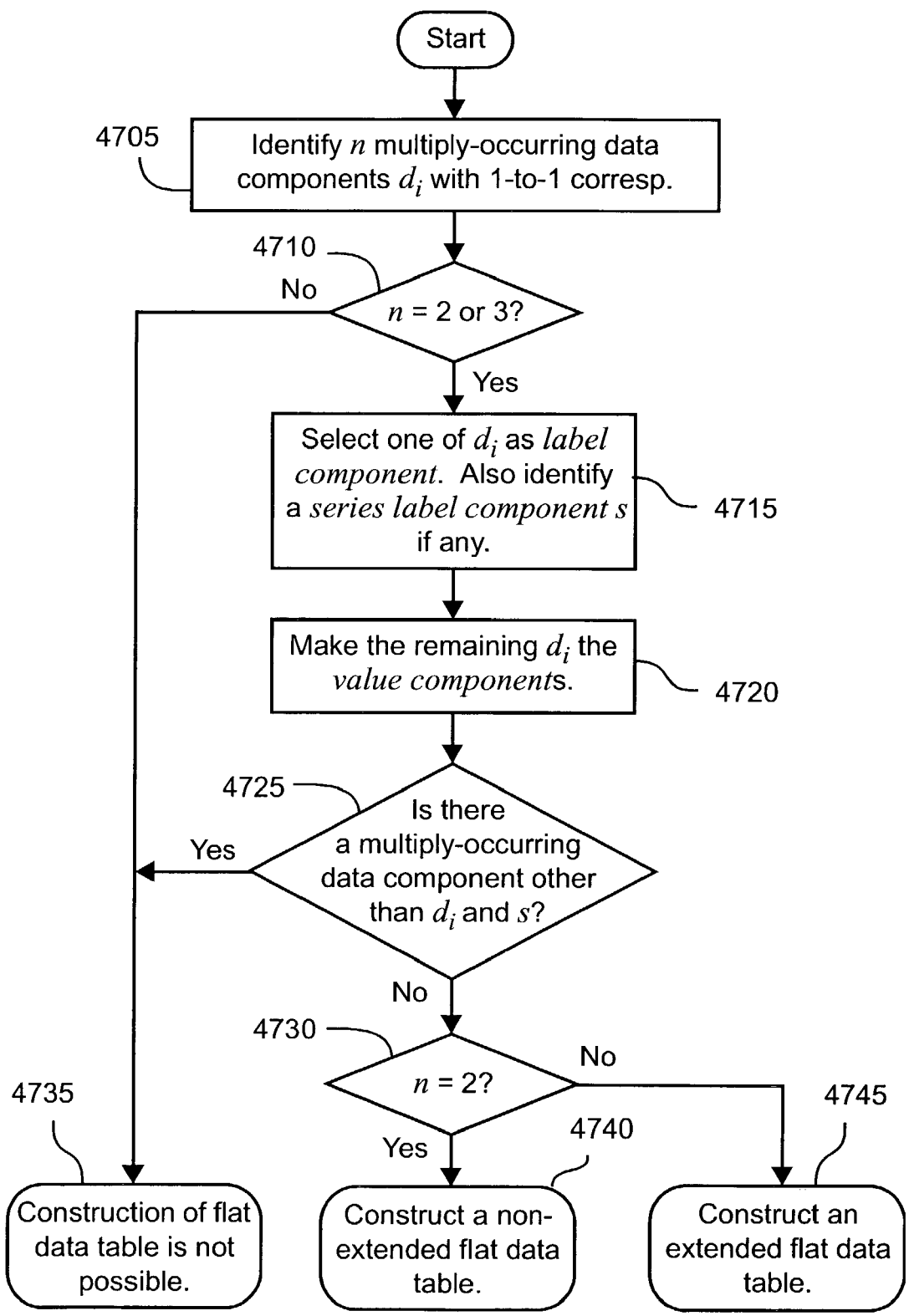
FIG. 47 is a flowchart of the flat data table construction procedure.
Figure 47B:
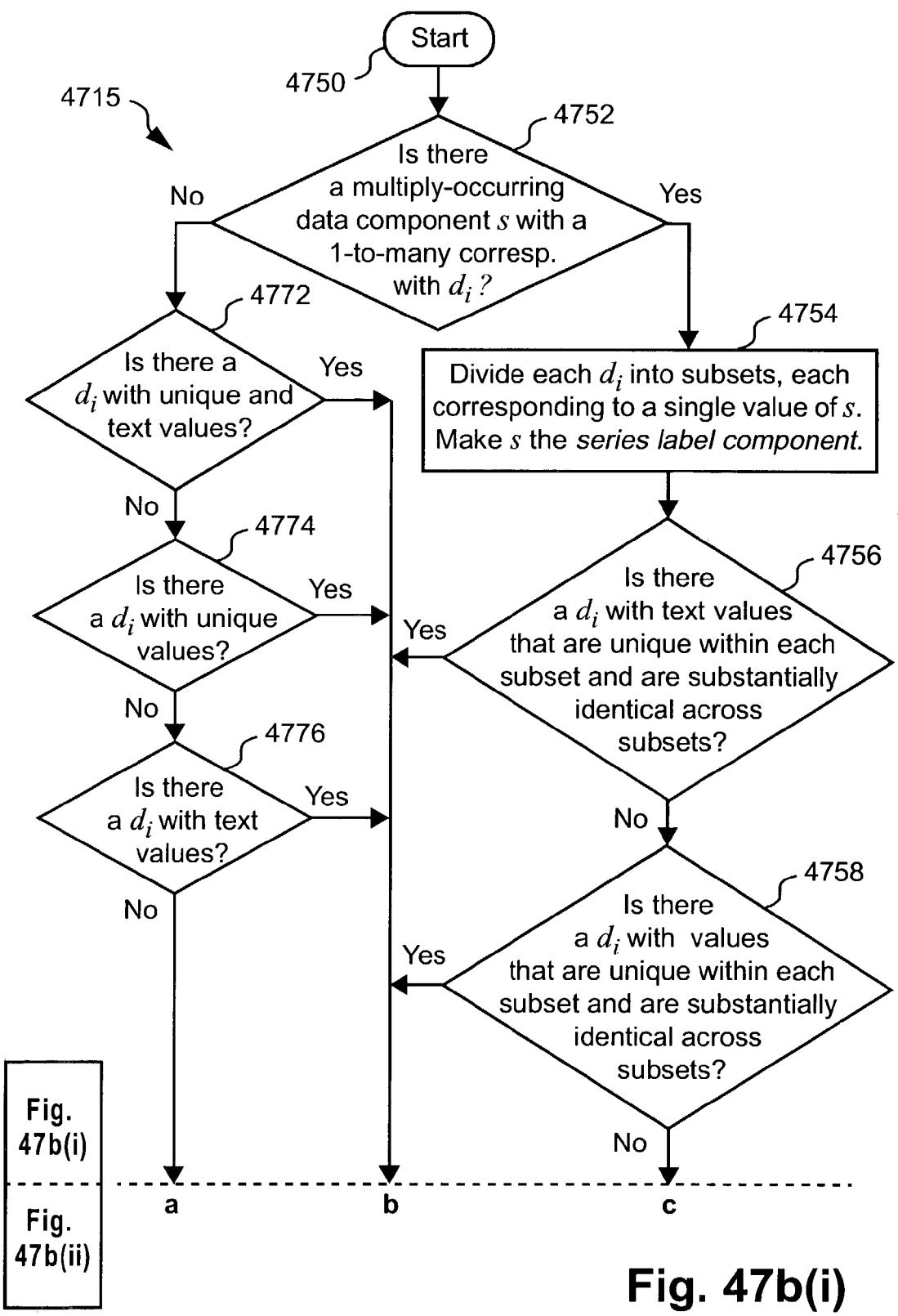

A flow chart of the procedure for constructing a flat data table is shown in FIG. 47A, with item 4715 in that figure being shown in detail in FIG. 47B. FIG. 47A depicts a method 4700 which is preferably performed as part of the data browsing application 120 and in which an initial step 4705 operates to identify n multiply-occurring data components $d_i$ each having a one-to-one correspondence with one another. Step 4710 then checks how many such data components exist and, if zero, one, or more than three, step 4735 follows and construction of a flat data table is not possible. If the number of data components is 2 or 3, then step 4715 follows where one of the data components $d_i$ is selected as a label component. Also, a series label component s, if such exist, is identified. In step 4720, which follows, the remaining data components $d_i$ are assigned as value components. Step 4725 then tests if there exists a multiply-occurring data component other than $d_i$ or s. Such a data component must not have a one-to-one correspondence with data components $d_i$, otherwise it would have been identified in step 4710 among these $d_i$. If so, then step 4735 operates to halt construction of a flat data table. If not, step 4730 follows to test if the number of data components is 2. If so, step 4740 follows and a non-extended flat data table is constructed. If not, step 4730 passes control to step 4745 where an extended flat data table is constructed.

FIG. 47B shows the detail of step 4715, which has an entry point 4750. Step 4752 performs a check of whether there is a multiply occurring data component s with a one-to-many correspondence with $d_i$. The procedure then effectively divides into two branches, one including steps 4754. 4768, and the other including steps 4772-4778.

Step 4754 divides each $d_i$ into subsets, each corresponding to a single value of s, and s is made the series label component. The remaining steps in this branch each perform a test for which a positive response (ie. yes) transfers control to step 4770, whereas a negative response (ie. no) transfers control to the next test in the branch and ultimately, step 4780. Step 4756 tests if there is a data component $d_i$ with text values that are unique within each subset and which are substantially identical across all subsets. Step 4758 tests if there is a data component $d_i$ with values that are unique within each subset and are substantially identical across all subsets. Step 4760 tests if there is a data component $d_i$ with values that are unique within each subset. Step 4756 is not redundant since step 4756 tests for 3 conditions that must be simultaneously true within the same data component $d_i$, whereas in step 4758 only 2 of these conditions need to be true, and in step 4760 only 1 of these conditions needs to be true. Effectively, this approach first looks for a data component $d_i$ satisfying all 3 conditions. If none exists then such is tried again but only testing for 2 of the 3 conditions, and so on. Step 4762 tests if there is a data component $d_i$ with values that are substantially identical across the subsets. Step 4764 test if there is a data component $d_i$ with text. Finally, step 4768 tests if there is a data component $d_i$ with monotonically increasing or decreasing numerical values within each subset.

In the branch of FIG. 47B including steps 4772-4778, a further series of tests are performed for each of which a positive (ie. yes) response transfers control to step 4770, and a negative (ie. no) response transfers control to the next step and ultimately step 4780. Step 4772 tests if there is a data component $d_i$ with unique values and text values. Step 4774 tests if there is a data component $d_i$ with unique values. Step 4776 tests if there is a data component $d_i$ with text values. Finally, step 4778 tests if there is a data component $d_i$ with monotonically increasing or decreasing numerical values.

If one of the above tests responds positively, step 4770 follows to select the left-most such data component $d_i$ satisfying the test as the label component. In contrast, step 4780 which occurs if all tests in each branch are negative, records that a label component does not exist. Step 4782 follows from steps 4780 and 4770 and returns program control to the source.

If the creation of the flat data table from FIGS. 47A and 47B is unsuccessful, then all graphical and xy plot display types are excluded from the list of possible display candidates for the elimination phase 3170. Only the tree and table display types are included in the list, with the latter being based on the base table data structure. If the procedure of FIG. 47A results in an extended flat data table, then the bar, line, and xy plot display types are included together with the table and tree display types in the list of possible display candidates. The preferred table display will use the base table data structure, and the bar and line graph display types will have 2 distinct y axes. For the xy plot display type, the two value components will play the roles of the x and y components, whilst the label component will assume the role of the point label component. If on the other hand the procedure of FIG. 47A results in a non-extended flat data table, then the pie graph display type is also included in the list, whilst the column-wise xy plot display type is excluded. The preferred table display will use the flat data table structure, and the bar and line graph display types will have only one y-axis. The xy plot display type will have no point label component, and the. label component and the sole value component will play the roles of the x and y components in the scatter plot respectively.

The 2D grid display type places a different requirement on the format of the base table data structure. There is no restriction on the number of data components present. However, all multiply-occurring data components must have a one-to-one correspondence relationship with one another. If the condition is satisfied, then the 2D grid display type is included in the list of possible display candidates for the elimination phase 3170, otherwise it is excluded. Clearly, this data pattern is.also suitable for the table display type which is based on the base table data structure. The preference rules (see Section 5.4) operate to order these display types appropriately.

When the data being displayed is small and/or can be quickly accessed, all the data is preferably examined in the analysis phase 3160. However, in a typical application environment where data may be obtained from multiple different data sources and accessible over slow network connections, it is preferable that the ordering of display types proceed without waiting for all data elements to be available, so that a display can be generated and presented to the user without noticeable delays. Consequently, when it is not possible to examine all the data within a short duration, only a limited subset is analysed before the analysis phase 3160 terminates. In the preferred arrangement, if a predetermined percentage subset of the data has been examined within a predetermined time period, then the data components identified and denoted by columns in the partially constructed base table data structure are assumed to represent all the data components present in the XML tree. The relationships between data components detected in the partial base table data structure at this point, whether they'd be one-to-one, one-to-many, or many-to-one, are also assumed to hold true in the unseen data.

With the above assumptions, the analysis of the base table data structure and the subsequent construction of the flat data table are performed as described earlier. As more data becomes available, tests are performed to determine if the assumptions are violated and if so, the display selection process terminates with a display list comprising of a single tree display type. The assumptions are violated if, for example, new and significant data components are detected in the newly seen data, or if multiple instances of a sub-element representing one data component are detected within a parent element representing a second data component when it had been assumed that there is a one-to-one correspondence between the two data components. Data components are typically considered to be significant if they are multiply-occurring data, or if there are a substantial number of singly-occurring data. On the other hand, if a predetermined subset has not been examined within the predetermined time period, then the remaining data is assumed not to follow similar patterns and the process terminates immediately with a display list comprising of a single tree display type. In an alternative arrangement, the last condition is omitted and the remaining data is assumed to follow similar patterns to the already examined data, regardless of the relative amount of data not yet examined.

In addition to the actual data, schema information describing the structure and nature of the data contents is often available. When working with XML data as described in the preferred arrangement, schema information is preferably expressed in the form of XML Schemas. An XML Schema document contains definitions for each of a collection of elements. Each definition specifies the allowable attributes, sub-elements and the cardinality and order of the sub-elements.

Schemas are a useful source of information in the construction of the base table data structure and also the flat data table, since they often allow the presence of data components and their inter-relationships to be deduced without the need to examine actual data. They are especially useful when the data to be analysed is large and contains many repeated elements, since these repeated elements are described by a single schema element and hence a quick examination of the latter is usually sufficient to deduce their contents.

Occasionally, a schema may not contain sufficient information and an inspection of the actual data is necessary. For example, if the schema indicates that a certain data element or attribute is optional, then the actual data needs to be examined to determine whether the element or attribute is present. Also a schema definition may allow an element to have any elements as part of its content. In such cases schemas are still useful because they can help to pin point which parts of the data need to be examined.

Apart from structural information, schemas may also contain information on the type of data stored in each data element. A schema can be used, for example, to determine whether each data element is numerical or not, and if so, obtain its associated unit (if any). For XML data, the data type associated with each attribute or text value of an element is specified in the schema definition of the element.

To facilitate their use in the elimination phase 3170, in addition to the actual data, the flat data table constructed in the analysis phase 3160 also stores schema information on data types for items whose actual data are not yet available. Where the schema definition for a data component is not available or its data type can not be determined, a generic text string data type is assumed and stored in the table. This indicates that nothing is known about the item, and hence an examination of the actual data is needed to determine its data type.

Figure 48:
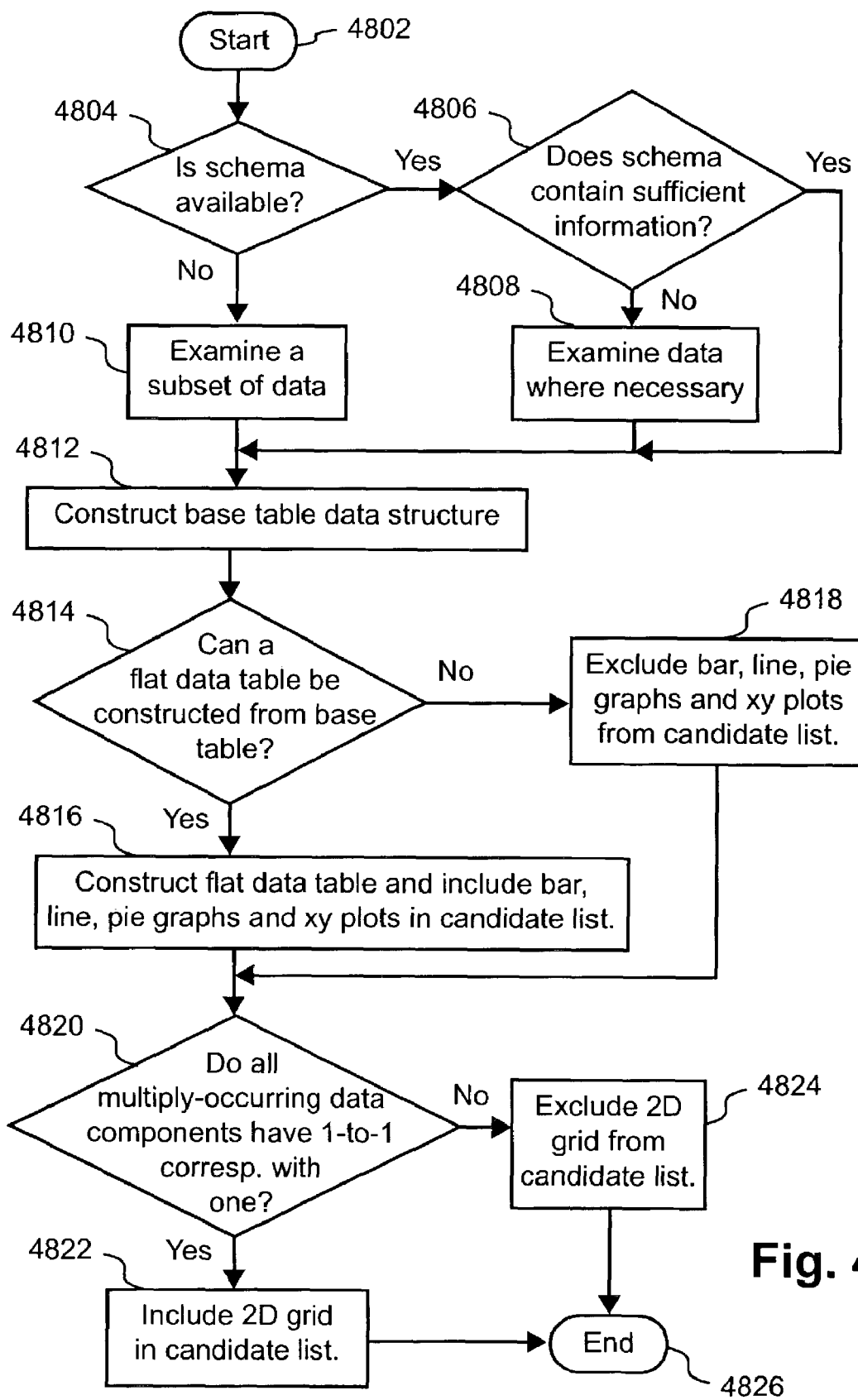
FIG. 48 is a flowchart of the analysis phase of the data view presentation process.

A flowchart of the analysis phase 3160, incorporating both schema and data analysis is given in FIG. 48. The method of FIG. 48 commences with a program entry point 4802 followed by step 4804 which determines if a schema is available. If so, step 4806 examines the schema to determine if it contains sufficient information to identify all data components that are present in the XML data. If not, step 4808 follows to examine the data where necessary. As mentioned earlier, if an element or attribute is declared as optional in the schema for example, then there is insufficient information to determine whether that element or attribute is actually present in the data, and hence an examination of its expected location in the data is necessary. Where step 4804 finds no schema available, step 4810 follows to examine a subset of data. The subset of data selected for examination is typically either determined randomly or on a first-come-first served basis. Its size is governed by the amount of data that can be processed within some pre-determined time duration.

Each of steps 4810, 4806 and 4808 returns control to step 4812 where a base table data structure is constructed. Step 4814 follows to assess if a flat data table can be constructed form the base table. If so, step 4816 follows to construct a flat data table which includes.bar, line, pie graphs and xy plots in the list of display candidates. If not, step 4818 follows which excludes bar, line, pie graphs and xy plots from the candidate list. Step 4820 follows each of steps 4816 and 4818. Step 4820 tests if all multiply-occurring data components have a one-to-one correspondence with one another. If so, step 4822 follows and a 2-dimensional grid is included in the candidate, list. If not, step 4824 is performed where a 2-dimensional grid is excluded from the candidate list. The method 3160 then ends at step 4826.

5.3 Elimination Phase

A key factor in determining whether a graphical presentation such as a graph or xy plot is possible is the type of data being displayed, in particular, whether they contain numerical values and if so, their associated units of measurement, such as length, temperature or currency. Only numerical data with compatible units can be shown as graphs or plots. Others can only be shown as tables or trees. In the remaining of the present document, the term "numerical data" will be used to denote a data item comprising of a numerical value, or a numerical value with an associated unit.

The elimination phase 3170 applies criteria such as these in order to eliminate non-appropriate display types. To achieve a modular design, the criteria are preferably expressed in the form of elimination rules in the present arrangement. Each elimination rule is independent of every other rule and hence can be modified, added or removed without affecting other rules. Because the elimination phase 3170 is concerned with the elimination of various graphical display types, the processing is based on the flat data table. This table is obtained using a set of pointers into the base table data structure (ie. the data is not duplicated).

Each elimination rule has associated with it a set of display types that are eliminated from the list of all possible candidates once certain conditions or tests are satisfied. The evaluation of each rule can return one of three possible values:
 (i) the tests succeed, in which case display types can be eliminated;
 (ii) the tests fail, in which case the display types are not eliminated (they may still be eliminated due to other elimination rules); or
 (iii) there is insufficient information to determine the outcome of the tests, in which case the rule must be executed again when new data become available.

In the first two cases, the rule is said to have processed successfully and need not be processed again. An additional test is performed prior to the processing of a rule. A check is made to determine whether at least one of a set of display types associated with a rule is among the remaining candidates. If so then the rule is processed, otherwise it is irrelevant and is hence deleted.

The use of three possible return values from each elimination rule allows the data browsing application 120 to operate without the need for all data to be present. Each time a new data item or items become available, the set of elimination rules are processed, possibly resulting in certain display types being eliminated from consideration. When all but the tree display type have been eliminated (recall that the tree display type is always possible), or when all rules have either been successfully processed or deleted, no further data need to be examined.

To facilitate the evaluation of rules, the base table data structure (and thus its derived flat data table) is updated as more and more data become available. When processed, an elimination rule operates on the contents of the partial flat data table current at the time of firing. The preferred list of elimination rules is given in Table 3. Fewer or additional rules may also be used. The column "Candidates for elimination" in Table 3 identifies display types that are eliminated if the condition under the corresponding "Condition" column is true. Here, the term "graphs" refer collectively to bar, line and pie graphs.

of non-numerical data items, if the schema information associated with an unseen item indicates that it has a non-numerical data type, then the test succeeds immediately without waiting for the item to become available. Alternatively, if the scheinas associated with all unseen data items indicate that they are all of numerical data types, then the test fails, again without waiting for any of these items to become available.

As has already been mentioned, when data is accessible over slow network connections, it is preferable that the ordering of display types proceed without waiting for all data to be available. Whilst the use of schema information can help in alleviating the need to examine all data, it may not always be available or sufficiently effective. Consequently, the time allocated for the elimination phase 3170 is typically limited to a short duration. If this duration lapses and the elimination phase 3170 has not been completed, it is terminated prematurely, and the list of candidates remaining at the time is taken as the list of possible display candidates to be used in the next preference phase.

Figure 49:
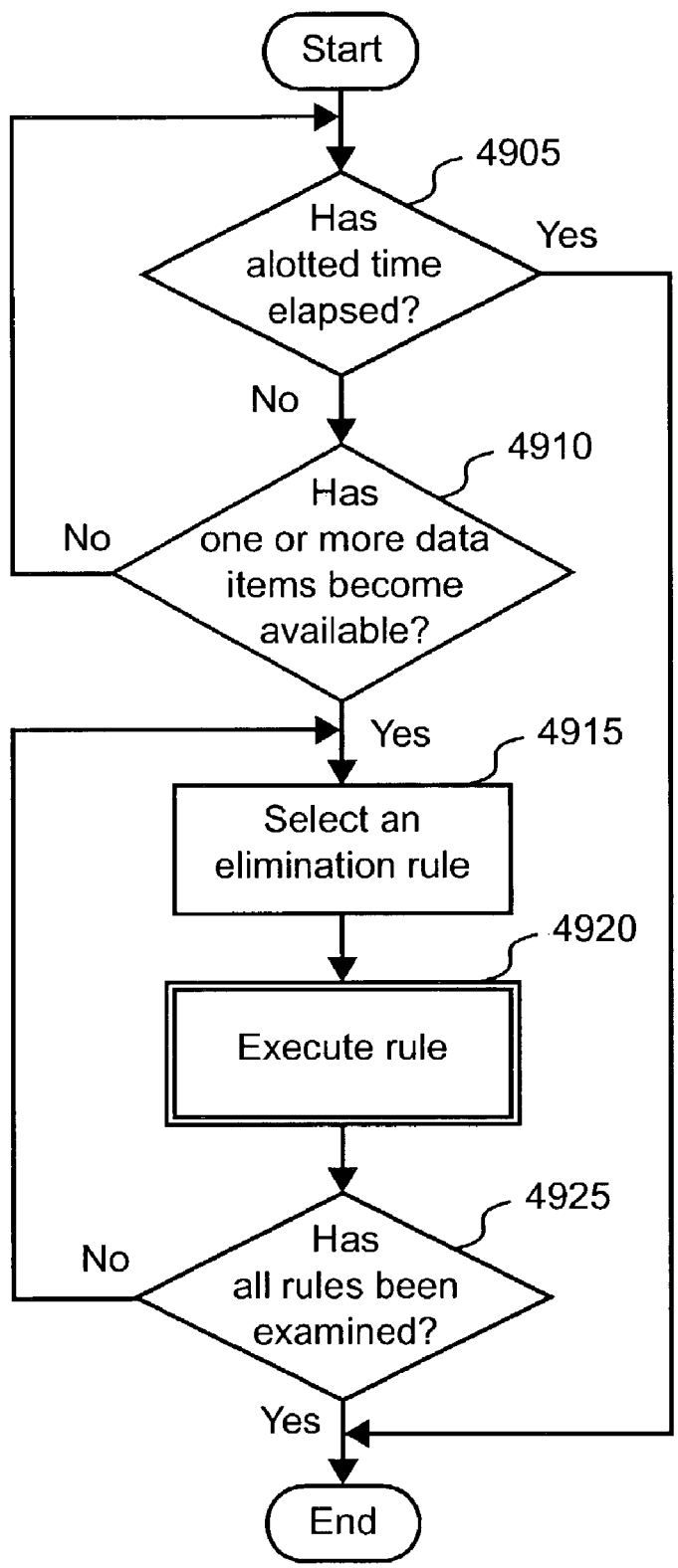
FIG. 49 is a flow chart of the elimination phase of the data view presentation process.

A flow-chart of the elimination phase 3170 is given in FIG. 49. After an initial entry point 4902, step 4905, operates a timer for the elimination phase. If the allotted time has elapsed, control passes to step 4930 where the elimination phase 3170 ends. If not, step 4910 detects whether or not one or more data items have become available. If not, control returns to check the timer at step 4905. If so, step 4915 follows which selects an elimination rule. Once a rule is selected, step 4920 follows to execute the selected rule, this being shown in

TABLE 3

Elimination rules.

| Rule | Candidates for elimination | Condition | Comments |
|---|---|---|---|
| 1 | all graphs and xy plots | One or more values of a data component are non-numerical, or do not contain compatible units. | |
| 2 | column-wise graphs and column-wise xy plot | Flat data table contains only a single row of data cells. | A data series must have more than 1 data point. |
| 3 | row-wise xy plot | Flat data table is in non-"extended" format and all column headers do not have numerical values with compatible associated units. | The column headers constitute the x-coordinate values and hence must have compatible units. |
| 4 | row-wise graphs | Values of the label component correspond to each value of the series label component are not unique. | Data series in a graph can have at most 1 y-value corresponding to each x-axis label. |
| 5 | column-wise graphs | Values of the series label component are not unique. | Data series in a graph can have at most 1 y-value corresponding to each x-axis label. |
| 6 | bar graphs | The number of cells in the flat data table is too large. | This is the number of bars in the graph. |
| 7 | row-wise pie graph | The number of columns in the flat data table is too large. | This is the number of segments in a pie chart. |
| 8 | column-wise pie graph | The number of rows in the flat data table is too large. | This is the number of segments in a pie chart. |

As in the analysis phase 3160, schema information, if available, can be used to reduce the amount of actual data that needs to be examined. Recall that the flat data table constructed in the analysis phase 3160 also contains information on the data types of unseen data items. This information is used in the execution of each elimination rule, in addition to the actual data already present in the data table. For example, when executing Rule 1 in Table 3 which tests for the presence detail in FIG. 50. Step 4925 follows which tests if all elimination rules have been processed and if so, the elimination phase ends at step 4930. If not, control returns to step 4915 to select a yet unprocessed rule.

Figure 50:
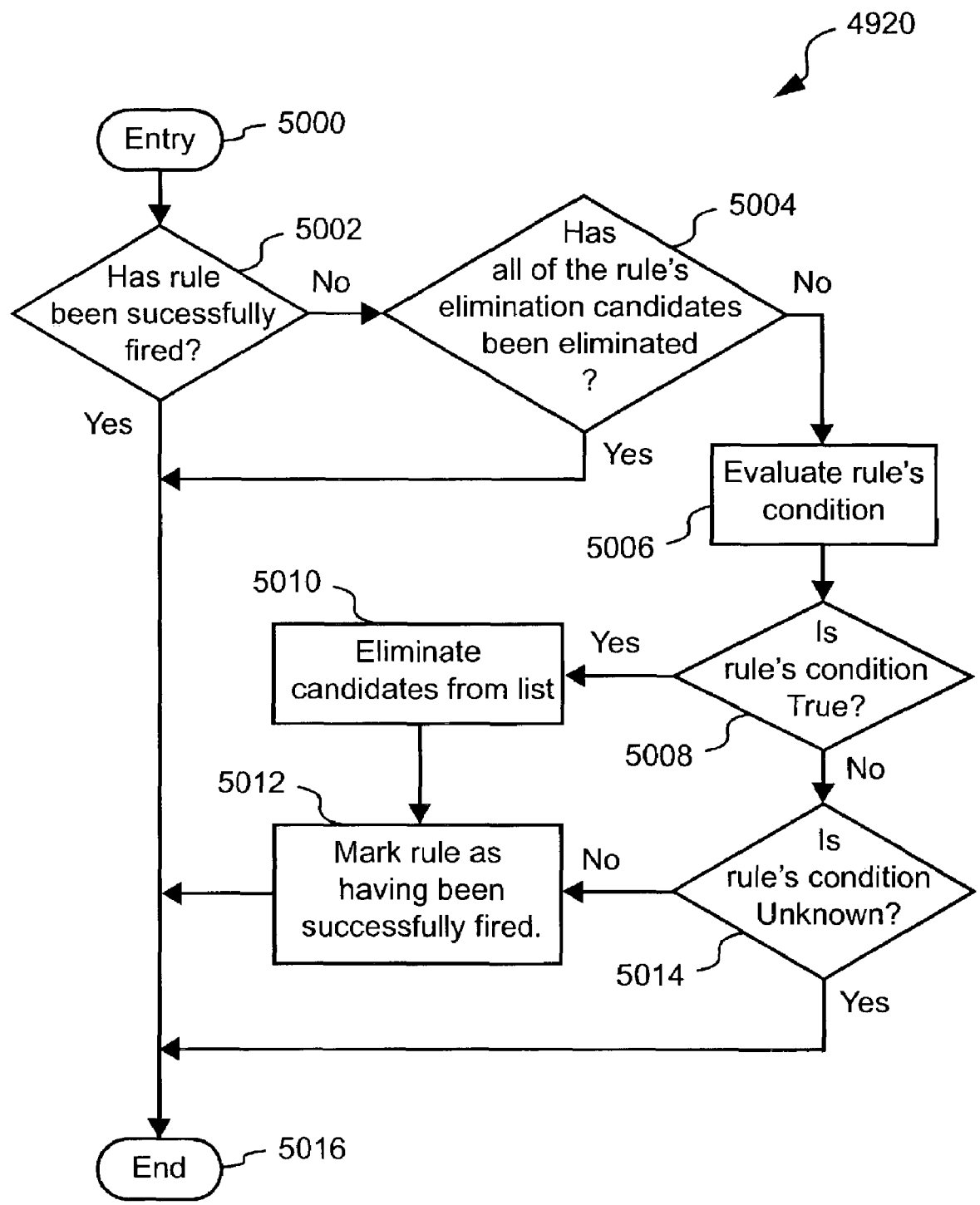
FIG. 50 is a flowchart of item 4920 of FIG. 49.

The process depicted by step 4920 is shown in detail in FIG. 50 which has an entry point 5000. Step 5002 follows which tests if the rule has been successfully processed. If so, the process 4920 concludes at step 5016. If not, step 5004 follows to determine if the selected rule's elimination candidates have been removed. Again, if so, the process 4920 concludes at step 5016. If not, step 5006 operates to evaluate the selected rule's condition. Step 5008 follows to test if the rule's condition is true. If so, step 5010 then removes the rule's elimination candidates from the list of display candidates. If not, step 5014 tests if the rule's condition is unknown. If so, the process 4920 concludes at step 5016. If not, step 5012, which also follows step 5010, is implemented there is no preferred choice among the pair. Restricting the scope of each rule to just a pair of candidates in this way lead to simpler rules since considerations need not be given to other candidates. A list of preference rules is given in Table 4. The column "A preferred over B" gives the condition that must be true for display type A to be preferred over display type B, and similarly for the column "B preferred over A". Fewer or additional rules are also possible. Rule 3 states that any other display type is preferred over the tree type.

TABLE 4

Preference rules.

| Rule | Display types (A v. B) | A preferred over B | B preferred over A |
|---|---|---|---|
| 1 | bar v. line | x-axis labels represent non-continuous quantities or have non-regular intervals (eg. geographical regions, departmental names). | x-axis labels represent continuous quantities and have regular intervals (eg. year, month). |
| 2 | row-wise table/bar/line graph v. column-wise table/bar/line graph | Flat data table has fewer rows than columns and the number of columns is not too large. | Flat data table has fewer columns than rows and the number of rows is not too large. |
| 3 | tree v. other | False | True |
| 4 | row-wise pie v. bar/line | Flat data table has 1 row. | False |
| 5 | col-wise pie v. bar/line | Flat data table has 1 column. | False |
| 6 | 2D grid v. table/bar/line/ pie/xy plot | One or data component has pictorial contents. | No data component has pictorial contents. |
| 7 | table v. others except tree | False | True | which marks the rule as having been successfully processed. The process 4920 then concludes at step 5016.

5.4 Preference Phase

At the completion of the elimination phase 3170, it is possible that more than one display type remain in the list of possible display types. If this is the case then a third phase, the preference phase 3180, begins to rank the remaining candidates in descending order of preferences. At the completion of this phase 3180, the top candidate in the ordered list is presented to the user. The remaining ordered list of candidates is also presented to the user, giving the user the option of selecting alternative display types the data.

The criteria used for ranking the list of display candidates are preferably expressed as a set of preference rules. As in the elimination phase 3170, the preference rules are modular in nature and hence can be modified or deleted without affecting the behaviour of other rules. Likewise, new rules can be added to the system without a need for modifying existing rules. In contrast, existing approaches for selecting among display types employ fixed, pre-determined sequences of tests that are not readily modifiable.

In the present arrangement, a preference rule compares a pair of display candidates and produces one of three possible outcomes: (i) the first candidate is preferred over the second candidate, (ii) the second is preferred over the first, or (iii)

A difficulty with using a modular set of preference rules as described above is that it can lead to conflicting results. This can occur in a couple of ways. Firstly, rules comparing the same pair of candidates may produce different outcomes. Secondly, rules comparing different pairs of candidates, when considered together, may lead to ambiguous preference relations. As an example of the latter, consider the case where there are three display candidates a, b and c. Suppose that one preference rule prefers a over b, another prefers b over c, and yet a third rule prefers c over a. In this scenario, the preference relations among the candidates a, b and c are ambiguous.

The first problem is avoided by employing at most one preference rule for each distinct pair of display candidates. The second problem on the other hand, can not be avoided without placing carefully crafted inter-rule constraints and dependencies, which would destroy the desirable modular nature of the system. The preferred approach is to incorporate some means for resolving the ambiguities. For simplicity reasons, rather than employing elaborate conflict resolution methods, the described arrangement addresses the problem by simply ignoring those preference relations that are ambiguous, and generates an arbitrary ordering among the display candidates that correspond with those results.

The presence of such ambiguities is detected by representing the display candidates and their preference relations as a directed graph. Each node in the graph is a display candidate, and the directed links between nodes represent the outcomes of the preference rules. In particular, if a rule prefers a first display candidate over a second display candidate then a link is created originating from the node corresponding to the first display candidate and terminating at the node denoting the second candidate. When no rule exists for a pair of candidates or when a rule exists but produces no preference between the pair, no direct link is created between the corresponding nodes in the directed graph.

Figure 51:
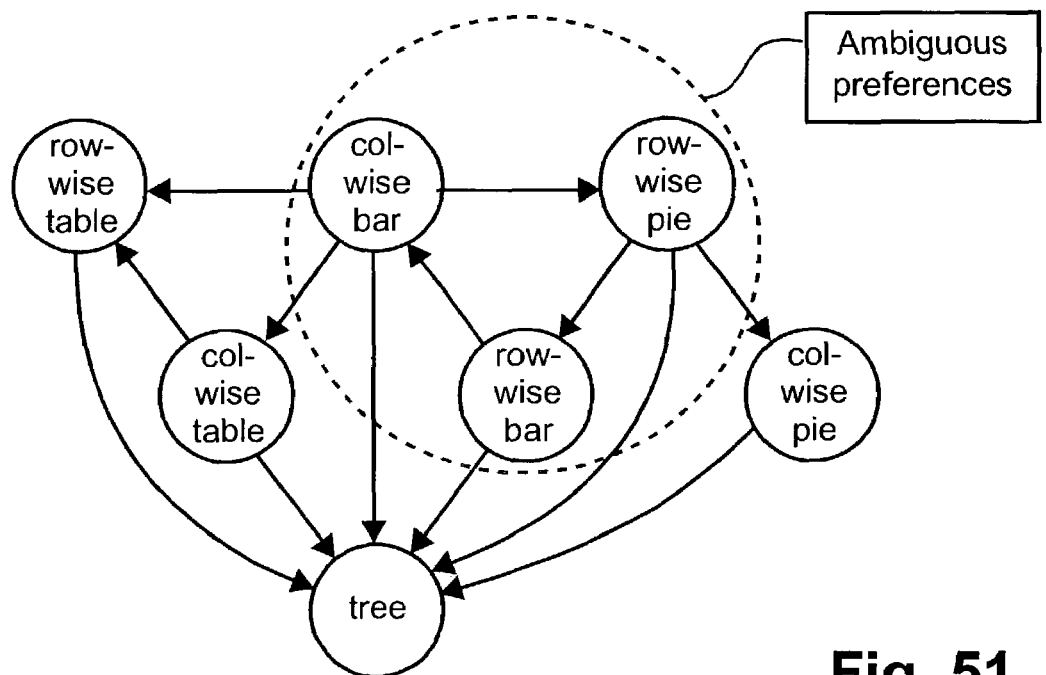
FIG. 51 is an example of a directed graph with ambiguous preference relations used in the presentation process.

With the above directed graph representation, ambiguous preference relations give rise to directed cycles. An example of a directed graph representation of display types with ambiguous preference relations is shown in FIG. 51. The ambiguity is evidently depicted by the directed cyclic paths between the display types "column-wise bar graph", "row-wise pie graph", and "row-wise bar graph".

Figure 52:
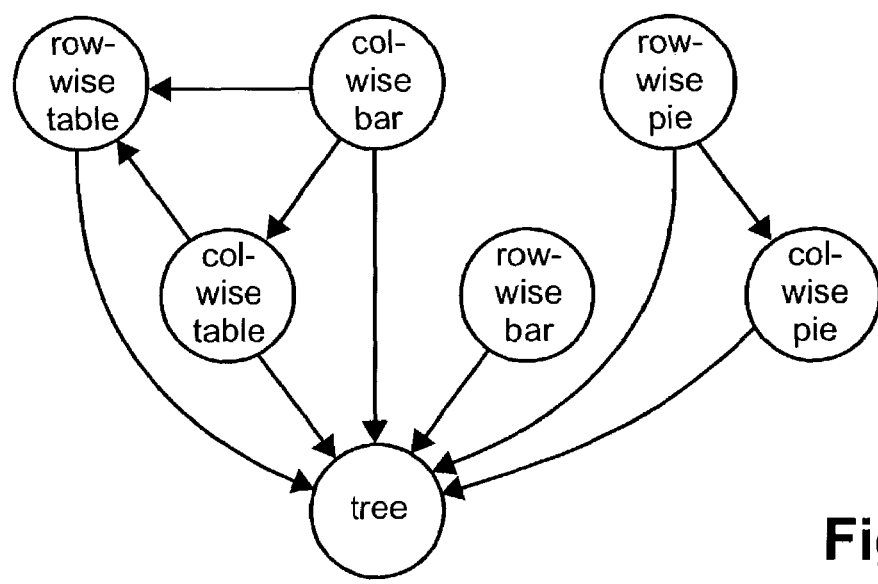
FIG. 52 is a directed graph obtained after ambiguous preference relations are removed from FIG. 51.

Directed cycles in directed graphs can be detected by identifying "strongly-connected components" using well-established algorithms, such as those described in "*Algorithms*", R. Sedgewick, $2^{nd}$ Ed., Addison-Wesley 1989. A strongly-connected component is a set of nodes in which there exists a directed path from each node to every other node in the set. Once such a component is found, the ambiguities are removed by deleting links between every pair of nodes in the set. FIG. 52 shows the result of deleting ambiguous preference links from the graph of FIG. 51.

The above directed graph representation also allows the ordering of all display candidates to be easily obtained using well-established "topological sorting" algorithms, described in the text referred to above. These algorithms produce an ordering of the nodes in such a way that if there exists an undeleted link originating from a first node to a second node, then the first node will appear before the second node in the ordered list. An example of such an ordering obtained for the graph of FIG. 52 is {col-wise bar, col-wise table, row-wise table, row-wise bar, row-wise pie, col-wise pie, tree}, in order of descending preference.

Figure 53:
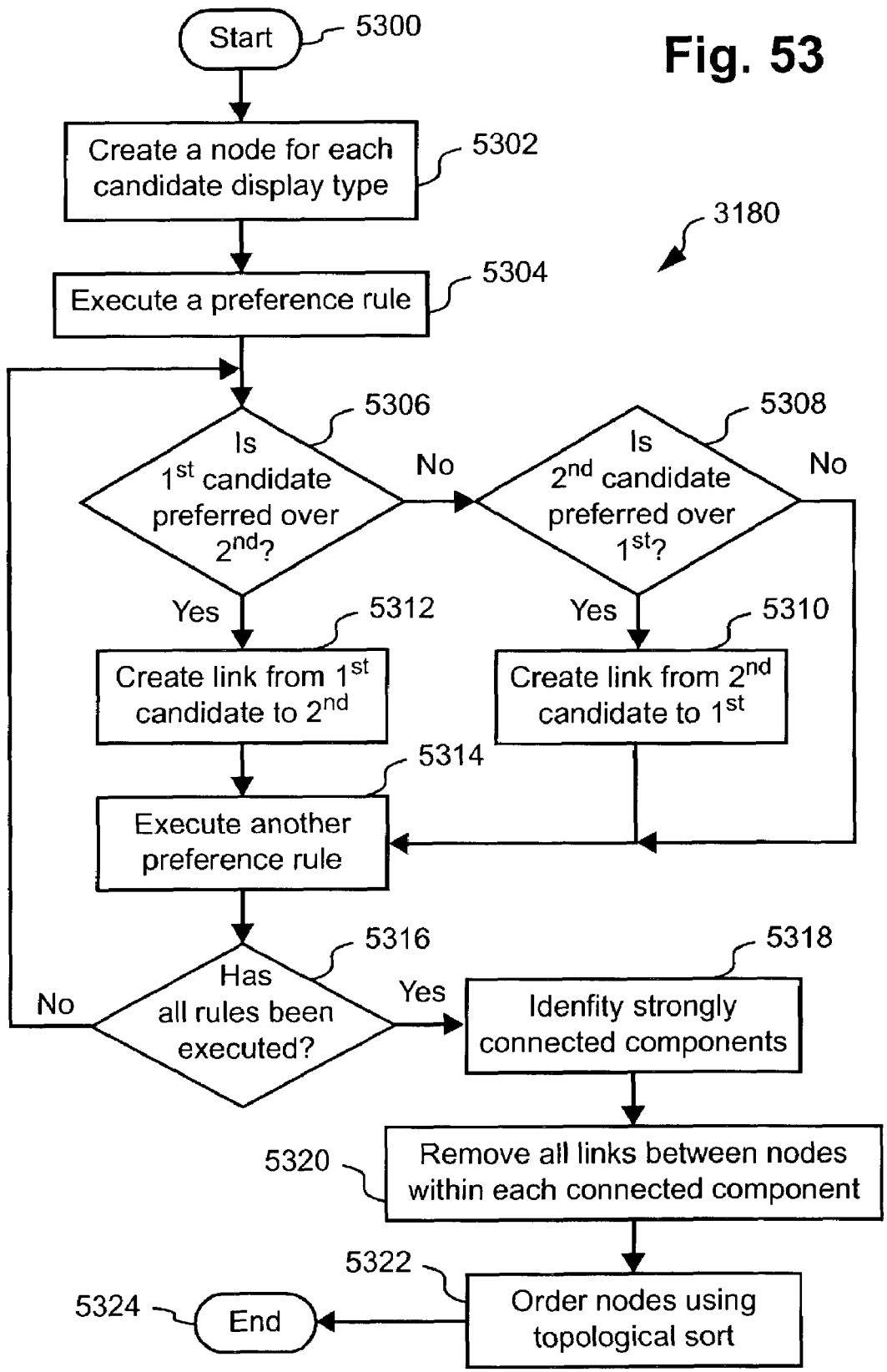
FIG. 53 is a flowchart of the preference phase of the data view presentation process.

A flowchart of the preference phase 3180 is given in FIG. 53. After an entry point 5300, step 5302 creates a node for each candidate of the desired display type. Step 5304 then executes a preference rule. Step 5306 initially tests whether a $1^{st}$ candidate is preferred over a $2^{nd}$ candidate. If so, step 5312 then creates a link from the $1^{st}$ to the $2^{nd}$ candidate. If not, step 5308 tests if the $2^{nd}$ candidate is preferred over the $1^{st}$ candidate. If so, step 5310 then creates a link from the $2^{nd}$ to the Ist candidate. If not, indicating there is no preference relationship between the $1^{st}$ and $2^{nd}$ candidates, step 5314, which also follows steps 5312 and 5310, executes another preference rule.

Step 5316 checks to see if all preference rules have been executed. If not control is returned to step 5306. If so, step 5318 follows and operates to identify strongly connected components, using well-established algorithms such as those described in "*Algorithms*", R. Sedgewick, $2^{nd}$ Ed., Addison-Wesley 1989. Step 5320 then removes all links between candidates within each connected component, and step 5322 orders the candidates, preferably using a topological sorting procedure. The preference phase 3180 then concludes at step 5324.

Preferably the preference rules can adapt to user preferences using feedback from the GUI. For example, a particular user may dislike tables with many columns and repeatedly transpose such tables. The preference rules could therefore modify their optimal number of columns for the table (see Rule 2 in Table 4).

6.0 Creating New Data Views

Section 2.0 describes how new data views can be created using a schema view. In this mode, a user may simply select the data sources that were required for the data view, and the data browsing application 120 can then generate a schema view which incorporates all the mappings which are relevant to the selected data sources. A GUI can then be provided (eg. FIGS. 7A-7C) which allows the user to select the data components required for the new data view, specify the data components which represent essentially the same information in different data sources, and specify any constraints that would control what data appears in the data view (eg. where Salary>$100,000 and Age<40). In addition, the user must specify how data components in different sources, which represent the same information, can effectively join data sources.

The term "join" is used by existing relational database management systems (RDBMSs) to effectively combine or join information from more than one table. Usually such ajoin.requires the expression of a congruence condition. For example, the following simple SQL statement effects a join between tables t1 and t2 based on the congruence condition, t1.id=t2.id:

select*from t1,t2 where t1.id=t2.id

The generator of this SQL expression must have had prior knowledge that the id columns of tables t1 and t2 had the same data. Similar congruence conditions can also exist between data components of different data sources and be used to create data views across the different data sources.

Now described is a preferred graphical method for creating new data views from existing data views. This method allows users to integrate the processes of creating a new data view and creating required,mappings in a single graphical process, which is data-driven rather than schema-driven as described in Section 2.0 In this mode, it is not necessary for the data browsing application 120 to generate a schema view and thus the user does not need to understand the existence of a schema for data sources. Also because the user works with actual data, problems that may be associated with correctly understanding what the names of data components mean, are reduced. Furthermore, the existing data views can bring implicit knowledge about joins between data sources of which the user may not be aware. Indeed, the user can create new data views using this method without even being aware of join, or congruence relationships, that others may have established.

In this method, the user works in the GUI environment 1200 displayed by the data browsing application 120 upon the video display 1114 as depicted in FIG. 12A and substantially as described in Section 5.0. The GUI 1200 allows the user to modify the data views displayed in the workspace 1202. For example, the user can modify presentation properties (eg. fonts, styles, colours, etc.), apply filters, change the sort order, hide or rename data components, specify and apply transformations/combinations that may apply to one or more data components, etc.

In the preferred arrangement, each data view is associated with an XQuery expression. XQuery (see http://www.w3.org/XML/Query), or XML Query, is a query language which can be used to express queries across various forms of data, whether physically stored in XML or viewed as XML via middleware. XQuery Version 1.0 is an extension of XPath Version 2.0. Any expression that is syntactically valid and executes successfully in both XPath 2.0 and XQuery 1.0 will return the same result in both languages. A module that executes XQuery expressions is called an XQuery processor. XQuery is the preferred query language because of its ability to address relational and hierarchical data sources. Clearly, other query languages with similar capabilities could also be used.

The basic building block of XQuery is the expression. Path (XPath) expressions are used to locate nodes within a tree whereas flwor expressions are used for iteration and for binding variables to intermediate results. The latter kind of expression is often useful for representing joins between two or more data sources and for restructuring data. The name flwor, stands for the keywords for, let, where, order by and return, the five clauses found in a flwor expression. Other expressions, which represent sequences and logical combinations of these basic expressions, are also permitted.

The method of creating new data views using existing query data will now be described with reference to FIG. 54. This method is described with respect to data components, however it should be clear that data components also represent data nodes, data sets and data series as defined in Section 2.0. The term data component is used as a generalisation of these terms.

Figure 54:
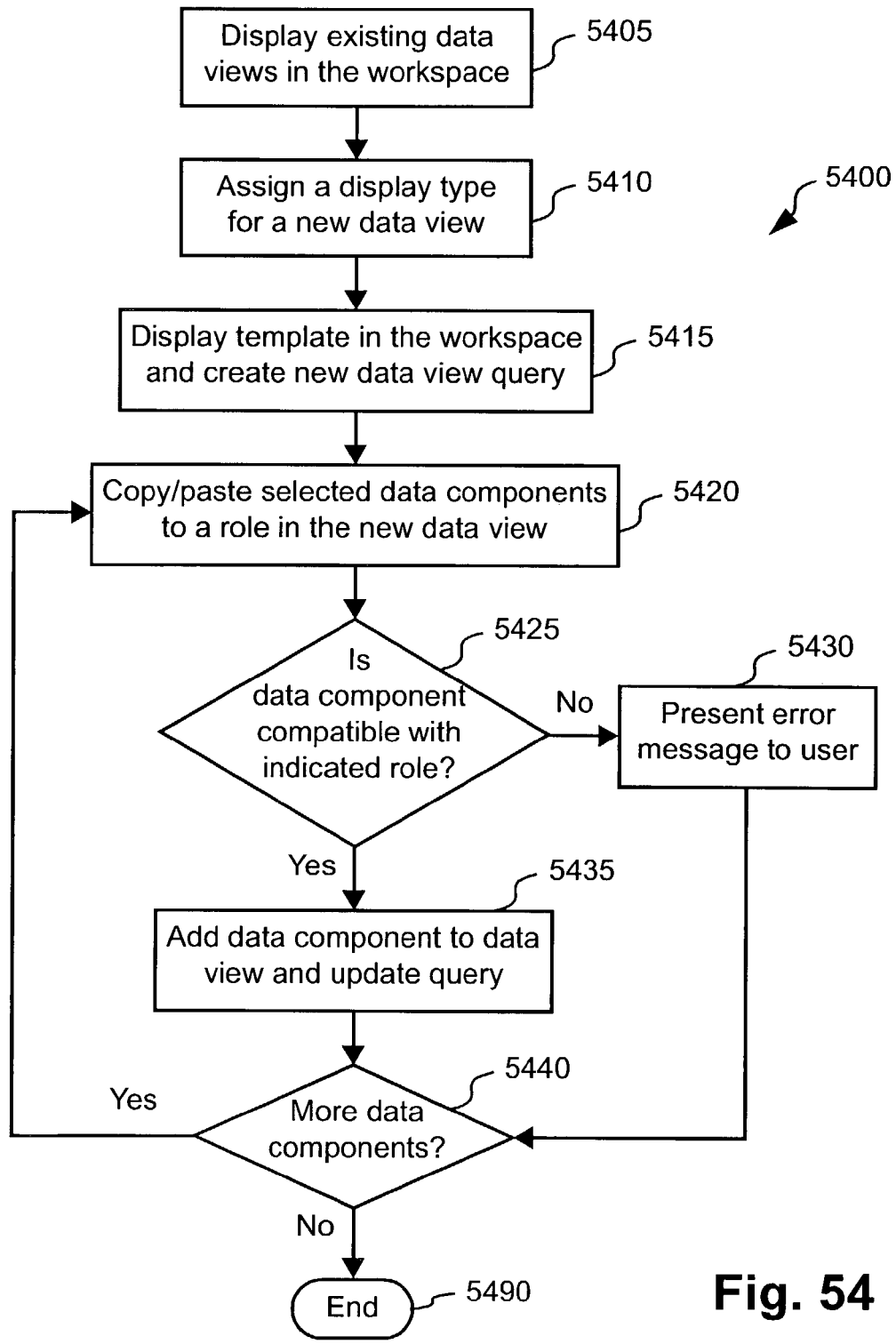
FIG. 54 is a flowchart of the process of creating new data views using existing query data.

FIG. 54 shows a method 5400 which is preferably implemented as a module of the data browsing application 120. The method 5400 commences at step 5405 where existing data views are displayed in the workspace 1202. This step permits the user to select one or more required existing data views. These data views may arise from selection of data sources or previously created data view definitions via the datamarks panel 1205 of FIG. 12A as described in Section 5.0. The selected data views may utilise any of the implemented display types as described in Section 5.0.

The user then indicates that he/she wants to create a new data view in the workspace 1202. In the preferred arrangement the user can do this in one of two ways. First, the user can select the New Data View option from the contextual menu 1292 for the workspace 1202. The contextual menu 1292 may be displayed by right clicking the mouse 1103 somewhere in the whitespace of the workspace 1202, as depicted in phantom in FIG. 12A. The data browsing application 120 then, according to step 5410, presents the user with a list of possible display types for the new data view and the user can select a preferred display type from this list. So, for example, two existing data views may be presented in the workspace 1202 using a table and a bar chart display type, respectively. The user may select to create a new data view with a display type of a line graph. This action results in the default template for the selected display type being displayed in the workspace 1202 as the new data view in step 5415. The initial size and position of this data view are assigned as described in Section 5.0. The data browsing application 120 also initialises the XQuery expression associated with the new data view.

In the second way, the user can select one or more data components from the one or more existing displayed data views and copy or drag the data components to an un-used location in the workspace 1202. On dropping or pasting the data components, a new data view is created at the drop or paste location. This data view has a display type that is consistent with the display type(s) of the existing data component(s). For example, if a data component were dragged to the workspace 1202 in such a way that it acted as the x-axis of a line-graph in the existing data view, then the new data view would be a line graph. The created data view would be displayed using the default template for a line graph with the dragged component acting as the x-axis.

If, however, two data components had been copied and pasted to a location in the workspace 1202, one from a line graph and one from a table, the new display type is that having the least constraints (ie. table). If more than one data component is used to initialise a data view, then the checks performed in step 5425 (and described below) are also performed before the new data view is created in the workspace.

Following from step 5415, in step 5420 the user can select to copy one or more data components from the existing one or more data views in the workspace 1202 to act with a specified role in the new data view. The role is indicated by the selected target position of the paste or drop in the new data view. For example, if the user pastes a copied data set onto the x-axis of a line-graph then it is assumed that the user wishes that data set to act as the x-axis for the graph. Similarly, if the user pastes a data set onto a particular column of a table, then it is assumed that the data set should replace that column of the table (ie. it should assume the role of that particular column of a table). Preferably menu options also provide the user with the options of inserting before and after the selected table column(s).

If more than one data component has been copied, then the indicated role in the new data view must be able to support more than one data component. For example, in the preferred arrangement, graph (line or bar) templates support more than one y-axis data set but only a single x-axis data set. Alternative arrangements could permit multiple x axes and thus have templates which support this feature. Similarly, a table can support multiple columns, whereas a pie chart template may support one or more individual pies (each visualising a single data series). In other words, the possible roles for a new data view depend on the template used to create the data view. If the indicated role in the new data view does not support multiple data components, then an error is generated in 5430 as described below.

The copy can be done in one of two ways. First the user can copy (or cut) the data component from its existing data view and then paste it in the new data view. Second the user can select a data component and drag it into the new data view. Preferably a shadow of the dragged column is shown during the drag. The role of the copied data can be indicated by a data component drop target (eg. such as an x-axis of a graph) or separator drop target (eg. border between two columns). In the latter case the dragged data component is inserted at the border. Drag operations between data views result in the dragged data component being copied. Drag operations within a data view are also allowed but in these cases the dragged data component is moved from its original place to the target place.

Before a data component is added to the data view a check is performed in step 5425 to ascertain whether the data component is compatible with its indicated role in the new data view. In other words, the data manipulation indicated by the user must be consistent with the semantics of the display type. These are described in Sections 5.0 and 8.0. This means, that if a user dragged a data set to a table data view, and this data set was not able to be joined to other data sets already in the table, the drag would be disallowed. This is because a table typically only makes sense if the data of a row of a table relates to a single entity. An error message would be presented to the user in step 5430 to describe the reason for not allowing the attempted drag and the process would continue at step 5440. Similarly, an attempt to drag a non-numeric data set to act as a "y-axis" of a bar chart would also be disallowed.

The data browsing application 120 can ascertain whether attempted data manipulations are allowable by examining both the queries associated with the existing data views and the data specifications associated with the manipulated data components. The data specifications are formed as part of the display type decision process described in Section 5.0 and provide the means to connect manipulated data with their corresponding specifications in queries. The existing data views effectively act as sources of data for the new data view. The data browsing application 120 can also make use of its own stored knowledge of known congruences (oins). It persistently maintains such knowledge.

If it was ascertained in step 5425 that the attempted data manipulation was allowable, then the data component is added to the displayed new data view in step 5435. Also the XQuery associated with the new data view is updated. This means that the user can select to save a data view at any time as its associated query will always be consistent with the displayed data. If further data components are to be copied to the new data view in check box 5440 then the process returns to step 5420.

The process of FIG. 54 will now be described in detail with respect to the following example of creating a bar chart from a set of existing data views. Suppose that the user wishes to compile a chart showing how well each project in his/her company has performed with respect to filing a target number of patents for a particular year. The company has a data source, ProjectsDB, which can be browsed via a data server using the data browsing application 120. This data source contains details of all the company's projects. Its structure can be represented as follows:

```
ProjectsDB
    Year
        Project
            Code
            Name
            Description
            Budget
            Manager
                PatentEstimate
            ProjectResources
                ProjectCode
                EmployeeID
                PersonMonths
```

The user preferably has recorded the following join information in his/her data browsing application 120:

ProjectsDBNear/Project/Code=ProjectsDB/Year/ProjectResources/ProjectCode

To display information about the company's projects in a data view, the user can select the ProjectsDB datamark 1210 in the datamarks panel 1205 as shown in FIG. 12A. Initially this would preferably display a link for each year for which project data has been recorded. The user can select the year of interest (eg. 2002). This results in the data view being updated to show now two further links, one for Project and one for ProjectResources. If the user selected the Project link, then a data view as shown in the top left hand corner of FIG. 12A, would be displayed in the workspace 1202 (some column data is not shown). The open location control 1208 displays the query associated with the currently selected data view as a URI. In this case, the XQuery expression is a path expression.

To limit this data to show just those projects managed by "Joe Brown", the user could select the Manager column and specify a filter constraint for that column (eg. Manager="Joe Brown"). Immediately the data in that data view would be restricted to just those projects managed by "Joe Brown" in the selected year. This filtering operation is not necessary for the current task. Filter operations are described in more detail in Section 7.2

The filter constraints specified for the Project data view are recorded by the data browsing application 120. If the user selected to save that data view for re-use, this filter constraint would be integrated into the query for the data view. For example, its associated XQuery would be:

XQuery Example 1

```
let$projects :=
    document("http://www.example.com/Projects?/ProjectsDB")
for $p in $projects/Year[.=2002]/Project
where $p/Manager = "Joe Brown"
return $p
```

In XQuery Example 1, the process identified by. http://www.example.com/Projects represents a data server, and the expression /ProjectsDB following the question mark represents the query for the data server.

The application of a filter in this example has resulted in the XQuery expression being changed from a path expression to a flwor expression. Preferably filters are expressed using the where clause of the flwor expression. This process is described further in Section 7.2. Alternative arrangements may preserve the path expression and apply the filter in the form of predicates.

Figure 12B:
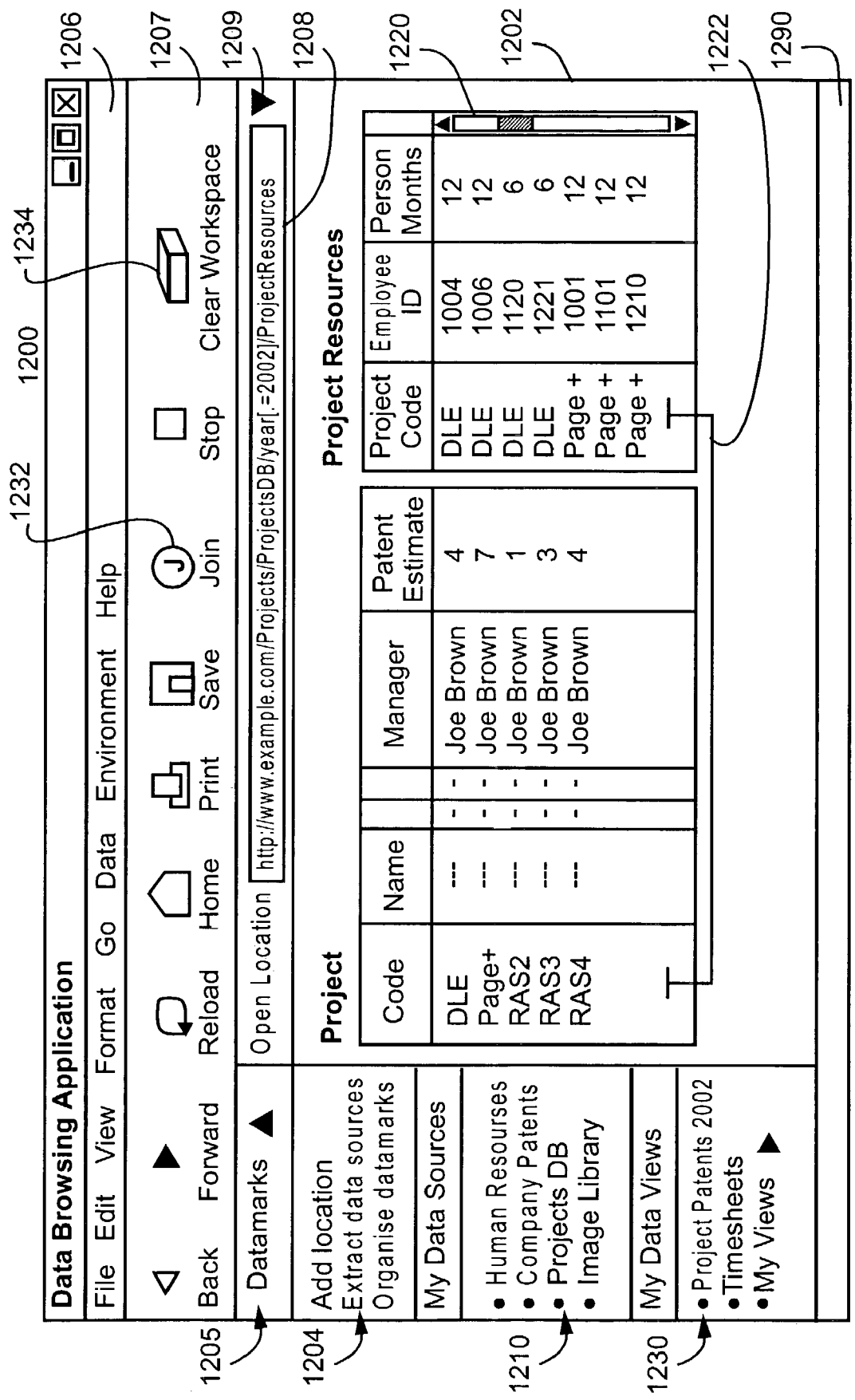

Using the same workspace 1202, the user may then select to display the resources required for these projects. To do this, the user once again selects the ProjectsDB datamark 1210, the desired year, and this time follows the ProjectResources link. This results in a table listing all the data components contained in the ProjectResources data component. The data browsing application 120 automatically connects the Code of the Project data view with the ProjectCode of the ProjectResources data view with a join connector 1222 as shown in FIG. 12B. Display of the join connector 1222 is possible because of the known congruence of these two data components. There may be a large number of rows in the ProjectResources data view. FIG. 12B shows a vertical scroll bar 1220 in that data view partly scrolled to show just the data for projects having a ProjectCode of "DLE" and "Page+".

Figure 12C:
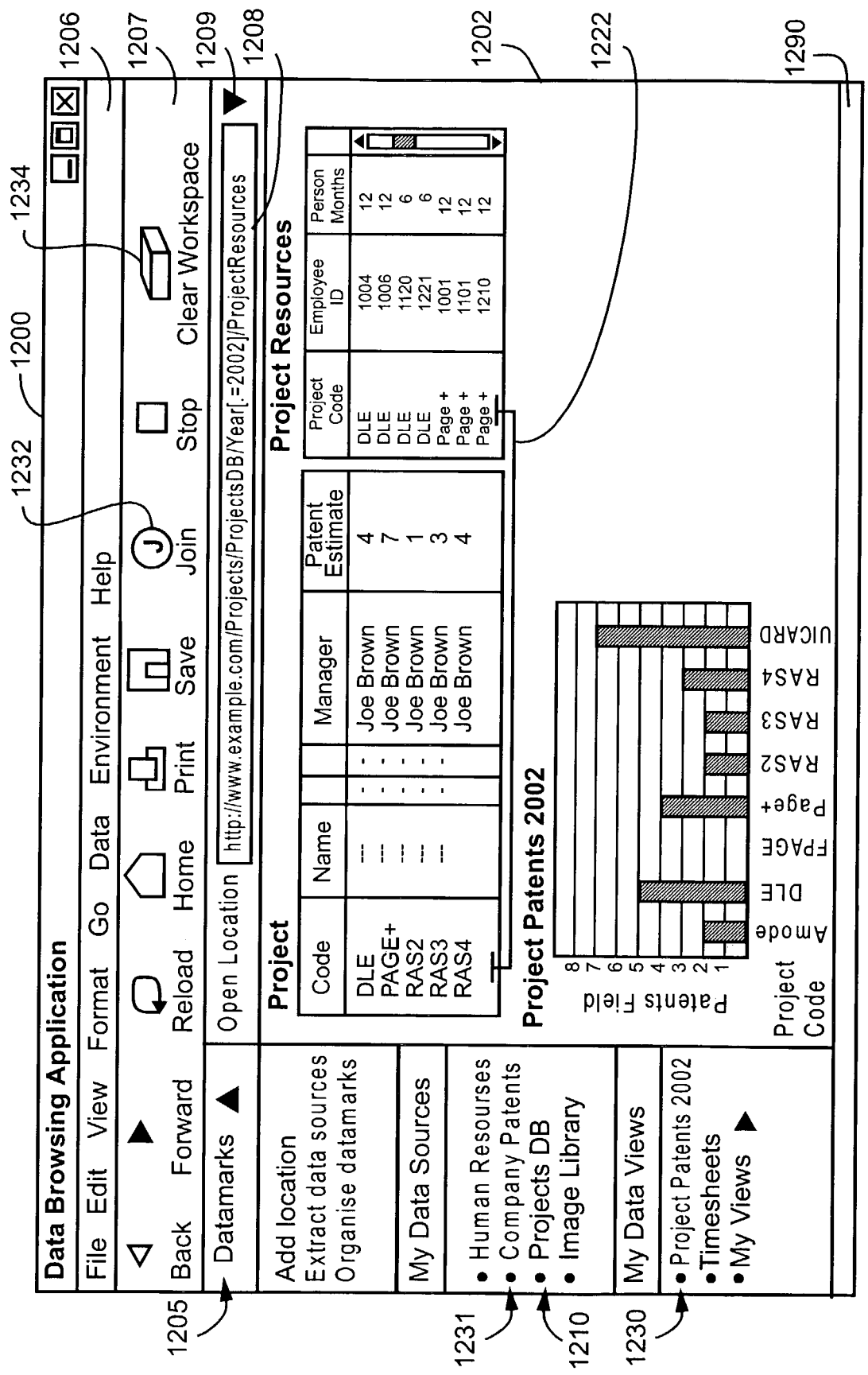

Now, in order to complete the task, the user must obtain information about the number of patents actually filed for each project in the specified year, 2002. To achieve this, the user selects the Project Patents 2002 data view 1230 in the data view section of the datamarks panel 1205. This data view results in the display of a bar chart, as shown in FIG. 12C, using the method described in Section 5.0. This data view has been derived previously using the CompanyPatents datamark 1231 in the datamarks panel 1205. This datamark corresponds to a data source that can be hierarchically represented as follows:

```
Patents
    Invention
        ProjectCode
        InventionCode
        Year
        InventorName1
        InventorName2
        InventorName3
        InventorName4
        DateFiled
        Abstract
```

The XQuery associated with the Project Patents 2002 data view is as follows:

XQuery Example 2

```
let $patents :=
    document("http://www.example.com/Patents?/Patents")
for $p in
    distinct-values($patents/Invention[Year=2002]/ProjectCode/text( ))
let $inv := $patents/Invention[
    ProjectCode = $p and
    DateFiled >= date("2002-01-01") and
    DateFiled <= date("2002-12-31")
]
return
    <Project>
        <ProjectCode> {$p} <ProjectCode>
        <PatentsFiled> {$inv/count( )} </PatentsFiled>
    </Project>
```

The process identified by the URI, http://www.example.com/Patent represents a data server dedicated to the Patents data source.

This query first extracts all the distinct ProjectCode values, and then for each one the query instructs a list of inventions, that were filed during 2002, to be obtained. The number of elements in this list can be counted using the XQuery counto function. The query returns a list of Project elements. Each Project element has a ProjectCode element with content derived from variable $p and a PatentsFiled element with content that has been derived from applying the count( ) function to the $inv variable (that holds a list of all the Invention elements that satisfy the letAssignment clause of the XQuery).

Preferably, the user has also recorded the following join information in his/her data browsing application 120:

ProjectsDB/Year/Project/Code=Patents/Invention/ProjectCode

Joins can be registered by a user by selecting two data sets in the workspace 1202, and then selecting the Join icon 1232 on the toolbar 1207. This action results in a join being stored by the data browsing application 120 for the selected data components.

Figure 12D:
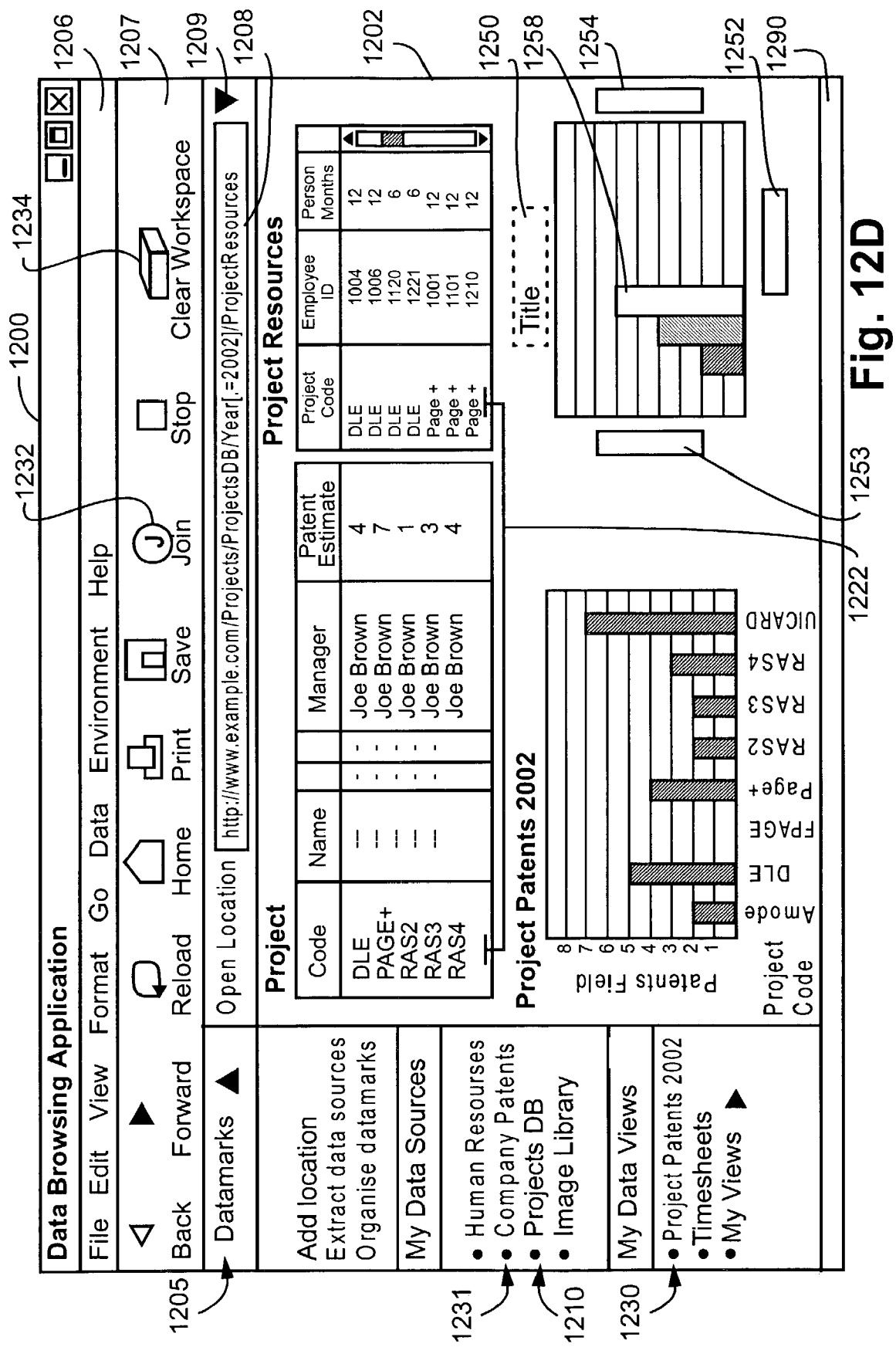

Consistent with step 5410, the user now right-clicks the whitespace of the workspace 1202 and selects the option New Data View from the displayed contextual menu 1292. The user then selects "Bar Chart" from the presented list of display types and the default template for a bar chart is displayed in the next available grid unit in the workspace as shown by FIG. 12D. The template has no data initially, just slots for data components (eg. x-axis slot 1252) and text objects (eg. the Title slot 1250). Preferably the text slots are differentiated from the data component slots by shading. In FIG. 12D, text slots are differentiated by a dashed border (eg. 1250). Preferably the template also shows an example of the bars 1258 that will be generated once data is specified for the new data view.

To establish an x-axis for the new data view, the user can copy the ProjectCode data component from the Project Patents 2002 data view and paste this data component in the slot reserved for the x-axis, 1252. Alternatively, the user can drag this data component to slot 1252. Immediately labels for the x-axis are displayed representing the projects for the year 2002. Preferably, when a data set is copied, any predicates implied by the data set's iteration operation are maintained (eg. Year=2002; see XQuery Example 2).

The user can then copy the PatentEstimate data set from the Project data view by selecting the relevant column in the table, pressing CTRL C on the keyboard 1102 and then pasting this data set on the left-hand y-axis of the new data view. This indicates to the data browsing application 120 that the pasted data set is to act as a y-axis with respect to the selected x-axis and hence be dependent on that axis. This is an allowable manipulation because the data browsing application 120 knows that the Code data component of the Project data view is joined to the ProjectCode data component from the Project Patents 2002 data view, and that the Code and PatentEstimate data components of the Project data view have a point-wise correspondence.

If a copied data set must correspond with other data sets in the receiving data view (eg. as in a table data view) then the step 5425 of FIG. 54 assesses whether this is possible. In the simplest case, the copied data set may share the same parent node as the other data sets in the data view and thus the current iterator for the table data view is unchanged by the addition of another data set (eg. column of the table). However, in other cases the data set may be able to be copied because there exists some join condition involving its iterator and the existing iterator of the table. Although the join condition implies that the two iterators can be unified, it does not imply that there is a one-to-one correspondence of the data.

For example, the ProjectsDB data source may have a record of all the projects, however the Project Patents 2002 data view may contain a subset of these projects (ie. only those projects for which patents have been filed). Therefore, if the user selected to copy the PatentsFiled data set from the y-axis of the Project Patents 2002 data view to a new column of the displayed Project data view in FIG. 12C, this manipulation would be allowed because of the join condition between ProjectsDB/Year/Project/Code and Patents/Invention/ProjectCode. However, the iterator for the new column of the table would result in a subset of the projects listed in the table (ie. not all the projects listed in the Project data view would have a corresponding value for PatentsFiled). In other words there is more than one way of presenting the joined data to the user. So, for example, should projects be listed in the updated table if they don't have a corresponding value for PatentsFiled, should new projects be added to the table if the Patents data source referenced projects that had not been stored in the ProjectsDB data source? These different options correspond to different methods of executing the join condition. The preferred arrangement allows the user to select from the following three methods of effecting a join condition: (i) distinct union; (ii) outer join; and (iii) inner join.

For the first distinct-union method, the data browsing application 120 generates a query that iterates through the distinct (ie. non-repeating) union of the join attribute values (eg. ProjectsDB/Year/Project/Code and Patents/Invention/ProjectCode in the above-mentioned example) and then generates a data result for each identified join attribute value. If the data is missing from one data source, then an empty or zero element results. This method results in a union of data and thus a table with zero or empty cells. It is useful when a user, is either unfamiliar with the data or wants to detect erroneous data. Filter operations can subsequently be applied to the data view to remove the empty or zero data.

For the second outer-join method, the data browsing application 120 generates a query where the added data set is obtain via a nested (inner) let or for clause in the XQuery. An inner let clause implies a one-to-one relationship between the two iterators whereas an inner for clause implies a one-to-many relationship. The nested iteration operation is predicated by the value of the join attribute value for the current outer iteration and a data result is generated for each data result of the outer iteration operation. So in the case of the above-mentioned example, no extra rows would appear in the table however some rows may have a zero value for the PatentsFiled data component.

The final inner-join method is similar to the outer-join method, with the exception that a data result is only created if both the outer and inner iteration operations have a result. So, in the case of the above-mentioned example, rows of the table not having a value for the PatentsFiled data component would be removed from the table.

Preferably, the user can specify default join behaviour to be used for his/her browsing session, which is to be used for all join operations. This means that the user does not need to specify for each operation what type of join is required. However, the data browsing application 120 provides menu options for the user to change the join method for a particular data view. This results in the XQuery associated with the data view being changed to reflect the different patterns of iteration (eg. from using a distinct-values iteration operation to a nested forAssignment node). Effecting join operations is discussed further in Section 7.0.

Returning now to the example task, when the PatentEstimate data set was copied into the new data view, the resulting data view would depend on the default join method selected by the user. If a distinct-union method was used then the data on the x-axis would reflect the distinct union of the following data components;

ProjectsDB/Year[=2002]/Project/ProjectCode, and
Patents/Invention/[Year=2002]/ProjectCode.

This would mean that new project code values may appear on the x-axis reflecting those projects that exist in the ProjectsDB data source but not the Patents data source. These new values would have associated patent estimate values. However, some project codes may not have corresponding patent estimate values (ie. the project codes from Patents data source).

If the outerjoin method was used then no new projects would appear on the x-axis, however some patent estimate values may not appear in the chart. If the inner-join method was selected then some project codes may disappear from the x-axis because they would be excluded from the query if there was not a corresponding patent estimate value. For the remainder of this example, a distinct-union join method is assumed.

Figure 12E:
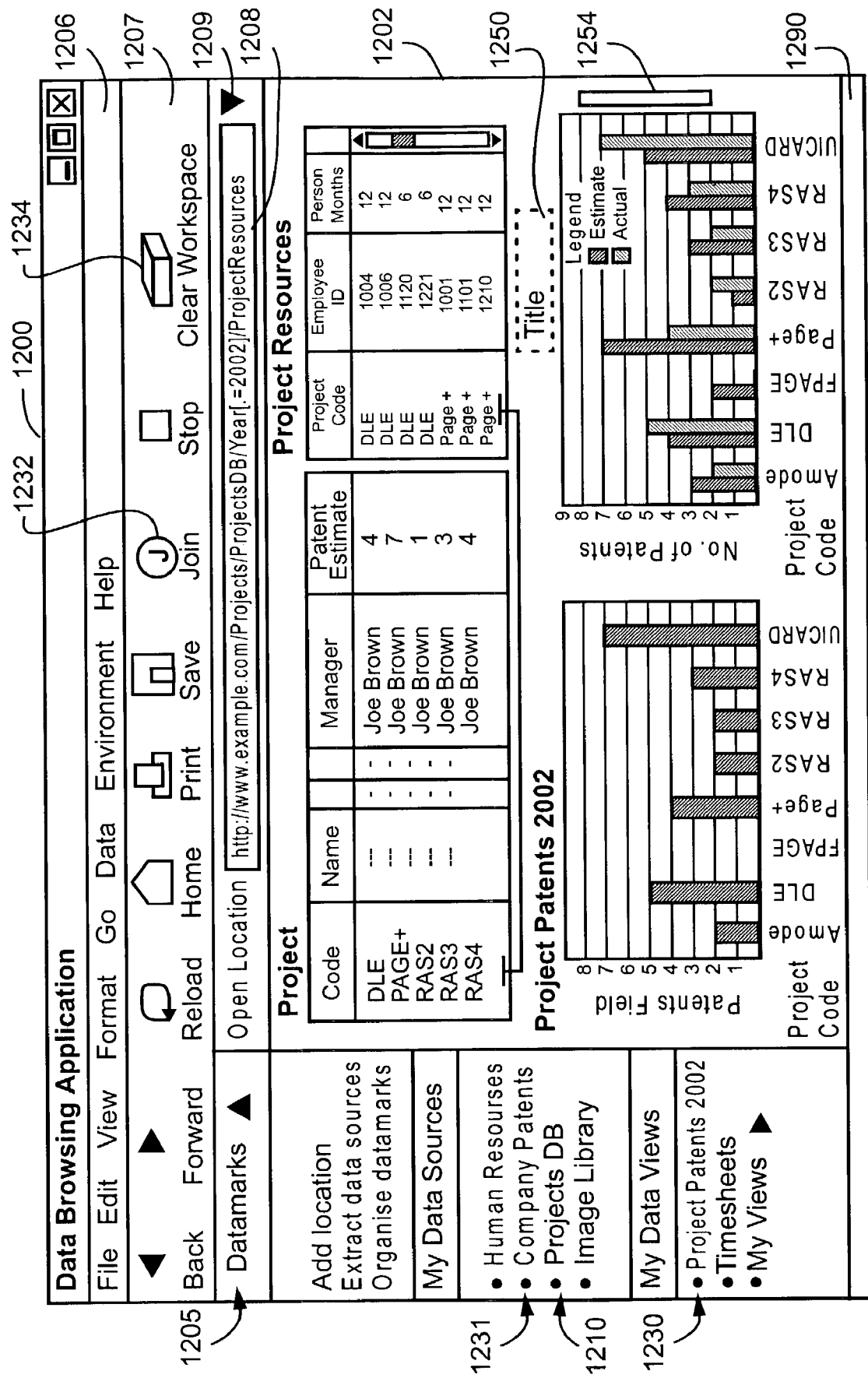

To obtain the comparison between the number of patents actually filed and those estimated for each project in 2002, the user can now select the PatentsFiled data set from the Project Patents 2002 data view. This can be achieved by either selecting the y-axis name (where there is a single data set associated with the axis) or selecting the data set name from a legend (if it is displayed). This data set can also be pasted to the left-hand y-axis of the new data view. This manipulation indicates to the data browsing application 120 that both the PatentEstimate and PatentsFiled data sets should use the same y-axis. This results in a legend being drawn for the new bar chart with PatentEstimate and PatentsFiled being listed. The user can modify these data set names by selecting the appropriate slots and editing the contained text. So, for example, in FIG. 12E the user has edited the y-axis name to be "No of Patents" and the data set names in the legend to be "Estimate" and "Actual".

The final task for the user is to show on the bar chart the resources that were used to get this result. The user selects the PersonMonths data set from the ProjectResources data view and copies this data set to the right-hand y-axis of the new data view. This indicates to the data browsing application 120 that PersonMonths is also to be graphed with respect to the ProjectCode. This is an allowable manipulation because of the join condition between the Code and ProjectCode elements of the ProjectsDB/Year/Project and ProjectsDB/Year/ProjectResources data components, respectively. In the preferred arrangement, the data browsing application 120 assumes that the person months for each project must be summed before being copied to the new data view. In an alternative arrangement, the user may be required to specify that the ProjectResources table first be grouped by ProjectCode by summing over all employees for a project.

Immediately data is shown for this data set. This new data component is added to the legend (see FIG. 12F, where the PersonMonths data components has been renamed to "Resources"). The template can use various means to distinguish between the y axes used by the legend item. In the described example, it is assumed that colour is used. In other words, the bars for the PersonMonths data component is shown in a different colour to the PatentsEstimate and PatentsFiled data components Alternatively, lines could be used to represent the data for a right-hand side y-axis, creating a chart having a mixture of bar and line styles.

Figure 12F:
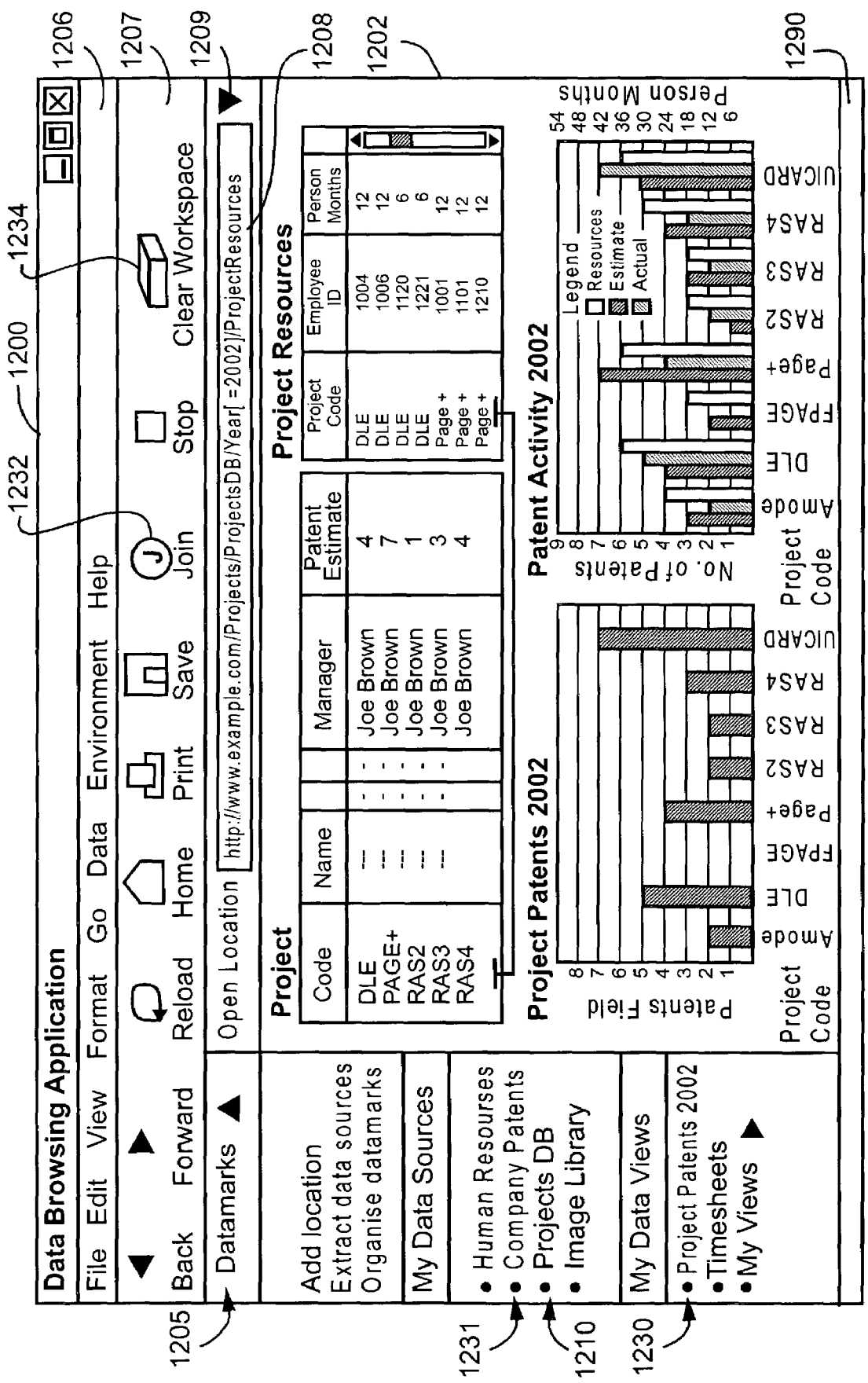

The user can then add a title and perhaps edit some of the axis names. The final result is shown in FIG. 12F. The XQuery that is generated for this result is as follows:

XQuery Example 3

```
let $projects :=
    document("http://www.example.com/Projects?/ProjectsDB")
let $patents :=
    document("http://www.example.com/Patents?/Patents")
for $p = distinct-values(
    $patents/Invention[Year=2002]/ProjectCode/text( ),
    $projects/Year[. = 2002]/Project/Code/text( ),
    $projects/Year[. = 2002]/ProjectResources/ProjectCode/text( ),
)
let $proj := $projects/ Year[. = 2002]/Project[Code=$p]
let $inv := $patents/Invention[
    ProjectCode = $p and
    Year = 2002 and
    DateFiled >= date("2002-01-01") and
    DateFiled <= date("2002-12-31")
]
let $res := $projects/Year[. = 2002]/ProjectResources[ProjectCode = $p]
return
    <Project>
        { <ProjectCode> {$p} </ProjectCode> }
        { <PatentEstimate> {$proj/PatentsEstimate/text( )}
        </PatentEstimate>}
        { <PatentsFiled>{$inv/count( )}</PatentsFiled>}
        { <PersonMonths>{sum($res/PersonMonths) }
        </PersonMonths> }
    </Project>
```

The final query thus represents a join between three sources of data (project data, patent data and project resource data). In each case the join is effected using the distinct-union join method. Performing distinct-union operations (using the distinct-values function as shown in XQuery Example 3) is generally not efficient. Alternative arrangements could reduce the processing associated with the primary iteration operation by analysing the available data. For example, if an examination of the data demonstrated that the ProjectsDB/Year/Project/Code data component contained a complete list of all the project codes, then the distinct union operation could be replaced by an iteration over the ProjectsDB/Year/Project/Code values.

The user can also apply filters to data views (eg. XQuery Example 1). These filters can involve any data components that are returned by a query. So, for example, if a query was a path expression, filter constraints can involve any displayed descendent elements for the data view. If the query is a flwor expression, then filter constraints may involve any data components that are returned by the query (including hidden data components). In the preferred arrangement, filters are treated as a property of a data view. The user can specify whether filters of a source data view should be copied with a data component to a target data view. This is a system preference, which can be set by the user. If set then a source data view's effective filter is added to the filter of the target data view when data is copied. Filter expressions are described in more detail in Section 7.2.

The generated XQuery is included in the data view definition. The method by which these XQueries can be generated is described in more detail in Section 7.0. The data view definition also contains presentation information and any mappings that may have been used in the construction of the data view (see Section 11.0). Note that the generated query does not specify that the data must be displayed as a bar graph. When the query is subsequently executed, the presentation process described in Section 5.0 will determine the best display type for the data. The generated query only defines the data required for the created data view. This means that if data sources involved in a query change between when the query was created and when its subsequently re-displayed, the display type used for the presentation will adapt to the data.

This graphical method of generating new data views can also be used to create new data components as a result of transformations or combinations of existing data component(s). The user can select to save these operations as new mappings that can be re-used in the future. These new mappings become part of the new data view's definition and are also saved as part of the user's mapping set. The user can select to perform a transformation or combination operation without creating a new mapping. In this case, the operation is just integrated into the XQuery which is generated for the new data view. This process is described further in Section 7.0.

Figure 13A:
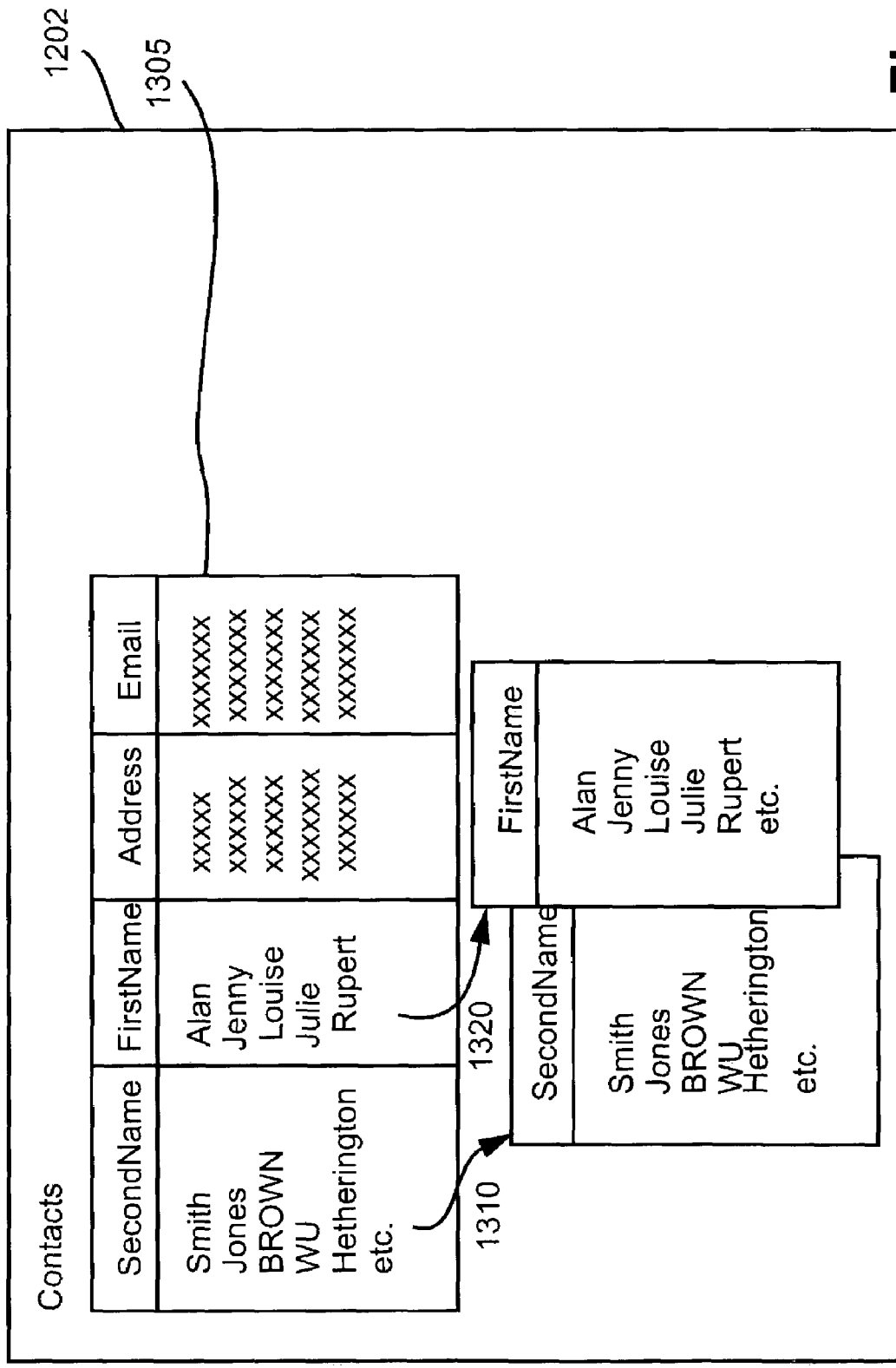
FIGS. 13A to 13C shows a series of GUIs by which a user can define a new transformation or combination operation.

FIG. 13A shows a workspace region 1202, which shows a Contacts data view 1305. This data view is a table, which contains four columns consisting of the data components; SecondName, FirstName, Address and Email. In this example, the user would like to create a new data view, where the name appears as in the format "SecondName, First-Name", with the SecondName part of the new data component being uppercase and presented in bold font. If the user would like to re-use this operation, then a mapping should be created.

Figure 13B:
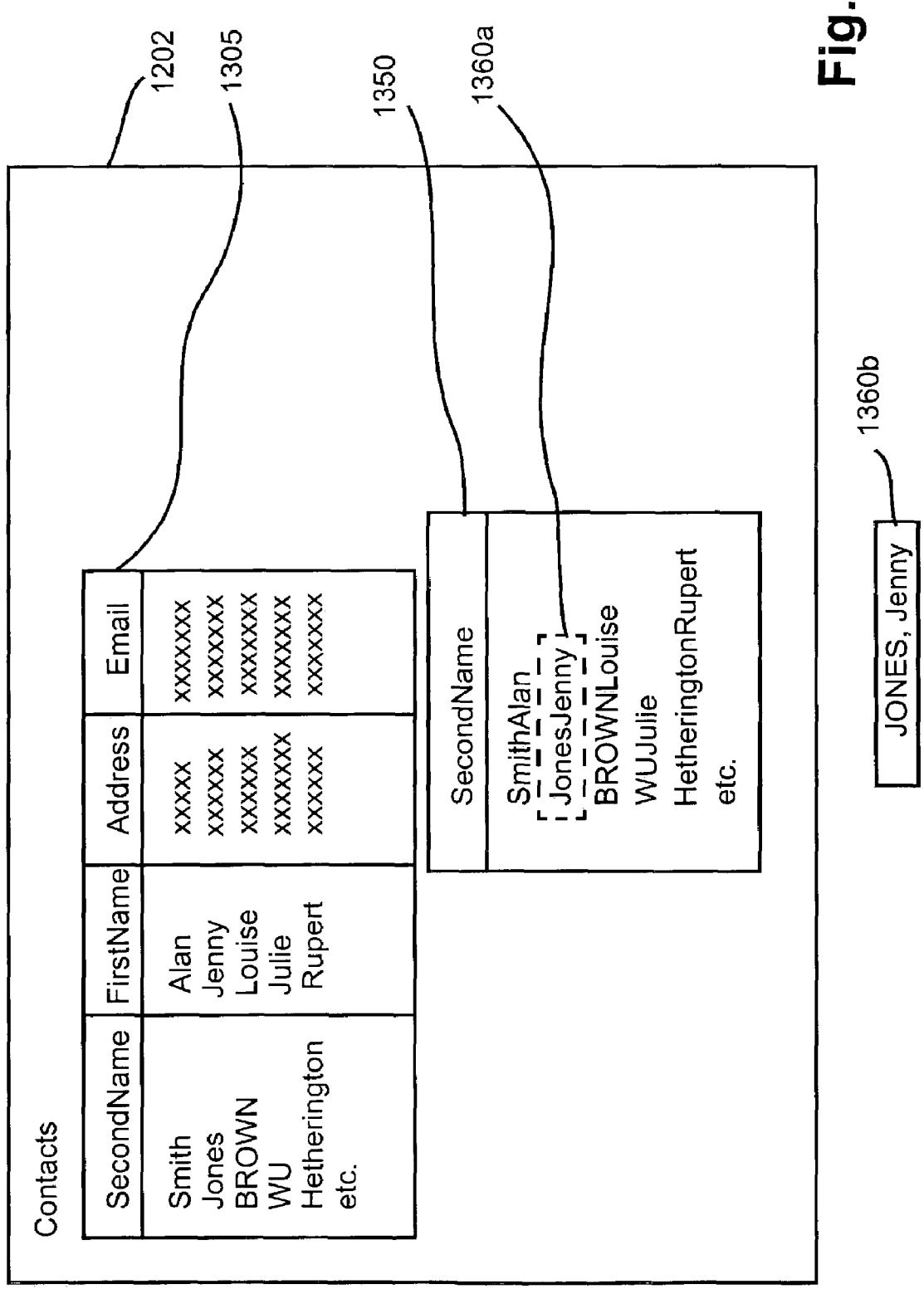

This result can be achieved using the GUI 1200 by the user selecting the first data component of the mapping, the column of data titled SecondName, and dragging this column 1310 to a blank region of the workspace 1202. This occurs as described above. The user then selects the second data component of the mapping, in this case the column of data titled, FirstName, and drags this column 1320 to a position that partially overlaps an existing column in the new data view. The new column can partially overlap to the left or right. As with the data appending drag operation described previously with reference to FIGS. 12A to 12F, a shadow of the dragged column is shown during the drag. If the column is dropped in a partial overlap position, the data browsing application 120 will assume that the two columns should be combined (concatenated) into a single column 1350 as shown in FIG. 13B. The concatenated column 1350 assumes the name of the left-most column, in this case SecondName.

Alternatively the combination operation between the two columns can be indicated by the user first dragging the SecondName and FirstName columns to the first two columns of the new data view. The user can then select both columns by using the keyboard 1102 and mouse 1103 by way of CTRL or SHIFT left click operations, and then choose the contextual menu 1292 option to Combine the selected data components. This procedure will result in the two columns being concatenated into a single column as shown in FIG. 13B. If the user wished to just perform a transformation on a data component (eg. column of a table), the user could select the data component and then choose the Transform option on the contextual menu 1292.

The process of defining the transformation associated with the mapping is substantially as described in Sections 3.0 and 4.0. The user selects an example of data by clicking on a cell in the table using the mouse pointer 1103. So, for example, in FIG. 13B, the user has selected the cell 1360*a* of the table 1350. The user edits the text of the example to indicate to the data browsing application 120 how the data for this column is to be transformed. In this case, the SecondName part of the new data component is converted to uppercase and a comma and space inserted between the two source data components, as depicted in a separate cell box 1360*b* in FIG. 13B, for the sake of clarity. The user has also applied the bold style to the SecondName part of the new data component. On detecting a pressing of ENTER on the keyboard 1102 by the user to indicate completion, the data browsing application 120 analyses the edited example using the method described in Section 4.0 and infers the transformation indicated by the user's edited example.

The user can then accept the inferred transformation or modify it using the method described in Sections 3.0 and 4.0. The user can also specify whether the performed operation should be saved as a mapping. The default behaviour for this property is preferably stored as a user preference. If the user selects to create a mapping, the name of the data component will be registered as the target data component name for the mapping. The mapping will be created in the user's namespace.

Figure 13C:
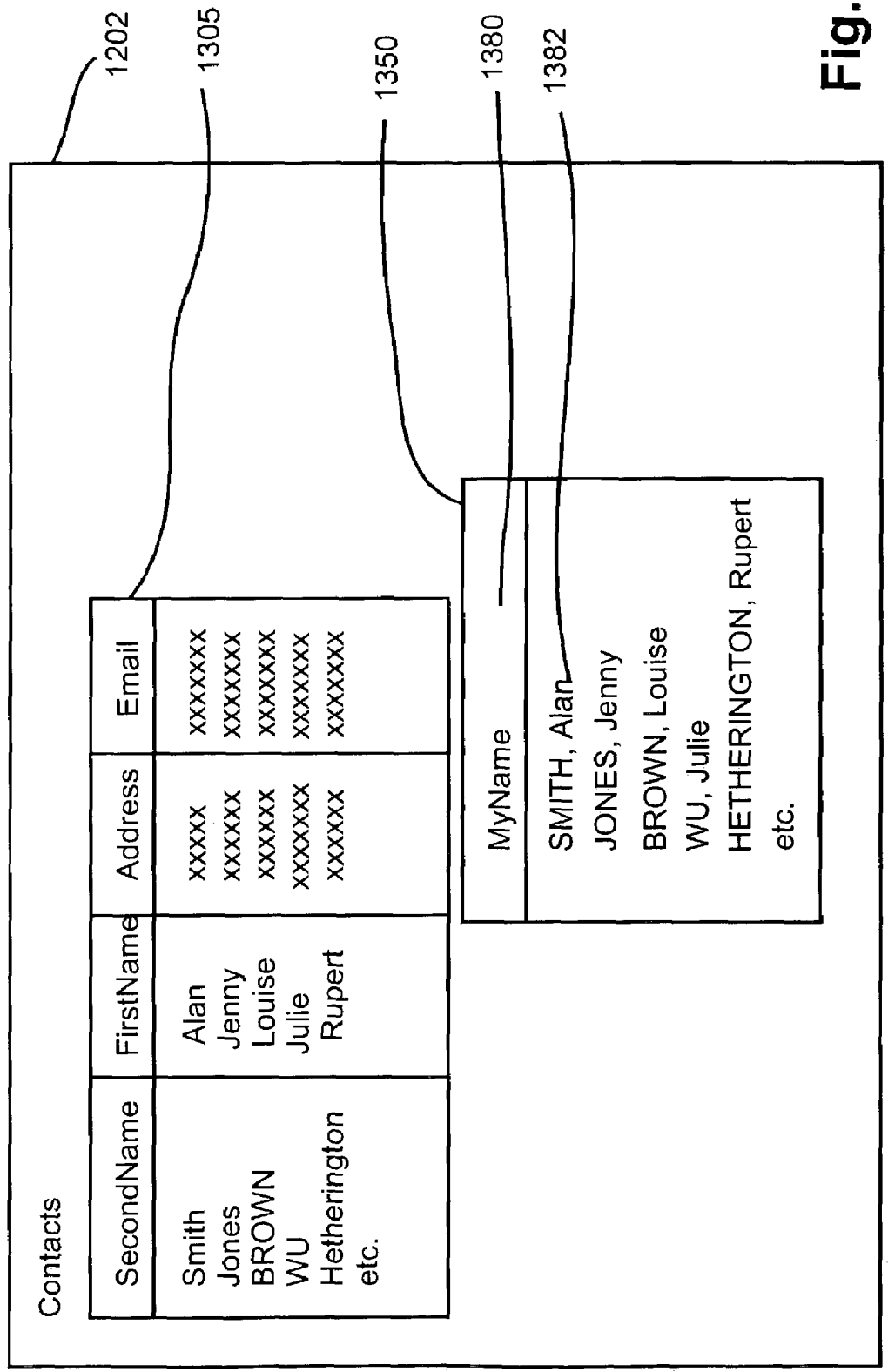

The updated data in table 1350 is shown in FIG. 13C. The user can then select the title 1380 of the column and rename it to MyName. As will be appreciated from an example name 1382, the second name is capitalized and bolded, and separated from the first name by a comma and space. If a mapping is being created these presentation characteristics are preferably stored as part of the mapping. Preferably the created mapping is saved immediately to the user's mapping set. It is stored as part of the data view's definition, but this definition is only saved when the user selects to do so. It should be clear that other data-based GUI methods for defining new mappings can be implemented without departing from the scope of the present disclosure.

7.0 Maintaining Queries for Data Views

The previous section describes how the user can manipulate the data associated with existing data views in a GUI to visually create a new data view. The methods described can also be used to modify existing data views. For example, a user can select and delete a data series from a graph. Both the processes of creating a new data view and modifying an existing data view involve maintaining a query expression for each displayed data view. This process of internally maintaining queries for data views is now described.

Figure 58:
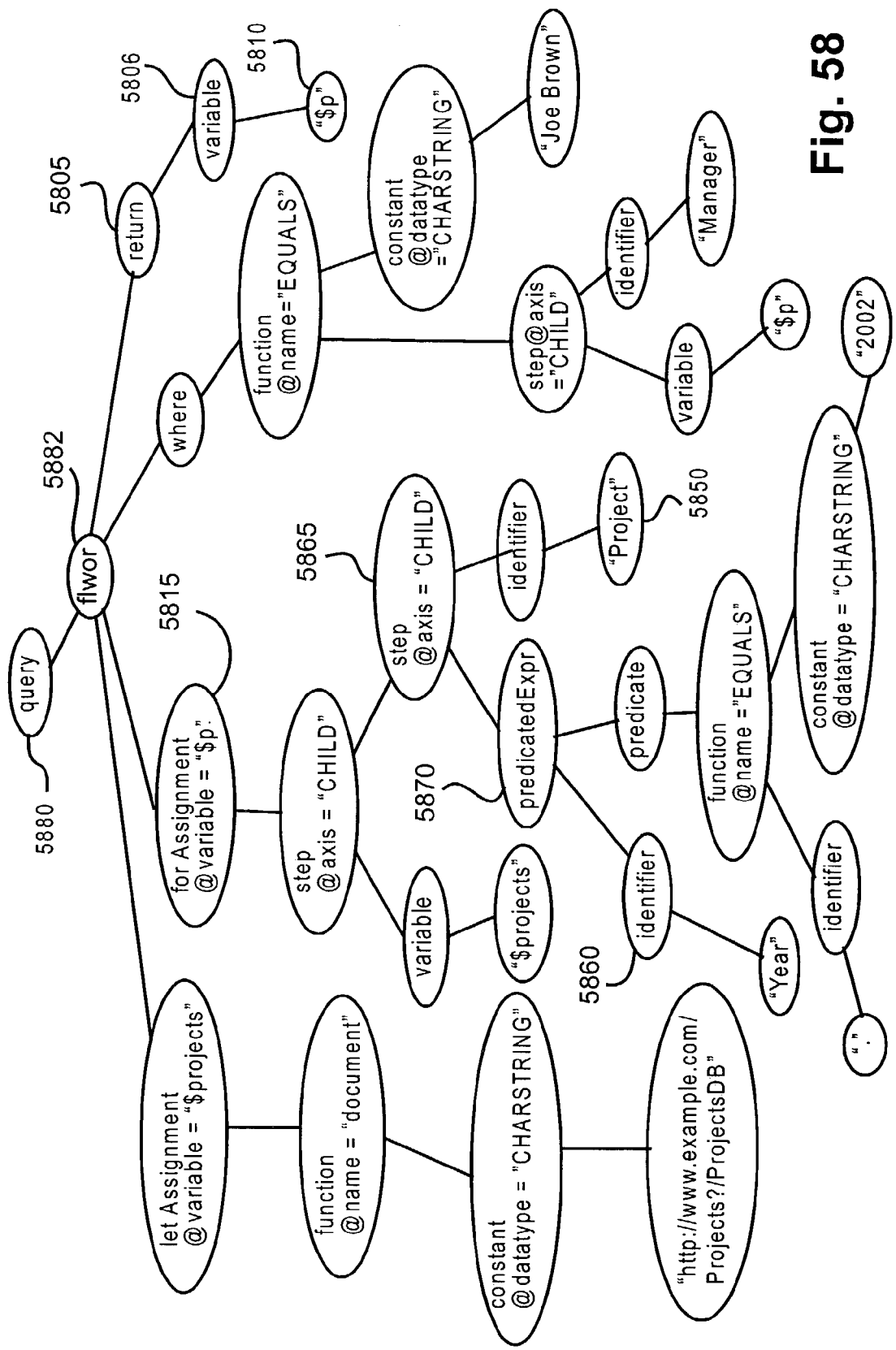
FIG. 58 is an example query tree used to describe the source data view of an example data manipulation process.

The XQuery expression is associated with the root node of the displayed XML data of the data view. It is this expression that the data browsing application 120 uses to obtain data, from either the Intranet or the Internet, for the data view. XQuery expressions can be represented as a tree structure. Preferably the XQueryX syntax (see http://www.w3.org/TR/xqueryx) is used but other query tree structures could also be used. An example of an XQueryX representation of an XQuery is shown in FIG. 58. This is the XQueryX form of XQuery Example 1 above. It represents the query for the Project data view shown in FIG. 12A. In the query tree structure individual components of the query (eg. for clauses) are broken into distinct node trees (eg. forAssignment nodes). This enables an iteration operation, for example, to be extracted or copied as a sub-tree to another sub-tree. This is essentially the process that must be performed when a user copies a data set from one data view to another.

Preferably the queries that are generated by user-indicated manipulations of data are expressed in terms of the data sources and not in terms of data views from which the data may have been copied. This means that the generated query is independent of other data view definitions and can be exchanged with others, without the other users having access to the original data view definitions from which the data was copied. It also means that data components can be copied from data views that might have sensitive information, without necessarily releasing the source data view to others. As mentioned in Section 2.0, the preferred arrangement assumes that data security is maintained at the data source level. Furthermore the data for the generated query can be obtained directly from the necessary data sources without having to read and process any interim data views.

Alternative arrangements may generate queries which depend on the data views from which new data views are constructed (ie. source data views are treated as data sources). Although this method may make the process of creating new queries simpler, the process of obtaining data for the generated queries is more complicated because it involves accessing and analysing the definitions of all the data views involved in the generated query.

When a data view is selected for presentation the query associated with the data view is parsed into a query tree. The data view manager object 3125 of FIG. 31A that is associated with the data view uses this query tree to obtain data for the data view. The resulting data is then analysed and presented as described in Section 5.0 by a corresponding data view presenter object 3120.

A data view may contain hyperlinks to further XML data. If the user follows these hyperlinks, a new XML document results and it is displayed using the above-mentioned process. The result is a new data view (with its associated query) which is displayed in the same grid position in the workspace. The query associated with this new data view is derived from the previous data view and the hyperlink. If the user selected to save the data view at this point, then a data view corresponding to the currently displayed data is saved. Thus when a user is using the data browsing application 120 to browse through a data source, the user is presented with a series of implicit data views each of which can be manipulated and saved as re-useable explicit data views. An explicit data view is one which is associated with a stored data view definition (see Section 11.0).

The analysis process described in Section 5.0 also associates the data components of the data view with path expressions and iterators that specify how the data is obtained with relation to the data view's XSDOM data 3130. So, as described in Section 2.0, a data set (such as displayed in the column of a table) is specified by an iterator and an optional path relative to the iterator. For example, in FIG. 12A, the data browsing application 120 associates the table column Pat-entEstimate with an iterator of Project and a path expression of PatentEstimate. When this data set is copied into the new data view in FIG. 12E, this data set acts as a data series, which is associated with an independent data set (ie. x-axis) derived from the Project Patents 2002 data view having an iterator, Project, and a path, ProjectCode.

Although the iterator is the same in both cases, these iterators refer to the XML data being viewed (eg. the iterator with respect to the data of the return clause of an XQuery flwor expression). In order to ascertain whether the copy operation is allowable, the data browsing application 120 must resolve these data iterators with respect to their sources. In other words, the iterator must be converted into a source data path, which completely specifies the path for the iterator with respect to its source. For example, the source data path for the iterator associated with the PatentEstimate data set of the Projects data view is:

document("http://www.example.com/Projects?/ProjectsDB")/Year [.=2002]/Project.

Source data paths are discussed further later in this section.

Each data manipulation the user performs is first checked for compatibility as described by step 5425 in FIG. 54. If the manipulation is compatible, then the data view manager object 3125 (FIG. 31A) of the data browsing application 120 effects the manipulation. For example, if a data set has been copied to a particular column of a table of a data view, then the data view manager object 3125 of the receiving data view is informed that the data set is to be added to the current data view in the role of a particular column number. The copied data set is identified by its source data view, its iterator and its path (relative to the iterator). The data view manager object 3125 then updates the query associated with the current data view, if possible, to account for the manipulation.

The data manipulation processes that are implemented in the preferred arrangement of the data browsing application 120 are:

1. Copying data component(s) to a data view;
2. Applying a filter to a data view;
3. Specifying a sort order for a data view;
4. Transforming a data component;
5. Combining two or more data components;
6. Hiding a data component;
7. Renaming a data component For each of these operations-the data view manager object 3125, associated with the data view being manipulated, updates the query for the data view. These operations typically involve data sets and data series, however some operations can also apply to a data node (eg. copying a single node to a tree data view, renaming or hiding a data component). If the user selects to copy, filter, sort, transform or combine a data series, then the data series is treated in a similar way to a data set.

When an operation involves a data set, the iterator associated with that data set is used to update the query of the receiving data view. The iterator informs the data view manager object 3125 of the repeating structure associated with a collection of data values. The path associated with a data set informs the data view manager object 3125 of the relative location of the XML element or attribute (providing the values) with respect to the iterator element. The path is typically used when a group of data sets use the same iterator (eg. columns of a table which share the same parent iterator element). A path does not need to be specified. If it is not, then it is assumed that the iterator specifies the entire path to the values of the data set. The different manipulation processes will now be described in more detail.

7.1 Copying Data Components to a Data View

When the user cuts/copies or drags a data component from a data view in the workspace and selects to paste/drop that data component in another data view, the data view presenter object 3120 of the data browsing application 120 calls one of the following methods on the data view manager object 3125 for the target data view:

1. addDataSet(DataSet source, DataSet target)
2. addDataSet(DataSet source, DataSeries target)
3. addDataSeries(DataSeries source, DataSet target)
4. addDataSeries(DataSeries source, DataSeries target)
5. addDataNode(DataNode source, DataNode target).

In each of these methods, the source argument refers to the copied data. It specifies the source data view object, and the data node, set or series in that data view. The target argument indicates the data set, series or node in the target data view after which the copied data is to be added.

Which of the above five methods is called depends on the display type of the target data view, the type of data that has been copied (data node, data set or data series) and the role of the copied data. The role of the copied data is determined by the drop or paste location in the target data view. If the user has copied a data set (eg. from a table or from the x-axis of a graph), then the data view presenter object 3120 can call either the first or second method depending on the drop position. If a data series has been copied, the data view presenter object 3120 can call either the third or fourth method depending on the drop or paste position. When a data series is added to a data view in the role of a data set (eg. column of a table, x-axis of a graph) then the data series is treated substantially as a data set.

If a data node is copied then only the fifth method can be called. If it is called and the drop or paste location in the target data view implies that a data set is expected then the data view manager object 3125 will report that the manipulation is not allowed. In the preferred arrangement the fifth method is only used to manipulate nodes of a tree. If there is no existing data specified in the target data view, the target argument can be set to null. Preferably, a null target argument is only valid if the target data view contains no data (ie. it has just been created using the New Data View menu option as described in Section 6.0).

The process of adding a data set to a data view is now described in more detail with reference to FIGS. 55 to 61 and the example described with reference to FIGS. 12A to 12F. Specifically, the process of copying the PatentEstimate column of the Project data view to act as a data series in the new data view depicted in FIGS. 12D, 12E and 12F will be described. The XQuery definition for the source data view is that of the Project data view as shown in XQuery Example 1. This XQuery is depicted as a query tree in FIG. 58. The XQuery definition for the new bar chart, which is the target data view of the manipulation, is as shown in XQuery Example 4 and is depicted as a query tree in FIG. 59.

XQuery Example 4

```
let $patents :=
    document("http://www.example.com/Patents?/Patents")
for $p in
    distinct-values($patents/Invention[Year=2002]/ProjectCode/text( ))
```

-continued

```
return
    <Project>
        <ProjectCode> { $p } <ProjectCode>
    </Project>
```

Note that when the ProjectCode data set was copied to the new bar chart from the Project Patents 2002 data view, the query for the bar chart maintained the distinct-values function, which was used to get all the distinct project codes that are associated with Invention elements for the desired year.

Figure 55:
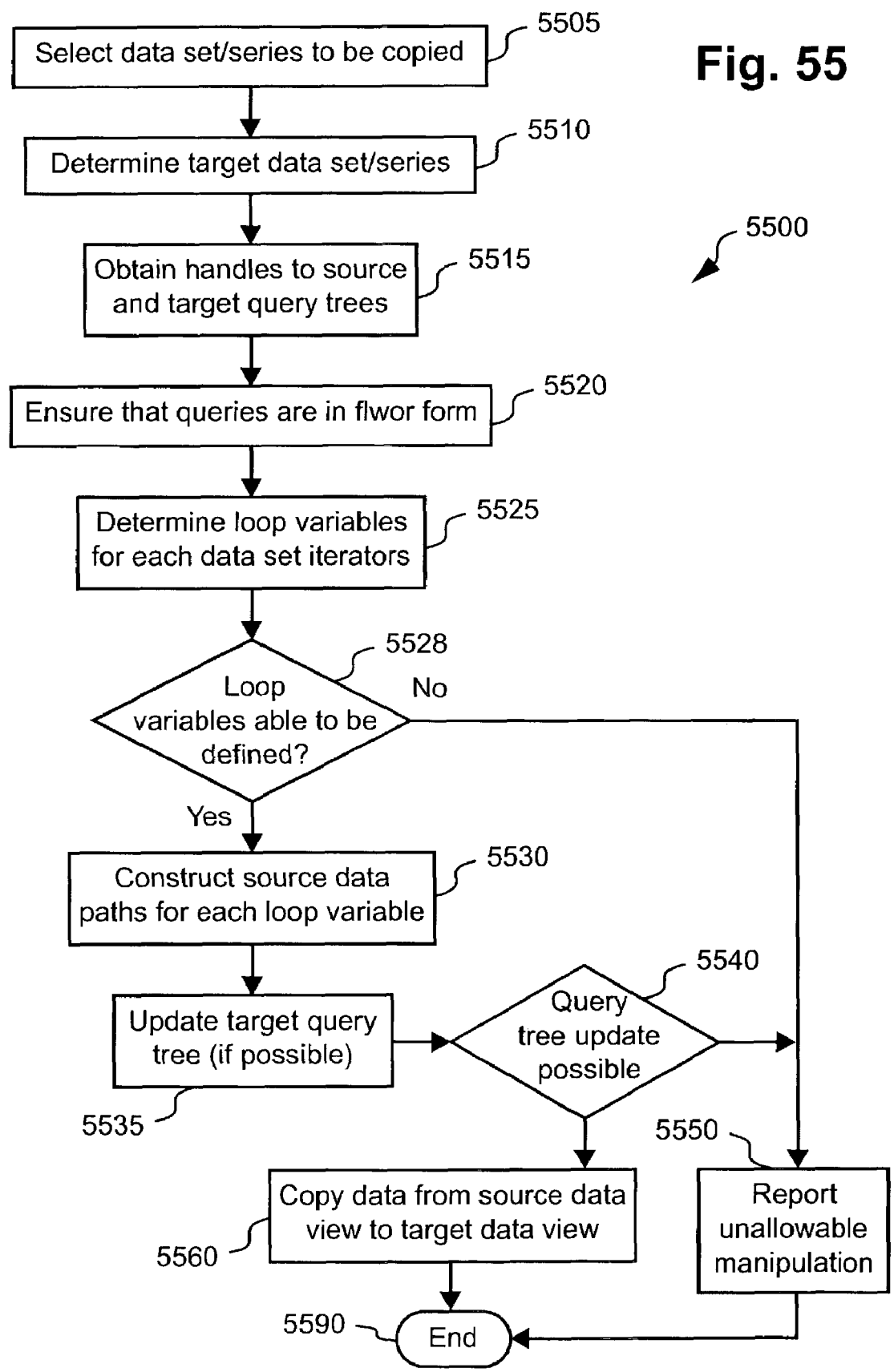
FIG. 55 is a flowchart of the process of adding a data set to an existing data view.

FIG. 55 shows a flowchart of a method 5500 of adding a data set to an existing data view which, again, is preferably implemented as a part of the data browsing application 120. In step 5505, the source data set/series is identified by the user interacting with a GUI such as shown in FIGS. 12A-12F. The source data set/series can be identified by a copy or cut operation, or alternatively by the initiation of a drag operation. So in the example, the user may have selected, and commenced to drag, the PatentEstimate column in the Project data view shown in FIG. 12D. Since the dragged data component is a data set, then the data view presenter object 3120 associated with the target data view of the drag operation will ultimately call one of the first two methods listed above.

In step 5510, the paste/drop location is used to determine which data set/series of the target data view is to be treated as the target data set/series. For example, if the user has dropped a data set on the y-axis of a graph, then the data view presenter object 3120 associated with the target data view would first see if any data series already existed for the graph. If so then it would identify the last data series as the target data series and call the addDataSet(DataSet source, DataSeries target) method of the corresponding data view manager object 3125. If no data series existed for the graph, then the data set corresponding to the x-axis would be selected as the target data set, and the addDataSet(DataSet source, DataSet target) method would be called.

Alternatively, if the drop/paste location was between two legend items then the target data series would be set to that data series corresponding to the legend item immediately before the drop/paste location. If the source for the manipulation is a data series then clearly the third or fourth methods are called depending on the paste/drop target. When the addDataSerieso method is called on a data view manager object 3125, preferably that object can use the information about the label of the data series to assist in deciding whether the manipulation is allowable and if so, to update the query for the target data view. For example, the label of a data series can provide information about a join condition for the manipulation. Join conditions have been discussed in Section 6.0 and are described in more detail later in this section.

So in the example, depicted in FIG. 12D, the user drops the dragged PatentEstimate data set over the y-axis data component, 1253 of FIG. 12D. In this example, there are no existing data series for the new bar chart so the target data set is the x-axis data set and the addDataSet(DataSet source, DataSet target) method is called on the data view manager object 3125 associated with the bar chart data view. The data view manager object 3125 then processes this call.

In step 5515 the data view manager object 3125 obtains handles for the source and target query trees. It has a stored handle for its own query tree, the target query tree. The data view manager object 3125 also obtains a handle to the source query tree via the source data set object that is passed to it. In step 5520, a check is made to ensure that both queries are in the form of a flwor expression. Any queries generated by the preferred arrangement will be in this form already, however data source queries need to be wrapped in a document function and have an iteration operation applied.

For example, the data source query:

http://www.example.com/Projects?/ProjectsDB/Year/
   [.=2002]/Project can be represented by the flwor expression shown in XQuery Example 5. The preferred arrangement attempts to separate the root of the data source in a top-level letAssignment node as shown below (bound to the $projects variable in the case of XQuery Example 5). The remainder of the path is used as the source data path of the forAssignment node.

XQuery Example 5

```
let$projects :=
    document("http://www.example.com/Projects?/ProjectsDB")
    for $p in $projects/ Year/[.=2002]/Project
    return $p
```

In step 5525 the loop variables associated with each of the data set iterators are determined. Loop variables are those variables that are declared to bind the data of an iteration operation. They thus provide a means for other XQuery operations to reference the results of an iteration process. Loop variables are either defined by a forAssignment node (eg. $p in XQuery Example 5) or a letAssignment node (eg. $inv in XQuery Example 3). Variables defined via a forAssignment explicitly hold the results of an iteration process, whereas those defined by a letAssignment can be viewed as implicitly holding the results of an iteration process. For example, it may be convenient to iterate through a set of keys using a forAssignment node and then to use one or more letAssignment nodes to obtain data for the individual key values. This process is shown in XQuery Example 3. The key, defined in a forAssignment node, can be treated as a primary loop variable ($p in XQuery Example 3), and the letAssignment variable ($inv in XQuery Example 3) a secondary or dependent loop variable. In cases where there is a one-to-n relationship between data, nested forAssignment nodes are employed.

The determination of the loop variables in step 5525 is required in order to connect the result data of the data views (from which the iterators are derived) with their associated iteration operations in the query, which are expressed in terms of the data sources. This is necessary if the resulting query is to be expressed in terms of the data sources and not the existing data views. This association results in a target query that is independent of its data view sources and depends only on original data sources.

Figure 57:
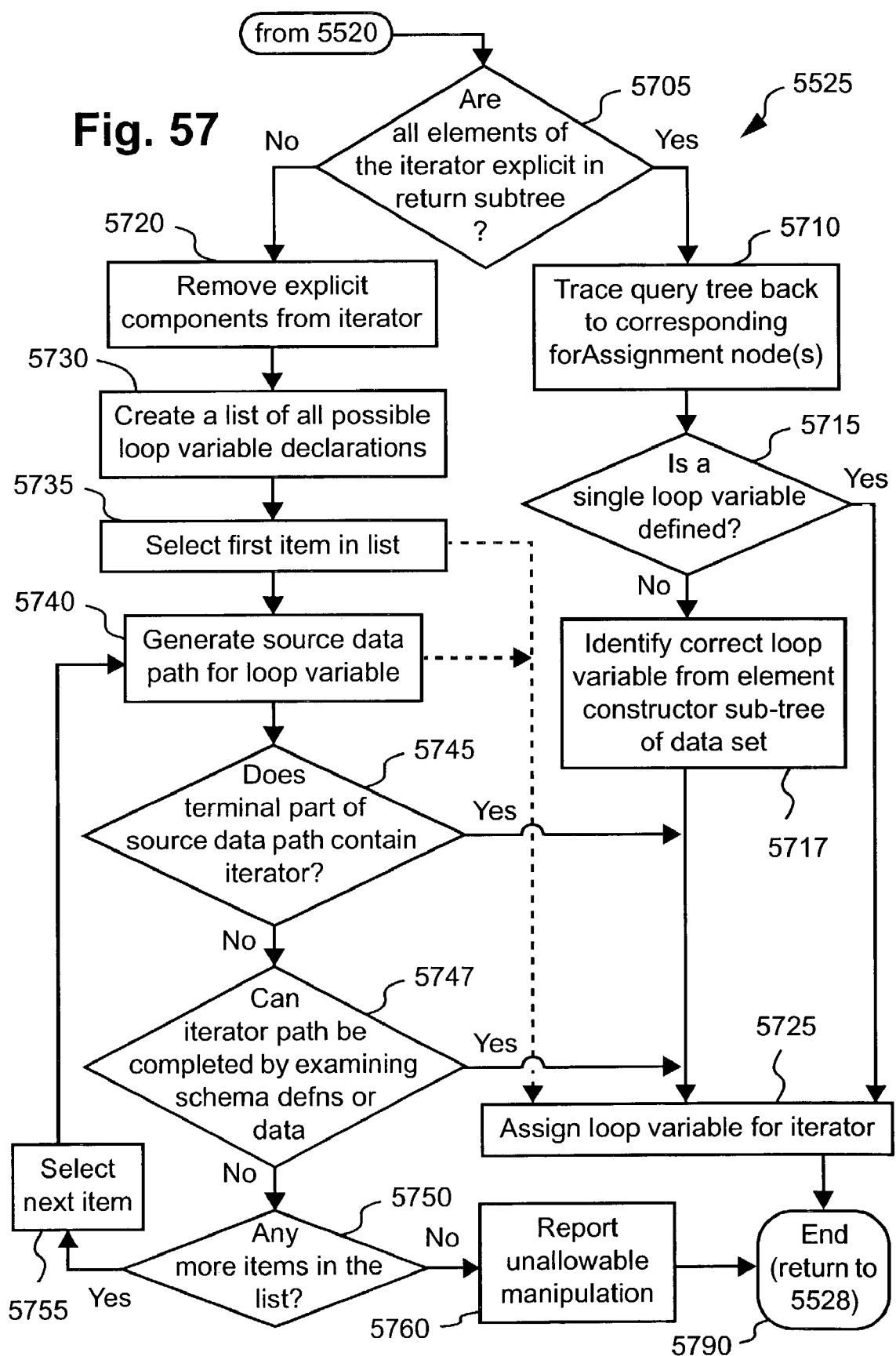
FIG. 57 is a flowchart of the process for determining a loop variable for a data set iterator as indicated by step 5525 of FIG. 55.

The process of determining the loop variable, which corresponds to the iterator for a data set, being step 5525, is now described further with respect to FIG. 57. In general, there are three cases to consider: (i) the data set's iterator is explicitly defined in the return sub-tree; (ii) the data set's iterator is defined via a variable in the return sub-tree; and (iii) the initial part of the data set's iterator is explicitly defined in the return sub-tree. The first and third cases can occur when all or part of the iterator's path is explicitly defined as tags in the return sub-tree of the XQuery (ie. when elements are explicitly constructed in the return sub-tree of the XQuery expression using XQuery's element constructor expressions). The first case is true for the target query depicted in FIG. 59, where the provided iterator, Project is explicitly located as a descendent node 5915 of the elementconstructor node 5910. The second case can occur when the iterator is implied by a variable node. For example, in the case of the source query, the return sub-tree 5805 has a variable node 5806 with the value of $p 5810.

As seen from FIG. 57, if all the elements of the iterator are not explicitly defined in the return sub-tree in decision 5705, then control passes to step 5720 where any initial elements of the iterator which are explicitly defined are removed from the iterator's path. This will be the case where element constructors have been used to wrap the results of a query. Then, in step 5730, a list of all possible loop variables (and their associated iteration operations) is compiled for the XQuery expression. This involves locating all iteration operations (as defined by letAssignment and forAssignment nodes) for the query and creating a list item for each one. So for the source data set in this example, there is just a single loop variable, $p.

In step 5735, the first item in this list is selected for processing. Preferably, if a single loop variable is identified in step 5730 then control passes to step 5725, this being depicted by the dashed lines in FIG. 57. Otherwise, in step 5740 the source data path for the iteration operation is generated by parsing the sub-tree of the iteration operation. As mentioned before, the source data path replaces any contained variable names with their values. In the case of the source data set in the source query (ie. FIG. 58), the source data path for the loop variable $p is:

document("http //www.example.com/Projects?/
   ProjectsDB")/ Year[.=2002]/Project.

Figure 59:
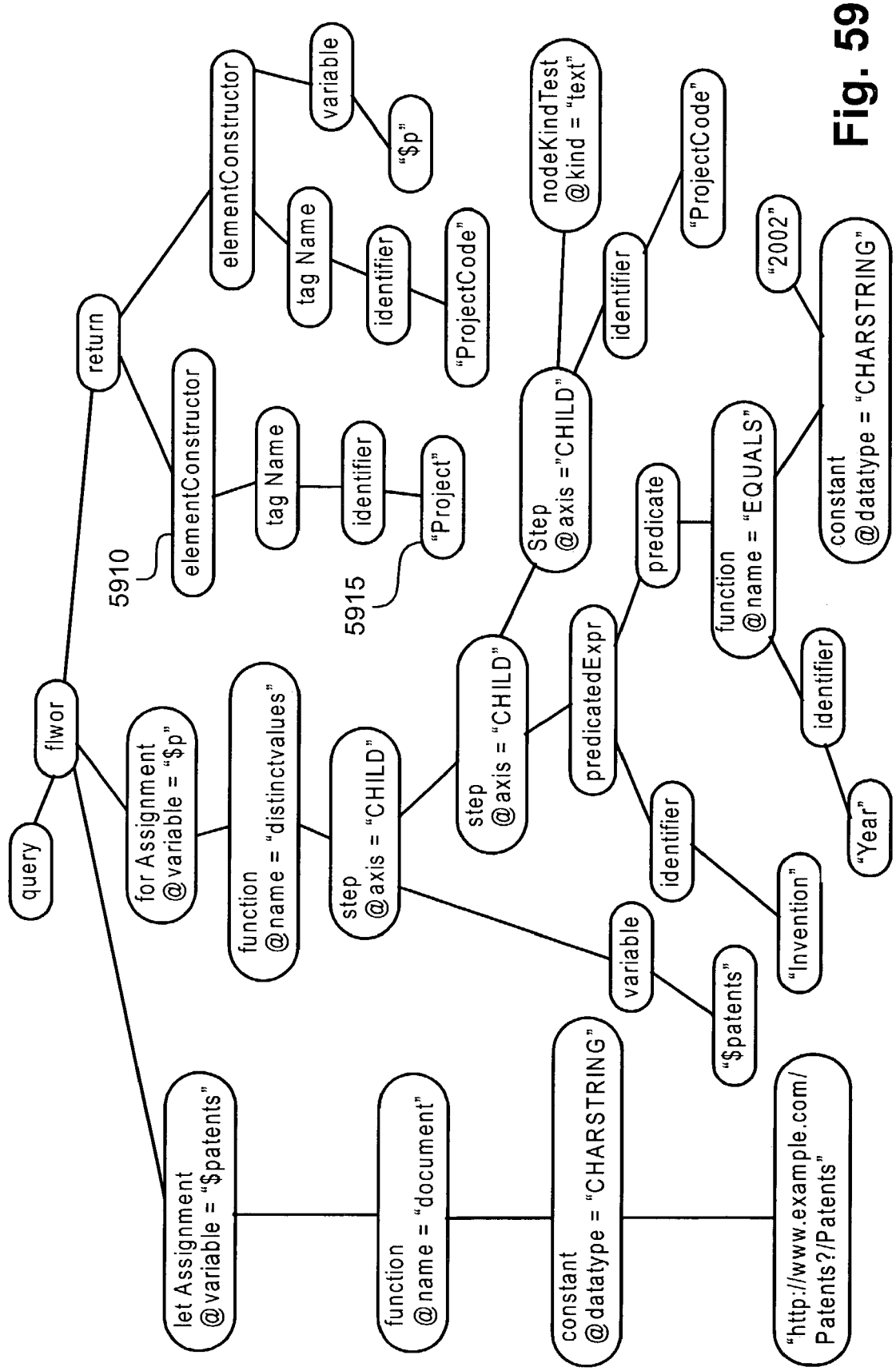
FIG. 59 is an example query tree used to describe the target data view of an example data manipulation process.

The source data path for the loop variable $p in the target query (ie. FIG. 59) is:

distinct-values(document("http://www.example.com/
   Patents?/ Patents")/Invention[Year=2002]/Pro-
   jectCode).

If, in decision step 5745, the terminal part of the source data path contains the specified iterator, then the loop variable associated with the item is set as the loop variable for the iterator in step 5725 and the process ends in 5790. In the preferred arrangement, the source data path is first converted to a skeletal source data path before the substring search is performed. A skeletal source data path is a source data path with all predicate expressions and functions, with the exception of the document function, removed. For example, the above-mentioned source data path for the source data set loop variable, $p, corresponds to the following skeletal source data path:

document("http://www.example.com/Projects?/
   ProjectsDB")/Year/Project.

Use of the skeletal source data path makes the sub-string search quicker and more robust, however step 5745 can also be performed using the source data path as shown in FIG. 57.

If the specified iterator cannot be identified in the source data path for the current loop variable, then control passes to step 5747. A check is performed to see whether the initial part of the iterator exists in the source data path. If so the data browsing application 120 tries to identify descendent elements for that last element detected for the iterator in order to complete the iterator path. Preferably this is achieved by examining the schema definition for the last element of the iterator. This definition should specify any descendent elements for the element of interest. If this is not possible because either schema definitions are not available or do not specify the child content explicitly, then the preferred arrangement examines the data associated with the query to identify descendent elements of the last listed element of the iterator. If the iterator path can be completed in this way then control passes to step 5725 and the current loop variable is assigned to the iterator.

If the iterator path could not be completed then control passes to decision step 5750. If there are more items in the list, then the next item is selected in step 5755 and control returns to step 5740. If no more items are identified in step 5750, then an unallowable manipulation must have been attempted. This is reported in step 5760 and the process ends in step 5790, thereby enabling a return to step 5528 of FIG. 55.

If, in step 5705, all the elements of the iterator are explicitly defined in the return sub-tree then control passes to step 5710. This is the case for the target data set. In step 5710 the query tree is traced back to any forAssignment nodes that correspond to the return node in which the iterator's path was identified (ie. same flwor expression). A flwor expression can have multiple iteration operations, with the results of each operation being bound to a loop variable. In addition, letAssignment nodes dependent on a forAssignment node can define further secondary loop variables. Because return clauses can contain nested flwor expressions, being able to identify the iteration operations that correspond to a particular return clause (and hence flwor expression) of the XQuery expression reduces the search space.

In step 5715, the forAssignment nodes identified in step 5710 are examined. If a single iteration operation (with its binding loop variable) is declared,in step 5715, then control passes to step 5725 where this loop variable to assigned to the iterator and the process ends in step 5790. This is the case for the target data set iterator. If more than one loop variable is declared (ie. the return expression is associated with more than one iteration operation), then control passes to step 5717. In this step the sub-tree associated with the element constructor corresponding to the terminal element of the iterator is examined. If this constructor explicitly contains the path associated with the data set, the correct loop variable can be determined from examining the content of the corresponding element constructor(s). For example, consider the case of finding the loop variable for the data set identified by the iterator and path, Project and ProjectCode, respectively, in XQuery Example 3. The iterator Project is explicitly defined in the return sub-tree. The data set's path corresponds to the ProjectCode element constructor, which is contained in the Project element constructor. The loop variable for this data set can be determined by examining the defined content of the ProjectCode element. In this case it uses the variable $p and hence $p can be assigned as the loop variable for the data set.

Alternatively, the data set may be able to be identified explicitly by its path relative to a variable (eg. $p/Code) within the iterator's element constructor. The final possibility is that a variable in the iterator's constructor contains the path implicitly (ie. the loop variable represents a data set value). If the latter case results and more than one loop variable is possible, then the preferred arrangement resolves the possible loop variables into source data paths and attempts to locate the correct variable by locating the data set's path using the method described for step 5747.

Returning now to FIG. 55, if a loop variable could be identified for each of the source and target iterators in step 5525, control passes from decision step 5528 to step 5530 where the source data paths are constructed for the loop variables. Preferably source data paths, that are constructed during the process of step 5525, are retained for use in this step. If step 5525 resulted in an error then control passes to step 5550 where an unallowable manipulation is reported.

After step 5530, step 5535 operates to update the target query tree, if such is possible. Step 5540 checks if the update was possible and, if not, then the process reports an unallowable manipulation in step 5550 and the process ends in step 5590. If the update is possible, the manipulation is considered allowed, and data from the source data view is copied to the target data view in step 5560. This step results in an update of the XSDOM structure 3130 associated with the target data view. The displayed data view is updated to reflect the result of the.copy and the process terminates at step 5590.

The process of updating the target query tree (step 5535 of FIG. 55) will now be described in more detail with respect to FIG. 56. In step 5602, the skeletal source data paths for each of the source and target loop variables are constructed. Preferably, if these have been constructed during the processing of preceding steps they are re-used. In step 5605, the skeletal source data paths are compared. If they are identical, then control passes to step 5615 where the source data paths are compared. If the source data paths are identical this means that predicate conditions do not vary for the two iterators and therefore the target data set's iterator can be used as is. If the source data paths are identical, then control passes to step 5630 where the source data set is included in the return sub-tree of the target query tree.

Step 5630 can mean copying the element constructor for the source data set from the source query tree to the target query tree and updating the referenced loop variable to be that of the target data set. If, however, the source data set was referenced using a expression involving a loop variable in the source query tree, then this expression is copied to the return sub-tree in the target query and the expression's loop variable is changed to be the same as that of the target data set. In both cases, the source data set is added to the return sub-tree immediately after the target data set. The process then ends in step 5690.

If the skeletal source data paths are identical but the source data paths are not, then there must exist different predicate expressions in the source data paths of the source and target iterators. The predicate expressions define filtering conditions on the data collected for the query and thus depend on the default join method being used. If in decision step 5618, an outer join method is detected then control passes to step 5619. Otherwise control passes to step 5620 where the source data paths are merged into a single source data path. This operation is only possible for the distinct union and inner join methods. The result of step 5620 is at least one new iteration operation for the target query. If possible, a single iteration operation, with a common source data path, results.

If the distinct-union join method is used, then the predicate conditions of the two source data paths are merged to generate the union of results of the individual predicate conditions. Predicate conditions are merged for unions using the following rules:

1. If a given element in the source data path has two different predicates then these predicates are joined with the "OR" function;
2. If a predicate exists for an element in one source data path but not for same element in the other source data path, then the predicate is dropped.

If an outer-join method is detected in decision step 5618, then an inner forAssignment node is created in step 5619 for the source data set. The outer interaction of the target view is left unchanged. Control then passes to step 5630 where the source data set is added to the return sub-tree using the loop variable used by the inner forAssignment node in step 5619.

Finally, if an inner-join method is being used, then the predicate conditions of the two source data paths are merged to generate the intersection of the individual predicate conditions. Predicate conditions are merged for intersections using the following rules:
1. If a given element in the source data path has two different predicates then these predicates are joined with the "AND" function;
2. If a predicate exists for an element in one source data path but not for same element in the other source data path, then the predicate is maintained.

The result of the merging process of step 5620 is a new source data path if the distinct-union or innerjoin methods are used. This new source data path is used for a common iteration operation in the target data view. In step 5625 the forAssignment node is updated with the new source data path. This involves updating, removing or adding predicatedExpr nodes. For example, if in FIG. 58 the predicate merging process required that the predicate on the Year element was to be removed, then the node 5860 would be made a direct child of node 5865 and the remaining nodes of the predicatedExpr sub-tree 5870 would be deleted from the query tree.

If the skeletal source data paths are not identical in step 5605, then it is necessary to identify a join condition in step 5610 that allows the manipulation to proceed. Preferably, the data browsing application 120 stores a list of skeletal source data path pairs that represent joins within and between different data sources. So in the example described in Section 6.0, the following join conditions are registered with the data browsing application 120:
1. document("http://www.example.com/Projects?/ProjectsDB")/Year/Project/Code=document("http://www.example.com/Projects?/ProjectsDB")/Year/ProjectResources/ProjectCode
2. document("http://www.example.com/Projects?/ProjectsDB")/Year/Project/Code=document("http://www.example.com/Patents?/Patents")/Invention/ProjectCode Each join condition represents two join attributes each specified as skeletal source data path. In the preferred arrangement, only join conditions employing an equal operation are considered. These join conditions may have been recorded as a result of a user indicating the join in the workspace by joining two data components by a join symbol 1222 as depicted in FIG. 12B. In alternative arrangements, join conditions could also be learned and recorded by examining the queries of received data views.

In the preferred arrangement, a suitable join condition is identified as one having one join attribute that acts as a sibling or is the same as the source data set and the other join attribute that acts as a sibling or is the same as the target data set. In other words, each join attribute and its related data set values must share a common parent. The preferred arrangement will favour a join condition that maintains a one-to-one relationship between the source and target data set values, if more than one possible join condition is identified. However, one-to-n, n-to-one and n-to-n relationships are also permitted. A one-to-n correspondence between target and source data set values will result if the join attribute of the source data set has a one-to-n relationship with the source data set values and the join attribute of the target data set has a one-to-one relationship with target data set values. N-ary relationships occur when for each join attribute instance there are possibly more than one data set values. Preferably cardinality of relationships is determined by schema definitions, if they exist, or by inspection of the data.

In the described example, the second join condition of the two above-mentioned join conditions represents a valid join condition for the manipulation. The first join attribute of that join condition is a sibling of the values of the source data set which is identified by the following skeletal source data path ie.:

document("http://www.example.com/Projects?/ProjectsDB")/Year/ Project/PatentEstimate.

The second join attribute is exactly matched to the skeletal source data path of the target data set.

If a join condition is not identified for the skeletal source data path pair in step 5610 then the manipulation is flagged as being unallowable in step 5660 and the process ends in step 5690. If a join condition for the pair is identified then in step 5640 a source join path is created for each of the data sets. A source join path is the source data path of the join attribute with the predicate expressions of the data set's source data path, added. So, for the source and target data sets, the source join paths for the described example are:

document("http://www.example.com/Projects?/ProjectsDB")/ Year[.=2002]/Project/Code, and document("http://www.example.com/Patents?/Patents")/ Invention[Year=2002]/ProjectCode, respectively.

In step 5645, the target query's iteration operations are updated. This step depends on what join method is being used (ie. distinct-union, outer and inner join). These join methods are described in Section 6.0.

Figure 60:
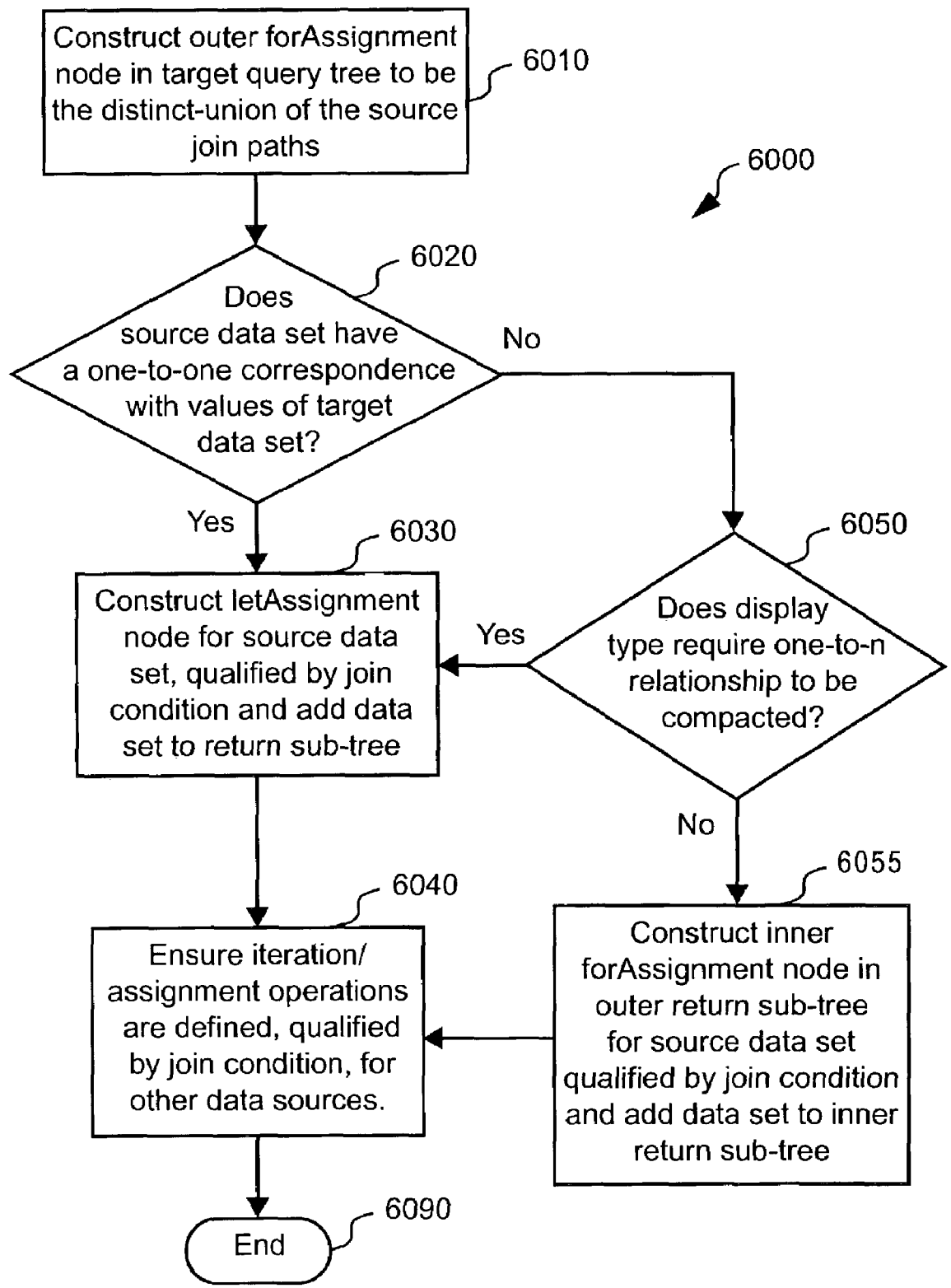
FIG. 60 is a flowchart of the process of updating a target query's iteration operations for the distinct-union join method.

For a distinct-union join, the process of step 5645 is now described with reference to the method 6000 shown in FIG. 60. In step 6010, an outer forAssignment node is created in the target query to iterate through the values generated by the distinct union of the source join paths. Preferably, any redundant distinct-values or distinct-nodes functions are removed from the source join path arguments of the distinct-values function. In decision step 6020, if the source data set is found to have a one-to-n relationship with values of the target data set, then control passes to step 6050. This information can be ascertained from either schema definitions, if they are available, or from inspection of the data. If a one-to-one relationship exists between values of the source and target data sets then control passes to step 6030.

In step 6030, a letAssignment node is created for the source data set. This assignment is qualified by a predicate specifying the join condition (see XQuery Example 3). The data set is also added to the return sub-tree of the created flwor expression. Preferably, the data set is added as an element constructor, however alternative arrangements may specify the data set using an expression involving the loop variable defined by the letAssignment node created in this step. Preferably the process of creating a letAssignment node for the source data set also involves copying the high-level letAssignment node from the source query to define the new data source (in this case the ProjectDB data source). This is not essential, however it makes the generated XQueries easier to understand if each of the data sources involved is clearly identified by a variable.

If, in decision step 6050, the display type does not support a one-to-n relationship (eg. a graph) then preferably the relationship must be compacted using either the count( ) or sum ( ) functions as described previously in the example in Section 6.0 for the PersonMonths data set. Preferably, the sum( ) function is used when the copied data is numerical.

Control then passes to step 6030 and processing continues as for a one-to-one relationship with the exception that the data set is specified in the return sub-tree using the selected compaction function. An example of this is seen with the count( ) function used by XQuery Example 3.

If the display type does support one-to-n data (eg. a table), then an inner forAssignment node is created within the outer return sub-tree in step 6055. This forAssignment is qualified by the join condition in the same way used by the letAssignment node in step 6030. Preferably, a test letAssignment is used to test if values exist for each inner iteration, and if no values exist to generate an empty element constructor for the nested iteration. Control then passes to step 6040.

In step 6040 the process ensures that iteration/assignment operations exist for the other sources of data for the target query (eg. the target data set) in other words, letAssignment and forAssignment nodes may need to be created for one-to-one and one-to-many relationships, respectively. These nodes may already exist if previous joins have been effected. Finally the process terminates at step 6090.

Figure 56:
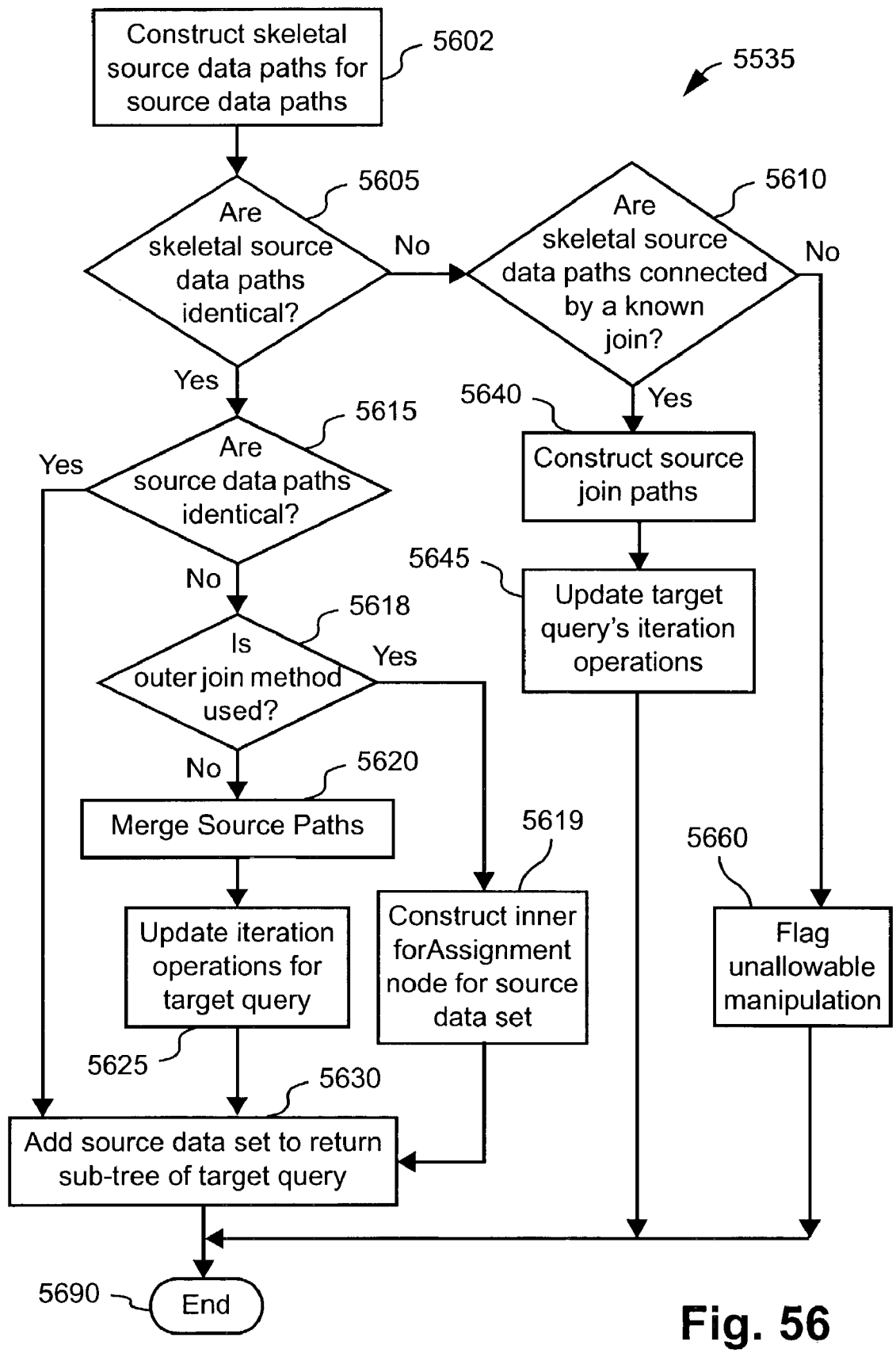
FIG. 56 is a flowchart detailing the process of updating the query tree indicated by step 5535 of FIG. 55.
Figure 61:
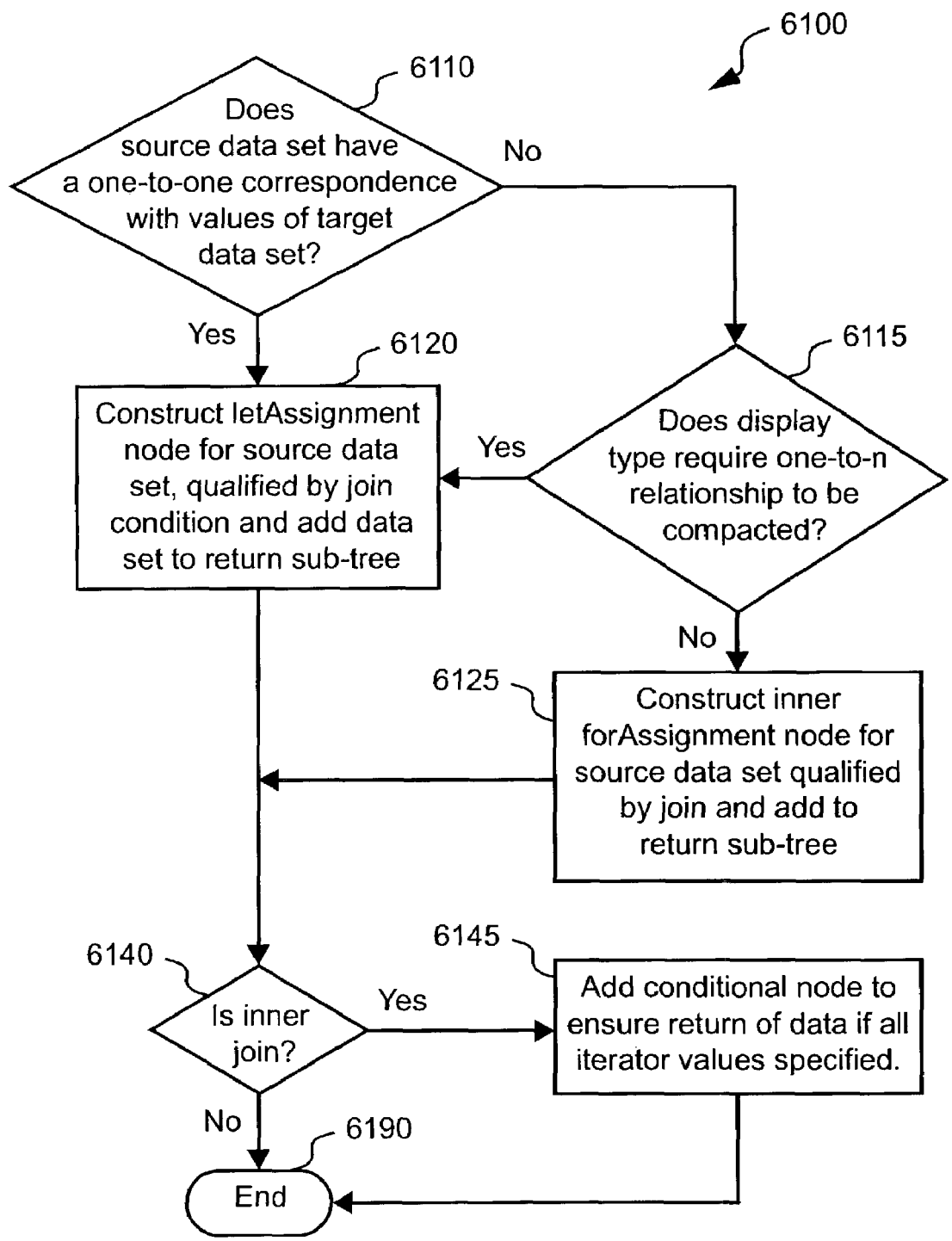
FIG. 61 is a flowchart of the process of updating a target query's iteration operations for the inner and outer join methods.

If an inner or outer join method is being- used in step 5645 of FIG. 56, then the process to update the target query's iteration operation proceeds according to the method 6100 depicted in FIG. 61. In step 6110, if the source data set has a one-to-one relationship with the values of the target data set, then control passes to step 6120. In step 6120 a letAssignment node is created for the source data set, the assignment being qualified by the join condition. The data set is also added to the return sub-tree.

If the source data set has a one-to-n relationship with the values of the target data set, then control passes to step 6115. If the display type requires a one-to-n-relationship to be compacted, then control passes to step 6120, where the resulting letAssignment will result in a list of values for each inner iteration. This list is then operated on by a compaction function in the return sub-tree as described for FIG. 60. If the display type supports a one-to-n relationship then an inner forAssignment node is created for the source data set.

For an inner join the forAssignment node created in step 6125 is added above the outer return sub-tree, however for an outer join this node must be created inside the return sub-tree as described for the distinct-union join method. Preferably the result of the inner iteration in a return sub-tree is first tested for resulting data and if no data exist an empty element is constructed in the returned data. In both of the inner and outer join cases the source data set is added to the return sub-tree. In other words, outer joins result in nested return sub-trees whereas inner joins only require a single return sub-tree. Control then passes to step 6140.

In decision step 6140, if an inner join is required then a conditional node is added in step 6145 to ensure that data is only returned if all iterators have associated values. Alternatively, if a one-to-one relationship exists between the target and source data sets, then this conditional node can be omitted if the letAssignment node created in step 6120 is changed to a forAssignment node (ie. treated no differently to a one-to-n relationship between the target and source data sets). Finally the process then ends in step 6190.

The result of step 5645 for the described example is shown in XQuery Example 6 below. The loop variable $p will contain the results of an iteration through each of the source join paths, with any duplicates removed. That is:

document("http://www.example.com/Projects?/
ProjectsDB")/ Year[.=2002]/Project/Code and document("http://www.example.com/Patents?/Patents")/ Invention[Year=2002]/ProjectCode)

The process depicted by FIG. 56 then ends in step 5690 and control passes back to step 5540 of FIG. 55. The updated query for the target data view is as shown in XQuery Example 6.

XQuery Example 6

```
let $projects :=
    document("http://www.example.com/Projects?/ProjectsDB")
let $patents :=
    document("http://www.example.com/Patents?/Patents")
for $p in distinct-values(
    $projects/Year[.=2002]/Project/Code/text( ),
    $patents/Invention[Year=2002]/ProjectCode/text( )
)
let $proj := $projects/Year[.=2002]/Project[Code=$p]
return
    <Project>
        <ProjectCode> {$p} </ProjectCode>
        <PatentEstimate> {$proj/PatentEstimate/text( )}
        </PatentEstimate>
    </Project>
```

Alternative arrangements could also build into the generated query some resilience to anomalous data. For example, if in XQuery Example 6, the $proj variable contains more than one Project node (ie. there existed more than one project with the same code), then the above query would be unpredictable. The actual resulting behaviour may depend on how a particular XQuery processor was implemented. It is possible to add checking when creating element constructors for the source data set in the return sub-tree. For example, the PatentEstimate element constructor could be inserted such that if multiple Project nodes did result with the same code, then a PatentEstimate element would be constructed for each result as shown below.

```
for $a in $proj
    <PatentEstimate> {$a/PatentEstimate/text( )} </PatentEstimate>
```

7.2 Applying a Filter to a Data View

In the preferred arrangement of the data browsing application 120, the user can specify one or more filters for a data view. Each filter specification can include one or more filter constraints combined with one or more of the Boolean conjunctions AND, OR, or NOT. A filter constraint defines a data component (identified by an XPath expression), a filter operation and a target or value (eg. Salary>100,000, Salary>AvgSalary). Preferably, filters are treated as a property of the data view because they can involve multiple data components contributing to the data view.

Also in the preferred arrangement filters can only involve data components that are specified by the query (ie. are part of the data view). This means predicate expressions in the source data paths of iteration and assignment operations are not treated as filters. Alternative arrangements may permit filter constraints involving data not explicitly fetched by the query. Filters can involve data components that are hidden (ie. returned by the query but not displayed as part of the data view). Hiding data components is described further in Section 7.6.

Preferably, filter specifications can be enabled and disabled by the user. This means that the user can create a set of alternative filter specifications and combine these in different forms for the current data view. This also means that the filter specifications, and their current state must be stored as part of the data view's definition (ie. they are not simply integrated into the XQuery for the data view). In the preferred arrangement, the filters are stored as a list in the data view definition (see Appendix A). Alternative arrangements may not provide for sets of filter specifications in which case the active filter for a data view can be simply integrated into the XQuery in the data view's definition.

Where there are multiple filter specifications for a data view, in preferred arrangements they are combined conjunctively (ie. in an "AND" fashion). Thus the active filter (ie. all the combined enabled filter specifications) for a data view, f, can be represented by an expression tree of the form:

f::=fc ('AND '|' OR '|' NOT' fc)*, where fc represents a filter constraint which is defined by, fc::=XPath op String|Number|XPath op::='equals' |'less-than' |'greater-than' |'not' |'contains' |

'starts-with'|'ends-with'

The XPath argument is the path of the data component path relative to the root node of the data view. The value of the constraint is represented either as a String (ie. XQuery data type of CHARSTRING), Number (ie. XQuery data type of NUMBER) or another data component (ie. XPath expression). In other arrangements, other filter operations and conjunctions may be used. For example, it may not be necessary to limit the combination of individual filter specifications to the conjunction "AND".

Filtering operations typically map to the where clause(s) of XQuery flwor expression(s). Since XQuery expressions can contain more than one flwor expression (eg. nested expressions or a sequence of expressions), an active filter may thus involve the modification of more than one where sub-tree in the query tree. Also, in the preferred arrangement, the user can specify a system preference for filters to be copied with data. So for example, if a data set is copied to another data view, the active filter of the source data view is added to the target data view. This results in a new active filter for the target data view.

Figure 62:
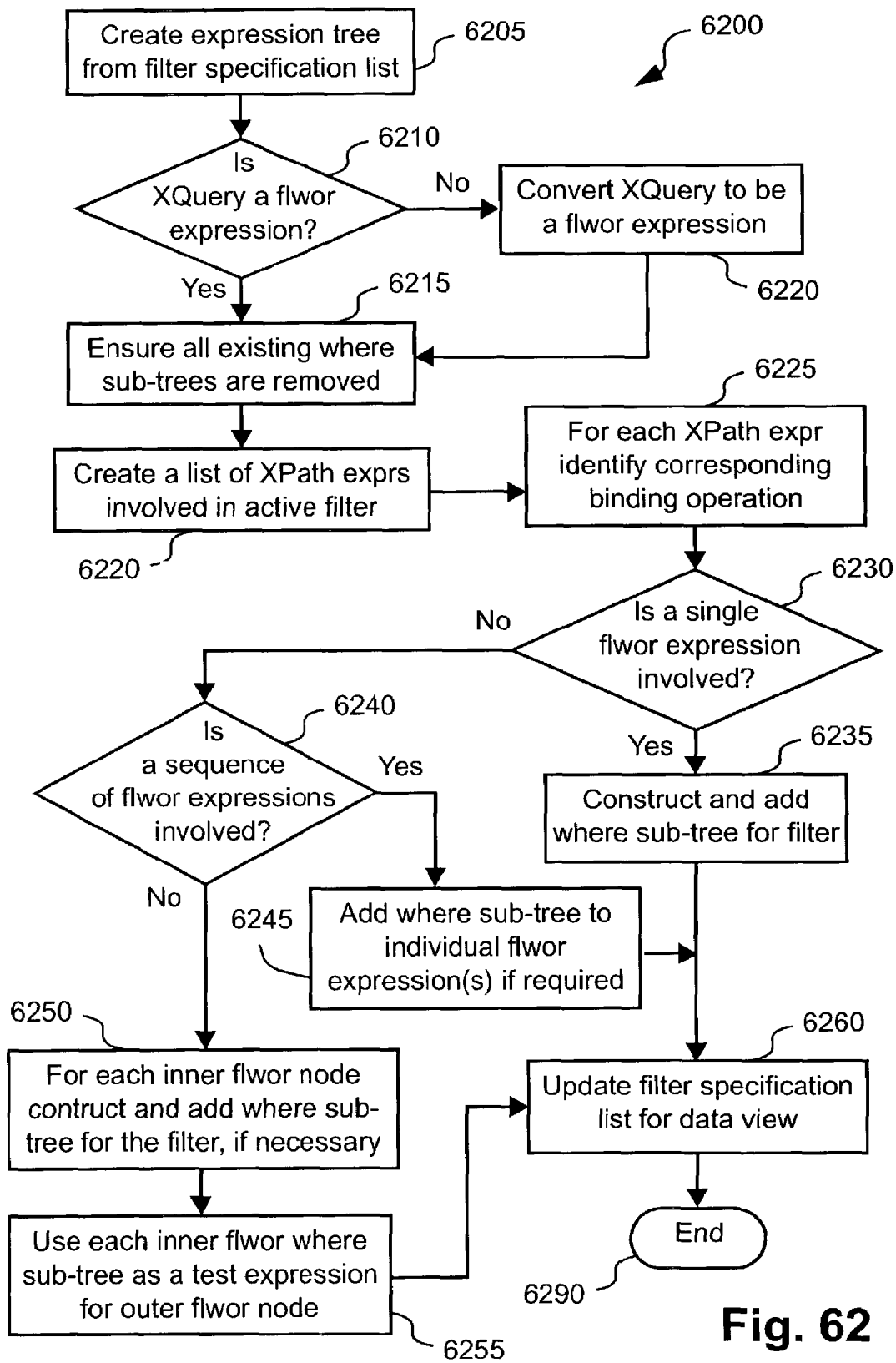
FIG. 62 is a flowchart of the process of updating a filter for a target query.

The process of setting a filter for a data view is now described with respect to the method 6200 depicted in FIG. 62 which is operable as a part of the data browsing application 120. This process is initiated by the user indicating in a GUI, such as shown in FIG. 12A, that a further filter specification is to be applied or an existing filter specification is modified or removed. The modification of an existing filter specification can include a change of state (ie. from enabled to disabled). The process is also initiated whenever a user copies a data component to a new data view with the copy filter preference set. Each of these user-mediated actions results in the list of filter specifications for the current data view being modified. The modified list is passed as a Filter object to the data view manager object 3125 (FIG. 31A) associated with the data view, for which the filter is being altered, using the following method:

void setFilter(Filter f)

The argument f contains a list of filter specifications, with each specification represented as an expression tree of the form described by the EBNF defined earlier in this section and having an associated flag, which defines its state (enabled/disabled). In step 6205 of FIG. 62, the data view manager object 3125 extracts those specifications which are enabled from the list of filter specifications in f and generates a single expression tree for the active filter.

In step 6210 the current query for the data view is examined. If the current query is not a flwor expression (as may be the case if the user is browsing through a data source), then in step 6220 the XQuery is converted into a flwor expression. Although the required filter could be applied by way of adding predicates to the XPath expression, in the preferred arrangement the XPath expression is converted to a flwor expression with a forAssignment node being created for the data path specified by the existing XPath expression (as shown in XQuery Example 5).

Once the query is in the form of a flwor expression, processing can continue at step 6215. In this step all the current where sub-tree(s) are pruned from the query tree. These sub-trees may have been involved in a previous filter operation. This step is performed in the preferred arrangement to ensure that the result of previous filtering operations is removed.

In step 6220, a list of XPath expressions. involved in the active filter is constructed. Each filter constraint will define at least one XPath expression identifying the data component on which a filter condition applies. Some filter constraints may also involve a second (target) data component, the value of which is to be compared to a first data component of the filter constraint. As mentioned before, these XPath expressions are relative to the root node of the data view. Then in step 6225, a corresponding binding operation (ie. as defined using either a letAssignment or forAssignment node) is identified for each of the XPath expressions in the list constructed in step 6225. The identification of the binding operation (and its corresponding binding variable) is achieved substantially as described in Section 7.1 for the copy methods.

If the XQuery contains a single flwor expression, then all the XPaths will correspond to the binding operations explicit in the forAssignment and letAssignment nodes of that expression. Consequently each of the filter constraints should be able to be expressed in the where clause of the flwor expression using the existing binding variables. So in decision step 6230, if the XQuery contains a single flwor expression, then control passes to step 6235 where a where sub-tree is constructed from the expression tree created in step 6205. This process involves locating all the XPath expressions in the expression tree and replacing them with expressions relative to the binding variable(s). For example, when the Project data view is filtered, as described in Section 6.0, the single filter constraint involves the XPath expression Project/Manager. This expression must be changed to be bound to the variable, $p (see XQuery Example 1). On completion of step 6235, control passes to step 6260.

If the XQuery contains more than one flwor expression then control passes to decision step 6240. Multiple flwor expressions can be combined in a sequence (eg. a list of expressions) or nested. In the nested case, because the individual filter constraints can be combined either conjunctively or disjunctively, it is not sufficient to treat the constraints as separable (ie. just applied to their own flwor expressions). Sequences of expressions can be treated as separable because the individual flwor expressions are essentially independent of each other. If in step 6240 a sequence of flwor expressions is detected, then control passes to step 6245. In this step each individual flwor expression is examined and, if one or more data components involved in the active filter arise from that flwor expression, then a where sub-tree is created for the part of the active filter that applies to the expression. Control then passes to step 6260.

In step 6250, the data view manager object 3125 inspects each of the inner flwor expressions. The data view manager object 3125 first ascertains whether any filter constraints of the active filter involve the inner flwor expression. If not then control passes to step 6255. If it does, then a where sub-tree must be constructed for the entire filter f and added to the inner flwor node. In this sub-tree the XPath expressions for data components must be replaced by expressions involving the binding variables (eg. loop variables of the inner and perhaps outer flwor expressions). Control then passes to step 6255. If there are multiple inner flwor nodes, then step 6250 is performed for each inner flwor node.

In step 6255 the filter must now be applied to the outer flwor expression. Preferably if none of the filter constraints involve this iteration operation, then it is not necessary to apply the filter at this level and control can pass to step 6260. If filter constraints do involve data components obtained via the outer iteration operation, then a where sub-tree must also be added to this flwor node. However, this where sub-tree must represent the entire filter and therefore may need to refer to data components that are obtained by the inner iteration operation. For this reason, it is necessary to add a test iteration within the where sub-tree of the outer iteration operation. This test iteration basically performs the inner iteration for the purposes of the filter. The test iteration can be created by copying the inner iteration, changing the loop variable of the iteration to use a variable not previously used by the query, and then applying the XPath 2.0 exists( ) function. A where sub-tree can then be constructed using the test iteration and added to the outer flwor node.

In general, it is not possible to de-nest the iteration operations (ie. move the inner forAssignment sub-tree to be outside of the outer flwor node's return sub-tree) because this will affect the grouping of the resulting data. Also if an XQuery contains multiple levels of nesting, then steps 6250 and 6255 must be performed for each parent-child pair. Finally, in step 6260 the filter specification list contained in the Filter object is then stored for the data view and becomes part of the data view's definition. The process ends in step 6290.

The process of FIG. 62 will now be discussed with reference to an example. Consider the following query, which uses the ProjectsDB data source described in Section 6.0.

XQuery Example 7

```
let $projects :=
    document("http://www.example.com/Projects?/ProjectsDB")
for $p in $projects/Year[.=2002]/Project
return
    <Project>
        <ProjectCode> { $p/Code/text( ) } </ProjectCode>
        <ProjectName> { $p/Name/text( ) } >/ProjectName>
        for $r in $projects/Year[.=2002]/ProjectResources[ProjectCode=
        $p/Code]
        return
            $r/EmployeeID,
            $r/PersonMonths
    </Project>
```

The data obtained using this query could be presented, using the method described in Section 5.0, as a table with four columns of data (ProjectCode, ProjectName, EmployeeID and PersonMonths) where there is a one-to-n relationship between the first two data sets and the last two data sets. The user may have specified an active filter of the form (Project/ProjectName starts with "D" OR Project/PersonMonths>6).

In this case, in step 6220 the XPath expressions Project/ProjectName and Project/PersonMonths are associated with the binding operation using variables $p and $r respectively. Since there are two flwor expressions involved in step 6230, control passes to step 6240 and then to 6250 because the query does not involve a sequence of flwor expressions.

In step 6250, it is necessary to construct a where sub-tree to the inner flwor expression in order to effect the entire filter constraint (ie. the active filter involves the data component, Project/PersonMonths). The XPath expressions in the filter are replaced with the relevant binding variables. In this case, the XPath expressions Project/ProjectName and Projec/PersonMonths correspond to the expressions $p/ProjectName and $r/PersonMonths. The constructed where sub-tree is added to inner flwor node and control passes to step 6255.

Since the filter also involves a data component that is obtained via the outer iteration operation, a where sub-tree must also be added to this flwor node. However, this sub-tree must reference the data component Project/PersonMonths that is obtained via the inner iteration operation. Consequently a test iteration must be constructed for the outer iteration's where sub-tree. This is constructed by copying the inner iteration, complete with its constructed where sub-tree, replacing the loop variable with a new variable that has not been used in the query, and then applying the XPath exists( ) function to the result of the iteration. The constructed where sub-tree is then added to outer flwor node. The resulting filtered XQuery is shown below in XQuery Example 8.

In this example, the nested iteration must be repeated in order to preserve the grouping of the returned data. For example, in the data returned by XQuery Example 6, it would not be possible to move the inner iteration above the return node because it would affect the grouping of the data. Each Project element can have multiple EmployeeID and PersonMonths child elements. If the inner flwor node was moved outside of the outer flwor node's return sub-tree, each Project element would have at most a single EmployeeID and PersonMonths child element. In other words although the data actually returned would be the same, the one-to-n grouping of the data would be changed.

XQuery Example 8

```
let $projects :=
    document("http://www.example.com/Projects?/ProjectsDB")
for $p in $projects/Year[.=2002]/Project
where exists(for $x in
    $project/Year[.=2002]/ProjectResources[ProjectCode=$p/Code]
    where $p/ProjectName starts-with "D" OR $x/PersonMonths > 6
    return $x
)
return
    <Project>
        <ProjectCode> { $p/Code/text( ) } </ProjectCode>
        <ProjectName> { $p/Name/text( ) } >/ProjectName>
        for $r in $projects/Year[.=2002]/ProjectResources[ProjectCode=
        $p/Code]
        where $p/ProjectName starts-with "D" or $r/PersonMonths > 6
        return
            $r/EmployeeID,
            $r/PersonMonths
    </Project>
```

Although the preferred arrangement can result in some redundancy (eg. the inner where sub-tree could be modified to include only those filter constraints pertaining to the inner iteration operation), the method does not require a specific process for each of the different conjugations of the filter and therefore is readily applied in a general sense. The method described with reference to FIG. 62 can be used for queries representing distinct-union, outer or inner joins.

Filters can be removed from a data view by simply calling the setFilter(Filter f) method with an empty Filter object. In this case, any where sub-trees in the query are simply removed as described for step 6215 in FIG. 62.

7.3 Specifying a Sort Order for a Data View

In the preferred arrangement the sort sequence for a data view can be set in either ascending or descending order of a particular data set. Preferably a single sort sequence is permitted for a data view. This may be achieved using the GUI, such as shown in FIG. 12A, by the user selecting the data set to be sorted, then choosing the Sort option on the contextual menu 1292 and specifying either ascending or descending order. Alternative arrangements could permit sort sequences involving more than a single data component to be specified without departing from the scope of this disclosure.

When the user specifies a desired sort order, a call is made to the following method of the data view manager object 3125 (FIG. 31A) associated with the relevant data view:

setSortBy(DataSet dataSet, SortDirection direction), where the dataSet argument is as defined in Section 7.1 and the direction argument is set to either ascending or descending.

The data view manager object 3125 first ensures that the query is in the form of a flwor expression as described in Section 7.2 for a filter operation. The data view manager object 3125 then updates the query tree associated with its data view to insert an orderBy node and associated sub-tree in the flwor expression, which defines the iteration operation required by the specified data set. Existing orderBy nodes in the query are removed. Alternative arrangements could allow multiple orderBy nodes to exist for the data view.

Figure 63:
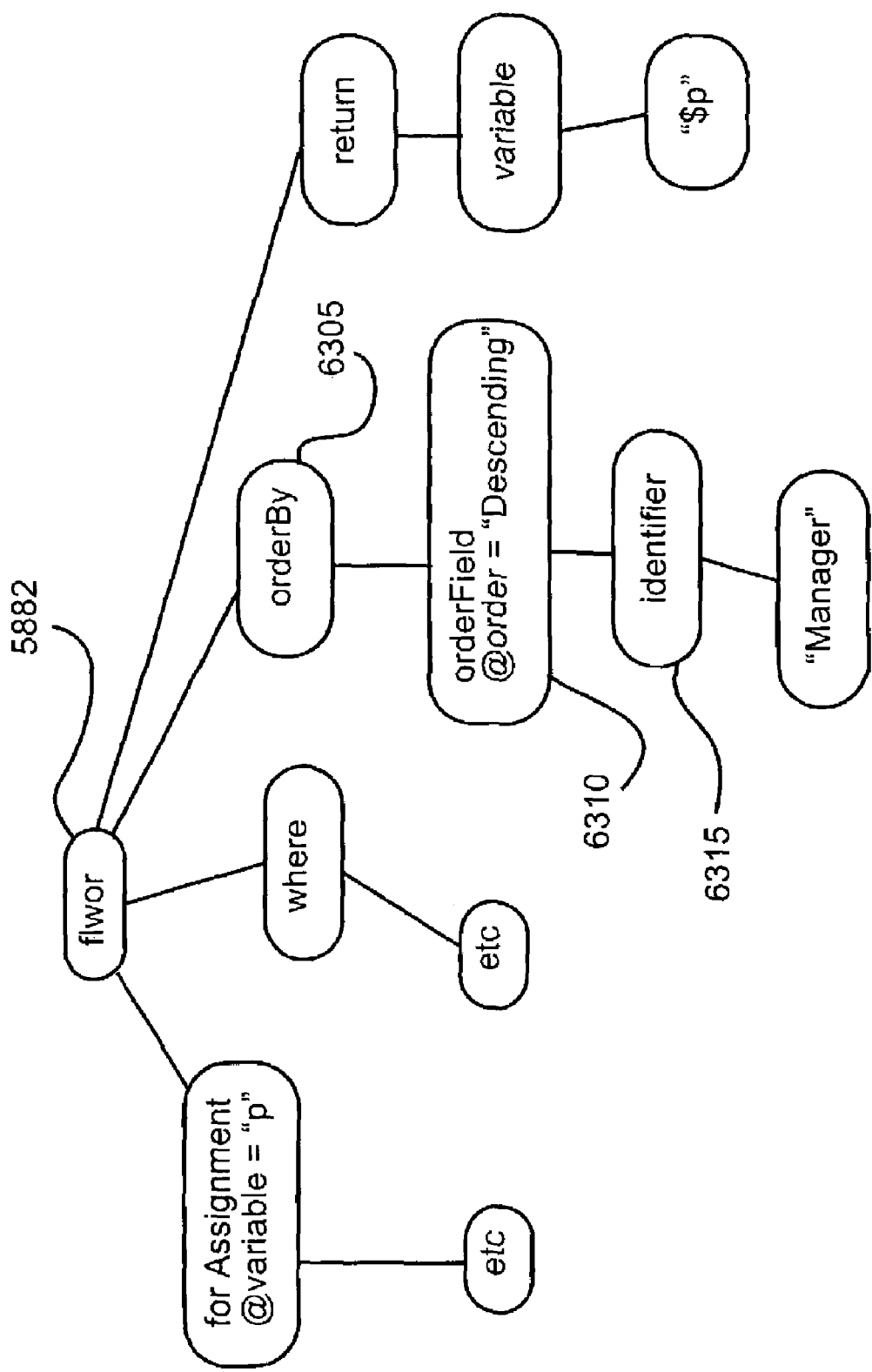
FIG. 63 is an example of a query tree having a specified query sort order.

FIG. 63 shows an example of a query having a specified sort order indicated by node 6305. An orderBy node must contain one or more orderField nodes 6310. Each orderField node specifies the data that is to be ordered and the order (ascending or descending). In order to create an orderBy node and its associated sub-tree, the data view manager object 3125 must be able to identify the flwor expression 5882 that defines the iteration operation used by the data set.

The iterator associated with the selected data set can be used to identify first the corresponding loop variable and hence relevant flwor expression, as described in Section 7.1. The path of the data set with respect to the loop variable can then be determined. A new orderBy node and it descendent nodes can then be added to the relevant flwor expression.

For example, if in FIG. 12A the user had selected the Manager column of the table and selected to sort the data view in descending order for that column, then the above method would be called on the data view manager object 3125 associated with that data view. The dataSet argument would have an iterator of Project and a path of Manager.

The method described in Section 7.1 can be used to determine that the loop variable for this data set is $p. This implies that the identifier for the order by expression is simply the path, Manager. The one or more child orderField nodes of an orderBy node specify the identifier relative to the loop variable of the identified flwor expression.

So, in the case of the example, the data view manager object 3125 would insert a orderBy node 6305 as shown in FIG. 63. This figure shows the flwor expression 5882 of FIG. 58. The orderBy node 6305 is inserted under the identified flwor node 5882 in FIG. 58. A orderField node 6310 in then added with an identifier child node 6315 which specifies the data set values, relative to the iterator, which are to be sorted.

After updating the query tree, the data view manager object 3125 then updates the data to reflect the new sort sequence. Preferably, this is achieved by sorting the data that has already been fetched for the query. However, it is also possible for the data view manager object 3125 to re-fetch the data for the query and thus use the functionality of data servers to perform the processing associated with the sort operation.

7.4 Performing a Transformation Operation.

Transformations are mapped to functions, which are built into the XQuery expression. In the preferred arrangement, a GUI such as shown in FIG. 12A allows users to specify transformations to apply to a selected data set or to combinations of selected data sets. Combination operations are described further in Section 7.5. Further preferably, transformation and combination manipulations are only permitted for data sets, however it should be clear that the concept could also be applied to data nodes without departing from the scope of the present disclosure.

For example, a user might select the Manager column of the Project data view shown in FIG. 12A and select to apply the function toUpperCase( ) to the data. Preferably this action would be achieved using the example-based method described in Sections 3.0 and 4.0. Alternatively, the user could select the toUpperCase( ) function from a provided list of functions.

Preferably a user's indication to perform a transformation results in the data view manager object 3125 (FIG. 31A), associated with the data view being manipulated, being called to perform the desired transformation and update the query and the associated data. In the preferred arrangement one of the following methods is called on the data view manager object 3125:

1. void transform(DataSet dataSet, Transform transform)
2. void transform(String newName, DataSet dataSet, Transform transform, boolean createMapping, boolean removeSource)

The first method is used when the user wishes just to transform some displayed data in place. In this case the data set is not renamed and a mapping cannot be generated for the transformation. The second method is required if the user desires to generate a copy of the data set to contain the transformed data, assign a new name to the transformed data, and/or create a mapping based on the transformation.

The dataSet and transform arguments specify the data set to be operated upon and the transform type that is to be performed, respectively. Arguments required for the transform (eg. see Table 1) are contained within the transform argument object. If the second method is used, the newName argument should contain the name to be used for the transformed data, if it is to be renamed. The Boolean flag createMapping informs the data view manager object 3125 whether it needs to create a mapping based on the transform. The final argument of the second method, the removeSource flag, should be set to false if the original data is to be preserved. The default for this flag is to remove the source data for the transform.

When processing a transform( ) call, the data view manager object 3125 uses an available library of XQuery functions. These library functions use internal XPath functions wherever possible (eg. upper-case($in) in XQuery Example 9). The data view manager object 3125 identifies the necessary function from the library and then inserts the function's definition into its data view's query tree (see Example XQuery 9 below). Note, that as with filter and sort operations, the data view manager object 3125 must first ensure that the query is in the form of a flwor expression. The data view manager object 3125 must then apply the function to the correct data set in the return sub-tree of the query tree. This means that the function must identify the dataSet identifier in the return sub-tree. This is done in substantially the same way as described for the copy, filter and sort operations described in Sections 7.1 to 7.3. The resulting XQuery for the described example is shown below in XQuery Example 9.

XQuery Example 9

```
define function toUpperCase(xsd:string $in) return xsd:string
{
    return upper-case($in)
}
<Data>
    let $projects := ("http://www.example.com/Projects?/ProjectsDB"
    for $p in document($projects)/Year[.=2002]/Project
    return
        <Project>
            $p/Code
            <Manager> {toUpperCase($p/Manager/text( )) }
            </Manager>
        </Project>
</Data>
```

If the second method is used with a specified newName argument, then an element constructor with a tag name of newName is added to the return sub-tree of the query. The content of this new element will be the result of applying the function to the original data (as shown above in XQuery Example 9). The Boolean value of the removeSource flag will specify whether the original data set should be removed from the return sub-tree. If the createMapping flag is true, then a mapping will be stored for the data view as described in Section 11.0. Another user, receiving this data view would be able to choose whether he/she wanted to import the mapping for further use. In other words, the mapping can represent a re-usable transformation that can be shared with others.

Nested transformations can be performed by making repeated calls to the above-described methods.

7.5 Performing a Combination Operation.

Data manipulations involving combinations of data components can also be processed by the data view manager object 3125 for its associated data view. These combinations may or may not also involve transformations. Typically, combinations of data components result in new element constructors in the query trees. Like transformation operations, the data view manager object 3125 must first ensure that the query is in the form of a flwor expression as described for filter operations in Section 7.2.

In the preferred arrangement, the user can indicate a combination is required by selecting two or more data sets in a data view (eg. columns in a table) and then choosing the combine option on the contextual menu 1292. Alternatively the user can select to combine two data sets as he/she is dragging new data into the data view as described previously with reference to FIGS. 13A to 13C. Preferably, the user can define the desired combination using the example-based approach described in Sections 3.0, 4.0 and 6.0. Alternative arrangements may require the user to specify the combinations functionally. The resulting request for a combination operation may involve one or more binary or n-ary operations, as described in Sections 3.0 and 4.0.

In the preferred arrangement, combinations are processed by calling one of the following methods on the data view manager object 3125 of FIG. 31A associated with the data view being manipulated.

1. void combine(String newName, Operation op, DataSet ds1, DataSet ds2, boolean createMapping, boolean removeSources)
2. void combine(String newName, Operation op, DataSetList dataSetList, boolean createMapping, boolean removeSources)

A combination operation, involving a series of transforms and binary and/or n-ary operations, is preferably broken up into its integral operation components and individual calls are made to the transform(.) method(s) and the above two combine(.) methods. Operations are performed on a left to right basis as described previously in Sections 3.0 and 4.0.

Each combination operation can be associated with an optional newName argument. If provided this argument will be the name of the element created in the XQuery to hold the result of the combination. If it is not provided (ie. null) then the name of the first data set will be used. An error results if the Boolean flag removeSources is false and a newName is not specified. This is because the resulting XQuery will have two elements with the same name and possibly the same namespace. The default value for the removeSources flag for combinations is true.

For binary operations, the first method should be used with the op argument specifying the desired operation. The binary operations supported by the data browsing application 120 are listed in Section 3.0. That list may be supplemented to contain further or different operations from those listed for the preferred arrangement. The data set arguments, ds1 and ds2, refer to the data sets on which the operation is being performed.

For n-ary operations, the second method should be used. As for binary operations, the op argument defines the desired operation that is to be performed on all the data sets in the dataSetList argument. The list of n-ary operations supported by the data browsing application 120 are listed in Section 3.0. As with binary operations, it should be clear that this list could contain further or different operations.

Mappings can also be created for combinations, just as they can for transformations. If the createMapping flag is set to true then the data view manager object 3125 will create a mapping for the combination as described in Section 7.4.

7.6 Hiding a Data Component

In the preferred arrangement the user is also able to "hide" a data component of a data view. This means that data for the data component is still collected as part of the query, however the data is ignored for presentation purposes. Preferably the user hides a data component by first selecting the data component in the GUI 1200 and then selecting the Hide option from the contextual menu 1292. This action results in the following method being called on the data view manager object 3125 of FIG. 31A associated with the data view in which the data component exists:

void hide(DataComponent dc)

The dc argument can represent a data node, data set or data series.

The process of hiding a data component is now described with reference to FIG. 64. In step 6405 the data view manager object 3125 of FIG. 31A examines the query associated with its data view. If the query is not a flwor expression, then, according to step 6410, the query is converted to a flwor expression as described with reference to XQuery Example 5 and step 6220 of FIG. 62. Control then passes to decision step 6415. If, in step 6415, the data component to be hidden is represented by an element constructor in the return sub-tree of the flwor expression, then control passes to step 6425. If this is not the case, then in step 6420 an element constructor is created to represent the data component. This step may be required if the data component was being previously obtained from attribute constructor or derived from a variable addressed element or attribute.

In step 6425, the data view manager object 3125 generates an attribute constructor for the hidden attribute, if it does not already exist, and the value of this attribute is set to true. The hidden attribute is defined to exist for a namespace, associated with the data browsing application 120, and therefore should not conflict with other data components used by data sources. The process then ends in step 6490.

The data view presentation processing described in Section 5.0 effectively ignores data components marked as hidden. The user can select to view hidden data components by selecting the View Hidden Data Components option of a data view's contextual menu 1292. This results in the data view being presented with all data components displayed. The user can then use the View Hidden Data Components option as a toggle to view the data view without hidden data components displayed.

A hidden data component can be made visible (ie. unhidden) by the user selecting a displayed hidden data component in the GUI 1200 and then selecting the Set Visible option from the contextual menu 1292. This action results in the following method being called on the relevant data view manager object 3125:

void unHide(DataComponent dc)

The data component indicated by the argument dc is have its' hidden state removed. Preferably this method sets the value of the hidden attribute for the data component to be false in the return sub-tree of the query. Alternative arrangements could remove the attribute from the data component's element constructor. The data view presentation process is performed again, resulting this time in a data view including the specified data component.

When hidden data component(s) are presented as part of the data view the presentation process, described in Section 5.0, may result in a different set of allowable display types. Preferably the display type used to present the data is not changed from that display type used before the Set Visible or View Hidden Data Components actions were initiated by the user.

7.7 Renaming a Data Component

Data components can also be renamed. In the preferred arrangement the user can select a data component in the GUI 1200 of FIG. 12A (eg. a column of a table, a grid unit, etc.) and alter the name of the data component. This results in the following method of the data view manager object 3125 of FIG. 31A associated with the data view being called.

void rename(String newName, DataComponent dc,
        boolean createMapping)

Since a data node, data set and data series are all specialisations of a data component (see Section 2.0), then objects of these types can be passed as arguments.

As with previous methods described, the data view manager object 3125 must first locate the data component in the result sub-tree. This method may need to interrogate the data component for its type (ie. data node, data set or data series) in order to locate the correct identifier in the return sub-tree.

Once located, an element constructor, with a tagName having the identifier specified by the newName argument, is added to the return sub-tree and the element corresponding to specified data component removed. The content of the data component is unchanged by the rename operation. If the data component was previously represented by an element constructor (rather than a path with respect to a variable), then preferably the name of the element constructor is simply modified. In other words, the data view manager 3125 just needs to change the name of the tagName node in the return sub-tree.

If the newName argument does not conform to the requirements of a tag identifier (eg. it contains spaces), then preferably the data view manager object 3125 creates an attribute constructor for the dcname attribute, in the located element constructor for the data component. It sets the value of this attribute to that of the newName argument. As with the hidden attribute, the dcname attribute is defined to exist for a namespace, which is associated with the data browsing application 120.

As with transformations and combinations, rename operations can also be saved as mappings.

8.0 Alternative Methods for Creating New Data Views using the Semantics of a Selected Display Type and Keywords The creation of new data views is often made difficult by the fact that the user creating the data view does not know of data sources which may have information which is relevant to his or her task. The graphical method described in Sections 6.0 and 7.0 of this disclosure relies on the user having access to existing data sources and data views. Preferably his or her knowledge of data sources and appropriate mappings is enhanced by the exchange of data views with other users. This section describes a method of recommending data components to the user for use within a data view. This method of recommending uses a central recommending services that stores information about generated data views and data sources. The described recommendation method uses the semantics of a selected display type and keywords to deliver sensible recommendations to the user.

A computer-implemented method that allows novice users to visually create new data views across heterogeneous data sources may be performed by a process 1490, forming part of the data browsing application 120, the process 1490 being described with reference to the flow chart in FIG. 14. In step 1400, the process 1490 detects a user selection of a display type from a list of allowed display types. This may be performed using a GUI in a manner similar to the arrangements described above. The display types are visual representations used by the data view and in the preferred arrangement includes tables, bar charts, line graphs, pie charts, scatter plots, 2D grids and trees. Other display types may alternatively be used as desired. Each display type is associated with one or more display templates. For instance, a bar chart display type may be associated with a 2D bar chart template, a 3D bar chart template, and so on. Each display template has its own style specification. The display templates are then displayed to the user via the GUI as indicated in step 1405. The user then selects one display template which is detected by the process 1490 in step 1410, and which is used for the new data view. Preferably, a display type is associated with a default display template and on selection of a display type, the default display template is automatically selected.

Figure 15:
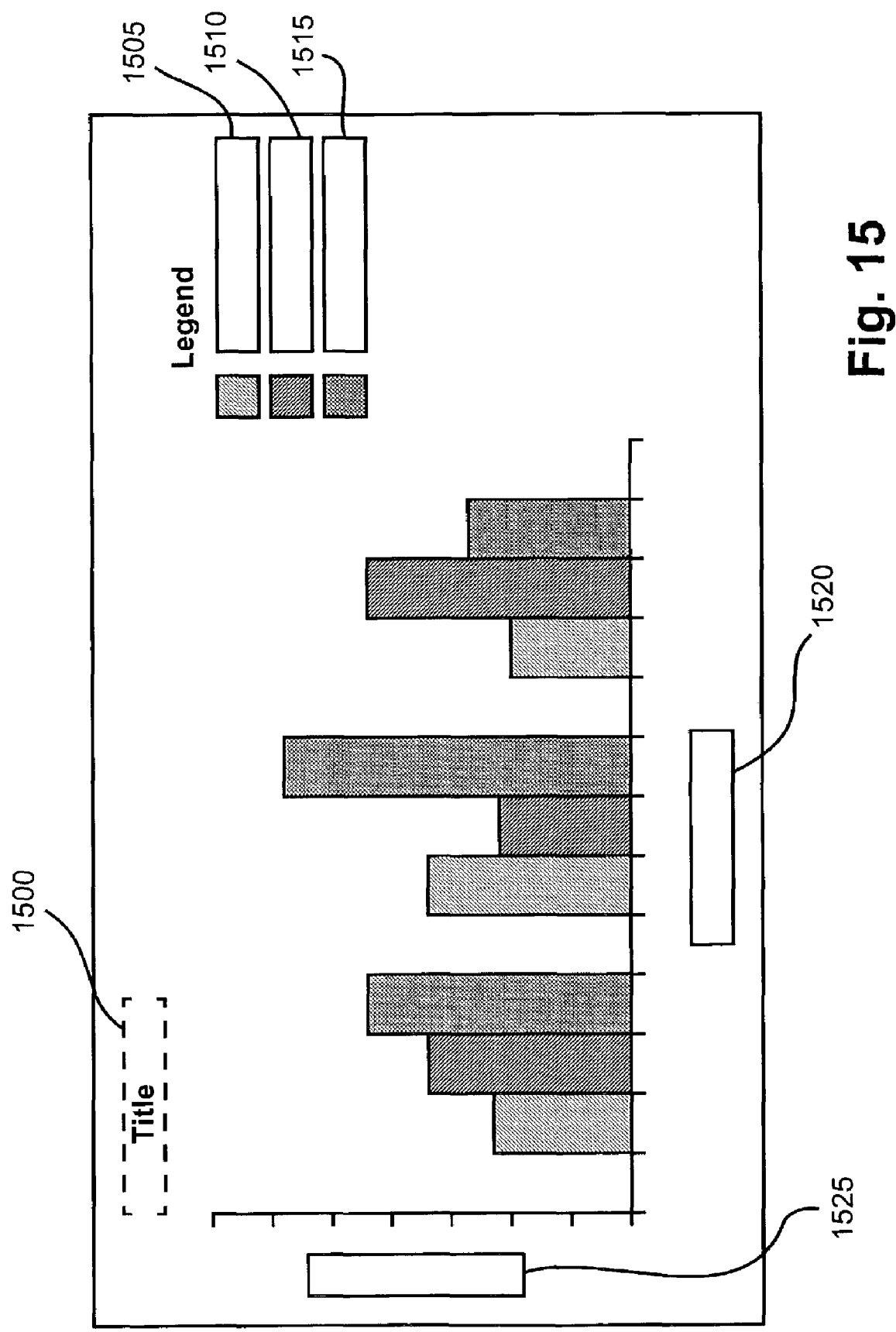
FIG. 15 is an example of a display template for a bar chart display type.

FIG. 15 is an example of a display template for a bar chart display type. The display template contains a plurality of data component slots 1505 to 1525. The data components must be specified for these slots in order to create a new data view. The data component slots are related according to the semantics of the selected display type. For example, in a graph, a data component associated with the y-axis must have a point-wise correspondence with the data component associated with the x-axis. Each display type is thus associated with a particular set of semantics. The particular sets of semantics are described in detail later. The display templates also contain one or more descriptive slots, such as 1500 shown in FIG. 15, for which the user can supply text. These slots can be identified to the user, and thus differentiated from data component slots, by shading or some other means such as a broken border as shown in FIG. 15. Preferably, the role of the data component and descriptive slots 1500-1525 is displayed when the cursor is placed over the slot (eg. Title, etc.) by user manipulation of the mouse pointer 1103. Also once a data component is specified for a slot, the user can preferably then modify the displayed text for the slot.

In step 1415, the process 1490 detects a user selection of one or more data sources from a list of known data sources. The process 1490 then creates and displays a schema view for the selected data sources in step 1420, substantially as described in Section 2.0. In an alternative implementation, the process 1490 may be configured so that the steps 1415 and 1420 are performed before step 1400. In step 1425, the process 1490 detects a user specification of one or more data components to be included in the data view. The user may cause this to occur by dragging each of the data components from the schema view created in step 1420 to the data component slots of the new data view. Each selected data component is associated with a slot in the template. Alternatively, the user can select data components from existing data views and copy these data components into template slots. This process is described in Section 6.0.

In step 1430, the process 1490 operates to detect a user request of the data browsing application 120 to provide a list of recommendations for other data components that may be relevant to the data view being created. According to the one or more specified data components and the semantics of the selected display type, the process 1490 then provides in step 1435 a list of recommendations for one or more unspecified data components of the new data view. The data source recommendations are displayed within a schema view in step 1440. The schema view serves to show the context of the recommendations. Preferably this context includes the data source root so that the user can identify the data source of the recommendations.

The data component recommendations are highlighted in the schema view created in step 1440. The user can then select data components for the unspecified data component slots from this schema view, the selection action being detected by the process 1490 in step 1445. in step 1445, the data of the data view is updated to include the selected data component. the query associated with the data view is also updated. If the user has specified all the required data components in decision step 1465, the process 1490 ends. If further data components are required in step 1465, the recommendation list is updated according to the user's selection in step 1445. This may occur if one selection results in a different ranking order or one or more of the previously selected recommendations becomes irrelevant. For example, if the user selected a data component for the x-axis, then the list of recommendations would be updated to include data components that could act as a data series for the selected x-axis data component. The data component selection and the modification of the recommending list is an iterative process which continues until all data components that the user wants to include in the data view are specified or the recommending process is terminated by the user.

Figure 16:
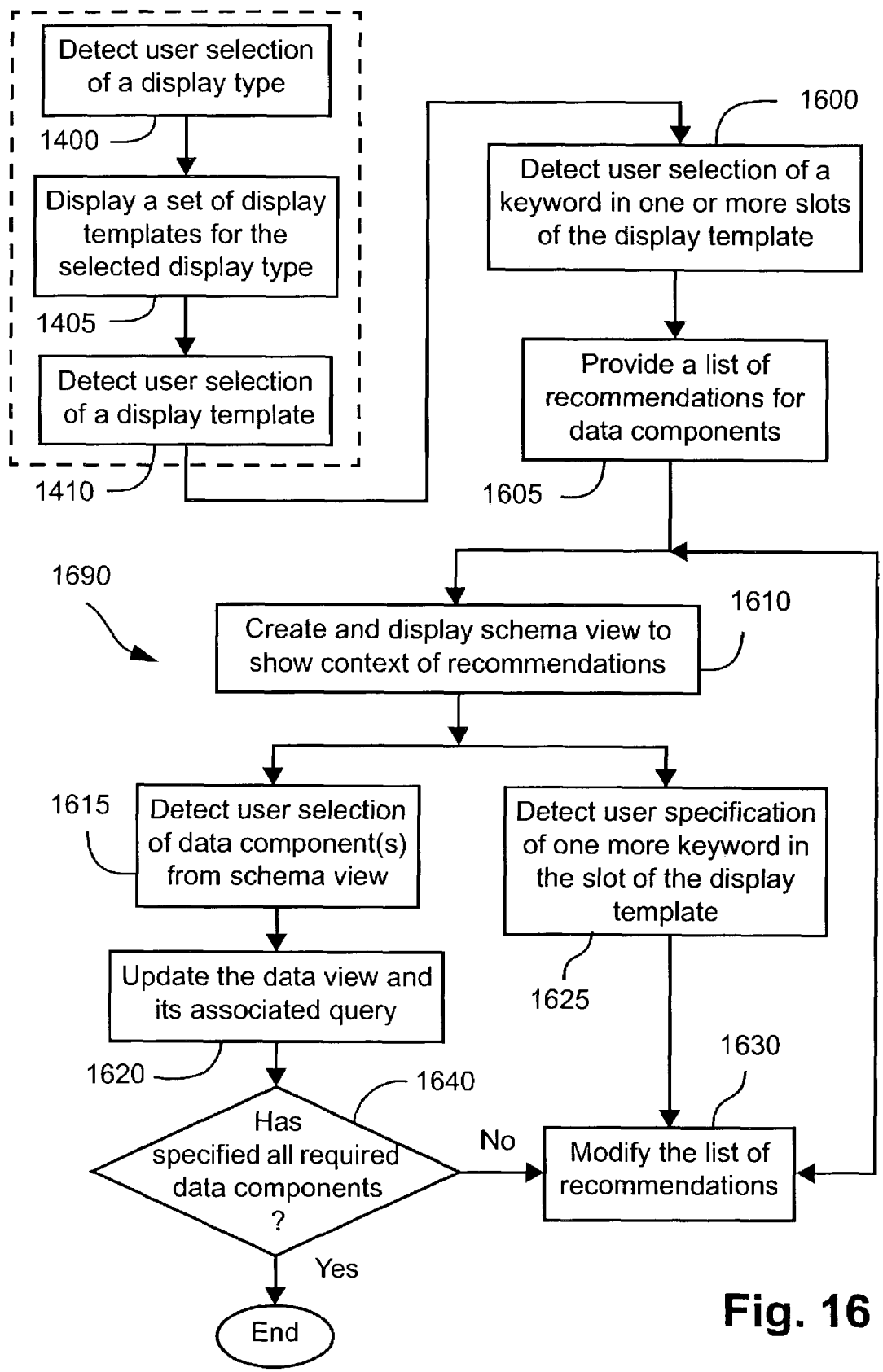
FIG. 16 shows an alternate approach to that of FIG. 14.
Figure 17:
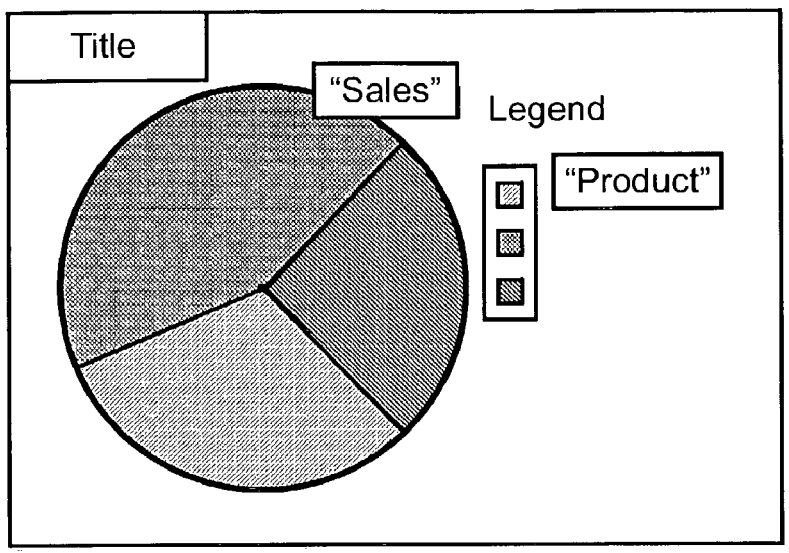
FIG. 17 shows another example of a display template.

An alternative method of visually creating a new data view is shown in FIG. 16 which illustrates a flow chart of another process 1690. Following the steps 1400 to 1410, which correspond to those of the process 1490 of FIG. 14, the user can specify keyword expressions for one or more data component slots in the selected display template to indicate the desired content for the template slots. This is detected by the process 1690 in step 1600, instead of step 1425. These keyword expressions can be logical combinations of individual keywords, or simply a list of one or more keywords. Keyword expressions are enclosed in double quotes ("like this"). FIG. 17 shows an example of a pie chart display template with the data component slots where keyword expressions are specified. The user has entered the keyword expressions "Sales" and "Product" as the value and label data components, respectively, of the pie chart. In step 1605, the process 1690, which forms part of the data browsing application 120, provides a list of recommendations for the data. The recommendations are based on the similarity of the data component names, schema descriptions or XML paths of the data components to the specified keyword expressions and the semantics of the display type. In step 1610, the process 1690 creates and displays a schema view to show the context of the recommendations.

As in step 1445, the user can select data components from the schema view generated from the list of recommendations, this being detected by the process 1690 in step 1615, or alternately continue to specify keyword expressions for unspecified data component slots, this being detected in step 1625. In the former, the data view and its associated query is updated in step 1620 and a test 1640 is performed to determine if the user has specified all the required data components. If not, and also in the alternate operation, the recommendation list is updated in step 1630 according to the selected data components from the list or newly-specified keyword expressions. The recommendations are also based on the semantics of the selected display type. In the case where the user specifies keyword expressions, the user must select a data component from the recommended list in order to confirm the data component for a slot. After the user has specified necessary data component slots in the selected display template, the process 1690 ends.

Figure 22:
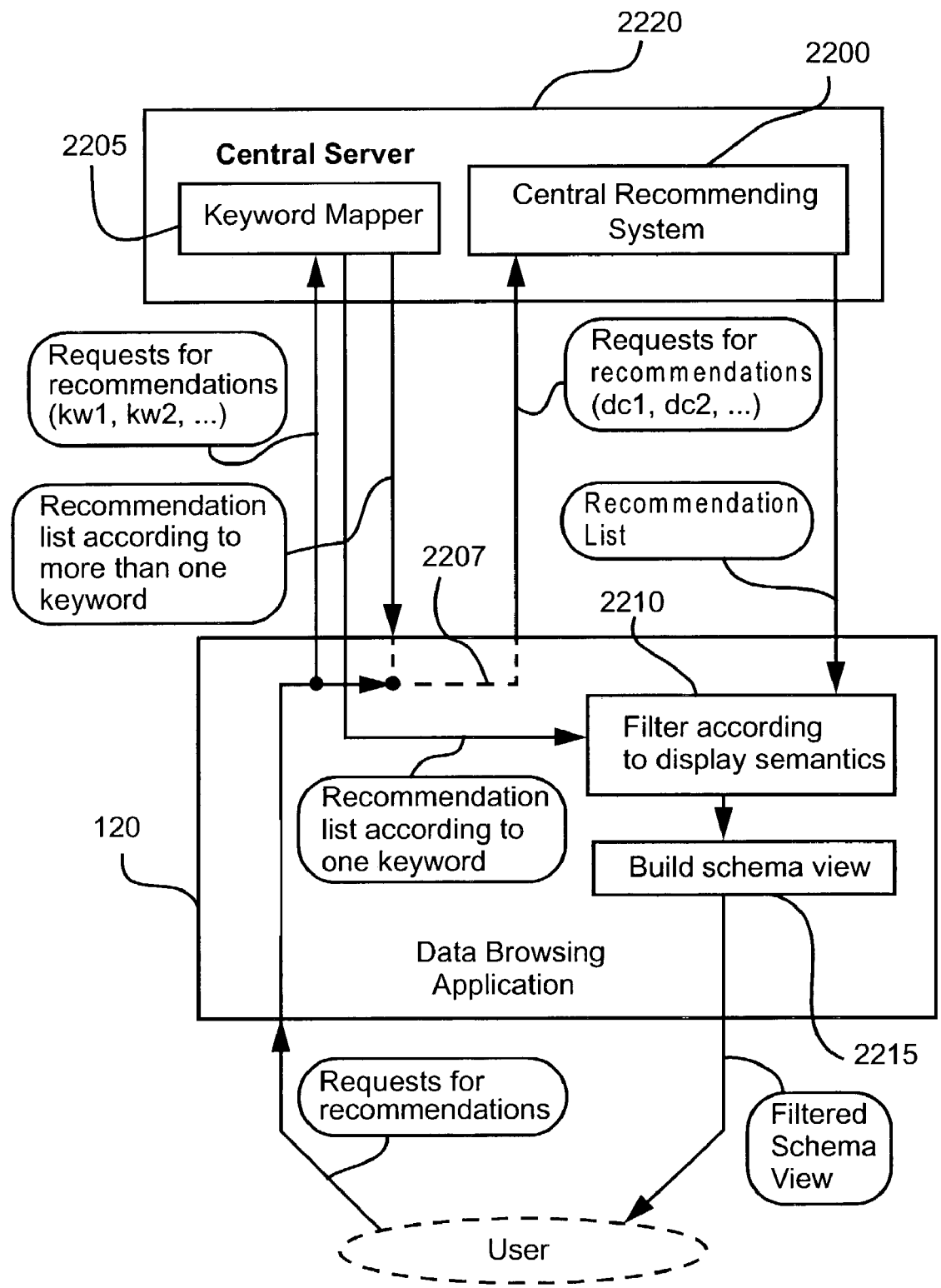
FIG. 22 is a data flow diagram depicting a method for generating recommendations.

The method for generating recommendations is shown in the data flow diagram of FIG. 22. In the preferred arrangement, a central recommending system 2200 recommends a full list of ranked data components that are relevant to a specified set of data components (eg. dc1, dc2, . . . ) for the operation at hand. This set may comprise those data components that are already selected for the data view. The preferred method used by the central recommending system 2200 is described further in Section 9.0. A keyword mapper 2205 maps user-entered keyword expressions (eg. kw1, kw2, . . . ) to possible data components in the known data sources. The keyword mapper 2205 could also operate by taking a single keyword at a time and map that keyword to possible data components.

Preferably, both the central recommending system 2200 and the keyword mapper 2205 are formed by software applications located and/or operating upon a central server 2220 which has access to information about the available data sources and previously generated data views. Step 1435 described above uses the central recommending system 2200 to generate an initial list of recommendations. In step 1605, the method of generating a list of recommendations involves using the keyword mapper 2205 to identify possible data components in data sources known to the keyword mapper 2205. A list of recommendations can then be generated by the central recommending system 2200 based on these sets of possible data components if more than one keyword expression is specified or other data components have already been specified for the data view by the user. In the case that the user specifies only one expression and no other data components have been specified for the data view, the recommendations are those possible data components identified by the keyword mapper 2205. In both steps 1435 and 1605, the list of recommendations produced by the central recommending system 2200 is filtered in a process 2210, forming part of the data browsing application 120, according to the semantics of the selected display type. The method of generating recommendations is described in more detail later.

Figure 14:
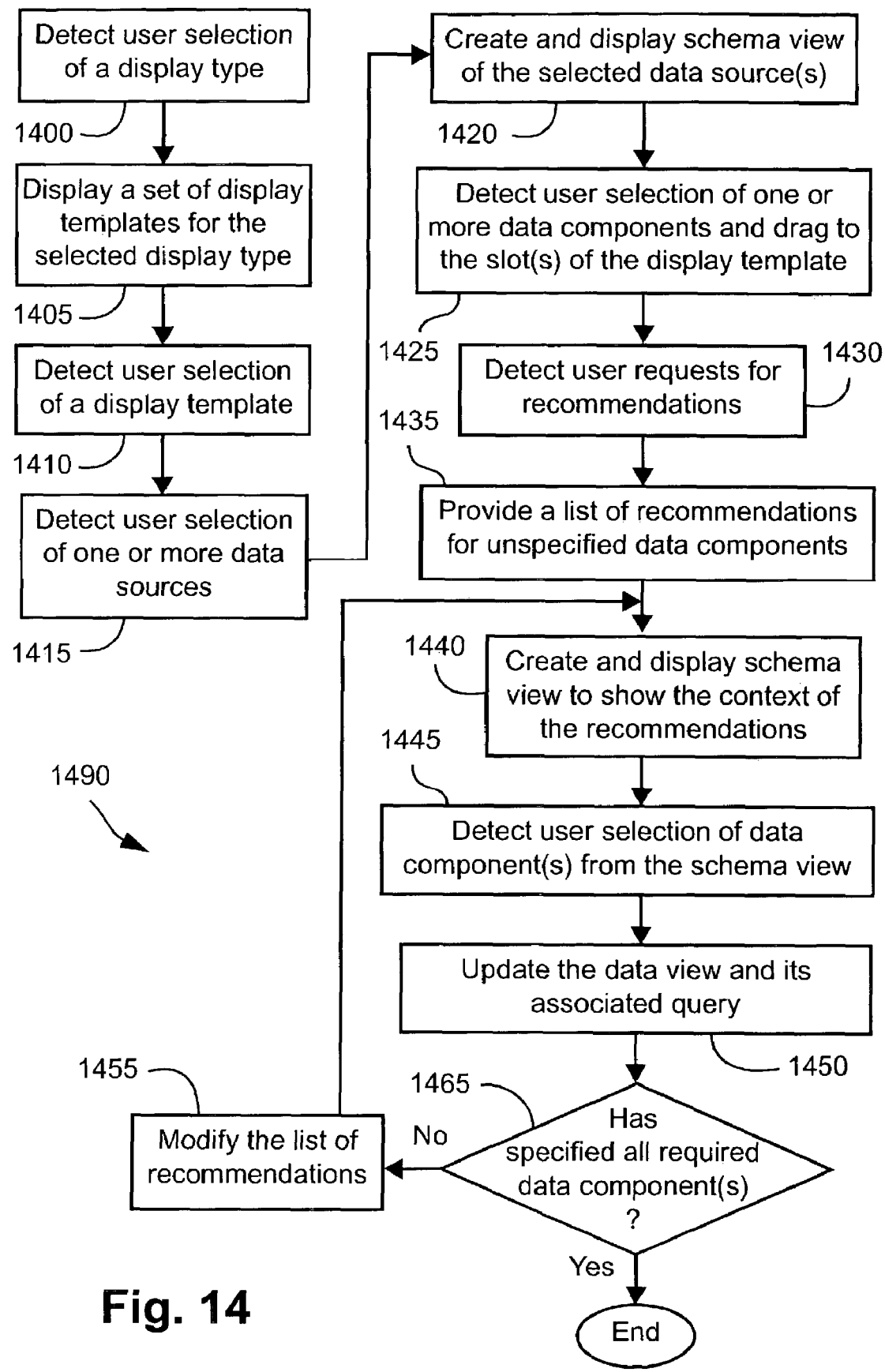
FIG. 14 is a flow chart depicting the visual creation of data views across heterogenous databases using recommendations based on one or more existing data components.

A more detailed description for the method shown in FIG. 14 is now provided using an example. A sales planning manager in a planning department wants to create a bar chart to show a comparison of product sales and sales targets for each product in January 1999. There are product sales records stored in the sales department. But the planning manager has no knowledge of the product sales database. The sales target information is recorded in his/her datasheet, SalesTargetsDS. To create the bar chart (ie. a new data view), the planning manager can select to create a new data view having the bar chart display type and the default bar chart display template is displayed, as shown in FIG. 15. The planning manager may then examine the data sources that he/she knows about. Perhaps there are just two known data sources, the SalesTargetsDS and a human resource database (HRDB):

HRDB
    SalesTargetsDS

The HRDB data source could be represented either by an XML document or a data server. By selecting the SalesTargetsDS, the schema view of the SalesTargetsDS can be shown substantially as described in Section 2.0. This schema view is shown below:

SalesTargetsDS
        ProductCode
        ProductName
        Descriptions
        SalesManager
        Year
        Month
        SalesQuota ProductName in SalesTargetsDS is the data component that the planning manager wants to display on the x-axis of the bar chart. The planning manager can indicate this by dragging the above ProductName to the data component slot 1520. Alternatively, the user can select the SalesTargetsDS/ProductName data component displayed in another data view in the workspace 1202 of FIG. 12A and drag the selected data component to the x-axis slot in the new data view. This process of graphically creating new data views is described in Section 6.0. The user then requests the data browsing application 120 to provide recommendations from the central recommending system 2200 for the remaining data component slots. Preferably, the central recommending system 2200 acts as a publishing service where users can publish (or register) their created data views for use by others. It is assumed that the project manager has published his/her SalesTargetsDS with the service. Typically such a service would be implemented on a company. basis. Since it has access to all published data views, the central recommending system 2200 can analyse registered data views to learn about the existence of data sources and relationships between data components in different data sources (eg. joins across data sources). This central recommending system 2200 can identify relationships between the SalesTargetsDS and any other known data sources using the query associated with the SalesTargetsDS. A related data source, product sales database (SalesDB), is identified. The SalesDB has a data component called ProductCode, which is the same data as ProductCode of the data source SalesTargetsDS. The SalesDB has the child data components Sales, Products and Customers. The data components, Products/ProductCode and Sales/ProductCode, are known to be related according a common key specification in their XML Schema definition. Consequently, the following relationship can be deduced:

(1) SalesDB/Products/ProductCode=SalesDB/Sales/ProductCode and (2) SalesDB/Products/ProductCode=SalesTargetsDS/ProductCode The schema view of the SalesDB is shown below:

SalesDB
    Sales
        ProductCode
        Quantity
        Year
        Month
    Products
        ProductCode
        ProductName
        Descriptions
        Price
    Customers
        CustomerID
        CompanyName
        ContactName
        Address
        Phone The central recommending system 2200 can generate a list of recommendations, comprising data components that are related to the already selected SalesTargetsDS/ProductName data component. This process is described in the following section. In addition to the list of recommendations, the central recommending system 2200 also returns information about join conditions relevant to the recommended data components. This join condition information is required by the data browsing application 120 to generate a query for the new data view (see Section 7.0 for further details). This list of recommendations is then filtered based on the current selection of the display type in 2210 and the relevant data components are presented to the user as highlighted data components in the resulting schema view.

SalesTargetsDS
        ProductCode
        ProductName
        Descriptions
        SalesManager
        Year
        Month
        SalesQuota
    SalesDB
        Sales
            ProductCode
            Quantity
            Year
            Month
        Products
            ProductCode
            ProductName
            Descriptions
            Price The highlighted data components are the only data components that can act as a data series for a graph where the SalesTargetsDS/ProductName data component is assigned to the x-axis. A data series must be numeric and have a point-wise correspondence with the x-axis data component. These recommendations are based on the semantics of the bar chart display type.

Now, the sales planning manager can select SalesQuota of SalesTargetsDS for slot 1505 and select SalesDB/Sales/Quantity for slot 1510 by dragging the corresponding schema view items to the corresponding slots in the data view. If a single data series is required for the graph, it can be dragged directly to slot 1525. In this case, the name of the selected data component will then automatically be displayed as the first field legend item. The legend can then be removed by the user if not required.

Figure 18:
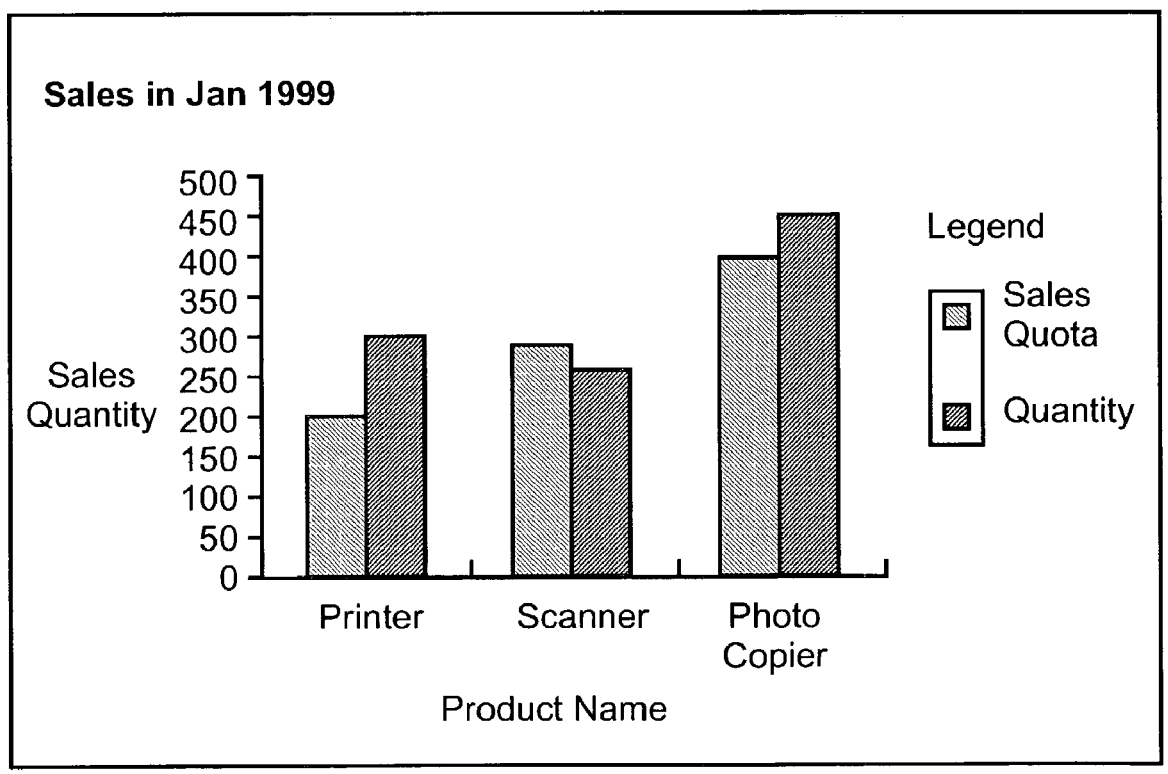
FIG. 18 shows the completed bar chart formed from the template of FIG. 15.

Optionally a title can also be specified in the title text box 1500. Preferably, the label for the x-axis will default to the name of the data component selected for the x-axis. However, the user may alter the text of the label to be more meaningful. Similarly, the data browsing application 120 attempts to generate a label for the y-axis. However, in many cases, this is difficult to do automatically because it requires knowledge of the selected data components. The user may therefore either enter the required text for the axis label or overwrite a label which has been automatically generated by the data browsing application 120 from the relevant data component name(s). Template slots can be left empty or deleted if not required. Once data components have been selected for the new data view, filter constraints can be specified for the data view to limit the data to be displayed to the Year "1999" and to the Month "January". These filter constraints can be substantially specified for SalesTargetsDS/Year and SalesTargetsDS/Month data components as described in Section 6.0. The resulting chart is shown in FIG. 18.

To indicate that the chart is completed, the user can select to save the data view. This results in the data browsing application 120 also saving a query for the new data view. In the preferred arrangement the query is represented using XQuery as described in Section 7.0, and is updated with each addition of new data components to the data view. The generated query for above example is shown below:

```
let $salesDB := document("http://www.example.com/SalesDB.xml")
let $planDS :=
   document("http://www.example.com/SalesTargetsDS.xml")
for $sale in $salesDB/SalesDB/Sales
    $plan in $planDS/SalesTargetsDS
where   $sale/ProductCode = $plan/ProductCode and
        $sale/Year = 1999 and
        $sale/Month = "January" and
        $plan/Year = 1999 and
        $plan/Month = "January"
return  <Sale>{ $plan/ProductName, $plan/SalesQuota,
         $sale/Quantity }</Sale>
```

A detailed description of the filtering operation 2210 of FIG. 22, based on display type semantics, is now provided. The central recommending system 2200 generates a list of recommendations that includes all data components that are possibly related to the specified one or more data components. This list contains all data components, which have direct or indirect relationships with the specified-data components and is generated without knowledge of the desired display type. The data browsing application 120 filters this list to include only those data components which could satisfy the unspecified slots of the current data view (ie. this list is filtered according to the display type's semantics).

The detailed semantics of each display type are described below:

Table Display Type Semantics
1. The data displayed for a row of a table must refer to the same entity.
2. Each column must be able to act as a data set. A data set is defined to be multiple instances of the same data component, or data that can act as the same data component (eg. the result of a transformation or combination of data components). Both elements and attributes of XML data can act as data components.

Bar Chart Display Type Semantics
1. The data component displayed on the x-axis of the bar chart represents a data set, for example, Product1, Product2, . . . etc.
2. The data components displayed on the y-axis of the bar chart must be able to act as a data series with respect to the x-axis data component. This means they:
   (i) Must be able to act as a data set (see above);
   (ii) Must be numeric, or a numeric value with an associated unit (eg. 100 kg, $100). If the latter, then all such values in the data series must have the same or compatible units. [eg. all are currency values, or all are weight measurements. This also applies to other display types where a numeric value is expected];
   (iii) Have a point-wise correspondence with the x-axis data component.

Line Graph Display Type Semantics
The assumed semantics associated with a line graph are as defined for a bar chart with the additional requirement that the data component displayed on the x-axis must either be numeric or be able to be interpreted numerically. For example, time-related labels such as the months can be interpreted numerically.

Pie Chart Display Type Semantics
The data component to be represented as a whole is a numeric data series with respect to the segment labels.

2D Grid Display Type Semantics
1. The data displayed in each grid unit of the 2D grid refer to the same entity (eg. photo and name)
2. Each grid unit contains the same set of data components in the same form.

Scatter Plot Display Type Semantics
Scatter plot display type semantics are the same as those for a line graph.

Other display types with associated semantics may also be included. Alternative implementations may choose a different set of display types with different semantics. For example, an alternative implementation may treat a line graph and a scatter plot as the same display type, and may allow graphs to have bar or line styles.

A method of recommending data components based on user-specified keyword expressions is now described in detail. As seen in FIG. 22, the keyword mapper 2205 receives a set of keyword expressions from the user via the data browsing application 120. The keyword mapper 2205 uses a keyword search engine to search for data components that may have names, or schema descriptions, which are similar in some way to the specified keyword expressions. These data components are preferably identified from schemas of data sources and available data view definitions. The keyword mapper 2205 identifies the data components (ic. elements and attributes), which have a similarity to the specified keyword expression or which are synonyms of the specified keyword expression. In another words, the keyword mapper dynamically maps data components to keyword expressions. The results of the search are ranked based on the similarity of the data component names to the specified keyword expressions.

The ranking order of the data components generated by the keyword mapper 2205 is reflected in the presented schema view. The order of the data source in the schema view depends on the type of match (full/partial) and the number of matched data components in the data source. Fully matched data components are ranked higher than partially matched data components, which are, in turn, ranked higher than matches resulting from synonyms. For example, a data source, which contains two fully matched data components, will be ranked higher than a data source, which contains one fully matched data component; in turn, the latter will be ranked higher than a data source, which contains partially matched data components only.

If the user specifies a single keyword expression, and no other data components have been specified for the data view, and then the user selects to get recommendations, a ranked list is then generated by the keyword mapper 2205.

If the user specifies more than one keyword expression, or other data components have already been a specified for the data view, and then the user selects to get recommendations, then preferably the ranked possible sets of data components generated by the keyword mapper 2205 are first passed to the central recommending system 2200 via a pathway 2207. This operates to generate a list of recommendations based on the combinations of the possible data components.

In both cases the resulting recommended data components are further filtered based on the above mentioned semantics of the selected display type. The data components, which have some similarity to the specified keyword expressions and satisfy the semantics of the selected display type, are recommended as highlighted data components in the schema view of the data browsing application 120.

Figure 19:
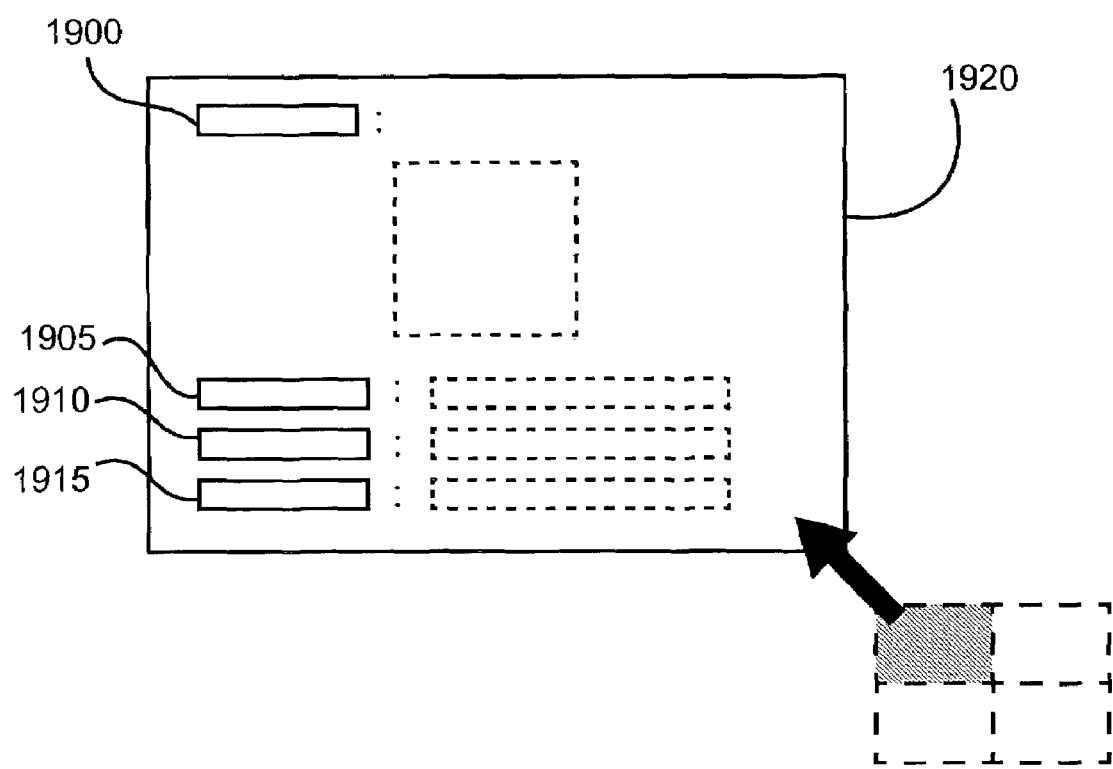
FIG. 19 shows a grid unit of a two-dimensional (2D) grid display template.

The detailed method shown in FIG. 16 is described now by way of an example. A project manager wants to create an intranet page for the project and include each project member's name, phone number, e-mail address and photo on the page as a grid. The information is stored in company databases or files, which may be distributed over the intranet. From the display type list, the project manager can select the 2D grid display type. A default 2D grid display template such as that shown in FIG. 19 is displayed. The manager can type a keyword expression "photo" in a data component slot 1900 and then select to get recommendations for that and other slots of the display template. The following possible data components are returned by the keyword mapper 2205 of FIG. 22. The list of recommendations is represented as a schema view, with the recommended data component Photo of the HR database, HRDB, highlighted. In this example it is assumed that the HRDB is accessed via a data server.

Figure 20:
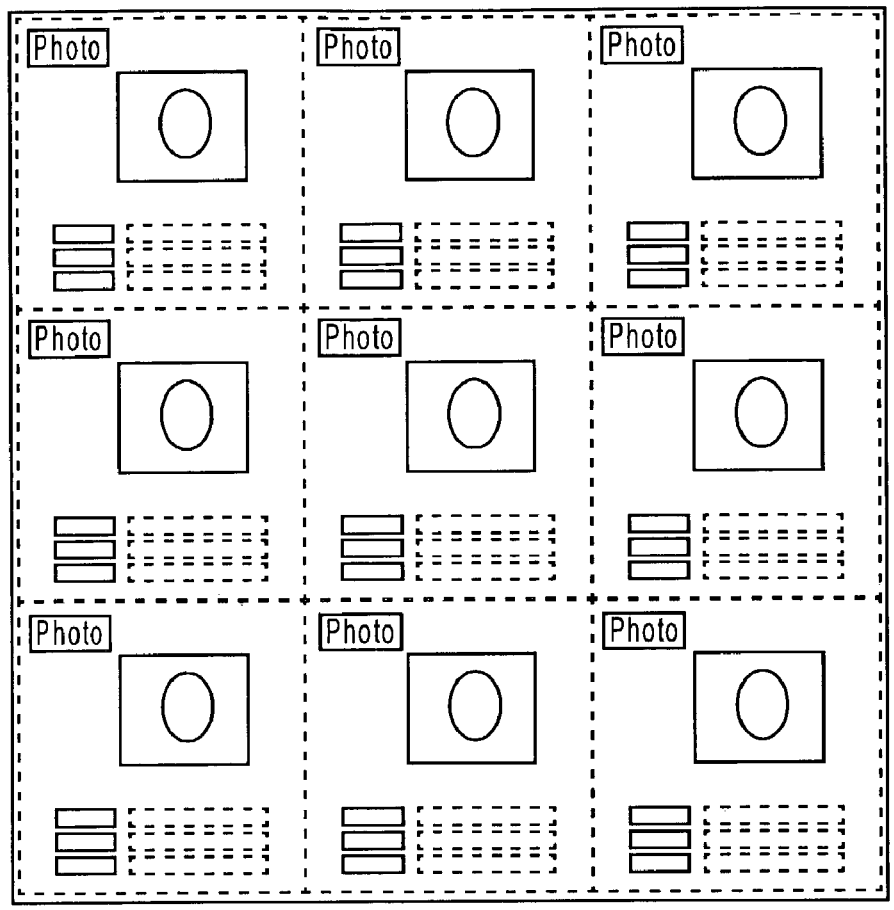
FIG. 20 is an example data view formed using the template of FIG. 19.
Figure 21:
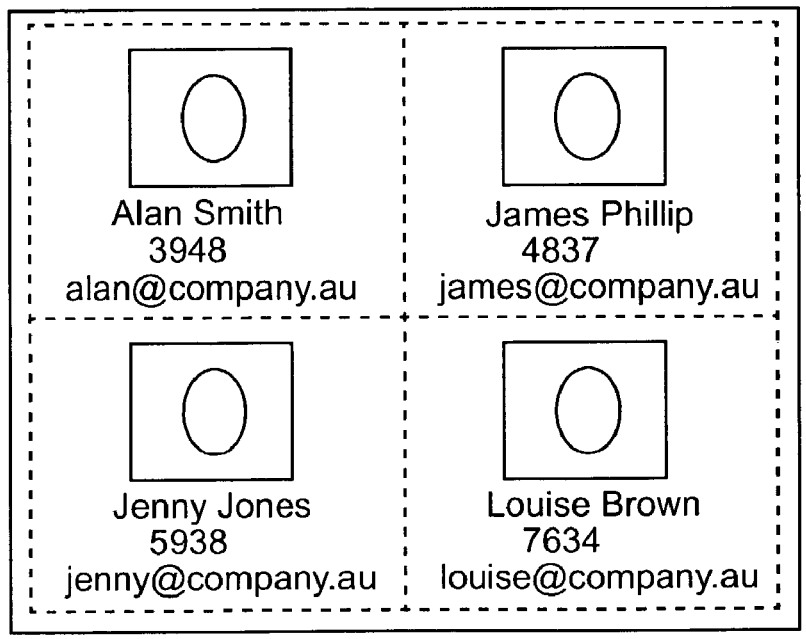
FIG. 21 is an example of a final data view formed from the template of FIG. 20.

HRDB
    PersonalDetails
        IDNO
        Name
        Age
        HomeAddress
        HomePhoneNumber
        Photo To use this recommendation the manager must drag the desired data component in the schema view to the slot. This will result in the data view being updated to show a grid unit for each of Photo instances in the HRDB/PersonalDetails data set, as shown in FIG. 20. The typed keyword expression in the slot is marked with double quotation until it is replaced by a selection. Then the manager can select the Name data component from the schema view by dragging it into the slot 1905 of FIG. 19. This selection results in the recommendation list being updated by the central recommending system 2200 and filtered by filter 2210 of the data browsing application 120, as seen in FIG. 21. This occurs because the Name data component may be directly or indirectly related to many other data components. The updated schema view may appear as below:

HRDB
    PersonalDetails
        IDNo
        Name
        Age
        HomeAddress
        HomePhoneNumber
        Photo
ProjectManagementDB
    EmployeeTasks
        IDNO
        Name
        ProjectCode
        StartDate
        EndDate
        Task
    Projects
        ProjectCode
        ProjectName
        Manager
        CommenceDate
        CompleteDate
    CompanyPhoneListDS
        IDNo
        Name
        PhoneNumber
        Email The highlighted data components represent recommendations that may have been detected on the basis of the similarity of the data component name to the keyword, the existence of the keyword. in the schema definition of the data component or the existence of the keyword in the XML path of the data component. Preferably the reason for the recommendation is indicated when the user moves the mouse over the highlighted item in the schema view.

From the above schema view, the manager can select the PhoneNumber and Email data components from the CompanyPhoneListDS by dragging them to the slots 1910 and 1915. This is possible because the central recommending system 2200 is aware that CompanyPhoneListDS/IDNo is joined to HRDB/PersonalDetails/IDNo, that is, HRDB/PersonalDetails/
        IDNo=CompanyPhoneListDS/IDNo.

To display only the persons in the project "DBR", a filter condition has to be specified for the ProjectCode of ProjectManagementDB, as ProjectManagementDB/.Projects/ProjectCode="DBR". This is possible because the central recommending system 2200 is aware of the join relationship between HRDB.PersonalDetails/IDNo and ProjectManagementDB/EmployeeTasks/IDNO, that is:

HRDB/PersonalDetails/IDNo=ProjectManagementDB/
        EmployeeTasks/IDNo, and the join relationship between ProjectManagementDB/Projects/ProjectCode and ProjectManagementDB/EmployeeTask/ProjectCode, that is:

ProjectManagementDB/Projects/
    ProjectCode=ProjectManagementDB/EmployeeTask/ProjectCode.

When the user selects to save the created data view, the data browsing application 120 generates a query based on the selected data components and their known relations.

```
let $phoneDS :=
    document("http://www.example.com/CompanyPhoneListDS.xml")
let $projectDB
    :=document("http://www.example.com/ProjectManagementDB.xml")
let $hrDB := document(http://www.example.com/HRDB?/")
for  $ps in $phoneDS/CompanyPhoneListDS
     $pd in $hrDB/PersonalDetails
     $p in $projectDB/Projects
where   $pd/IDNo = $ps/IDNo and
        $pd/IDNo = $projectDB/EmployeeTasks/IDNo and
        $p/ProjectCode = "DBR"
return
    <Member>
        { $ps/Name, $ps/PhoneNumber, $ps/Email, $pd/Photo }
    </Member>
```

The final data view is shown in FIG. 21. There are 4 members' information returned from the data sources. The final data view is a 2×2 grid with each cell containing a member's information for the project. The cell information includes photo, name, phone number and e-mail address of the member. In the final data view of FIG. 21, the data component names, which are displayed as labels (Photo, Name, etc.), have been hidden. Preferably the user can hide the labels after generating the final data view.

Alternatively, the manager can type two keyword expressions "Photo" in slot 1900 and "Name" in slot 1905 in the beginning and then select to get recommendations for these and other slots of the display template. The possible data components, which have similarities to the "Photo" and the "Name" keywords, are identified by the keyword mapper 2205 and then passed to the central recommending system 2200. The resulting recommendation list is shown below as a schema view, with the appropriate data component recommendations highlighted:

HRDB
  Personal Details
    IDNO
    Name
    Age
    HomeAddress
    HomePhoneNumber
    Photo
ProjectManagementDB
  EmployeeTasks
    IDNo
    Name
    ProjectCode
    StartDate
    End Date
  Projects
    ProjectCode
    ProjectName
    Manager
    CommenceDate
    Complete Date
    Task
CompanyPhoneListDS
  IDNo
  Name
  PhoneNumber
  Email HRDB has two data components that exactly match the specified keyword expressions and appear in the same database table. This is the highest-ranked possibility so that it is listed first. Two data components have been identified from the ProjectManagementDB data source, however, only one data component exactly matches one keyword expression and another data component partially matches the same keyword expression so that the ProjectManagementDB is ranked after the HRDB. The last data source, CompanyPhoneListDS, contains only one data component that matches just one keyword expression and is ranked last. According to the semantics associated with the display type, 2D grid, the data components displayed in a grid must refer to the same entity. This is assured by the relationships known by central recommending system 2200.

The manager can confirm the data components for keyword expressions specified in the slots now by dragging the data components Photo and Name of the HRDB to the slots 1900 and 1905 of the data view. This results in the schema view (containing the recommendations) being updated to highlight other possible recommendations. The manager could then select the data component PhoneNumber from CompanyPhoneListDS and Email from CompanyPhoneListDS to complete the data view.

The method of generating the list of recommendations for more than two keyword expressions is described now. Possible data components for each of the specified keyword expressions are identified by the keyword mapper 2205. This results in a set of data components for each specified keyword expression. For example, the user types two keyword expressions k1 and k2. The possible sets of data components are shown below:

| k1 | k2 |
|---|---|
| DS1.ck11 | DS1.ck21 |
| DS2.ck12 | DS5.ck22 |
| DS3.ck13 | |

In the left column, three data components are mapped to k1. These data components come from three different data sources (DS1, DS2 and DS3). In the right column, two data components are mapped to k2 from data sources, DS1 and DS5 respectively. As the central recommending system 2200 can return recommendations based on the presence of the specified data components, the data browsing application 120 can systematically select pairs of data components from the above sets and pass these to the central recommending system 2200 for recommendations. The pairs that are passed to the central recommending system 2200 are listed below:

| | |
|---|---|
| DS1.ck11, | DS1.ck21 |
| DS1.ck11, | DS5.ck22 |
| DS2.ck12, | DS1.ck21 |
| DS2.ck12, | DS5.ck22 |
| DS3.ck13, | DS1.ck21 |
| DS3.ck13, | DS5.ck22 |

Some pairs will not result in any recommendations because they are unrelated. Duplicate data component recommendations are removed from the composed list of recommendations before it is passed to the filter 2210. The final list of recommendations will contain the non-repeated lists of recommendations generated from above pairs.

9.0 Method of Making Recommendations for Data View Creation

The described arrangements in Sections 8.0 to 10.0 of this disclosure enable views of data to be formed across heterogeneous data sources, and for such views to be able to be created by average users (ie. users not necessarily skilled in the art of administration of computer systems and databases). These views of data can represent the data views of the described data browsing application 120 of the preferred arrangement or other representations of views of data required for other applications and systems. Hereinafter in this and the following section, the term "view" will be used to refer generally to views of data. The described arrangement disclosed in this section and in Section 10 employs a recommendation system that can identify and recommend relevant data components to a view creation process. Section 10.0 describes the use of the recommendation system to identify and recommend existing views to an application such as the data browsing application 120.

Apart from tracking the available data and storing the definitions of the data and their relationships, the described arrangement also learns previously unknown relationships from views created by other users and recommends relevant data components to the users based on the pre-defined and learned relationships. The recommended data components are ranked by their perceived relevance to the current set of data components that the user has included into his/her new view. The value of learning previously unknown relationships between different components of different data sources is described briefly below with regard to an example involving a database source and a spreadsheet Consider a relational data source having two tables A and B. Table A has a column a (ie. A.a) which is defined to be a primary key for the table A. This means each value of a in the table A is unique and that records can be uniquely retrieved from table A on the basis of the value of a. Table B is defined to have a column a (ie. B.a) which contains values stored in A.a. In other words, A.a and B.a are a pre-defined primary/foreign key pair.

Also, let there be a spreadsheet S which may have been authored using a spreadsheet application such as MS Excel™. The spreadsheet S contains the field S.a which is equivalent to A.a and B.a (ie. the values of S.a, A.a and B.a are equivalent or congruent). Assume that a user with full knowledge of A and S, and has already created a view V in a proprietary reporting system, for example, which uses the join condition "where A.a=S.a". Now suppose now that a further user wants to create a new view including a certain data component of B, say B.b. However, he/she is unaware of the existence of the spreadsheet S which actually contains another data component, for example S.s, which he/she needs for the new view. With existing systems, the relationship between B and S is unknown.

With the described arrangement, the relationship among data components (across heterogeneous data sources) established by the views (such as V above) created by the users of the system are tracked, analyzed and learned. The described arrangement is able to deduce from view V that table B is related to spreadsheet S through the data component a. Since it knows that table A is related to table B through their primary/foreign key definition, the system infers that spreadsheet S is also related to B and is thus able to recommend the data components of spreadsheet S as relevant data components to the user for use in the new view.

Specific configurations can also suggest the necessary join conditions for each recommended data component and rank the recommended data components. Factors such as matching primary key, foreign key and join conditions as well as the degree of indirection, the existence of other joining conditions, etc. are taken into account when computing the relevance of a recommended data component.

A key-point of the present disclosure lies in the support for view creation across heterogeneous data sources by:

Learning previously unknown relationships among the data components from existing views;

Recommending relevant data components to the users for creating views based on the pre-defined (eg. specified key/foreign key information from data sources) and learned relationships among the data components;

Ranking the recommended data components according to their computed relevance.

A similar method is also used for recommending relevant views to the user. This method is described further in Section 10.0. To assist a user in selecting appropriate views for displaying the data, the system ranks the existing views against the user's criteria on the required data components and recommends the relevant views to the user.

The described arrangement uses XML-enabled data sources and XQuery-based view definitions as used by the data browsing application 120. However, those skilled in the art will recognize that the arrangements may be used for other non-XML-enabled data sources and with a mixture of data definitions and query languages including SQL.

Figure 23:
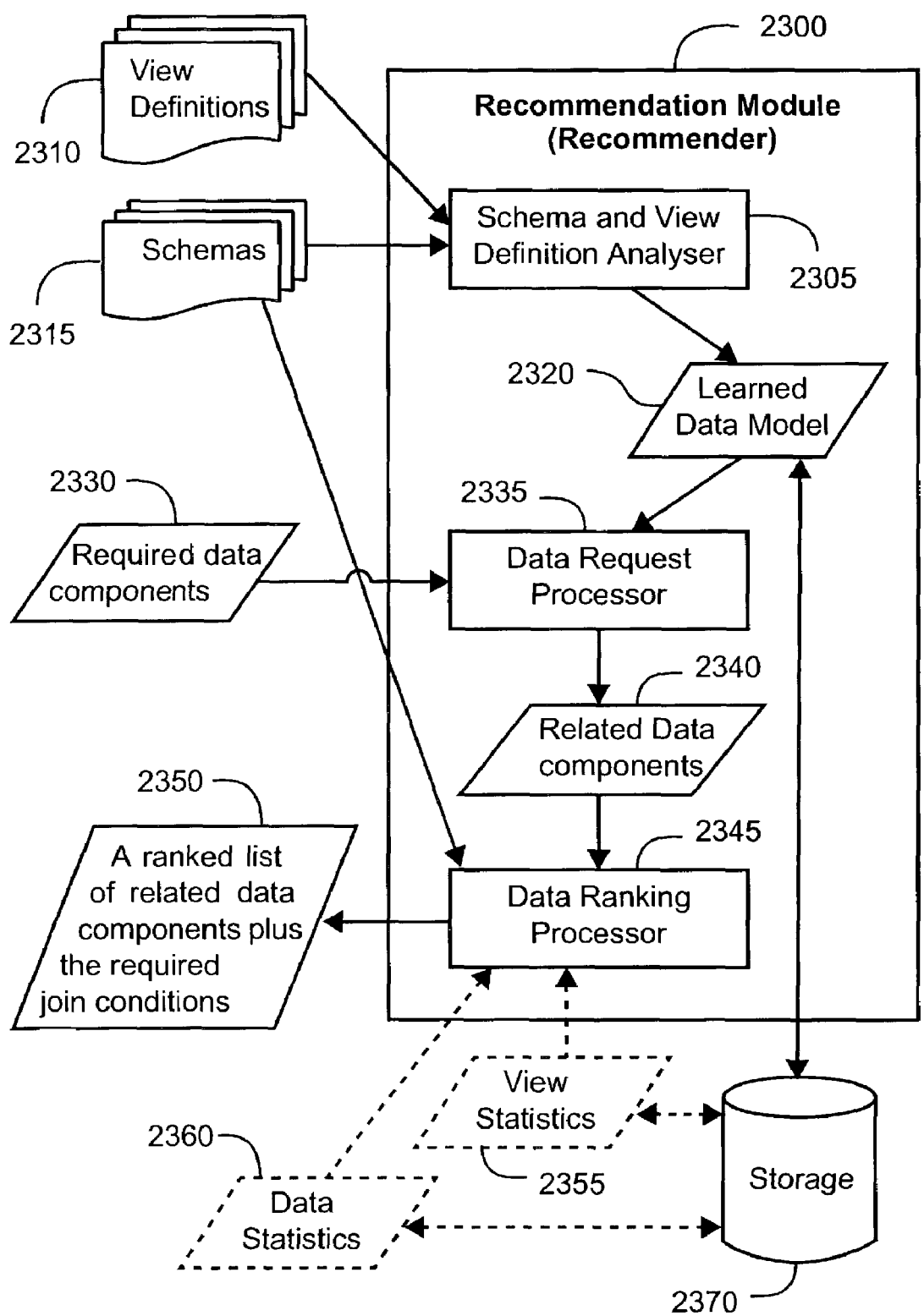
FIG. 23 is a data flow diagram of the data recommendation process used for the recommending data components for view construction.

A high-level data flow diagram is shown in FIG. 23 to provide an overview of the data recommendation process performed by a recommendation module 2300 operable within a computer network, not illustrated. A schema and view definition analyser 2305 analyses available schema 2315 and view definitions 2310 to create/update a data model which is referred to herein as a learned data model 2320. The learned data model 2320 captures the relationships between known data components.

The schema and view definition analyser 2305 can preferably actively crawl the network for new or updated view definitions and updated schemas for known data sources. This crawling process can involve recursively detecting new sources of information (data sources and views) by analysing the contents of located view definitions. These view definitions can identify data sources and views previously unknown to the recommendation module 2300. Alternatively the schema and view definition analyser 2305 may receive notifications from other processes of new or updated view definitions and updated specifications for data sources. Hereinafter the specifications of data sources will be referred to as schemas. In the preferred arrangement used by the data browsing application 120, data source schemas are represented using the XML Schema Recommendation. However, it should be clear that other schema representations are also possible.

Keys defined in the data source schema are recorded in the learned data model 2320. The database term key is variously interpreted depending on the database system (eg. whether it is relational or not, even different relational systems vary). Most database systems however support the concept of a unique key (every value for the specified field must be unique), and a foreign key (which is a reference to a unique key).

In the described arrangement, we assume the existence of primary keys (unique keys) which may or may not be present in supplied data and foreign keys. These key types are assumed because they are implemented in the XML Schema Recommendation. The XML Schema element name key can be used to specify that a particular element must be unique and present in supplied data. The element name unique can be used to specify that a particular element must be unique in the supplied data (but not necessarily present). XML Schema also provides a keyRef element that allows the assertion that a specified element content must match the content of a specified key field. Thus the keyRef provides the function of a foreign key. Clearly other arrangements could utilise different key and foreign key, specifications.

The join conditions of view definitions are analysed in order to learn about relationships which are not specified in the data source schemas. Joins have been briefly discussed in Section 6.0, however a more detailed description will be provided here. A join operation is used to combine related records that satisfy a certain join condition from two data sources, into single records. A join condition is of the form:

<condition>AND <condition>AND . . .
AND<condition> where each <condition> compares the value of two data components called join attributes, one from the first data source and the other from the second data source. For example, the join condition t1.id=t2.id has a single condition which involves the join attributes t1.id and t2.id, where t1 and t2 represent tables of a RDBMS.

While the comparison operators =, ≠, <,>, ≦ and ≧ used in a join condition usually imply that two data components from two data sources are related or even equivalent (or semantically congruent), this is not always the case. This is especially the case with the comparison operators <, >, ≦ and ≧. For instance, while the two data components being compared in the join condition:

/corporate Database/employeeTable/employee/code =
/myProjectWorksheet.team/member/id can be expected to be equivalent, the two data components involved in the following join condition have hardly any connection at all.

/person/numberOfDependents=/person/numberOfPets

The learned data model 2320 is written out to storage 2370. Preferably the data is stored as structured data (eg. a database) to allow efficient extraction of information at run-time. However other forms of storage are also possible. For example, the learned data model 2320 can also be serialised into an XML document and then read in and held in memory when the recommendation module 2300 is initiated.

Figure 28:
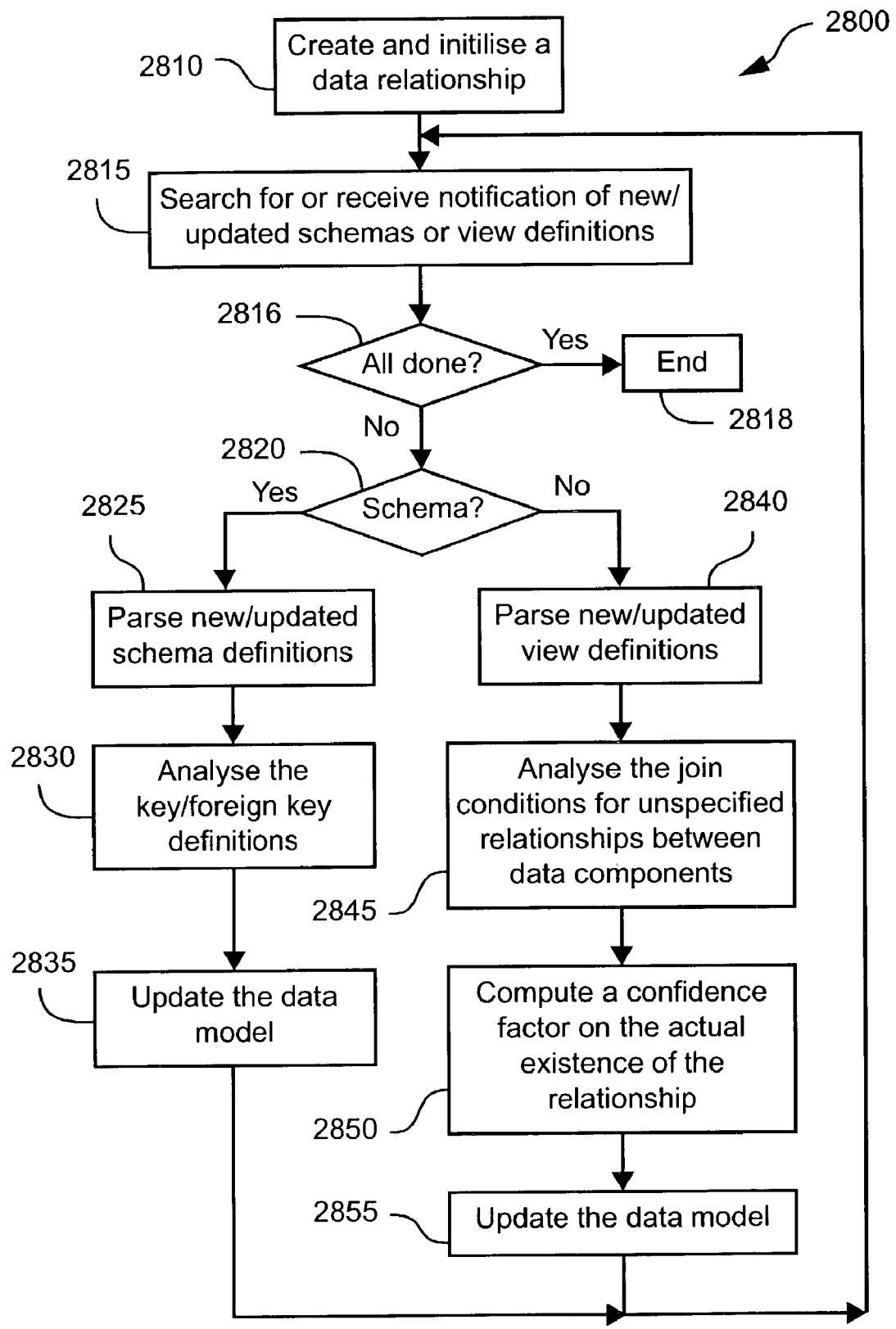
FIG. 28 is a flow chart depicting the learning process used for modeling the relationships among the data components.

The manner of learning undertaken for creation of the learned data model 2320 is summarised by the method 2800 of the flowchart of FIG. 28. The method 2800 commences with a step 2810 with a software entry point for the creation and initialisation of the data relationship model. At step 2815, the software searches for, or receives notification of, new and updated schemas 2310 or view definitions 2315. Step 2816 tests when no more can be located, in which case the method 2800 terminates at step 2818. Where notifications are located, step 2820 tests if such relate to schema. If so, a branch commencing with step 2825 is actioned. In step 2825, the new/updated schema definitions are parsed. At step 2830, which follows, key and foreign key functions are analysed. This is followed by updating the learned data model 2320 at step 2835 with the equivalence relationships implied by the key and foreign key definitions. If the notification tested in step 2820 is not a schema, then it is a view definition, a branch commencing with step 2840 is actioned. That step parses the new/updated view definitions, and step 2845 analyses the join conditions contained in the view definitions for previously unknown relationships between data components. Step 2850 then computes the confidence factor on the actual existence of the relationship. The learned data model 2320 is then updated at step 2855. Information about the data sources, the views and the data components referenced by the processed view are also analysed and stored. Steps 2835 and 2855 return the method 2800 to step 2815 to search for new notifications. Accordingly, from FIG. 28, it will be appreciated that the learned data model 2320 is incrementally/iteratively constructed from the various data source schemas and views encountered.

The existence of key/foreign key pairs (in schemas) and joins (in views) between two data components is represented as an equivalence relationship between the two data components in the learned data model 2320. The learned data model 2320 stores a reference to any view definitions that support the equivalence relationship and records the comparison operators used. The learned data model 2320 also associates a confidence factor with the equivalence relationship. The confidence factor, being a value in the range 0-1, describes the degree of confidence the recommendation module 2300 has on whether the two data components are indeed equivalent. The confidence factor is set to one for data components that are defined as key/foreign key pair in schemas. On the other hand, the confidence factor for a relationship learned from the join operations of views has to be assigned manually or computed. Preferably, the confidence factor is computed by the schema and view definition analyser 2305 of FIG. 23. The confidence factor is computed based on:

The existence of any key/foreign key definitions between the two data components in the schemas;

The types of join operations used between the two data components and the number of times the join operations are used in any associated views, and;

In the case the data components are nodes of a structured document, such as an XML document, the existence of other equivalence relationships between their ancestor, sibling or descendent nodes and the confidence factor of such relationships as well.

Figure 24:
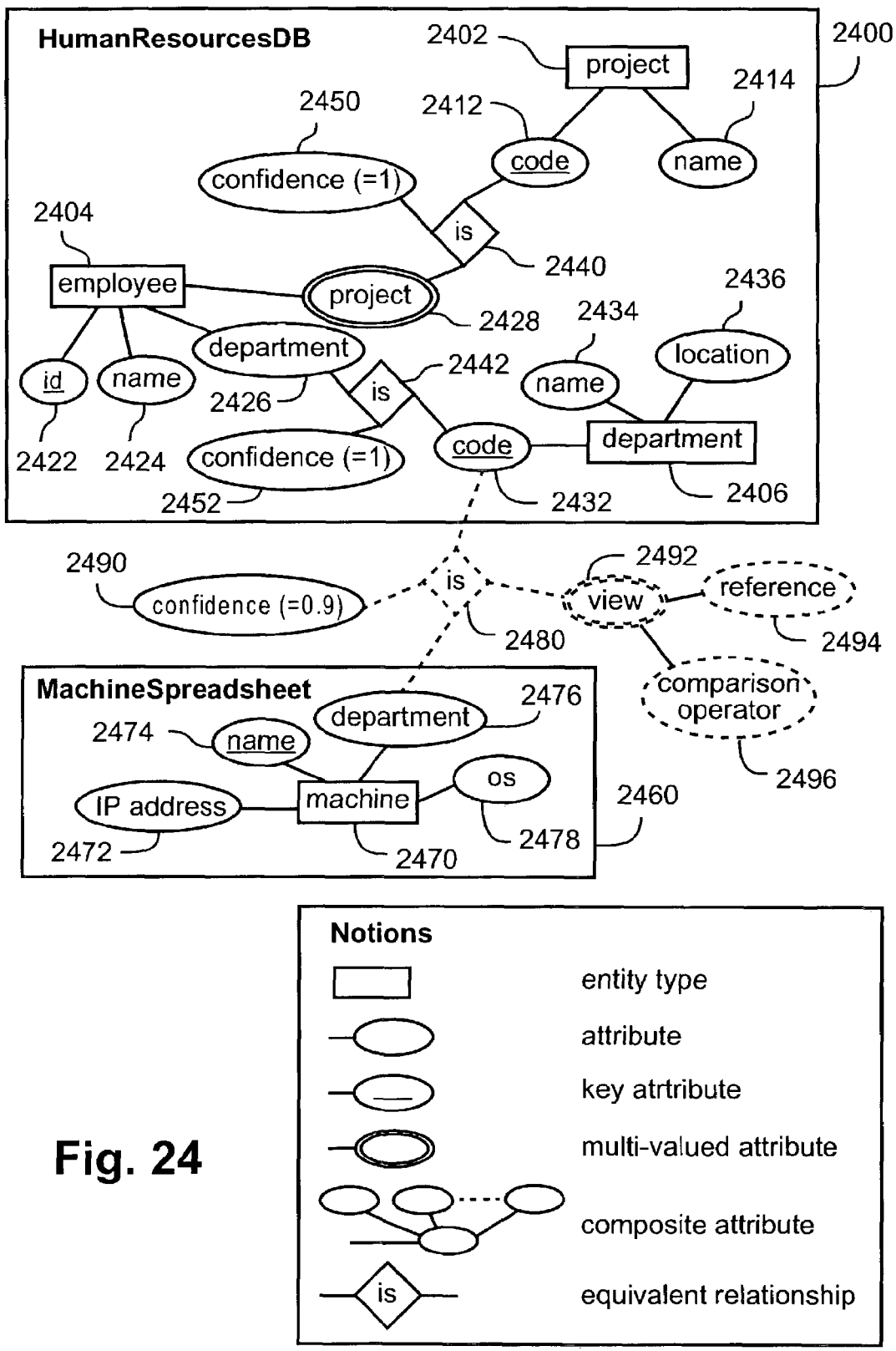
FIG. 24 is an adapted E-R diagram of the example schemas used for demonstrating the data recommendation process.

For instance, the following formula can be used in the example of FIG. 24 to compute the confidence factor (CF):

$CF=1$, if the two components are key/foreign key pair, $CF=0$, if they are not key/foreign key pairs and are not joined in any view definitions; or $CF=\min(0.95, (\max(0.6, CF_m) \times 1.05^n \times 0.5^m)$, otherwise.

where (i) the min and max functions return the minimum and maximum value of its arguments, $CF_m$ is the maximum confidence factor of all equivalence relationships between the ancestor, sibling and descendent nodes of the two data components, (ii) n is the number of times the = operator is used to compare two data components, and (iii) m the number of times other comparison operators are used to compare the two data components in join operations.

The formula above sets the confidence factor to 1 for data components that are defined as key/foreign key pair in schemas and 0 for data components that are not key/foreign key pairs and are not joined in any view definitions.

The formula gives higher confidence (to the existence of an equivalence relationship between the two data components) if the = operator is used to compare the two data components more than once and rapidly lowers the confidence if other comparison operators are used. If the two data components are part of some structured documents and equivalence relationships already exist between their ancestor, sibling or descendent nodes, then the maximum confidence factor of such relationships is used as the base to compute the confidence factor.

Whenever an existing view or schema is modified or removed, or a new view is added to the system, the confidence factors of those equivalence relationships affected by the change are recomputed.

FIG. 24 shows an adapted E-R diagram of an example learned data model 2320. Both entities and attributes (of entities) are valid data components. Indeed, an entity is treated as a composite data component. Instead of representing a relationship by connecting two related entities as in traditional E-R diagrams, FIG. 24 represents the equivalence relationship by connecting the (possibly composite) attributes of the two entities that actually provided the connection. Primary key entities are shown underlined. In the example, a database 2400 defines 3 entities: project 2402, employee 2404 and department 2406. The entity project 2402 has a primary key code 2412 and another attribute name 2414. The entity employee 2404 has a primary key id 2422, attributes name 2424 and department 2426 (which stores the code of the department in which the employee worked), and a multi-value attribute project 2428 which stores the codes of the projects with which the employee is involved. The entity department 2406 has a primary key code 2432, and attributes name 2434 and location 2436. In the example of FIG. 24, project/code and employee/project as well as department/code and employee/department are defined as primary/foreign key pairs in the database schema. An equivalence relationship (2440 and 2442) with a confidence of 1 is associated with each of those key pairs.

FIG. 24 also depicts another data source, a spreadsheet 2460. The spreadsheet 2460 define an entity machine 2470, which has the attributes IP_address 2472, name 2474, department 2476 (which stores the code of the department where the machine is located) and os 2478 (which identifies the machine's operating system). The relationship between machine 2470 of spreadsheet 2460 and the entity department 2406 of database 2400 was not pre-defined but was deduced from the view definition 2500 of FIG. 25. The XQuery predicates [department=$dept] in the view definition 2500 suggests that /machine/department of spreadsheet 2460 may be equivalent to /department/location/code of database 2400.

An equivalence relationship 2480 is added to link the two data components machine/department 2476 and department/code 2432. As the system is not completely certain about the actual existence of the relationship, in this case, the confidence 2490 was computed to be 0.63. The relationship 2480 is shown by dashed lines in FIG. 24 to highlight that the relationship was learned rather than pre-defined. The relationship 2480 also holds a reference 2494 to each view 2492 that implies the existence of the relationship as well as the comparison operator 2496 used by the view in joining the two data components.

The recommendation module 2300 uses the learned data model 2320 of FIG. 23 to assist average users who only have a limited knowledge of the available data sources in creating new views. A set of required data components 2330 is obtained from the users. The set of boolean operators (and, or) may be used when specifying the required data components 2330. A data request processor 2335 then uses the learned data model 2320 to search for data components that are related to the set of required data components.

Figure 29:
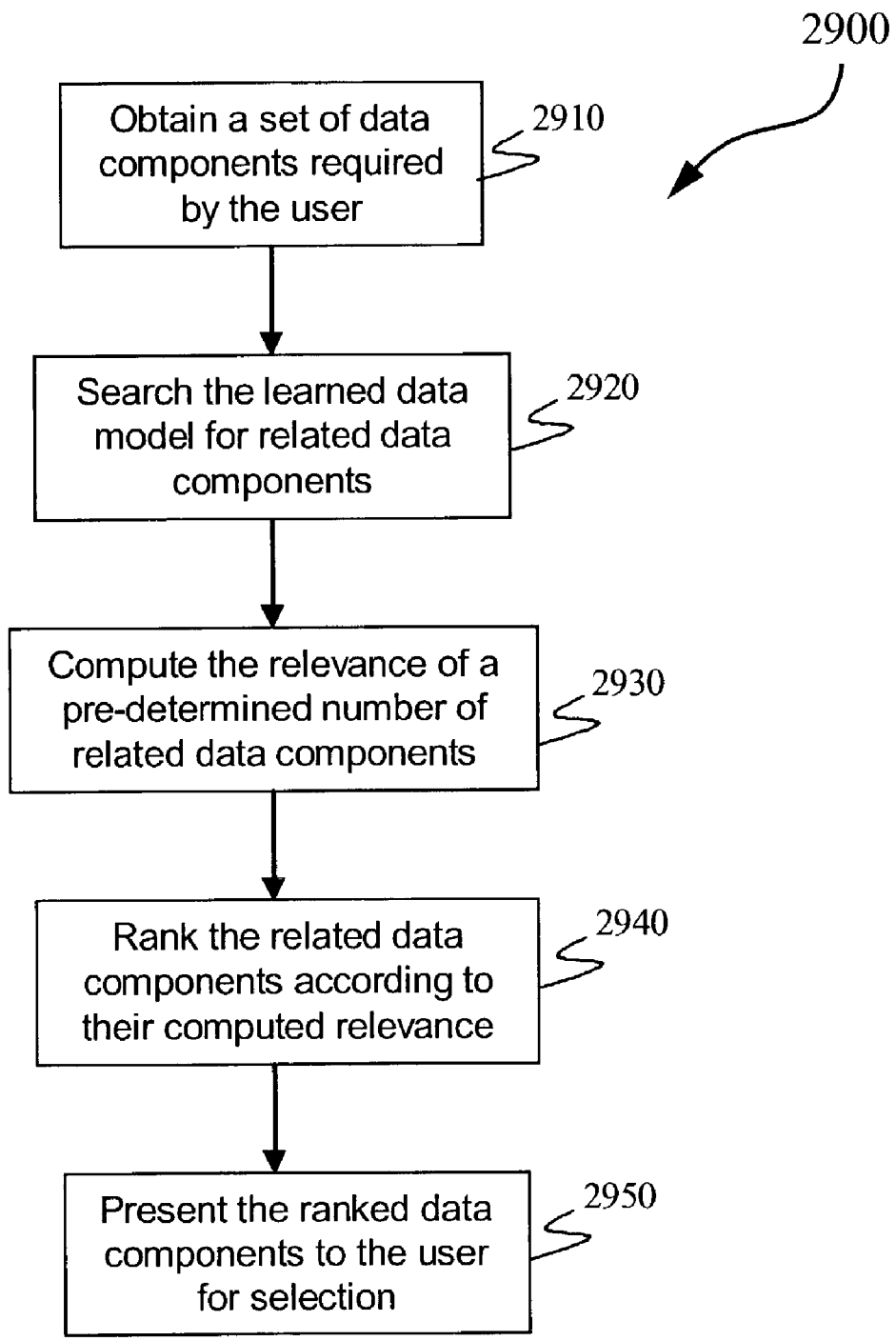
FIG. 29 is a flow chart depicting the process used for recommending data components that are related to a set of specified data components.

The data request processor 2335 and a data ranking processor 2345 operate according to software summarised by a method 2900 shown in the flowchart of FIG. 29. The method 2900 commences at step 2910 where the set of data components 2330 from 20 which the user's desired view to be formed is obtained. Step 2920 then searches the learned data model 2320 for related data components.

A number of related data components 2340 are found and are then passed on to a data ranking processor 2345 which computes the relevance of the data components with respect to the set of required data components 2330 and ranks the data components accordingly. A ranked list of related data components 2350 is then returned in step 2950 to the user for selection. Preferably, the user is allowed to navigate to and select an ancestor, a descendant or a sibling of a recommended data component as long as the join conditions required for linking the recommended data component to the set of required data components 2330 are not violated.

The use of the ranked list of related data components 2350 depends on the application or process receiving the list. Section 8.0 described how the data browsing application 120 uses the ranked list of related data components 2350 to create new data views. In this case, the user can navigate through descendants, and in some cases ancestors, of the recommended data component to select a data component for his/her new data view. However the user's selection of data components cannot violate the display type semantics of the new data view.

The required join conditions will also be returned with the recommended data components. In the preferred arrangement, the returned join conditions are used by the data browsing application 120 to construct the query of a new data view. Alternatively, the user may be allowed to edit the text of the join conditions directly or modify the join conditions through some graphical user interface.

The relevance of a data component with respect to the set of required data components 2330 is preferably computed based on all or a subset of the following factors:

(a) whether the data sources are related directly through a primary or foreign key;
(b) whether the data sources are related indirectly through other primary/foreign keys and join conditions and the level of indirection;
(c) whether the data component constitutes part of a primary or foreign key that links the data sources directly or indirectly;
(d) the confidence factors of the equivalence relationships that link the data components directly or indirectly;
(e) whether any sibling, ancestor or descendant of the data component constitutes part of a primary or foreign key that links the data components directly or indirectly;
(f) the join conditions in any associated views in which the data component is a join attribute;
(g) the other join conditions in the views mentioned in (f) in which the data component is not a join attribute;
(h) the relative frequency of co-occurrence of the data component and any subset of the required data components in existing views; and
(i) the amount of data available for the data component (if statistics about the data is available).

Some of the above factors require statistics on the views 2355 of FIG. 23 and statistics on the data 2360 to be gathered and made available to the recommendation module 2300.

While most databases provide statistics about the data they store, the system may have to gather statistics on data from non-database sources itself.

Using the example of FIG. 24, let's assume now that a user wants to create a new view to summarise the use of machines by projects. With existing reporting systems, the user is typically unable to make use of the relationship that exists between machine 2470 in spreadsheet 2460 and department 2406 in database 2400 to create the desired summary because this relationship is not known as the spreadsheet is created outside the reporting system. The presently described arrangement, however, is able to track and learn the relationship implied by a query associated with a view 2500 of FIG. 25 created earlier by another user who had a knowledge of the relationship between the database 2400 and the spreadsheet 2460. After the user has selected to use the attribute code 2412 of project 2402 from database 2400 for the new view, the module 2300 will suggest to the user that employee 2404, department 2406 and machine 2470 are related, and indicate the data components (that is, code 2412 of project 2402, project 2428 and department 2426 of employee 2404, code 2432 of department 2406 and department 2476 of machine 2470) that provide the links for the relationships. To assist the user to select the correct data components, employee 2404, department 2406 and machine 2470 are ranked according to their computed relevance. Employee 2404 and department 2406 will be ranked higher than machine 2470. This is mainly because employee 2404 and department 2406 are more directly related to project 2402 (through predefined key/foreign key pairs) with a confidence of 1. In contrast, machine 2470 is only known to be indirectly related to project 2402 through the existing view 2460, department 2406 and employee 2404 with a confidence of 0.63. The required join conditions (expressed in XQuery) are:

```
for $prj in distinct-values(document("HumanResourcesDB")/project/code)
let $dept :=
    document("HumanResourcesDB")/employee[project=$prj]/department
let $mc := document("MachineSpreadsheet")/machine[department=$dept])
```

In this example, the user is interested in the data components of machine 2470. The user navigates to and selects name 2474 of machine 2470 for inclusion into the new view. This is allowed because the required join conditions remain unchanged. In a preferred implementation, the data browsing application 120 uses the selected data components and the required join conditions to construct the query 2600 shown in FIG. 26.

10.0 Method of Recommending Data Views

Figure 27:
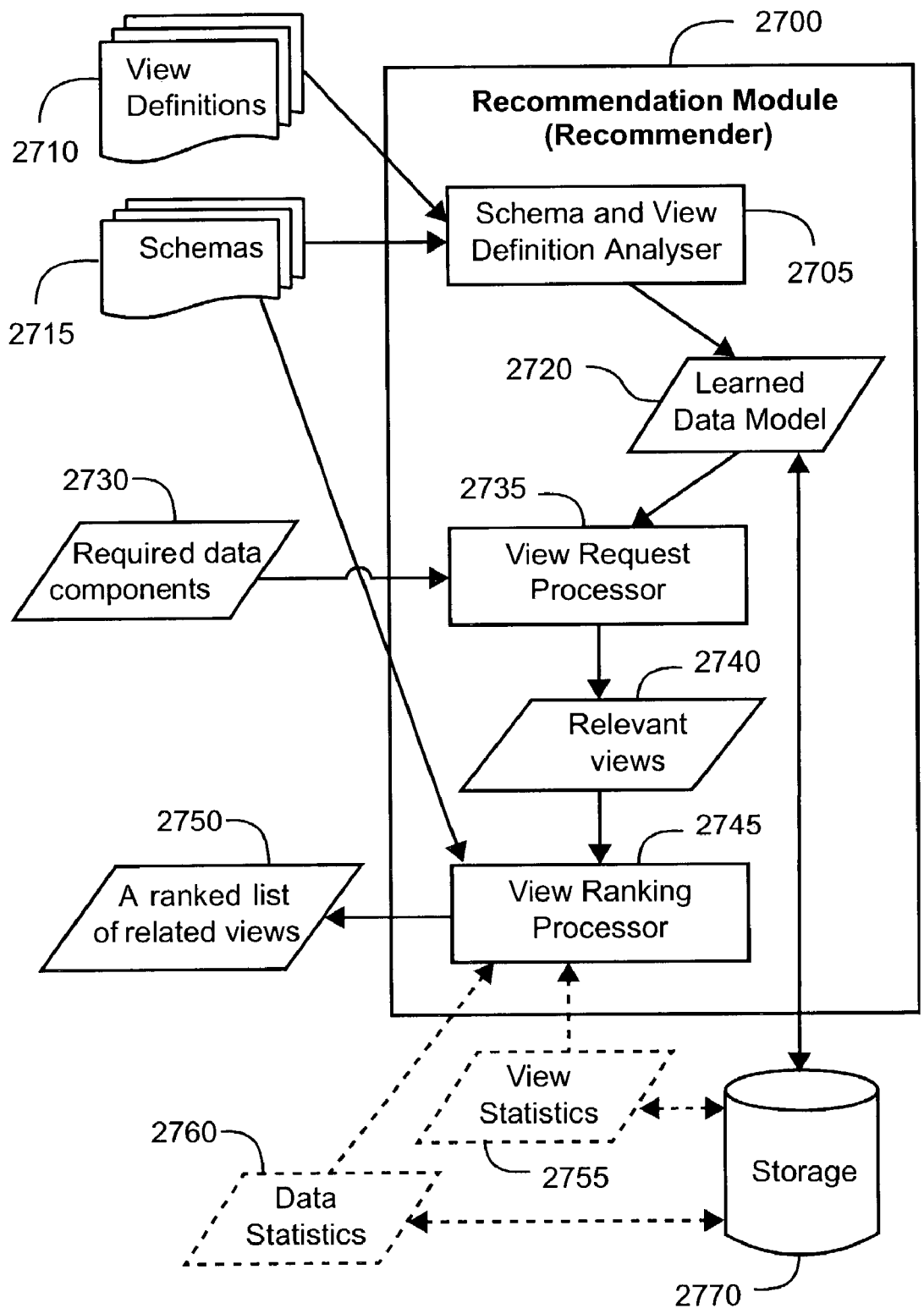
FIG. 27 is a data flow diagram of the data view recommendation process used for recommending data views.

Another aspect of the present disclosure is to assist average users to select an existing view that most closely matches their data requirement. The feature can also be used for selecting an existing view for modification. A high-level block diagram is shown in FIG. 27 to provide an overview of the view recommendation process of the preferred arrangement.

The system uses a learned data model 2720 (which is the same as the learned data model 2320 of FIG. 23) to assist users who only have a limited knowledge of the available views in selecting an existing view that fit the user's data requirement best. A set of required data components 2730 is obtained from a user. The set of Boolean operators (and, or) may be used when specifying the required data components 2730. A view request processor 2735 then uses the learned data model 2720 to search for views that include all or a subset of the required data components. Views that include an ancestor, descendent or sibling of the required data components will also be considered. Relevant views 2740 found by the view request processor 2735 are then passed on to a view ranking processor 2745 which computes the relevance of the views with respect to the set of required data components 2730 and ranks the views accordingly. The ranked list of views 2750 is then returned to the user for selection.

Figure 30:
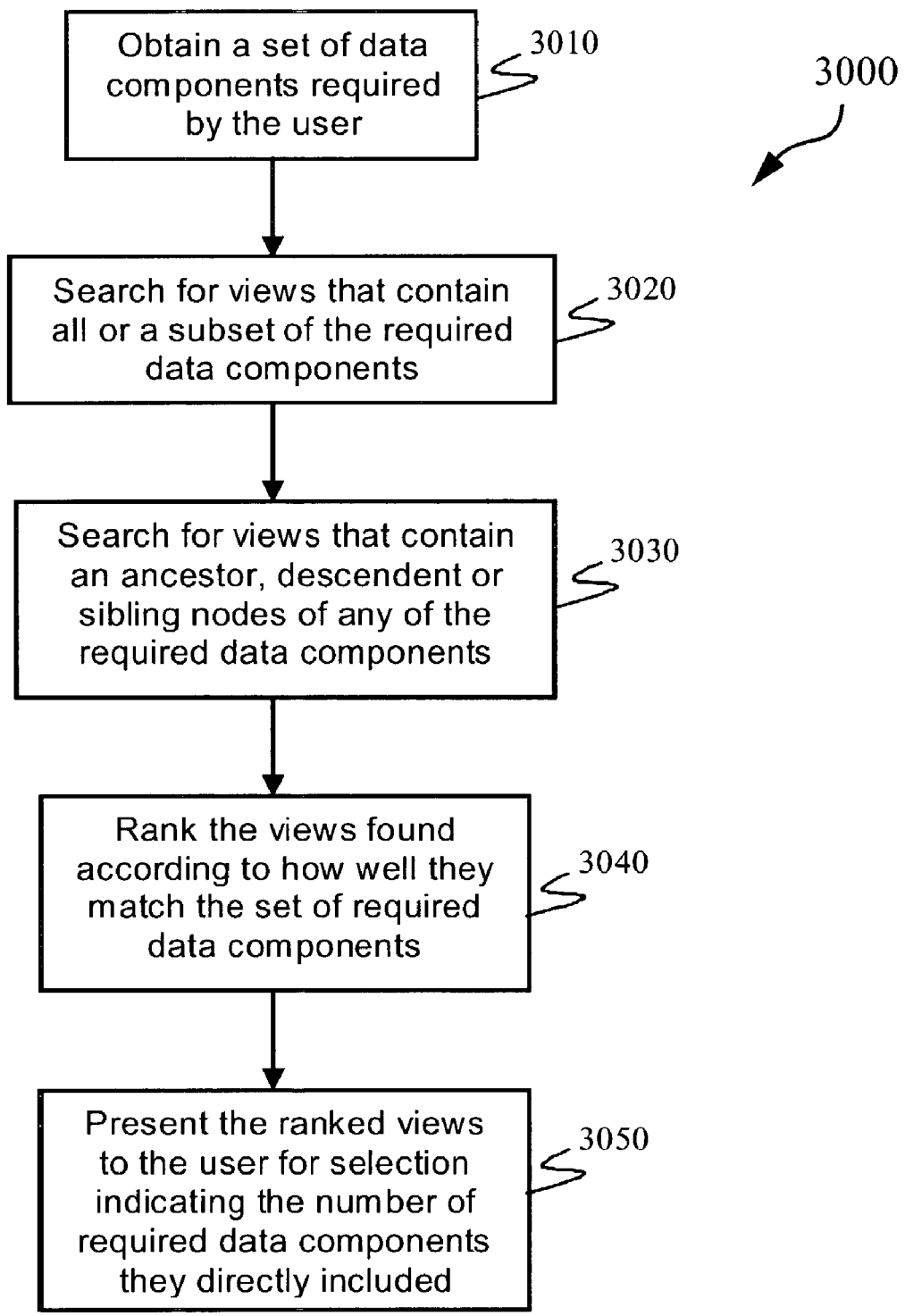
FIG. 30 is a flow chart depicting the process used for recommending data views.

The method of recommending of views, performed by the recommendation module 2700 is summarised in the flowchart of FIG. 30. The method 3000 commences with step 3010 where the software obtains a set of data components required by the user. Next, in step 3020, the software searches for views 2710 that contain all or a subset of the required data components 2730. The view request processor 2735 then, according to step 3030, searches for views 2740 that contain an ancestor, descendent or sibling nodes of any of the required data components 2730. Step 3040, performed by the view ranking processor 2745 ranks the views 2740 according to how well they match the set of required data components 2730. Finally, in step 3050, the processor 2745, presents the ranked views as a list 2750 to the user for selection and indicating the number of required data components that were directly included.

In the preferred arrangement, the relevance of a view with respect to the set of required data components 2730 is computed based on all or a subset of the following factors:
 (a) whether the view contains all or a subset of the required data components;
 (b) whether the view contains any sibling, ancestor or descendant of any of the required data components;
 (c) the number of other data components apart from the required data components;
 (d) the join conditions that are required (or necessary) for joining the set of data components;
 (e) the other join conditions specified by the view; and
 (f) the relative frequency with which the view is used (if the statistics is collected by the view presenting application).

The last factor requires usage statistics 2755 on the views to be gathered and made available to the system.

As an example, assume that the system contains only the two views defined in FIG. 25 and FIG. 26. If the user specifies machine/name 2474 of FIG. 24 as the required data component, then both the view 2500 of FIG. 25 and the view 2600 of FIG. 26 will be returned with view 2600 ranked higher than the view 2500 because the view 2600 contains the data component machine/name 2474 while the view 2500 only contains its sibling machine/os 2478. As another example, if the user specifies machine/name 2474 and project/name 2414 as the required data components, then only view 2600 will be returned as view 2500 does not contain project/name 2414 nor its siblings, ancestors or descendants. As yet another example, if the user specifies department/name 2434 or project/code 2412, both the view 2500 and the view 2600 will be returned with the view 2600 ranked higher than the view 2500 because the view 2600 contains the data component project/code 2412 while the view 2500 contains department/location 2436 which is a sibling of department/name 2434.

The system may also treat each data source (as defined by its schema) as having an implicit view and consider these implicit views along with all the explicit views defined by the users when recommending views. In this case, if the user specifies machine/name 2474 as the required data component, not only the view 2500 and the view 2600 but also the implicit view of machine 2470 will be ranked and returned for selection as well.

The system may also modify a relevant view automatically to create a new view of data for recommendation to the user. One way is to use data components specified by the user instead of their siblings, ancestors or descendants as long as the join conditions of the relevant view remain valid. Another way is by removing from the relevant view join conditions that are not necessary for obtaining the set of data components specified by the user.

11.0 Incrementally Extending Mapping Sets

It is time consuming to create new data views and their associated mappings. For this reason, it is highly desirable for users to be able to share data views and their associated mappings. This sharing process needs further to allow users to add mappings, which they encounter in shared data views to their own browsing environment. The data browsing application 120 provides a means for users to incrementally add mappings to a mapping set by importing mappings encountered in shared data views. In other words, the sharing of data views can be used as a mechanism to incrementally refine a mapping set for use in creating further data views.

This process requires that a data view definition can be serialised and shared with other users. These data views may have been created using a schema view (as described in Section 2.0) or graphically derived from existing data views (as described in Sections 6.0 and 7.0). The data browsing application 120 provides a means for data views to be serialised into an XML format that is suitable for exchange with other users. The preferred serialisation syntax for these data view definition documents is as defined by the XML Schema in Appendix A.

The serialised data view definition contains any mappings used by the data view. These mappings include mappings inherited from other data views and mappings created especially for the data view (as described in Section 6.0). The former class of mappings become related to a data view when a user selects to used a mapped data component when creating the data view using the methods described in the previous sections of this disclosure.

Preferably, the mappings are decomposed into their structural and presentation components and serialised using the W3C Extensible StyleSheet Language Transformations (XSLT) Version 2.0 (see http://www.w3.org/TR/xslt20/). This serialisation process results in a single transform block (enclosed by an '<xsl:transform>' tag) for each of the structural and presentation components in the data view definition document. The structural components are stored as a block within the Query element of the data view definition, whereas the presentation components are stored in the Presentation element. The advantage of serialising the mappings using XSLT is that the receiving data browsing application 120 can use a standard XSLT processor to effect the required transformations on the incoming XML data. A further advantage of using XSLT is that applications other than the data browsing application 120 could readily utilise the transformations.

The structural and presentation components are serialised into separate transform blocks because the data browsing application 120 preferably generates the transformed XML before adding presentation characteristics. Also some applications using the mappings may only be interested in either the presentation or structural components of the mappings.

In an alternative implementation, the mappings could be serialised using a specifically designed syntax. It is desirable though not necessary that the syntax be XML-based. In a further variation, the unit of information being serialised may be a worksheet, or collection of data views. In this case the data view definition component of the serialised document could be substantially unchanged from the example included in Appendix A.

Figure 9A:
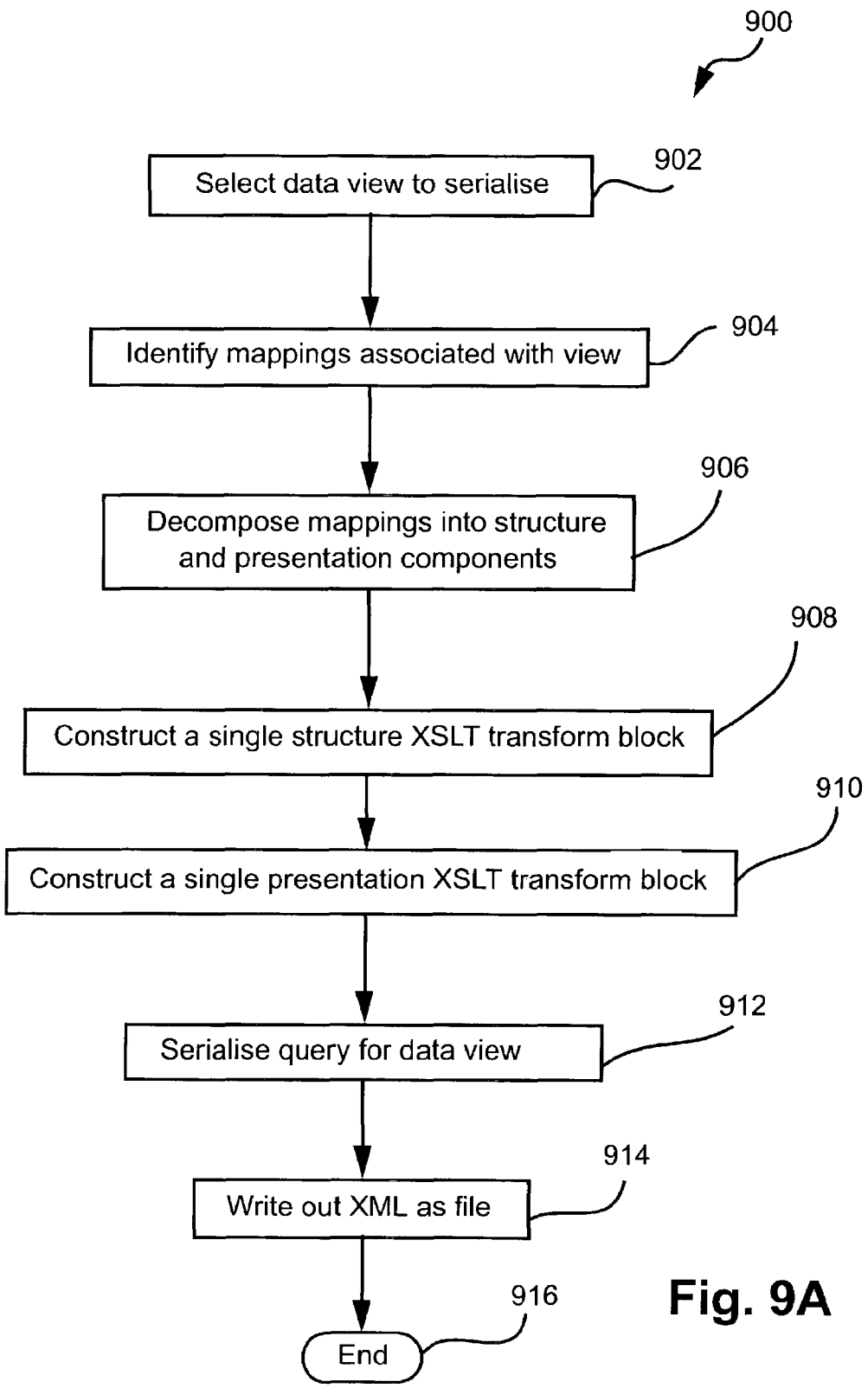
FIGS. 9A and 9B are flow charts describing the processes of serialising and receiving mappings, respectively.

The process of serialising a data view definition will now be described with reference to a method 900 shown in FIG. 9A. The method 900 may be implemented as a part of the data browsing application 120 which is executed by the processor 1105, sourced for example from the storage device 1109 and which may output to the display 1114. In step 902, the method 900 detects a user selection of a data view to save or serialise. Preferably this is the data view that is currently selected in the workspace 1202 of the GUI as shown in FIG. 12A. In step 904, any mappings that are used by the data view are identified as these need to be serialised into the definition of the data view. In step 906, each mapping is decomposed into structural and presentation components. In steps 908 and 910, respectively, the structural and presentation components of all the relevant mappings are each serialised into single structural and presentation XSLT transform blocks.

The query for the data view is then serialised in step 912. Preferably this query is maintained for the data view progressively as it is created and then modified. It is preferably represented as an XQuery expression in the data browsing application 120 and defines how to obtain the source data components for the data view. So, for example, this XQuery may specify how to perform a join across two or more data sources. In the preferred arrangement the query tree structure described in Section 7.0 is serialised to its XQueryX XML format. Alternative arrangements may serialise the query as a string.

The XQuery, structural transform and presentation transform blocks are then written out to an XML file and saved in step 914 and the process completes at step 916.

Figure 9B:
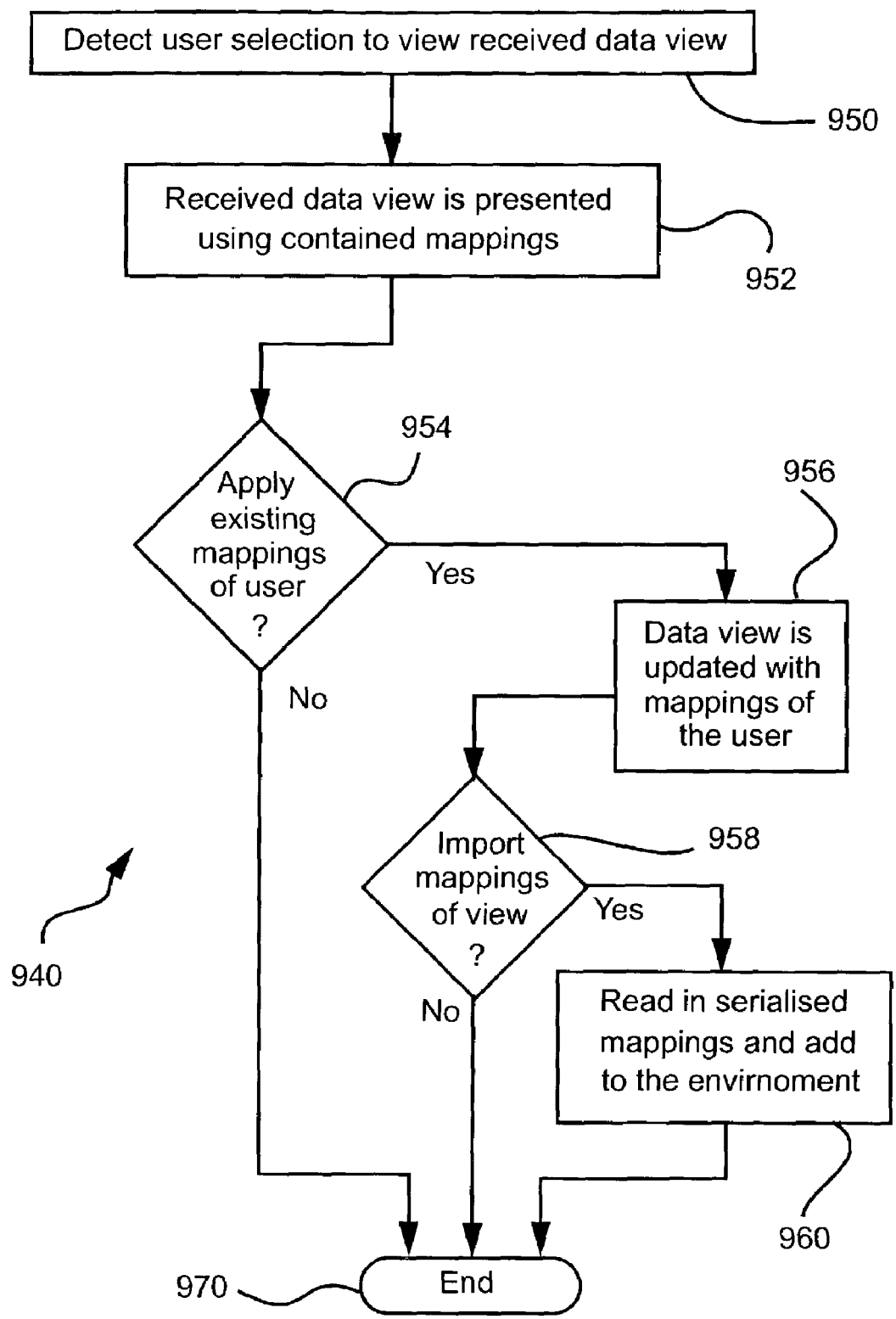

When a user selects to view a data view that they have received from another user, they immediately see the data as transformed by the mappings of the received data view as preferably the transformation, renaming and combination operations have been built into the query. The user may optionally select to also apply any mappings that the user has associated with their own viewing environment. A process 940 of viewing a received data view is described with reference to FIG. 9B. The process 940 begins in step 950 by detecting a user selection to see (view) a received data view. This data view may have been obtained from a web site, via e-mail or from a data view repository. It may also have been received as part of a collection of data views that may have been saved as a workspace. The received data view is processed using the contained mappings in step 952. This processing involves. collecting data from one or more datasources using the query defined as part of the data view's definition. This process is depicted in FIG. 31A. If mappings exist for the data view, the source data is transformed according to the contained mappings resulting in the data view being presented to the user in step 952 using the method described in Section 5.0.

The user is then asked if other relevant mappings, that may exist within the user's own mapping set should be applied in step 954. Preferably this prompt is not displayed if there are no relevant mappings that can be displayed. If the user selects to apply other relevant mappings the user has already accumulated, then the data view is re-processed using the set of mappings that would result if the received data view's mappings were added to the user's mapping set. The new mappings are added to the end of the user's current set and therefore are applied after the user's existing mappings as indicated in step 956. This step means that mappings that have been integrated into the data view's query must be first reversed before the user's amended mapping set is applied to the data. Alternative arrangements may not integrate a data view's mappings into the saved XQuery. On presenting the results of step 956 to the user, the user may choose to revert to the previously generated data view.

The user is then asked in step 958 if the data view's mappings should be added to his/her mapping set. If the user responds positively to this prompt the mappings from the received data view are assimilated in the user's mapping set in step 960, and the process ends in step 970. If the user selected in step 956 not to apply existing mappings then the process terminates at step 970. In an alternative implementation, the user may specify default responses for the two prompts in FIG. 9B as preferences or settings of the data browsing application 120.

Preferably default assimilation is achieved by adding the new mappings in their serialised order to the end of the existing mapping set. This means that they will be applied after existing mappings have been applied. In some cases this is not suitable, and the user can use the data browsing application 120 to alter the priority of mapping rules. A function is provided where all the mappings of a mapping set are able to be viewed in mapping application order sequence. The user can then select particular mappings and drag them up or down the priority sequence list in order to effect a change in the order in which mappings are applied. Inappropriate mappings can also be removed from a mapping set by selecting a mapping and pressing the delete key.

Serialised mapping definitions should preferably include a schemaLocation hint for the target data component of the mapping. If no schemaLocation hint is provided and the data browsing application 120 is looking for a definition for the target data component (eg. to create a schema view), then the data browsing application 120 must try and find schemas that contain definitions for the target data component's namespace.

Within the data browsing application 120, mappings of the user's mapping set are stored in tables of a relational database, for example retained by the HDD 1110. Alternative storage arrangements could also be used, however it is obviously preferable to store the mappings in a format which allows quick retrieval via source and target data component names. For example, when creating a schema view it is necessary to locate mappings that are relevant based on their source data component names. However, when a data view must be serialised it is necessary to identify mappings that are relevant based on the target component names.

12.0 Inferring Transforms used in Style Sheets

An alternative use of the present disclosure applies to the problem of generating style sheets for XML documents. It is common practice in the implementation of many Web sites to re-purpose XML documents for presentation in a browser. This re-purposing can involve performing structural transformations and/or adding presentation characteristics to the original XML data. The most common method of specifying the required transforms is to design an XML style sheet using XSLT.

One problem encountered by organizations implementing Web sites is that typically a graphic designer is the person of choice to design how information is to be presented. This designer uses a Web page (typically HTML) authoring tool to author an example page of the desired presentation. This example page is then referred to a person more skilled in the art of programming to author a stylesheet which defines how data in XML data sources must be transformed to be presented in the way depicted by the graphic designer's example page.

These transforms may involve performing numeric operations on a number of data fields in the XML sources (eg. generating a year-to-date sales value from the sum of quarterly sales values), and/or applying presentation characteristics to various data fields. Although a graphic artist may be comfortable with some of these transforms, the use of many structural transforms commonly used in XSLT style sheets may not be intuitive for artists. The other reason for artists generally not authoring the stylesheet is that the XSLT transform language can be complex and requires significant understanding of XML and related standards (eg. XML Namespaces). From the abovementioned work practice, it is desirable to provide graphic artists with a tool that would enable them to graphically generate XSLT stylesheets without having to write the XML that comprises the stylesheets. Any such authoring environment advantageously provides a means to graphically, rather than textually, define the required transforms. Example-based demonstration of required transforms, principally as described above in Sections 3.0 and 4.0 of this disclosure, can provide the necessary link in this process. In this alternative implementation, there is no need to associate a desired transform with a target name.

A preferred stylesheet authoring environment may be implemented in a manner like existing authoring environments (eg. Netscape Composer). Graphic designers may then define how web pages should look (eg. the colours of the page, presence of any frames, etc.) using methods that are already familiar to them. The graphic designer is then able to select XML data principally as described for the definition of mapping transforms. One or more data sources may be selected. The data associated with the data sources may already exist in static XML documents stored on an accessible file system. Alternatively the data represented by the data sources may be stored in a database and be able to be represented using XML as required.

As the designer selects data components of interest from the selected sources, a list of examples of the data is displayed. These lists of examples are useful in their own right because they show the designers how the data is stored. The designer then can select one example and edit as required for the presentation form. The implied transform can then be predicted using the inference method described previously. The result of the inferred transform can be communicated to the designer by an updated list of examples. Refinement of the transform can then be performed as described previously.

The output of the style sheet design process is an XSLT stylesheet. This style sheet can be used by a system to generate the presentable content (XML, or more commonly, at present, HTML) by performing an XSLT transform at the server on the XML document. Alternatively, as browser applications increasingly support XML and XSLT processing, the presentable form of the content can be generated at the client (ie. a Netscape Navigator™ browser application or Internet Explorer™ browser application operating at a user terminal).

One of the major advantages of providing such a stylesheet authoring system useable by graphic artists is that if changes are required to the information presented to the user by the browser application, the changes will only require the graphic designer to effect the changes. With current systems and work practices, any change to the presentable content, however small, typically involves both the graphic designer and the style sheet author. This means that changes are very expensive to implement.

Industrial Applicability

The above that the arrangements described are applicable to the databases and to arrangements for facilitating vie wing access to data retained by such databases (eg. including the computer and data processing industries).

The foregoing describes only some embodiments of the present invention, and modifications and/or changes can be made thereto without departing from the scope and spirit of the invention, the embodiment(s) being illustrative and not restrictive.

APPENDIX A This Appendix provides an example of XML code that affords a definition of a view.

```
<?xml version='1.0' encoding='utf-8'?>
<xsd:schema
    xmlns = 'http://www.cisra.com.au/DataBrowser'
    xmlns:xsd = 'http://www.w3.org/2001/XMLSchema'
    xmlns:xsl = 'http://www.w3c.org/1999/XSL/Transform'
    xsl:version = '1.0'
    targetNamespace = 'http://www.cisra.com.au/DataBrowser'
    version = '1.0'>
<xsd:annotation>
    <xsd:documentation>XML Schema for Data Browser core attributes (Version 1.0)
    (C) Copyright Canon Information Systems Research Australia (CISRA) 2001
    All Rights reserved
    </xsd:documentation>
</xsd:annotation>
<xsd:element name = 'DataView'>
    <xsd:complexType>
        <xsd:sequence>
            <xsd:element ref = 'Name'/>
            <xsd:element ref = 'Description'/>
            <xsd:element ref = 'CreatedBy' minOccurs = '0' maxOccurs = '1'/>
            <xsd:element ref = 'DateCreated' minOccurs = '0' maxOccurs = '1'/>
            <xsd:element ref = 'Query'/>
            <xsd:element ref = 'Presentation' minOccurs = '0' maxOccurs = '1'/>
        </xsd:sequence>
    </xsd:complexType>
</xsd:element>
<xsd:element name = 'Name' type = 'xsd:string'/>
<xsd:element name = 'Description' type = 'xsd:string'/>
<xsd:element name = 'CreatedBy' type = 'xsd:string'/>
<xsd:element name = 'DateCreated' type = 'xsd:date'/>
<!-- Query block for this data view -->
<xsd:element name = 'Query'>
<xsd:complexType>
    <xsd:sequence>
        <xsd:element name = 'XQuery' type = 'xsd:string'/>
        <xsd:element ref = 'Mappings' minOccurs = '0'/>
        <xsd:element ref = 'FilterList' minOccurs = '0'/>
    </xsd:scquence>
</xsd:element>
<!-- Mappings specific to this data view -->
<xsd:element name 'Mappings'>
    <xsd:complexType>
        <xsd:sequence>
            <xsd:element ref = 'xsl:transform' minOccurs = '1' maxOccurs = '0'/>
        </xsd sequence>
        <xsd:attribute name = 'name' type 'xsd:string'/>
    </xsd:complexType>
</xsd:element>
<!-- Filter specifications for this data view -->
<xsd:element name = 'FilterList'>
    <xsd:complexType>
        <xsd:element name = 'Filter' minOccurs = '0' maxOccurs = 'unbounded'>
            <xsd:complexType>
                <xsd:simpleContent>
                    <xsd:extension base = 'xsd:string'>
                        <xsd:attribute name = 'enabled' type = 'xsd:boolean'/>
                    </xsd:extension>
                </xsd:simpleContent>
            </xsd:complexType>
        </xsd:element>
    </xsd:complexType>
</xsd:element>
<!-- Definition for in-line additional presentation characteristics -->
<xsd:element name = 'Presentation'>
    <xsd:complexType>
        <xsd:sequence>
            <xsd:element ref = 'Mappings' minOccurs = '0' maxOccurs = '1' />
        </xsd:sequence>
    </xsd:complexType>
```

```
</xsd:element>
</xsd:schema>
```

The invention claimed is:

1. A computer implemented method of interactively determining transformations for use in mapping at least one source data component from at least one source to target data component, said method comprising the steps of:
    (a) using a computer to detect selection of at least one said source data component;
    (b) for each said selected source data component, generating a corresponding list of representative data examples;
    (c) using a computer to compile a resulting list of representative data examples for said target data component from said lists of representative data examples of said selected source data components, said resulting list of representative data examples being a limited subset of the source data components and representative of said target data component;
    (d) using a computer to display said resulting list of examples in a graphical user interface;
    (e) using a computer to identify a user generated modification of a single textual entity example from said resulting list of examples, wherein said user generated modification is made by a user selecting the single textual entity example from said resulting list of examples displayed in the graphical user interface and then directly modifying the single textual entity example; and
    (f) using a computer to determine at least one transformation to be applied to the at least one source data component including its corresponding representative data examples displayed in the graphical user interface, said at least one transformation being selected from a list of solutions, each solution of the list of solutions being based on the modified example and comprising at least one function, wherein said at least one transformation is selected from the list of solutions according to one of:
        a length of connectors between said functions; and
        a weight assigned to said functions.

2. A method according to claim 1, wherein step (b) is performed upon each selection in step (a), and step (c) comprises the sub-steps of:
    (ca) initializing said resulting list of representative data examples for said target data component to said list generated in step (b) corresponding to a first selected data source component; and
    where at least one subsequent said data source component was selected in step (a),
    (cb) concatenating each example of said resulting list with a corresponding example in a list generated for said subsequent data source component.

3. A method according to claim 2, wherein step (a) comprises ordering the selection of said source data components, and step (e) comprises detecting selection and editing of said example.

4. A method according to claim 2 wherein generation of said target data component is specified using the W3C Extensible Stylesheet Language Transformation Recommendation.

5. A method according to claim 4 wherein a stylesheet resulting from said generation is used to re-purpose components of the at least one selected data source for presentation.

6. A method according to claim 1, comprising the further step of:
    (g) updating said resulting list of representative examples using said determined one or more transformations and said data components obtained from said one or more data sources.

7. A method according to claim 1, comprising the further step of:
    (h) representing the determined transformation using a stylesheet.

8. A method according to claim 1 where said selection of source data components comprises at least one of:
    (i) a selection of indicia representing the source data components; and
    (ii) a selection of structured data, said structured data comprising a list of representative data examples for said source data component.

9. A method according to claim 1 wherein said step (f) implements a determination by example to derive said transformation.

10. A method according to claim 9, wherein said step (e) comprises an interpretation of a user entered demonstration of a transformation, which structurally transforms the data, and only that part of the example that has been changed by the said modification is considered.

11. A method according to claim 1, wherein said transformation is a unary transform, said unary transform having a single operand, and solutions in which a sequence of unary transforms are performed are considered, with the operand of each step in the transform sequence being the result of the previous step.

12. A method according to claim 1, wherein said transformation is a binary transform involving sequential pairs of data operands.

13. A method according to claim 12 wherein said binary transforms include mathematical functions selected from the group consisting of addition, subtraction, division and multiplication.

14. A method according to claim 1, wherein said transformation is an n-ary operation involving at least two data operands, and solutions in which a sequence of binary transforms are performed with the first operand of each step in the transform sequence being the result of the previous step are considered.

15. A method according to claim 1 wherein said unary transform is selected from the group consisting of:
    (i) a string containing a predetermined number of first words of the operand;
    (ii) a string containing a predetermined number of words starting from a start word;
    (iii) a string containing a predetermined number of first characters of the operand;
    (iv) a string representing operand converted to upper case;
    (v) a string representing operand converted to lower case;
    (vi) a string in which the first characters of all non-conjunction words in the operand are capitalised;
    (vii) a string in which the first characters of all words in the operand are capitalised;
    (viii) a string in which the operand is translated to the language specified by the XML language;

(ix) a string in which all punctuation in the operand is removed;

(x) a string in which the string text is inserted at a predetermined position in the operand;

(xi) a string in which all the conjunctions in the operand have been removed;

(Xii) a number if the operand can be parsed as a number;

(xiii) a string representing the operand;

(xiv) a value which is the negation of the operand;

(xv) a value of the operand as an integer; and (xvi) a value of the operand as double precision number.

16. A method according to claim 14, wherein said n-ary transforms include operations selected from the group consisting of mm, max and sum.

17. A method according to claim 1, wherein said step (F) comprises interpreting a user entered demonstration of a transformation, which defines a style in which at least a part of the transformed data is to be presented, and said demonstration includes at least one of:

(i) a style applied to the entirety of the result of the transformation; and (ii) a style applied to data arising from at least one said source component involved in the mapping.

18. A method according to claim 17 wherein said demonstration of style asserts at least one of:

(i) that the data be displayed using a style characteristic selected from the group consisting of bold, italic, underline, superscript, and subscript; and (ii) that the data be displayed using at least one of a specified font type, font size and colour.

19. A method according to claim 1 wherein said target data component is stored as a named-component of a unique namespace, and said target data component represents a component of a schema view over the at least one selected data source.

20. A method according to claim 1 wherein said target data component of said mapping comprises a dimension consistent with a dimension of the corresponding said source data component.

21. A method according to claim 1 wherein said mapping defines units of said dimension for said target view component and data associated with said source data components of the mapping are converted into said defined units.

22. A method according to claim 1, further comprising extending a set of mappings, said set of mappings acting to provide a unified representation of a collection of heterogeneous data sources and comprising at least one said mapping, said target data component being a constituent part of said unified representation, said extending comprising the steps of:

(1) receiving a data view, said data view having been created for the purposes of exchanging a view of data derived from one or more of said heterogeneous data sources and containing at least one target data component, said target data component resulting from the application of a mapping;

(2) importing, as a constituent part of said set of mappings, mappings associated with said received data view, said importing creating an extended set of mappings; and (3) creating at least one new data view using said extended set of mappings.

23. A method according to claim 1, further comprising visualizing a collection of heterogeneous data sources using a set of mappings, said set of mappings acting to provide a unified representation of the said collection and comprising at least one said mapping, said target data component being a constituent part of said unified representation, said visualizing comprising the steps of:

(1) selecting a set of mappings to use for the visualization;

(2) selecting at least one data source to be visualized;

(3) identifying, for each selected data source, a schema definition representative of said selected data source, and using said definition to identify all child definitions for said data source, to thereby form a schema view for the selected data sources;

(4) generating a tree representation for said schema view;

(5) applying each of said mappings of said mapping set to said schema view, each application of each said mapping comprising the steps of:

(5a) identifying, for said mapping, said one or more source data components;

(5b) if all said identified source data components exist in said schema view, then performing steps (5ba), (5bb) and (Sbc) as follows:

(5ba) identifying the target data component of said mapping;

(5bb) creating a visual representation of said target data component;

(5bc) updating said schema view by inserting the created visual representation of said target data component into said schema view such that the hierarchical context of the target data component in the schema view is the same as a maximum common hierarchical context of the source view components of the said mapping; and (6) visually presenting the updated schema view.

24. A computer readable storage medium, having a program recorded thereon, where the program is configured to make a computer execute a procedure to interactively determine transformations for use in mapping at least one source data component from at least one data source to a target data component, said program comprising:

code providing for detecting a selection of at least one said source data component;

code for generating a list of representative data examples for each corresponding said selected source data component;

code for compiling a resulting list of representative data examples for said target data component from said lists of representative data examples of said selected source data components, said resulting list of representative data examples being a limited subset of the source data components and being representative of said target data component;

code for displaying a resulting list of examples in a graphical user interface;

code for identifying a user generated modification of a single textual entity example from said resulting list of examples, wherein said user generated modification is made by a user selecting the single textual entity example from said resulting list of examples displayed in the graphical user interface and then directly modifying the single textual entity example; and code for determining at least one transformation to be applied to at least one source data component including its corresponding representative data examples displayed in the graphical user interface, said at least one transformation being selected from a list of solutions, each solution of the list of solutions being based on the modified example and comprising at least one function, wherein said at least one transformation is selected from the list of solutions according to one of:

a length of connectors between said functions; and a weight assigned to said functions.

25. A computer apparatus having a processor and a memory, wherein the memory stores a computer-executable program executable by the processor for controlling the computer apparatus to interactively determine transformations for use in mapping at least one source data component from at least one data source to a target data component, and wherein the computer-executable program stored in the memory comprises code to cause the computer apparatus to perform the steps of:

selecting at least one said source data component from at least one heterogenous data source;

generating, upon each selection of one said data source component, a list of representative data examples for each corresponding said selected source data component;

compiling a resulting list of representative data examples for said target data component from said lists of representative data examples of said selected source data components, said resulting list of representative data examples being a limited subset of the source data components and being representative of said target data component;

displaying a resulting list of examples in a graphical user interface;

user modification of a single textual entity example from said resulting list of examples, wherein said user generated modification is made by a user selecting the single textual entity example from said resulting list of examples displayed in the graphical user interface and then directly modifying the single textual entity example; and determining at least one transformation to be applied to at least one source data component including its corresponding representative data examples displayed in the graphical user interface, said at least one transformation being selected from a list of solutions, each solution of the list of solutions being based on the modified example and comprising at. least one function, wherein said at least one transformation is selected from the list of solutions according to one of:

a length of connectors between said functions.

a weight assigned to said functions.

* * * * *